United States Patent
Arazi

(10) Patent No.: US 11,726,891 B1
(45) Date of Patent: **\*Aug. 15, 2023**

(54) REAL-TIME IOT DEVICE RELIABILITY MAINTENANCE SYSTEM AND METHOD

(71) Applicant: Aimcast IP, LLC, Santa Monica, CA (US)

(72) Inventor: Matan Arazi, Santa Monica, CA (US)

(73) Assignee: Aimcast IP, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,150

(22) Filed: Oct. 27, 2022

Related U.S. Application Data

(63) Continuation of application No. 16/948,635, filed on Sep. 25, 2020, now Pat. No. 11,520,677.

(60) Provisional application No. 62/905,670, filed on Sep. 25, 2019.

(51) Int. Cl.
G06F 11/30 (2006.01)
G06F 11/32 (2006.01)
G16Y 20/20 (2020.01)
G06F 18/20 (2023.01)
G16Y 40/20 (2020.01)

(52) U.S. Cl.
CPC ...... *G06F 11/3089* (2013.01); *G06F 11/3065* (2013.01); *G06F 11/321* (2013.01); *G06F 11/324* (2013.01); *G06F 18/295* (2023.01); *G16Y 20/20* (2020.01); *G16Y 40/20* (2020.01)

(58) Field of Classification Search
None
See application file for complete search history.

(56) References Cited

U.S. PATENT DOCUMENTS

| | | | |
|---|---|---|---|
| 6,754,470 B2 | 6/2004 | Hendrickson et al. |
| 7,967,731 B2 | 6/2011 | Kil |
| 8,149,530 B1 | 4/2012 | Lockton et al. |
| 8,162,756 B2 | 4/2012 | Amaitis et al. |
| 8,312,173 B2 | 11/2012 | Berg et al. |
| 8,381,108 B2 | 2/2013 | Fuller et al. |
| 8,504,389 B2 | 8/2013 | Saidel et al. |
| 8,560,498 B2 | 10/2013 | Allen et al. |
| 8,600,774 B2 | 12/2013 | Saidel et al. |
| 8,606,308 B2 | 12/2013 | Simon et al. |
| 8,620,687 B2 | 12/2013 | Saidel et al. |
| 8,622,837 B2 | 1/2014 | Harris et al. |

(Continued)

OTHER PUBLICATIONS

Python—Find pattern in time series graph with pandas—Stack Overflow, (Accessed Sep. 20, 2020) https://stackoverflow.com/questions/55057635/find-pattern-in-time-series-graph-with-pandas, 3 pages, Internet.

(Continued)

*Primary Examiner* — Kevin T Bates
*Assistant Examiner* — Emad Siddiqi
(74) *Attorney, Agent, or Firm* — Amster, Rothstein & Ebenstein LLP

(57) ABSTRACT

The present invention generally relates to systems and methods for detecting and/or isolating any causes of defective and/or partially defective IoT device or individual sensor device(s). In embodiments the present invention generally relates to fixing, replacing, and/or troubleshooting IoT devices and/or individual sensor device(s) that are defective and/or partially defective.

20 Claims, 59 Drawing Sheets

(56) References Cited

U.S. PATENT DOCUMENTS

| | | | |
|---|---|---|---|
| 8,768,728 | B2 | 7/2014 | Saidel et al. |
| 8,799,019 | B2 | 8/2014 | Saidel et al. |
| 8,920,332 | B2 | 12/2014 | Hong et al. |
| 8,945,017 | B2 | 2/2015 | Venkatraman et al. |
| 9,044,171 | B2 | 6/2015 | Venkatraman et al. |
| 9,069,380 | B2 | 6/2015 | Rahman et al. |
| 9,173,576 | B2 | 11/2015 | Yuen et al. |
| 9,173,577 | B2 | 11/2015 | Yuen et al. |
| 9,198,611 | B2 | 12/2015 | Migita et al. |
| 9,202,111 | B2 | 12/2015 | Arnold et al. |
| 9,215,286 | B1 | 12/2015 | Schilit et al. |
| 9,247,884 | B2 | 2/2016 | Yuen et al. |
| 9,274,747 | B2 | 3/2016 | Fuller et al. |
| 9,433,357 | B2 | 9/2016 | Yuen et al. |
| 9,642,209 | B2 | 5/2017 | Eisele et al. |
| 9,715,242 | B2 | 7/2017 | Pillai et al. |
| 9,830,426 | B2 | 11/2017 | Arnold et al. |
| 9,874,457 | B2 | 1/2018 | Fung et al. |
| 9,931,539 | B1 | 4/2018 | de Pablos et al. |
| 10,268,660 | B1 | 4/2019 | Arazi |
| 10,375,135 | B2 | 8/2019 | Lee et al. |
| 10,398,389 | B1 | 9/2019 | D'Alessandro et al. |
| 10,477,640 | B2 | 11/2019 | Eisele et al. |
| 10,512,407 | B2 | 12/2019 | Richards et al. |
| 10,545,132 | B2 | 1/2020 | Guthrie et al. |
| 10,579,866 | B2 | 3/2020 | Bedrosian et al. |
| 10,582,007 | B2 | 3/2020 | Chander |
| 10,599,116 | B2 | 3/2020 | Pillai et al. |
| 10,691,148 | B2 | 6/2020 | Pillai et al. |
| 10,712,722 | B2 | 7/2020 | Pillai et al. |
| 10,719,788 | B2 | 7/2020 | Block et al. |
| 10,825,356 | B2 | 11/2020 | McNichol et al. |
| 10,880,606 | B2 | 12/2020 | Loheide et al. |
| 2008/0182542 | A1 | 7/2008 | Choi et al. |
| 2009/0054123 | A1 | 2/2009 | Mityagin et al. |
| 2009/0300143 | A1 | 12/2009 | Musa et al. |
| 2010/0029370 | A1 | 2/2010 | Robinson et al. |
| 2010/0178985 | A1 | 7/2010 | Chickering et al. |
| 2012/0166372 | A1 | 6/2012 | Ilyas et al. |
| 2012/0166373 | A1 | 6/2012 | Sweeney et al. |
| 2012/0191757 | A1 | 7/2012 | Gross et al. |
| 2012/0244504 | A1 | 9/2012 | Wasserman |
| 2013/0084882 | A1 | 4/2013 | Khorashadi et al. |
| 2013/0139259 | A1 | 5/2013 | Tegreene |
| 2013/0159310 | A1 | 6/2013 | Birdwell et al. |
| 2013/0176438 | A1 | 7/2013 | Mate et al. |
| 2013/0245930 | A1 | 9/2013 | Husain et al. |
| 2014/0142397 | A1 | 5/2014 | Bedrosian et al. |
| 2014/0142967 | A1 | 5/2014 | Bedrosian et al. |
| 2014/0302470 | A1 | 10/2014 | Zapantis et al. |
| 2015/0224364 | A1 | 8/2015 | Hsieh |
| 2015/0237479 | A1* | 8/2015 | Fung ................ G06T 7/246 455/456.6 |
| 2015/0364057 | A1 | 12/2015 | Catani et al. |
| 2016/0178481 | A1* | 6/2016 | Fudulea .............. B60T 8/171 701/33.9 |
| 2016/0324463 | A1 | 11/2016 | Simpson et al. |
| 2017/0053157 | A1 | 2/2017 | Bedrosian et al. |
| 2019/0065970 | A1 | 2/2019 | Bonutti et al. |
| 2019/0228856 | A1 | 7/2019 | Leiter et al. |
| 2020/0204861 | A1 | 6/2020 | Loheide et al. |
| 2021/0019300 | A1* | 1/2021 | Marathe ............ G06F 11/3419 |
| 2021/0058673 | A1 | 2/2021 | Loheide et al. |
| 2021/0144209 | A1* | 5/2021 | Yamato ................ G01D 21/00 |
| 2021/0226647 | A1* | 7/2021 | Richart .............. H03M 7/3059 |
| 2021/0264771 | A1* | 8/2021 | Subramaniam ......... H04Q 9/00 |

OTHER PUBLICATIONS

Time series modeling with Facebook Prophet, JR Kreiger, Towards Data Science, (Accessed Sep. 20, 2020) https://towardsdatascience.com/time-series-modeling-with-facebook-prophet-57f146a11d0d, 11 pages, Internet.

* cited by examiner

| Sensor Device A Specification Information 4360 | | | | | |
|---|---|---|---|---|---|
| Part # | Useful Life | Vendor | Contact | E-Mail | Purchase Order |
| 124A | 3.4 Years | Vendor 1 | Alice | Alice@A.com | PO 1 |
| 672C | 1.2 Years | Vendor 2 | Bob | Bob@B.com | PO 2 |
| 249E | 5.1 | Vendor 1 | Alice | Alice@A.com | PO 1 |

S4402: providing a plurality of sensor devices operatively connected via a network to a computing device S4404: storing, sensor information associated with each sensor device of the plurality of sensor devices S4406: accessing, by a sensor module operatively connected to the computing device the sensor information S4408: selecting, by the sensor module, at least a first group of sensor devices of the plurality of sensor devices S4410: obtaining, by the sensor module, sensor feedback information from one or more sensor devices of the first group of sensor devices S4412: generating a timestamp indicating a time at which feedback data was obtained by the sensor module S4414: storing the sensor feedback information and timestamp S4416: generating, for each sensor device of the first group of sensor devices, sensor variance information S4418: generating, for each sensor device of the first group of sensor devices, sensor deviation information S4420: storing respective variance information and respective sensor deviation information associated with each sensor device of the first group of sensor devices

CONTINUED WITH FIG. 44B

FIG. 44A

S4424: determining, by the computing device, whether at least one sensor device of the first group of sensor devices is at least partially defective S4430: comparing, by the computing device, first respective sensor feedback information associated with the at least one sensor device with first respective sensor information associated with the at least one sensor device S4432: comparing, by the computing device, the first respective feedback information with second respective sensor feedback information associated with one or more other sensor devices of the first group of sensor devices

FIG. 44C

REAL-TIME IOT DEVICE RELIABILITY MAINTENANCE SYSTEM AND METHOD

REFERENCE TO OTHER APPLICATIONS

This application is a continuation of U.S. patent application Ser. No. 16/948,635, filed Sep. 25, 2020 and entitled "REAL-TIME EVENT TRANSCRIPTION SYSTEM AND METHOD" which claims the benefit of and priority to U.S. Provisional Application No. 62/905,670, filed on Sep. 25, 2019 and entitled "REAL-TIME EVENT TRANSCRIPTION SYSTEM AND METHOD" the contents of which is hereby incorporated by reference herein in its entirety.

This application is a continuation-in-part of U.S. patent application Ser. No. 16/527,743, filed on Jul. 31, 2019 and entitled "REAL-TIME EVENT TRANSCRIPTION SYSTEM AND METHOD" which is a continuation-in-part of U.S. patent application Ser. No. 16/379,368, filed on Apr. 9, 2019 and entitled "REAL-TIME EVENT TRANSCRIPTION SYSTEM AND METHOD" which is a continuation-in-part of U.S. patent application Ser. No. 16/220,394, filed on Dec. 14, 2018 and entitled "REAL-TIME EVENT TRANSCRIPTION SYSTEM AND METHOD," which is a continuation of U.S. patent application Ser. No. 15/865,928, filed on Jan. 9, 2018 and entitled "REAL-TIME EVENT TRANSCRIPTION SYSTEM AND METHOD," which is a continuation of U.S. patent application Ser. No. 14/214,894, filed on Mar. 15, 2014 and entitled "REAL-TIME EVENT TRANSCRIPTION SYSTEM AND METHOD," which claims the benefit of and priority to U.S. Provisional Patent Application No. 61/798,710, filed on Mar. 15, 2013, and U.S. Provisional Patent Application No. 61/802,463, filed on Mar. 16, 2013, the contents of all of which are incorporated by reference herein in their entirety.

This application is also related to co-pending U.S. patent application Ser. No. 16/533,312, filed on Aug. 6, 2019 and entitled "REAL-TIME EVENT TRANSCRIPTION SYSTEM AND METHOD" which is a continuation-in-part of U.S. patent application Ser. No. 16/379,368, filed on Apr. 9, 2019 and entitled "REAL-TIME EVENT TRANSCRIPTION SYSTEM AND METHOD," the contents of which is incorporated by reference herein in its entirety.

This application is also related to co-pending U.S. patent application Ser. No. 16/527,743, filed on Jul. 31, 2019 and entitled "REAL-TIME EVENT TRANSCRIPTION SYSTEM AND METHOD" which is a continuation-in-part of U.S. patent application Ser. No. 16/379,368, filed on Apr. 9, 2019 and entitled "REAL-TIME EVENT TRANSCRIPTION SYSTEM AND METHOD," the contents of which is incorporated by reference herein in its entirety.

FIELD

The present invention generally relates to systems and methods for detecting and/or isolating any causes of defective and/or partially defective "Internet of Things" (IoT) device or individual sensor device(s). In embodiments the present invention generally relates to fixing, replacing, and/or troubleshooting IoT devices and/or individual sensor device(s) that are defective and/or partially defective.

BACKGROUND

The expansion and utilization of IoT devices has led to the deployment of various devices that use or include various types of sensor devices that may gather and communicate data in a variety of environments, including in homes (e.g. connected consumer devices), offices and buildings (e.g. connected enterprise devices), and/or manufacturing plants (e.g. connected industrial devices), to name a few. The effectiveness of IoT devices is dependent on the reliability of the data obtained and generated using the IoT devices—highlighting the importance of detecting and/or isolating any causes of defective and/or partially defective sensor devices. Current methods and processes for identifying defective or malfunctioning devices or individual sensors used therein are often unreliable, require the sensor device to be powered off, and do not account for multiple devices failing simultaneously. Thus, it would be beneficial to provide systems and methods for detecting and/or isolating any causes of defective and/or partially defective IoT device or individual sensor device. It would be further beneficial to provide systems and methods for curing causes of defective and/or partially defective sensor devices.

SUMMARY

The present invention generally relates to an improved real-time event transcription system and method.

In embodiments, a method may comprise: (a) obtaining, by a sensor module on a computer system, first sensor feedback information from each sensor device of a first group of sensor devices of a plurality of sensor devices operatively connected via a network to the computer system, wherein the first sensor feedback information includes: (1) identification information associated with each respective sensor device providing first sensor feedback information; (2) respective first readout information provided by each respective sensor device; (3) respective first metadata information associated with and provided by each respective sensor device; and (4) respective first timestamp information indicating a respective first time at which the respective first readout information was generated by the respective sensor device; (b) generating, by the sensor module, respective second timestamp information indicating a respective second time at which the first sensor feedback information was obtained by the sensor module; (c) storing, in at least one memory element of memory operatively connected to the computer system, the first sensor feedback information, including the second timestamp, wherein the at least one memory element further includes historical sensor feedback information associated with one or more sensor devices of the plurality of sensor devices, wherein the historical sensor feedback information includes: (1) identification information associated with each respective sensor device of the one or more sensor devices associated with the historical sensor feedback information; (2) respective historical readout information provided by each respective sensor device of the one or more sensor devices associated with the historical sensor feedback information; (3) respective historical metadata information associated with and provided by each respective sensor device of the one or more sensor devices associated with the historical sensor feedback information; and (4) respective historical timestamp information indicating a respective historical time at which the respective historical feedback information was generated by the respective sensor device of the one or more sensor devices associated with the historical sensor feedback information, wherein the memory comprises: (i) a reliability rating database operatively connected to the computer system, which comprises a respective historical reliability rating for each sensor device of the plurality of sensor devices, and (ii) a sensor information database which includes for each sensor device of the plurality of sensor devices, sensor information including: (a)

sensor identification information unique to each sensor device; (b) location information indicating a sensor location associated with each sensor device; and (C) data range information indicating a range of permissible sensor values for the respective sensor device; (d) calculating, by the sensor module, for each sensor device of the first group of sensor devices, respective sensor variance information based on at least one of the following: (1) respective first sensor feedback information; (2) respective historical sensor feedback information; and (3) respective predictive data, wherein the respective predictive data is generated by the computer system by populating a database with respective exemplary readout information associated with a sensor device of the first group of sensor devices; (e) calculating, by the sensor module for each sensor device of the first group of sensor devices, respective sensor deviation information based on at least one of the following: (1) respective sensor variance information; and (2) first sensor feedback information; (f) storing, by the sensor module in the at least one memory element, the respective sensor variance information and the respective sensor deviation information associated with each sensor device of the first group of sensor devices; (g) determining, by the computer system, a reliability rating of each sensor device of the first group of sensor devices based on at least the following: the respective sensor variance information; the respective sensor deviation information; and the respective first sensor feedback information; (h) determining, by the computer system, whether at least one sensor device of the first group of sensor devices is out of specification by performing at least the following steps: (1) comparing, by the computer system, first respective sensor feedback information associated with the at least one sensor device with first respective data range information associated with the at least one other sensor device, wherein, the computer system determines that the at least one sensor device is out of specification when the first respective sensor feedback data varies by more than a first predetermined threshold from the first respective data range information; (2) comparing, by the computer system, the first respective sensor feedback information with second respective sensor feedback information associated with one or more other sensor devices of the first group of sensor devices, wherein the computer system determines that the at least one sensor device is out of specification when the first respective sensor feedback data is inconsistent with the second respective sensor feedback data; and (3) determining that the at least one sensor device is out of specification by performing the following steps: (A) obtaining respective reliability ratings for at least the at least one sensor device; (B) in the event the respective reliability ratings indicate the at least one sensor is unreliable, the at least one sensor device is determined to be out of specification; and (C) in the event the respective reliability ratings indicate the at least one sensor is not unreliable, the at least one sensor device is not determined to be out of specification; (i) in the case where at least one sensor device is determined to be out of specification, performing the following steps: (1) generating, by the computer system, a notice message identifying the at least one sensor device that is out of sequence, where the notice message includes cause information indicating the at least one sensor device is out of specification; and (2) sending the notice message to a device associated with at least one user of the computer system; and (j) updating, by the sensor module, the historical sensor feedback information with the first sensor feedback information.

In embodiments, in step (d), the sensor module calculates, for each sensor device of the first group of sensor devices, respective sensor variance information further based on: calculated results of a Hidden Markov Model (HMM) algorithm utilizing one or more of the following as an input: the respective sensor variance information; the respective sensor deviation information; the respective first sensor feedback information; and respective historical sensor feedback information;

In embodiments, in step (d), the sensor module calculates, for each sensor device of the first group of sensor devices, respective sensor deviation information further based on at least one of the following: (3) respective historical sensor feedback information; (4) respective predictive data; and calculated results of a Hidden Markov Model (HMM) algorithm utilizing one or more of the following as an input: the respective sensor variance information; the respective sensor deviation information; the respective first sensor feedback information; and respective historical sensor feedback information;

In embodiments, in step (h)(2) of comparing the first respective sensor feedback information with second respective sensor feedback information further comprises comparing the first respective sensor feedback information with one or more of the following: (A) historical sensor feedback information associated with the respective sensor device; (B) historical sensor feedback information associated with the one or more other sensor devices of the first group of sensor devices; (C) predictive data associated with the respective sensor device, wherein the respective predictive data is generated by the computer system utilizing respective exemplary readout information associated with the respective sensor; (D) predictive data associated with the one or more other sensor devices of the first group of sensor devices, wherein the respective predictive data is generated by the computer system utilizing respective exemplary readout information associated with the one or more other sensor devices of the first group of sensor devices;

In embodiments, the computer system weights respective sensor feedback information associated with one or more sensor devices of the plurality of sensor devices that are associated with a first respective reliability rating indicating that one or more sensor devices are reliable more than respective sensor feedback information associated with one or more sensor devices of the plurality of sensor devices that are associated with a second respective reliability rating indicating that one or more sensor devices are unreliable.

In embodiments, determining whether the at least one sensor device of the first group of sensor devices is out of sequence further comprises: (4) obtaining, by the computer system from the reliability rating database, a respective historical reliability rating for each sensor device of the first group of sensor devices; and (5) weighting respective sensor feedback information associated with reliable sensor devices of the first group of sensor devices more than sensor feedback information associated with unreliable sensor devices of the first group of sensor devices. In embodiments, in the event that both the respective historical reliability rating and the determined reliability rating associated with the at least one sensor device indicate that the at least one sensor device is unreliable, the at least one sensor device is determined to be out of sequence. In embodiments, in the event that the respective historical reliability rating indicates that the at least one sensor device is reliable and the determined reliability rating indicates the at least one sensor device is unreliable, the respective sensor device is determined to be out of sequence. In embodiments, in the event that the respective historical reliability rating indicates the at least one sensor device is unreliable and the determined reliability rating indicates the at least one sensor device is reliable, the at least one sensor device is determined to be not out of sequence.

In embodiments, the method further comprises: (k) identifying, by the computer system, respective first readout information associated with one or more sensors that are determined to be reliable based on the determined reliability rating; (l) generating, by the computer system, first machine-readable instructions to provide a first graphical user interface, wherein the first graphical user interface presents a display of the respective first readout information associated with the one or more sensors that are determined to be reliable; and (m) transmitting, by the computer system to an administrator device associated with an administrator of the computer system, the first machine-readable instructions, wherein, upon receipt, the administrator device executes the first machine-readable instructions such that the first graphical user interface is displayed on a display screen associated with the administrator device.

In embodiments, the method further comprises: (k) obtaining, by the computer system, respective sensor information associated with the at least one sensor device that is out of sequence; (l) generating, by the computer system, a report comprising at least the following: (1) the respective sensor information; and (2) a repair message indicating that the at least one sensor device is out of sequence; and (m) sending, by the computer system to the device associated with the at least one user, the report.\

In embodiments, the method further comprises: (k) obtaining, by the computer system, respective sensor information associated with the at least one sensor device that is out of sequence; (l) determining, by the computer system based on the respective sensor information, at least one item associated to purchase, wherein the at least one item is associated with the at least one sensor device; (m) generating, by the computer system, a purchase order comprising at least the following: (1) the respective sensor information associated with the at least one sensor device that is out of sequence; and (2) the at least one item; and (n) sending, by the computer system, the purchase order to a third party vendor. In embodiments, the method further comprises: (o) generating, by the computer system, a report comprising at least the following: (1) the respective sensor information; (2) information identifying the at least one item; and (3) a repair message indicating at least the following: (i) that the at least one sensor device is out of sequence; and (ii) the at least one item; and (p) sending, by the computer system to the device associated with the at least one user, the report. In embodiments, the method further comprises: (q) sending, by the computer system to an electronic device operatively connected to the computer system, the repair message.

In embodiments, the method further comprises: (k) obtaining, by the computer system, respective sensor identification information associated with the at least one sensor device that is out of sequence; (l) storing, in a flagged sensor database of the computer system, the respective sensor identification information; (m) generating, by the computer system, second machine-readable instructions to: (1) flag, by the flagged sensor database, obtained respective sensor feedback data associated with the sensor identification information stored in the flagged sensor database; and (2) store, in the flagged sensor database, the flagged respective sensor feedback data; and (n) executing, by the computer system, the second machine-readable instructions. In embodiments, the method further comprises: (o) generating, by the computer system, third machine-readable instructions to: (1) ignore data received from the at least one sensor device that is out of sequence; and (2) cease transmitting data to the at least one sensor device that is out of sequence; and (p) sending, by the computer system to each sensor device of a second group of sensor devices, the third machine-readable instructions, wherein the second group of sensor devices is the first group of sensor devices less the at least one sensor device, and wherein, upon receipt of the third machine-readable instructions, each of the second group of sensor devices executes the third machine-readable instructions.

In embodiments, the method further comprises: (k) obtaining, by the computer system for each sensor device of the first group of sensor devices, first weather information associated with at least a first respective temperature at the first time within a predetermined radius of respective location information, wherein the sensor variance information is further based on the first weather information, and wherein the sensor deviation information is further based on the first weather information.

In embodiments, wherein the first group of sensor devices selected by the sensor module by performing the following steps: (1) determining, by the sensor module for each sensor device of the plurality of sensor devices, respective location information; (2) selecting, by the sensor module, a group of sensor devices of the plurality of sensor devices based on the respective location information, wherein each sensor device of the group of sensor devices are within a predetermined radius; and (3) determining, by the sensor module for each sensor device of the group of sensor devices, a respective sensor type based on respective sensor identification information, wherein the first group of sensor devices is each sensor device of the group of sensor devices that are of a first type of sensor device.

In embodiments, the method further comprises: (k) determining, by the computer system, whether a first sensor device of the first group of sensor devices is detecting an emergency, based on at least the following: (1) comparing, by the computer system, first sensor feedback information associated with the first sensor device with first data range information associated with the first sensor device, wherein the computer system determines that the first sensor feedback information varies by more than a second predetermined threshold from the first data range information; (2) comparing, by the computer system, the first sensor feedback information with at least second sensor feedback information associated with a second sensor device of the first group of sensor devices, wherein the computer system determines that the first sensor feedback data is consistent with at least the second sensor feedback data; and (3) analyzing, by the computer system a first determined reliability rating associated with the first sensor device, wherein the first determined reliability rating indicates that the first sensor device is reliable; and (l) generating, by the computer system, an emergency notification indicating that the first sensor device is detecting an emergency event; and (m) sending the emergency notification to the at least one administrator of the computer system. In embodiments, the method further comprises: (n) sending, by the computer system to an electronic device operatively connected to emergency services, the emergency notification.

In embodiments, a process for detecting at least a partially defective sensor device may include: (a) providing a plurality of sensor devices operatively connected via a network to a computing device; (b) providing a reliability rating database operatively connected to the computing device, wherein the reliability rating database comprises a respective historical reliability rating for each sensor device of the plurality of sensor devices; (c) storing, by the computing device, in at least one memory element operatively connected to the computer device, sensor information associated with each sensor device of the plurality of sensor devices, wherein the sensor information includes, for each sensor device of the plurality of sensor devices: (1) sensor identification information unique to each sensor device; (2) location information indicating sensor location; (3) data range information indicating a range of sensor values, the data range information including: (i) a maximum sensor value; and (ii) a minimum sensor value; (d) accessing, by a sensor module of the computing device, the sensor information; (e) selecting, by the sensor module, at least a first group of sensor devices of the plurality of sensor devices based on at least the sensor information, (f) obtaining, by the sensor module, first sensor feedback information from one or more sensor devices of the first group of sensor devices, wherein the sensor feedback information includes: (1) identification information associated with a respective sensor device providing the first sensor feedback information; (2) first feedback data provided by the respective sensor device in response to stimuli; and (3) a first timestamp indicating a first time at which the first feedback data was generated by the respective sensor device; (g) generating, by the sensor module, a second timestamp indicating a time at which the first sensor feedback data was obtained by the sensor module; (h) storing, by the sensor module, the first sensor feedback information, including the second timestamp in the at least one memory element; (i) generating, by the sensor module, for each sensor device of the first group of sensor devices, sensor variance information based on at least the first sensor feedback information; (j) generating, by the sensor module for each sensor device of the first group of sensor devices, sensor deviation information based on at least the first sensor feedback information and the generated sensor variance information; (k) storing, by the sensor module in the at least one memory element, respective sensor variance information and respective sensor deviation information associated with each sensor device of the first group of sensor devices; (l) determining, by the computing device, a determined reliability rating of each sensor device of the first group of sensor devices based on at least the following: (1) respective sensor variance information; (2) respective sensor deviation information; and (3) respective first sensor feedback information; (m) determining, by the computing device, whether at least one sensor device of the first group of sensor devices is at least partially defective based on at least the following: (1) comparing, by the computing device, first respective sensor feedback information associated with the at least one sensor device with first respective data range information associated with the at least one other sensor device; (2) comparing, by the computing device, the first respective sensor feedback information with second respective sensor feedback information associated with one or more other sensor devices of the first group of sensor devices; and (3) analyzing respective determined reliability rating, wherein the computing device determines that the at least one sensor device is at least partially defective when at least one of the following occurs: (A) the computing device determines that the first respective sensor feedback data varies by more than a first predetermined threshold from the first respective data range information; (B) the computing device determines that the first respective sensor feedback data is inconsistent with the second respective sensor feedback data; and (C) the computing device determines that the first respective reliability rating indicates the at least one sensor device is unreliable; (n) generating, by the computing device, a notice message identifying the at least one sensor device that is at least partially defective, where the notice message includes cause information indicating the at least one sensor device is at least partially defective; and (o) sending the notice message to a device associated with at least one user of the computing device.

In embodiments, the computing device weighs respective sensor feedback information associated with one or more sensor devices of the plurality of sensor devices that are associated with a first respective reliability rating indicating that one or more sensor devices are reliable more than respective sensor feedback information associated with one or more sensor devices of the plurality of sensor devices that are associated with a second respective reliability rating indicating that one or more sensor devices are unreliable.

In embodiments, determining whether the at least one sensor device is partially defective may further comprise: (4) obtaining, by the computing device from the reliability rating database, respective historical reliability ratings for each sensor device of the first group of sensor devices. In embodiments, in the event that both the obtained reliability rating and the determined reliability rating indicate the respective sensor device is unreliable, the respective sensor device is at least partially defective. In embodiments, in the event that both the obtained reliability rating indicates the respective sensor device is reliable and the determined reliability rating indicates the respective sensor device is unreliable, the respective sensor device is not at least partially defective. In embodiments, in the event that both the obtained reliability rating indicates the respective sensor device is unreliable and the determined reliability rating indicates the respective sensor device is reliable, the respective sensor device is not at least partially defective.

In embodiments, the method further comprises: (p) identifying, by the computing device, respective feedback data associated with one or more sensors that are rated as reliable; (q) generating, by the computing device, first machine-readable instructions to provide a first graphical user interface, wherein the first graphical user interface presents a display the respective feedback data associated with the one or more sensors that are rated as reliable; and (r) presenting, by the computing device based on the first machine-readable instructions, the first graphical user interface on a display screen associated with the computing device.

In embodiments, the method further comprises: (p) generating, by the computing device, second machine-readable instructions including troubleshoot instructions, wherein the troubleshoot instructions are associated with the at least one sensor device; (q) sending, by the sensor module to the at least one sensor device via the network, the second machine-readable instructions, wherein, upon receipt of the second machine-readable instructions, the at least one sensor device performs a troubleshoot operation by executing the second machine-readable instructions; (r) obtaining, by the sensor module from the at least one sensor device, second sensor feedback information; (s) generating, by the sensor module, a third timestamp indicating a time at which the second sensor feedback information was obtained by the sensor module; (t) generating, by the sensor module, for the at least one sensor device, updated sensor variance information based on at least the second sensor feedback information and the sensor feedback information; (u) generating, by the sensor module for the at least one sensor device, updated sensor deviation information based on at least the sensor feedback information, the generated sensor variance information, the second sensor feedback information, the updated sensor variance information and the sensor deviation information; (v) determining, by the computing device, whether at least one sensor device of the first group of sensor devices is at least partially defective based on at least the following: (1) comparing, by the computing device, first respective second sensor feedback information associated with the at least one sensor device with the first respective data range information associated with the at least one other sensor device; (2) comparing, by the computing device, the first respective second sensor feedback information with second respective second sensor feedback information associated with one or more other sensor devices of the first group of sensor devices; and (3) analyzing at least the updated sensor variance information and the updated sensor deviation information, wherein the computing device determines that the at least one sensor device is at least partially defective when at least one of the following occurs: (A) the computing device determines that the first respective second sensor feedback information varies by more than the first predetermined threshold from the first respective data range information; (B) the computing device determines that first respective second sensor feedback information is inconsistent with the second respective second sensor second feedback information; and (C) the computing device determines that the sensor variance information and the updated sensor deviation information indicate the at least one sensor device is unreliable; (w) generating, by the computing device, an updated notice message identifying whether the at least one sensor device is at least partially defective; and (x) sending the updated notice message to at least one administrator of the computing device.

In embodiments, the method further comprises: (p) obtaining, by the computing device, respective sensor information associated with the at least one sensor device that is at least partially defective; (q) generating, by the computing device, a report comprising at least the following: (1) the respective sensor information; and (2) a repair message indicating at least that the at least one sensor device is at least partially defective; and (r) sending, by the computing device to the device associated with the at least one user, the report. In embodiments, the method further comprises: (s) sending, by the computing device to an electronic device operatively connected to the computing device, the report.

In embodiments, the method further comprises: (p) obtaining, by the computing device, respective sensor information associated with the at least one sensor device that is at least partially defective; (q) determining, by the computing device based on the sensor information, at least one item to purchase, wherein the one item is associated with the at least one sensor device; (r) generating, by the computing device, a purchase order comprising at least the following: (1) the respective sensor information associated with the at least one sensor device that is at least partially defective; and (2) the at least one item; and (s) sending, by the computing device, the purchase order to a third party vendor. In embodiments, the method further comprises: (t) generating, by the computing device, a report comprising at least the following: (1) the respective sensor information; (2) information identifying the at least one item; and (3) a repair message indicating at least the following: (i) that the at least one sensor device is at least partially defective; (ii) the at least one item; (u) sending, by the computing device to the device associated with the at least one user, the report. In embodiments, the method further comprises: (v) sending, by the computing device to an electronic device operatively connected to the computing device, the repair message.

In embodiments, the method further comprises: (p) obtaining, by the computing device, respective sensor identification information associated with the at least one sensor device that is at least partially defective; (q) storing, in a flagged sensor database of the computing device, the respective sensor identification information; (r) generating, by the computing device, second machine-readable instructions to: (1) flag, by the flagged sensor database, obtained respective sensor feedback data associated with the sensor identification information stored in the flagged sensor database; and (2) store, in the flagged sensor database, the flagged respective sensor feedback data; and (s) executing, by the computing device, the second machine-readable instructions. In embodiments, the flagged respective sensor feedback data is stored with the respective sensor identification information. In embodiments, the method further comprises: (t) generating, by the computing device, third machine-readable instructions to: (1) ignore data received from the at least one sensor device that is at least partially defective; and (2) cease transmitting data to the at least one sensor device that is at least partially defective; and (u) sending, by the computing device to each sensor device of a second group of sensor devices, the third machine-readable instructions, wherein the second group of sensor devices is the first group of sensor devices less the at least one sensor device, and wherein, upon receipt of the third machine-readable instructions, each of the second group of sensor devices executes the third machine-readable instructions.

In embodiments, the method further comprises: (p) generating, by the computing device, a reliability report comprising, for each sensor device of the first group of sensor devices, at least: (1) a respective reliability rating; and (2) respective feedback data; and (q) transmitting, by the computing device to the device associated with the at least one user, the reliability report.

In embodiments, the method further comprises: (p) obtaining, by the computing device for each sensor device of the first group of sensor devices, first weather information associated with at least a first respective temperature at the first time within a predetermined radius of respective location information, wherein the sensor variance information is further based on the first weather information, and wherein the sensor deviation information is further based on the first weather information.

In embodiments, the first group of sensor devices is selected based on location information.

In embodiments, the first group of sensor devices is selected based on the sensor identification information.

In embodiments, the location information, for each sensor device of the plurality of sensor devices, includes respective hierarchical information associated with a respective sensor device. In embodiments, the first group of sensor devices is selected based at least in part on respective hierarchical information.

In embodiments, the first group of sensor devices selected by the sensor module by performing the following steps: (1) determining, by the sensor module for each sensor device of the plurality of sensor devices, respective location information; (2) selecting, by the sensor module, a group of sensor devices of the plurality of sensor devices based on the respective location information, wherein each sensor device of the group of sensor devices are within a predetermined radius; and (3) determining, by the sensor module for each sensor device of the group of sensor devices, a respective sensor type based on respective sensor identification information, wherein the first group of sensor devices is each sensor device of the group of sensor devices that are of a first type of sensor device.

In embodiments, the senor identification information comprises, for each sensor device, at least the following: (A)

a sensor type; (B) sensor specification information; and (C) sensor running time information indicating a respective amount of time a respective sensor has been operating.

In embodiments, the sensor information further includes: (4) sensor proximity information, indicating one or more sensor devices within a predefined distance of a respective sensor device.

In embodiments, determining whether the at least one sensor device is at least partially defective is further based at least partially on respective sensor variance information, respective first timestamp, and respective second timestamp.

In embodiments, the plurality of sensor devices includes at least one of: (1) a temperature sensor; (2) a pressure sensor; (3) a torque sensor; (4) a MEMS sensor; (5) a humidity sensor; (6) an air moisture sensor; (7) an air flow sensor; (8) a dielectric soil moisture sensor; (9) an optical sensor; (10) an electro-chemical sensor; (11) an accelerometer; (12) a gyrometer; (13) a magnetometer; (14) a proximity sensor; (15) an air bubble detector (16) a piezo film sensor; (17) an angle or position sensor; (18) a voltage sensor; (19) a current sensor; (20) a magnetic or electrical field sensor; (21) an audio sensor; (22) a pH sensor; (23) a time sensor; (24) a biological sensor; (25) a biometric sensor and (26) a radiation sensor.

In embodiments, the method further comprises: (p) determining, by the computing device, whether a first sensor device of the first group of sensor devices is detecting an emergency, based on at least the following: (1) comparing, by the computing device, first sensor feedback information associated with the first sensor device with first data range information associated with the first sensor device, wherein the computing device determines that the first sensor feedback information varies by more than a second predetermined threshold from the first data range information; (2) comparing, by the computing device, the first sensor feedback information with at least second sensor feedback information associated with a second sensor device of the first group of sensor devices, wherein the computing device determines that the first sensor feedback data is consistent with at least the second sensor feedback data; and (3) analyzing, by the computing device a first determined reliability rating associated with the first sensor device, wherein the first determined reliability rating indicates that the first sensor device is reliable; and (q) generating, by the computing device, an emergency notification indicating that the first sensor device is detecting an emergency event; and (r) sending the emergency notification to the at least one administrator of the computing device.

In embodiments, the method further comprises: (p) sending, by the computing device to an electronic device operatively connected to the computing device, the notice message.

BRIEF DESCRIPTION OF THE DRAWINGS

Exemplary embodiments of the present invention will be described with references to the below referenced accompanying figures.

FIGS. 44A-44G are exemplary flow charts of a process for detecting and resolving defective IoT devices in accordance with exemplary embodiments of the present invention;

DETAILED DESCRIPTION

Figure 1:
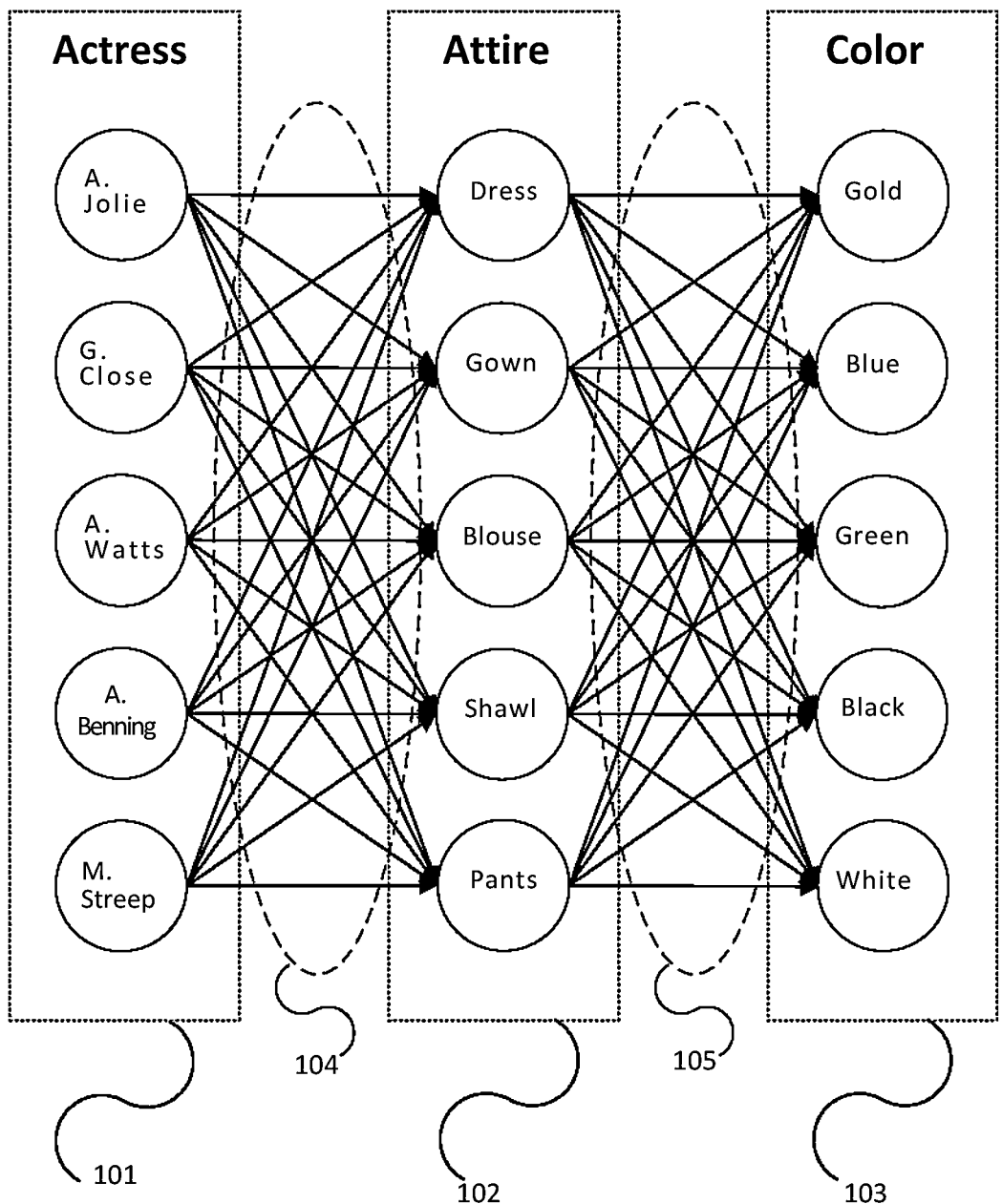
FIG. 1 illustrates an initial set of connections between a plurality of exemplary entity types according to one or more embodiments of the invention.

The present invention generally relates to a real-time event transcription system and method. In embodiments, the present invention provides a technical solution to a technical problem that currently exists in networks, such as crowd-sourcing networks, that rely on information from a plurality of users connected to an electronic computer network to, for example, generate an accurate news report, determine accuracy of a news report, collect opinion information, predict financial market conditions, or predict stock market conditions. As discussed above, these networks suffer from a technical problem in that they cannot identify deceitful users and prevent cheating, which affects accuracy and reliability of the received information.

In embodiments, the present invention is directed to a unique and non-routine method for identifying an unreliable user(s) of a network and/or using a user response(s) in the network to provide an accurate timeline of an event. As further described below, at least one embodiment of the present invention requires unconventional and non-routine method steps that specify how to collect responses from a plurality of users, analyze those responses to determine a reliability rating based on the response information and create an accurate timeline of an event based on the responses while accounting for unreliable responses.

In embodiments, a computing device (e.g., computer system) connected to the network is configured to assign reliability ratings (reliable or unreliable or graded reliability ratings) to users based on the accuracy of the information provided in their responses, wherein a user providing accurate information in a response is reliable and a user providing inaccurate information in a response is unreliable. Based on these reliability ratings, in embodiments, a decision is made as to whether a respective user is unreliable. In embodiments, responses provided by reliable users are weighted more heavily in creating a timeline than response from unreliable users, such that the net result is a more reliable and accurate timeline. These unique and non-routine steps offer a technical solution to the technical problem posed by deceitful users in network applications that rely on user responses.

In embodiments, as described below in Example 12 and illustrated in FIG. 22, the present invention is directed to a unique and non-routine method of generating an accurate news report based on information provided by one or more users of a plurality of users of an electronic computer network, the method including steps of: (a) receiving, by a computing device, identification information associated with each user of the plurality of users of the electronic computer network; (b) storing, by the computing device in one or more databases, the identification information; (c) generating, by the computing device, a first stimulus message related to an event; (d) transmitting, by the computing device, the first stimulus message to a first group of user devices associated with a first group of users of the plurality of users; (e) receiving, by the computing device from one or more user devices of the first group of user devices, a first response, wherein the first response includes: (i) user information specific to the respective user associated with the respective user device that transmits the first response; (ii) responsive information related to the event; (iii) location information associated with a location of the respective user device associated with the respective user; and (iv) a timestamp; (f) storing, by the computing device, the first response in the one or more databases; (g) determining, by the computing device, authenticity of the first response based on one or more of the responsive information, the location information and the timestamp; (h) assigning, by the computing device, a reliability rating to the respective user based the first response by performing steps of: (i) assigning, by the computing device, the reliability rating to be a reliable rating when the location information is consistent with a location of the event and the timestamp indicates acceptable delay; and (ii) assigning, by the computing device, the reliability rating to be an unreliable rating when the location information is inconsistent with the location of the event or the timestamp indicates an unacceptable delay; (i) storing, by the computing device in the one or more databases, the reliability rating; (j) identifying, by the computing device, one or more reliable users based on the reliability rating; (k) selecting, by the computing device, the responsive information associated with the one or more reliable users; and (l) generating, by the computer system, a news report based on the selected responsive information.

In embodiments, as described below in Example 13 and illustrated in FIG. 23, the present invention is also directed to a unique and non-routine method of determining accuracy of a news report based on information provided by one or more users of a plurality of users of an electronic computer network, the method including steps of: (a) receiving, by a computing device, identification information associated with each user of the plurality of users of the electronic computer network; (b) storing, by the computing device in one or more databases, the identification information; (c) generating, by the computing device, a first stimulus message related to the news report; (d) transmitting, by the computing device, the first stimulus message to a first group of user devices associated with a first group of users of the plurality of users; (e) receiving, by the computing device from one or more user devices of the first group of user devices, a first response, wherein the first response includes: (i) user information specific to the respective user associated with the respective user device that transmits the first response; (ii) responsive information related to the news report; (iii) location information associated with a location of the respective user device; and (iv) a timestamp; (f) storing, by the computing device, the first response in the one or more databases; (g) determining, by the computing device, authenticity of the first response based on one or more of the responsive information, the location information and the timestamp; (h) assigning, by the computing device, a reliability rating to the respective user based the first response by performing steps of: (i) assigning, by the computing device, the reliability rating to be a reliable rating when the location information is consistent with a location associated with the news report and the timestamp indicates acceptable delay; (ii) assigning, by the computing device, the reliability rating to be an unreliable rating when the location information is inconsistent with the location associated with the news report or the timestamp indicates an unacceptable delay; (i) storing, by the computing device in the one or more databases the reliability rating; (j) identifying, by the computing device, one or more reliable users based on the reliability rating; (k) selecting, by the computing device, the responsive information associated with the one or more reliable users; (l) determining, by the computing device, a news report reliability rating based on the selected responsive information associated with the one or more reliable users; (m) transmitting, by the computing device, the news report reliability rating to the plurality of users.

In embodiments, as described below in Example 14 and illustrated in FIG. 24, the present invention is also directed to a unique and non-routine method of predicting financial market conditions based on information provided by one or more users of a plurality of users of an electronic computer network, the method including steps of: (a) receiving, by a computing device, identification information associated with each user of a plurality of users of the electronic computer network; (b) storing, by the computing device in one or more databases, the identification information; (c) generating, by the computing device, a first market query related to past financial market conditions; (d) transmitting, by the computing device to at least a first group of user devices associated with a first group of users of the plurality of users of the electronic computer network, the first market query; (e) receiving, by the computing device from at least a plurality of user devices of the first group of user devices, a first market response, the first market response including: (i) user information unique to the respective user associated with the respective user device providing the first market response; (ii) past market information related to prior market conditions; and (iii) a timestamp; (f) storing, by the computing device in the one or more databases, the first market response of each user device of the plurality of user devices of the first group of user devices from which the first market response was received; (g) generating, by the computing device, a second market query related to future market conditions; (h) transmitting, by the computing device, the second market query to the first group of user devices; (i) receiving, by the computing device from at least a plurality of user devices of the first group of user devices, a second market response, the second market response including: (i) user information unique to the respective user associated with the respective user device providing the second market response; (ii) a prediction for the future market conditions; and (iii) a second timestamp; (j) storing, by the computing device in the one or more databases, the second market response of each user device of the plurality of user devices from which the second market response was received; (k) accessing, by the computing device, at least the first market response and the second market response provided by each user device of the first group of user devices; (l) calculating, by the computing device, a market prediction related to the future market conditions based on at least the first market response and the second market rely provided by the first group of user devices.

In embodiments, as described below in Example 15 and illustrated in FIG. 25A, the present invention is also directed to a unique and non-routine method of predicting stock market conditions based on information provided by one or more users of a plurality of users of an electronic computer network, the method including steps of: (a) receiving, by a computing device, identification information associated with each user of a plurality of users of the electronic computer network; (b) storing, by the computing device in one or more databases, the identification information; (c) generating, by the computing device, a first stock market query related to prior stock market conditions; (d) transmitting, by the computing device to a first group of user devices associated with a first group of users of the plurality of users of the electronic computer network, the first stock market query; (e) receiving, by the computing device from a plurality of user devices of the first group of user devices, a first stock market response, the first stock market response including: (i) user information unique to the respective user associated with the respective user device providing the first stock market response; (ii) past stock market information related to the prior stock market conditions; and (iii) a timestamp; (f) storing, by the computing device in the one or more databases, the first stock market response of each user device of the plurality of user devices of the first group of user devices from which the first stock market response was received; (g) generating, by the computing device, a second stock market query related to future stock market conditions; (h) transmitting, by the computing device, the second stock market query to the first group of user devices; (i) receiving, by the computing device, a second stock market response from at least a plurality of user devices of the first group of user devices, the second stock market response including: (i) user information unique to the respective user associated with the respective user device providing the second stock market response; (ii) a prediction for the future stock market conditions; and (iii) a second timestamp; (h) storing, by the computing device in the one or more databases, the second stock market response; (i) accessing, by the computing device, at least the first stock market response and the second stock market response provided by each user device of the first group of user devices; (j) calculating, by the computing device, a stock market prediction related to the future stock market conditions based on at least the first stock market response and second stock market response provided by the first group of user devices.

In embodiments, as described below in Example 15 and illustrated in FIG. 25B, the method of predicting stock market conditions may further include a step of (k) detecting, by the computing device, a trading pattern by performing steps of: (i) generating, by the computing device, a third stock market query related to past transactions; (ii) transmitting, by the computing device, the third stock market query to the first group of user devices; (iii) receiving, by the computing device, a third stock market response from at least a plurality of user devices of the first group of user devices, the third stock market response including: (A) user information unique to the respective user associated with the respective user device providing the third stock market response; (B) stock ID information for a particular stock; (C) stock price information for the particular stock; (D) buy/sell data information for the particular stock; and (E) quantity information for the particular stock; (iv) storing, by the computing device in the one or more databases, the third stock market response; (v) accessing, by the computing device, at least the first stock market response, the second stock market response and the third stock market response provided by each user device of the first group of user devices; (vi) determining, by the computing device, the trading pattern based on at least the first stock market response, the second stock market response and the third stock market response provided by the first group of user devices.

In embodiments, as described below in Example 16 and illustrated in FIG. 26, the present invention is also directed to a unique and non-routine method of gathering opinion information provided by one or more users of a plurality of users of an electronic computer network, the method including steps of: (a) receiving, by a computing device, identification information associated with each user of a plurality of users of the electronic computer network; (b) storing, by the computing device in one or more databases, the identification information; (c) transmitting, by the computing device to at least a first group of user devices associated with a first group of users of the plurality of users of the electronic computer network, market data, the market data including: (i) past price information; and (ii) past volume information; (d) generating, by the computing device, a first market query related to the market data; (e) transmitting, by the computing device, the first market query to one or more user devices of the first group of user devices; (f) receiving, by the computing device, a first market response from at least one user device of the first group of user devices, the first market response including: (i) user identification information unique to the respective user device and associated with the respective user associated with the respective user device; (ii) impression information related to the respective user's impression of the market data; (g) generating, by the computing device, a second market query related to future market parameters; (h) transmitting, by the computing device, the second market query to one or more user devices of the first group of user devices; (i) receiving, by the computing device, a second market response from at least one respective user device of the first group of user devices, the second market response including: (i) user identification information unique to the respective user associated with the respective user device; (ii) prediction information related to at least one of future price information and future volume information; (j) storing, by the computing device in the one or more databases, the second market response; (k) calculating, by the computing device, at least one of a price prediction and a volume prediction based on at least the first market response and the second market response; and (l) transmitting, by the computing device, at least one of the price prediction and the volume prediction to the plurality of users.

Numerous embodiments provide for a client/server user query system that allows multiple users, experiencing varying network latency, to synchronize on a best-effort basis to absolute time events on the server, where these may in turn have been started relative to an absolute event that is external to the system (an example would be a series of questions relating to the outcome of a play in NFL football, in turn synchronized to a TV broadcast). Furthermore, the server can push content to the users in real-time, thus allowing a multitude of clients to be presented with content in real-time on their devices (handhelds, tablets, laptops, etc. be they connected wirelessly or via wired connections) at approximately the same time despite varying network conditions.

It can be appreciated that the present invention can scale to an almost infinite numbers of users, including for example, without limitation, human users, intelligent machine users and/or a combination of human and intelligent machine users, by employing standardized distributed processing methods such as those made available by various cloud computing services, such as, for example, without limitation, Amazon® cloud computing services and/or Google® cloud computing services.

One or more embodiments of the invention can provide generally for real-time event transcription, cheating detection and compensation, and/or synchronizing user engagement. One or more such embodiments can be implemented in the context of detecting cheating in an online game associated with one or more events. One or more embodiments can include, in the same context of an online game, some combination of analyzing latency in individual and cohort responses, machine-trained analysis of user cohort behavior, and analysis of crowdsourcing information derived from the same or other cohorts.

One or more embodiments can provide for one or more of: analyzing crowdsourcing information for the further purpose of analyzing events that are the subject of user responses; utilizing recursive queries to prompt secondary crowd-sourced responses; and additionally, or alternatively using intricate analysis of multiple data sources to form synchronization across delivery paths, locales and modes.

One or more embodiments provide for a method of determining one or more of the existence, sequence and timing of one or more event elements of an event, including the steps of sending, by a computer devices, a first information to a plurality of users in the context of an event or an event element thereof, wherein event elements are associated with one or more time steps and further associated with a state-transition; receiving, by a computing device, from a plurality of users one or more first or subsequent user inputs in reference to the event or an event element thereof in response to the first information, wherein the one or more first or subsequent user inputs in response to the first information is associated with a time step; sending, by a computing device, a second information to a plurality of users in the context of the event and in the context of a time step differing from the time step associated with the first information; receiving, by a computing device, from a plurality of users one or more user inputs in response to the second information; calculating, by a computing device, probabilities associated with one or more of the existence, sequence and timing of one or more event elements including the event from a plurality of user inputs; and determining, by a computing device, one or more of the existence, sequence and timing of one or more event elements including the event, based on the probabilities. One or more embodiments can provide for the first or subsequent and the second or subsequent inputs being derived or implicit inputs, rather than only responsive inputs that are explicitly generated based on specific stimuli.

In various embodiments the first information sent to a set of users can be a query that is related to an element of an event. A stimulus affecting the user can elicit a response from the user. A query can provide a stimulus. An element of an event that is being observed, watched and/or otherwise engaged by a user (such as, for example, interacting as a participant, as an audience member, watching on a mobile device, observing from a distance, monitoring via indirect means, or engaging in any other manner, without limitation, so as to gain information about and form a perception of an event and/or an element of an event) can also provide a stimulus to the user. The absolute time and/or a receipt time relative to a reference timepoint that a user might see a stimulus can be affected by many factors, some of which are shown in Table 1.

Table 1 below summarizes some of the factors that influence when a user sees the stimuli and how their prediction or reaction to it is affected by delays:

TABLE 1

| Factor | Absolute time | Inter-user Standard deviation | Intra-user Standard deviation | Delay |
|---|---|---|---|---|
| When does the user observe the event element | Unknown | High | Low | High |
| User Response Latency | Can be estimated | Medium | Medium | Medium |
| Processing Latency | Can be estimated | Low | Low | Low |

One of the challenges in reconstructing sequences of event elements from inputs received from a plurality of users that each have differing latency characteristics associated with both their observation and/or engagement with an event and associated with their communications with the event reconstruction and/or synchronization system is how to detect and compensate for the latency issues themselves and also how to detect and compensate for potential behaviors of some users who can be aware that latency issues can provide them an advantage and may attempt to exploit their advantage for unfair individual gain or for other purposes that the detection and compensation system and method may seek to counter. In order to manage and overcome such challenges, one or more embodiments provide for utilizing many types of information and disparate sources of data related to, for example: time, location, communication mode, local conditions, content transmissions, user characteristics and behaviors, and any number of other types of information and sources of data, without limitation. One or more embodiments can reference data sources from a group that includes, for example, without limitation, the following data sources:

Cellular/WiFi signal for coarse location detection;

Geo location (GPS) to determine where the user is, and possibly what the minimum transmission delay should be. This input can be used to correlate with other proximate users, optionally using WiFi, NFC, Bluebooth, audio content fingerprinting, or other methods, without limitation, be they mechanical, acoustic, electronic or otherwise.

Mobile device accelerometer to record calculate average hand motion for user, compare to other users and also can compare game to game for same user. If different, this data input can be used for flagging or indicating flagging a potentially-cheating user;

Absolute atomic time (via GPS or the mach_absolute_time( ) function (or equivalent) on mobile device;

Microphone input for audio content recognition to be used for detection of other devices or for audio content recognition. Capture audio input at time user confirms choice, compare to audio fingerprint of event reference to make sure the two are within an allowable threshold, and of other input emitted by other devices. Also compare to user-stated information as to broadcast media and method. If user input is at "wrong" time compared to broadcast, consider to be indication of cheating;

"Logical" locations (venue name, social network location, or other location, without limitation. This input can be used to encourage users to "check-in" via foursquare, Facebook, twitter, etc., without limitation);

Content channel (for example, ESPN, Fox Sports, etc., without limitation);

Event time using the mobile device hardware clock that is not controllable by user, optionally by timing arrival of timing packets;

Event display time, which can be calculated according to an event time and a user delay, such as, for example, compared to audio fingerprint at each stimuli reaction and phone hardware clock;

Content delivery system (TV [cable, satellite, analog], radio [satellite, digital, analog], internet, mobile device [3G/4G/5G, Wi-Fi, or future wireless standards]) allows to calculate base delay depending on range of pre-determined factors including a user's device, communication channels, and delivery method of event broadcast;

User choice (regarding an event or an event element thereof); and

User choice time (locally cached on device). For example, if user choice time is less than a time limit stimuli response, then the system can accept the input even if delay caused the response to be received after the generally allowed timeout setting.

For various purposes, including detecting and compensating for latency and/or delay in users perceiving stimuli and detecting and compensating for a processing system experiencing latency and/or delay in receiving user inputs, one or more embodiments can implement delay estimation methods such as, for example, without limitation:

Prompt user as to the manner in which they will watch the event (radio/TV channel, can then deduce if cable, terrestrial or satellite).

Take a user's geographic location and comparing it to other users. For example, calculate the standard deviation of response time and/or accuracy for users with similar location and/or provider. In, an online betting game context, for instance, allow responses only within certain response time (for example: 2 standard deviations).

Evaluate user's response time and accuracy compared to other media (for example: radio). If there is low correlation with a user's stated reply (for example: HDTV), but a high correlation with other media and methods (example: analog radio), then that user is more likely to be cheating. The system could then optionally employ additional algorithms to detect and compensate for suspected cheating.

At least one or more embodiments of the invention can provide for the following methods or sub-methods for sending query information to a set of users and receiving responses from that or another set of users or a combination thereof:

Randomization: ask the questions in different order, and place the responses in different areas of the screen.

Honeypot testing for other transmission modes: Ask questions that the user would not be able to legitimately know the answer to (for example, if user claims he's on a satellite feed, pop up a question about a commercial that showed up on a cable feed—if user responds correctly to many such honeypots, it means they are not observing with the transmission media and method(s) they claim and with the delay associated with that transmission media and method(s)).

Control cohorts (such as, without limitation, in cheating context), e.g.: (a) Control group of known users that don't cheat; and/or (b) Control group of known users that actively cheat.

Calculate average response time based on an aggregation of mean times for all of the users' responsive actions to various stimuli (for example, see the event on screen, think of a response, send a response, and receive the response in the system. This will generate a certain time range, with a minimal "floor" time. If the system receives an answer before this time, it is probable that user is attempting to cheat or defraud.

Calculate average correct response percentage. For example, if user is further than two standard deviations of that percentage (p-factor of 0.05), then user is probably cheating.

Take user's geo location and compare it to other users. Calculate standard deviation of response time and/or accuracy for users with similar location and/or provider. Reactions to stimuli are only accepted only within certain response time (for example: 2 standard deviations).

Take user's response time and accuracy compared to other media (for example: radio). If there is low correlation with user's stated reply (for example: HDTV), but high correlation with other media and methods (for example: analog radio), then the user is likely to be cheating; and/or Utilizing accuracy measure(s) based on probabilities and successes, e.g., $A(i)=average[p(t)*Si(k, t)]$.

At least one embodiment of the invention can provide for a system that can send and/or display different questions (stimuli) to different groups of users in the context of an event or event elements (timing and distribution of questions determined by the system) and then correlate the responses from the users (both time of indication and answer), in order to predict with a high likelihood what happened and when in the context of the event and event elements. The system can use, recursively, one or more sets of responses to generate the choices displayed for additional stimuli (and the system can combine information from other data sources with the one or more sets of responses in a combined analysis for this purpose). Additionally, the system can adjust the types and/or instances of system-distributed stimuli for sending to differently constituted set or group of users as selected by the system at any specific time based on the system processing data inputs. For example, without limitation, a question may be any one of the following, each sent to a system-selected group of users:

"Will John Doe wear a jacket when he next appears on stage?" to which the displayed list of possible answers may be "Yes" or "No."

"What color dress did Jane Doe wear when she appeared on stage," to which the displayed list of possible answers may be "Green" or "Other."

Upon selection by a large group of users that Jane Doe wore an "Other" colored dress at any particular time of the event, it is therefore likely that she appeared on stage at such a point.

Another case, for example, without limitation, in the context American NFL Football, can display one or more of the following questions to a plurality of users (timing and distribution of questions determined by the system):

"Will the next play be a rush or a pass" to which the displayed list of possible answers may be "Rush" or "Pass."

"How many yards were gained?" to which the displayed list of possible answers may be "more than 10" or "less than 10"

"How many yards were gained?" to which the displayed list of possible answers may be "more than 5" or "less than 5"

"How many yards were gained?" to which the displayed list of possible answers may be "less than 5" or "fumble"

Correlating this data over a large body of users can preferably provide very high and even more preferably provide almost absolute precision to be attained, especially when the system employs any combination of any variety of algorithms (including, without limitation, heuristics, comb filters, auto-correlation, statistical algorithms, machine learning algorithms, multi-agent systems, and so on) used to improve the precision of the derived data. The processing method according to one or more embodiments can also feed the various stimuli of similar events (past of present) as additional signals into the algorithm. As well, the system can employ a variety of algorithms to determine which users shall be shown which questions at whatever time.

Crowd-Sourcing

One or more embodiments can provide a system for using crowd-sourcing, wherein the system can determine which event occurred according to user replies (based on a plurality of replies from a plurality of distinct users) and can then dynamically update the decision model. Based on the time the user replies, the system can estimate the user's location, transmission method and media (TV, radio, live event, etc., without limitation) and other parameters.

The system can compare the users' replies to those replies of other users with, in one or more embodiments, similar characteristics, for example: affinity (including team and player preference, brand preference, stock market trading strategies, financial product preference, industry sector focus, etc.), mobile device metadata (including connection method, broadcast viewing method and so on), purchasing history and geographical location among others (such comparisons determined by the system in accordance with an embodiment), and the system can also use a checking process if the system determines that the user is likely to be cheating (for example, if user says he or she is watching an event on TV, yet the behavior and response time of this user is similar to a typical profile of a user listening on a radio).

An embodiment can provide for the system to produce a transcript of the event, accurate to a very small time interval, that outlines the sequence and timing of events that happened by using either onsite or remote viewers that reacted to various stimuli during said event, and then algorithmically deriving the sequence and timing to produce the transcript with minimal delay. Crowdsourcing techniques may be applied in such computations. For example, output from the system can be used to verify accuracy of other stated transcripts (such as those provided by third parties). Furthermore, output from the system can be further used to verify and mitigate cheating attempts by users. Additionally, output from the system can be used to provide an accurate and timely data-feed of the event sequence which can be transmitted to other third parties).

One or more embodiments provide for a method and a system by which the absolute time that a stimuli (or event element) occurred can be accurately deduced from a plurality of data without any physical nexus at the location of the occurrence of said stimuli. For example, remote sensing and image processing can add to a data stream and provide timing information. As a further example, without limitation, one embodiment can use machine vision to determine when a snap happened in a football game. This determination can allow for increased accuracy when computing latencies because the processing has an external data source that cannot be controlled nor affected by users. See Machine Vision (http://www.sciencedirect.com/science/article/pii/S0262885609002704) and audio monitoring (to detect waveforms that indicate the event happened and, optionally allow timing synchronization) and Acoustic fingerprinting (See Duong, N. Q. K.; Howson, C.; Legallais, Y, "Fast second screen TV synchronization combining audio fingerprint technique and generalized cross correlation," Consumer Electronics-Berlin (ICCE-Berlin), 2012 IEEE International Conference on, vol., no., pp. 241,244, 3-5 Sep. 2012; doi: 10.1109/ICCE-Berlin.2012.6336458), which foregoing references are herein incorporated by reference in their entirety.

One or more embodiments provide for receiving crowd-sourced inputs from remote viewers, wherein a plurality of remote viewers, each viewing the event over any transmission method and media with any propagation or transmission delay endemic to such transmission method and media, can enter their inputs as to the exact and/or absolute time that they witnessed the stimuli occurring (the "epoch"). Any number of such indications, from any number of users, can then be calculated in a plurality of ways, including, for example, by designating certain users as trusted users who view the events and indicate when stimuli occur, with said such trusted users viewing the event over a transmission method and media with a known and predicable propagation or transmission delay. With such a plurality of trusted users giving a plurality of indications, the present invention can be used to calculate when the stimuli occurred by subtracting the known transmission or propagation delay from the absolute time indicated by said power users and by adjust for the human reaction speed of the users both individually and as a group.

One or more embodiments provide for receiving crowd-sourced inputs from local viewers. Similar to crowdsourcing from remote viewers, a plurality of trusted users who are known to be in the immediate proximity to the stimuli can indicate when the stimuli occurred, without any transmission or propagation delay. In this case, only the adjustment for the human reaction speed of the users both individually and as a group need be taken into account. Additionally, the system can utilize the geo-location functionality built into contemporary smartphones (using GPS and other methods) to determine these users are physically proximate to the actual event and thus have minimal latency. The system can then send timing packets (for example as provided by the ping utility and the ICMP protocol, http://tools.ietforg/html/rfc4884 and its predecessors and citations, herein incorporated in their entirety) to determine the data transmission latency between a user's device and one or more servers executing computer code of an embodiment of the present invention.

Synchronizing Input

One or more embodiments provide for synchronizing input from a large number of devices to ascertain content, time, and time differences from varying external stimuli. In one embodiment a viewer can see an event at time, t(e) (or t.sub.event), a viewer can respond to an event at a time t(r) (or t.sub.response), and the system and/or method can process the viewers' responses at time t(p) (or t.sub.process). In embodiments, a plurality of data sources (such as, for example, without limitation, wireless signal, GPS, device accelerometer, absolute time, microphone input, logical location, delivery system base delay, event time, calculated event time, user event-based choice, and user choice time) may be made part of the processing. In one or more embodiments, a delay estimation can be made by: (i) user-stated mode, (ii) geo-location, (iii) ping times and/or (vi) comparing response time and accuracy to other media/ modes. The system and methods can determine, optionally in reference to a standard and precise clock time, calculate and/or generate latency analysis based on t(r), on t(e), or on a difference between t(r) and t(e). Various embodiments can further provide for additional methods of accounting for various latency between users seeing the questions sent to them by an embodiment of the present invention, and [the embodiment] receiving the user responses to the aforementioned questions. The system and method of numerous embodiments provide for measuring (i) how long before a user sees a question appear and (ii) how long it takes a user to respond to the system based on system-prompted and/or system-registered stimuli. This, together with other latency data the system and/or method can acquire or derive, allows for more accurate latency compensation and cheating mitigation. One or more embodiments can further adapt the weights governing the probability of a certain plurality of users responding to various stimuli, using various inputs and parameters as inputs for recalculating the weights at any point.

One or more embodiments can provide for identifying control groups with better latency, such as those users who are physically present at the event location and thus are not subject to propagation delays of the broadcast transmission system. Further, users using mobile devices that allow for lower latency transmission can also be identified. Lower latency is desired because higher levels of statistical accuracy can be attained within a shorter time frame, enabling the filtration of incorrect/fraudulent responses faster and more accurately. In one or more embodiments, less latency is better. Less latency also allows for faster training of the model and lower risk of cheating, and it confers the added benefit of using the lowest latency and the minimum time marker for which an event happened. This is especially important if this rapid training happened as a stimuli response by users (one or more) who can be determined (by location) to be physically proximate to the event.

Detecting and Synchronizing Input Timing

One or more embodiments provide for detecting and synchronizing input timing with neighboring devices by a variety of methods, including, without limitation, WiFi, Bluetooth®, NFC, and/or similar methods. An embodiment can have each device emit specific sound (within and/or outside the audio band) detected by other devices' available sensors. Another or the same embodiment can use both input timing, as described above, and audio content recognition (such as that provided by Duong et al., as previously cited herein)) to determine which method and media is being used to broadcast the event to the viewers, and to further aid in the detection of cheating attempts. An embodiment can use input timing to identify control groups with better latency.

Advanced Processing Methods

One or more embodiments can provide for an ability to use a variety of additional processing methods in the transformation of, for example, without limitation, inputs, stored information, analyzed and calculated information and/or derived or generated information, including machine learning, heuristics, pattern-matching, game-theory, and other analytical and/or processing methods.

Determining Absolute Time

One or more embodiment scan further provide for determining absolute time (and nature) of stimuli without physical presence at location(s) of stimuli. This can further include, without limitation, one or more of: displaying different stimuli to different groups, then correlate responses to predict what happened where and when; recursively using of one set of responses to generate additional query/stimuli; processing being automated within the system; and using heuristics, comb filters, auto-correlation, statistical algorithms, machine learning algorithms, and/or multi-agent systems, inter alia, without limitation, in order to improve the precision of the derived data. The processing in at least one embodiment can one or more of: feed other stimuli of similar events as additional signals (past or present); dynamically change decision graph (represents options for events that have taken and/or are taking place (and potential future events)), wherein crowd-sourcing responses can be used to prune or exclude decision-tree branches; compare individual replies to group to detect cheating or fraud; produce one or more transcripts of one or more events; and/or identify one or more control groups with better accuracy and/or latency.

EXAMPLES

The following examples illustrate embodiments of the present invention. The following examples are not intended to be limiting. It will be appreciated by those of skill in the art that embodiments may be applied to other use cases not specifically called out herein without departing from the present invention.

Example 1. Dynamically Generating (Promotional and Other) Content Based on User Feedback Assume that a major sporting event currently takes place. Millions of people are watching it on their television sets and online. By querying a sufficiently large number of people (and by filtering the fraudulent ones using the method described herein) the system and methods of a one or more embodiments may be able to determine the following for very short time intervals:

How far was a basketball player from the basket when he shot?;

How many yards were just gained in a football game?;

Which team seemed favorite at any given moment?;

What was the color of the dress worn by a leading celebrity when she walked on the red carpet?; and/or Exact play by play outcomes of each play within the event.

Example 2. Reconstructing News Events and Providing Insights

Using large amounts of user responses to stimuli in short intervals throughout the course of an event, (including press conference, disaster, or anything being reported upon) the system and methods of one or more embodiments are able to faithfully recreate the event. In addition, the system and processing steps are able to do the following:

Identify points of specific interest (based on user feedback) and highlight them Generate automatic summaries containing details such as highlights, MVPs and common perceptions Provide recommendations to journalists and other news services regarding the best way to portray an event in order to "cater" to the perceptions of their readers.

Provide accurate timeline of the event with high accuracy and precision and low latency.

Example 3. Ascertaining the Sentiment of an Individual User

One or more embodiments provide for using various sources of information and applying sub-methods described above for ascertaining the sentiment of an individual user. The system enables to accurately predict the users' affinity to various teams, actresses, etc. and without limitation, based on the users' selections, group assignment, or other data, inter alia. Further, by evaluating what may happen in the immediate future, the system in one or more embodiments can predict if that specific user will be happy or sad in the next few seconds. This prediction has extremely high value as an input to any number of advertising and marketing systems and campaigns.

Example 4. Users Creating Stimuli Questions and Response Options

One or more embodiments may allow users to create stimuli questions and possible response options themselves, optionally in real time. In embodiments, the system may then query a plurality of users with the created questions, optionally in addition to the generated questions. One or more embodiments may enable a first user to communicate a second user or with a plurality of other users via written, audio, video, or other means.

Example 5. Event-Reporting Channel

An additional embodiment can provide for an event-reporting channel, whereby the system and/or methods leverage a user-confidence tracking feature. Such an embodiment can allow a cohort of reporters, each reporter associated with a continual evaluation of each reporter's individual confidence levels, to be used to crowd-source input from a plurality of sources. These responses can be processed using the methods described herein to capture various points of view and evolution of sentiment and information over the course of the reported period. These events can also be processed by methods provided for in one or more embodiments, which methods produce an accurate transcript of timeline of the reported event, by correlating the occurrences with the highest likelihood that were deemed to have occurred and had been reported on by users of the highest confidence and lowest latency.

Example 6. Financial Trading

Financial markets constantly publish a wide assortment of data about market status and various indicators, including future and past analysis of indicators, trends and events. The high volume of data, the rapid expiration of old data and the absolute volume of data produced and report make it extremely difficult to track in an actionable manner. One or more embodiments of the present invention can provide for querying a plurality of users as to each of their impressions about released data (past impressions), and to further query a plurality of users as to what they think will happen in the future (future predictions). The system can process such user responses, optionally together with external data sources to enable accurate prediction of, for example, future financial instrument or commodity prices, without limitation, and to optionally either signal trades accordingly or to sell access to the predictions, again without limitation.

Example 7. Stock Exchanges

As with financial markets, stock exchanges also publish a wide assortment of data about market status and various indicators, including future and past analysis of indicators, trends and events, including stock prices, periodic financial reports from companies, option conversion dates and other company information, without limitation. The high volume of data, the rapid expiration of old data and the absolute volume of data produced and report make it extremely difficult to track in an actionable manner. Furthermore, users may be further influenced by reading company reports, leaks, news media, social media, etc., all of which may have an effect on the price of any traded stock. One or more embodiments of the present invention can provide for querying, by computing device, a plurality of users as to what is each of their impressions of released data (past impressions), and to further query, by computing device, a plurality of users as to what they think will happen in the future (future predictions). The system according to such an embodiment provides further for processing such user responses, by a computing device, optionally together with external data sources, and generating accurate prediction of future economic and/or market events and/or event elements, such as, for example, without limitation, future prices of financial instruments or commodities, future likely changes to the price of company shares, future trading volumes, and future short and long positions. Further embodiments can provide for signaling trades accordingly and/or selling access to the predictions, again without limitation.

Example 8. Market Research

A market research or similar company can use large amount of data collected by an embodiment of the present invention to acquire insights as to customer sentiment towards various products, current events, and/or other trends. Such company may entice users to use various applications, including such applications that perform as client devices for the present invention, or as various computer games in order to send queries to users and analyze their responses.

Example 9. Advertising

A promotion or advertising company can use one or more embodiments of the present invention to send advertising to users while they interact with various query and response cycles as provided for by the present invention. Such users, using one or more embodiments, may interact with each other, with celebrities, or with other users as described in EXAMPLE 4, without limitation. The promotion or advertising company may choose to incentivize any user to further interact with the system.

One or more embodiments can be understood in more detail and with more particularity by reference to the further processing approaches and steps that follow below and with illustrative reference to the Figures.

In at least one embodiment, the processing can be illustrated by letting E represent an entities graph, and letting e.1, e.2, . . . e.n be entity types 1 through n. Similarly, let e.1.1, e.1.2, . . . e.1.m be a set of m entities of type e.1. And let entities graph E be infinitely dimensioned.

FIG. 1 illustrates an initial set of connections between a plurality of entity types according to one or more embodiments of the invention. Three different entity types are illustrated, 101-103, each including some exemplary member entities. Connections 104 and 105 depict the initially-available connection between the illustrated entities and each of the entity types. Similar graphs can be created for each type of event (e.g. football game, Academy Awards ceremony, without limitation) for which one or more embodiments of the present invention would apply. For each such event, a generic ontology can be created for defining connections between entity types which may happen at each occurrence within an event.

For example, still referring to FIG. 1, without limitation, for the event "Academy Awards Ceremony", entity of type "actress" 101, with entity type "actress" 101 denoting which entities of type "actress" (Angelina Jolie being actress.1, Glenn Close actress.2, and so on); with 102 denoting "attire" as the entity type such that "Blouse" is denoted as attire.3, and so on). Similarly, 103 denotes various colors, such that "Green" would be color 3. Entity type "actress" 101 can be connected to entity type "attire" 102 by connection 104 of type "is wearing." Entity type "attire" 102 can be connected to entity type "color" 103 via connection 105. The initial connections are {n:n}, which means that if a connection is defined between entity types a and b, all the entities in the former group are initially connected to all entities in the latter.

It should be understood that a connection between entities can, in one or more embodiments, be considered as a relationship descriptor or predicate (arc) that relates two objects (or nodes) in a semantic statement, or a semantic triple-store, such that numerous additional methods of database storage, including graph-type databases, can be used, and which can allow very rapid analysis of the graph-store utilizing multi-threading processor architectures, optionally arranged in any distributed processing topologies.

In embodiments, during the training phase of the model (or by analyzing prior events, and/or by applying defined rules for the event type, for example the official rules for a football game), for each point in time (which can alternatively be referred to as an "occurrence" or as an "event element"), the system and/or method can use the predictions of a set of users as to what will happen in order to assign weights to the various connection between the entities (the strength of the outgoing links from each entity are normalized to 1). The weights can be arranged as templates so that no prior knowledge about the particular actors of an event need be required; all that is needed is a general knowledge as to the type of the event.

Still with reference to FIG. 1, when creating entity types 101, 102 and 103, for example, and defining connections 104, all entities are initially connected. Based on the predictions of a set of users, only some of the links will be retained (e.g., all connections having strength below a predefined threshold or zero can be discarded). Once all valid connections have been defined, one or more embodiments may calculate the probability of each combination of connections to occur by multiplying the probabilities of all of its "elements" happening together (such as, for example, the probability that actress Angelina Jolie will arrive at the Academy Awards, the probability that she will arrive wearing a dress, and the probability that the dress will be blue).

The training process can be included of two distinct processing aspects. The system and/or method of one or more embodiments calculate (1) the users' predictions about future occurrences as well as (2) their impressions about past occurrences (the very near past, such as, for example, without limitation, sometimes only seconds in the past). At any given time, t, users can be presented with two series of questions: (a) questions that ask them to predict what will happen next (i.e., for example, what will be the next occurrence(s) at time t+1, t+2, or at later time points); and (b) what was the occurrence that took place at time t−1, t−2, or earlier time points. The latter question set also consists, in addition to "legitimate" questions designed to infer the sequence of occurrences within said event, of questions designed to detect frauds and intentionally incorrect answers.

Although information about past occurrences and events is usually more solid, the predictions about future occurrences offer at least two important advantages: (1) they encourage users to participate, as a sort of competition (which one or more embodiments may further realize as a game application of any kind); and (2) they confer additional information (which is likely to be more abundant, because of the additional interest) that could be augmented into the data analysis.

By using a "sliding window" technique, the state of each occurrence within an event at each time t is updated at least twice—its initial state is set in time t−1 (as a prediction about the future) and is then modified again in time t+1 (as a question about the past). It should be further understood that either t+1 and/or t−1 can be t+p or t−q, designating any point in the past or the future). In addition, each state may be updated n additional times with n being the size of the sliding window. In embodiments, a Hidden Markov Model (HMM) algorithm may be used to update and correct the states sequence. Alternatively, other embodiments may use other kinds of algorithms. In embodiments, even though a lower weight may be allocated to predictions about future occurrences in comparison to impressions about past occurrences that already happened in the calculation of the probabilities and states, they nonetheless, in embodiments, play an important role.

It is important to note that multiple stimuli questions relating to the same occurrence may be created. For example, an occurrence of "Kobe Bryant shot a three pointer from 25 feet" may be a part of an almost identical set of stimuli questions, each specifying a slightly different distance. Each element in the question may vary, which of course leads to a large number of possible states. The likelihood of each state can be managed and determined by the algorithm or algorithms used in one or more embodiments, including without limitation Hidden Markov Models, Conditional Random Fields, and other suitable methods It should be further noted that multiple algorithms may be used in parallel to create a multi agent system, optionally also using a "mixture of experts" or other ensemble methods to obtain better performance and/or accuracy. It should be further appreciated that the processing of any step or module of the present invention need not be limited to a single application running on a single computing device, and that numerous parallel processing and scalability can be applied to embodiments of the present invention.

During the training phase, in embodiments, the process may compare the predictions (stimuli responses) made by a set of users to the occurrences that actually transpired in the real world and match their prediction responses to "known good" input sources, such as human taggers and other sources of information that become available after an occurrence has been actually happened. A "human tagger" is a person or plurality of people who refine the data captured and processed by the system using human intelligence as well as their personal knowledge and experience as it applies to the analyzed event and its entities, all in order to enhance the accurate of the data during the training phase. When the system is operating in runtime phase, the process already possesses a large states matrix and information about various predictions. For this reason, each iteration only needs to calculate the various probabilities of each observation and it can "predict the past" almost instantaneously after it has occurred. In addition, by analyzing past occurrences, the process can calculate the "real" probabilities (or at least close enough approximation) of options that are likely to occur during an event.

In embodiments, a system that has an elaborate decision graph or state transition diagram, dynamically changing as a result of a live event, is provided. The event can further include multiple occurrences or event elements. Such a decision graph can represent options for events and/or event elements that have taken place and/or are taking place, as well as events that have not yet happened, but which may occur in the future. Some branches of such a decision graph according to one or more embodiments can be mutually exclusive options; i.e., if one option occurs, then the other option(s) certainly do not occur. Therefore, if a derivative of such an option occurs, then the system can identify with very high probability that the other branch in the decision graph, and all of its derivatives, have been eliminated. For example, if it is given that A and B are mutually exclusive decisions (branches) on the same decision graph, with AA and BB being derivative decisions of options A and B, respectively, then if the system identifies that event BB occurred, the system can calculate with high probability that the entire A branch, and all subsequent options (including AA), have been eliminated. This can be further illustrated by an example, as follows: The system is asked to determine whether the weather today is sunny or cloudy. However, if during another question the user replies that it is raining, then certainly the system can identify that it is cloudy today.

Figure 2:
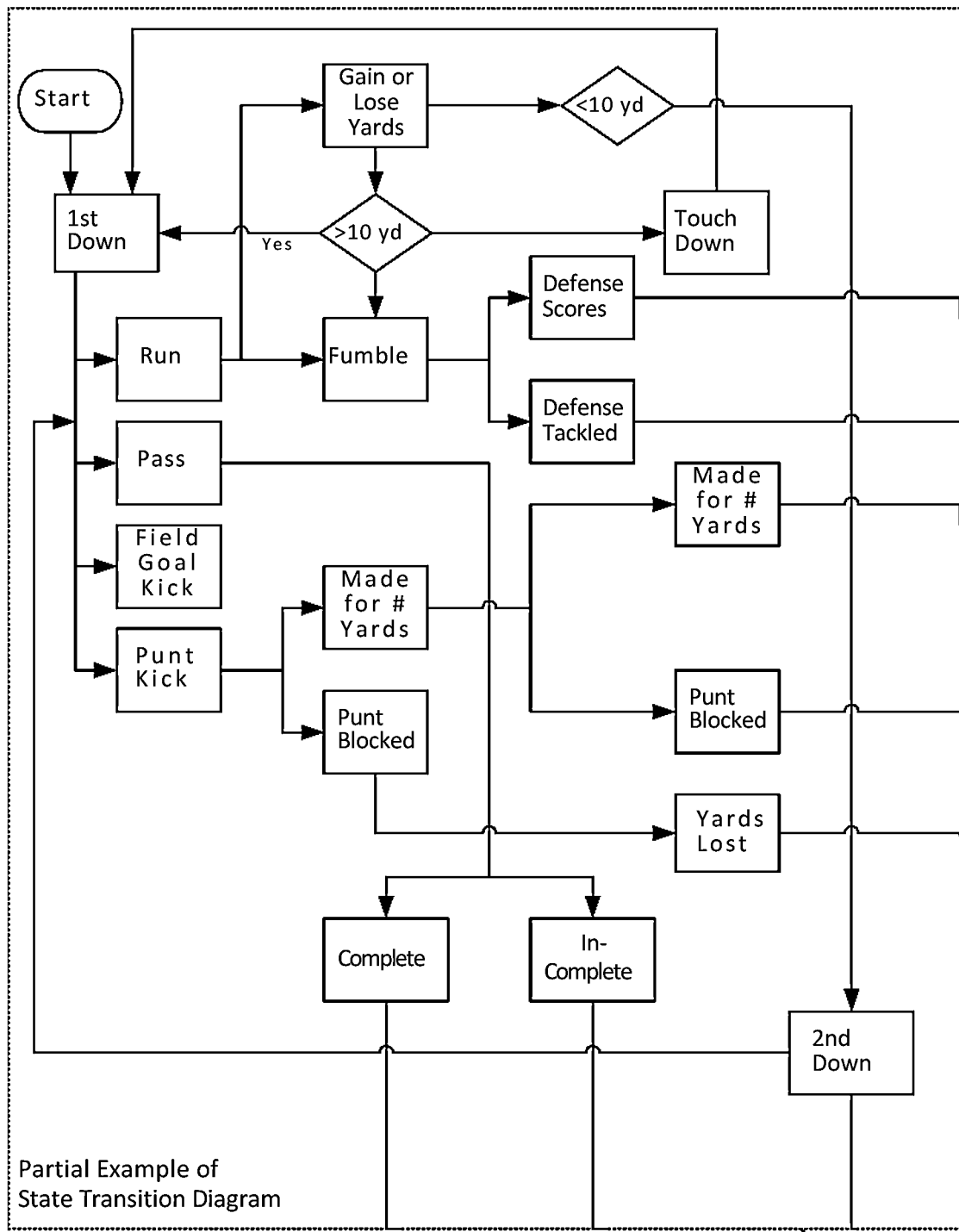
FIG. 2 illustrates an example of a state transition diagram according to one or more embodiments of the invention.

Referring now to FIG. 2, a decision graph 201 depicts a partial description (or an illustrative subset) of the different states and transitions that may occur during a game of NFL Football. It can be appreciated by a person skilled in the art that such a graph may be designed using a plurality of applications, such as, for example, without limitation, Bonitasoft® brand (version 5.5) business process management (BPM) or workflow software, and that the such graphs, optionally implemented as workflows, may be programmatically operated upon by applications such as, for example, without limitation, Apache Software Foundation's jBPM (version 5.4) software package.

One or more embodiments can provide for modelling the problem described above as a Hidden Markov Model (HMM) problem, where a states transition matrix can be created by transcribing the rules, optionally using a decision graph or state transition diagram, of the event in question into computer-operable instructions. Still referring to FIG. 2, a state mapping or decision graph 201 can represent multiple elements of an event that can flow sequentially from another event element, and/or wherein legal transitions exist from one event element to another. "Legal transitions," as used here signifies those transitions in state space allowed by the rules of a game and/or allowed by the known and/or calculable physical, transactional, logical and/or other constraining requirements associated with a set of one or more event elements that include an event state space. The decision graph 201 can be optionally rendered as a state transition matrix, that can be further generated by a training phase (analysis of past events to determine legal occurrences, the likelihood of each occurrence, and optionally further refined by "known good" information such as a transcript of a prior event, comparison to a television recording and/or other data feed). In one or more embodiments, the states transition matrix and the observations matrix (and their probabilities to be connected with each state) can be further generated by analyzing a set of users' predictions. Further information about Hidden Markov Models (HMI) can be found at http://www.cs.sjsu.edu/faculty/stamp/RUA/HMM.pdf, herein incorporated by reference. http://cran.r-project.org/web/packages/HMM/index.html.

HMM's can be further understood and implemented by one of ordinary skill in the art by reference to Ghahramani, Zoubin; Jordan, Michael I. (1997). "Factorial Hidden Markov Models". Machine Learning 29 (2/3): 245-273. doi:10.1023/A:1007425814087 (which is hereby incorporated by reference in its entirety).

According to one or more embodiments, the system can use HMI to determine the most likely set of events based on the set of observations provided by users over a certain span of time. By analyzing the observations and the probabilities of transitioning from one state to another (that is, for selecting which occurrence will happen next based on what has actually happened during an event), the system can determine the most likely set of states to have occurred and also correct its predictions when new information becomes available.

Sampling Intervals in embodiments, the size of the interval that will be used for sampling will be determined based on one or more of the following factors: (1) Number of available users: Preferably, the number of users available to the system in one or more embodiments is in the range of 10 to 50 million, more preferably the number of users available to the system is in the range of 10 to 100 million, and most preferably the number of users available to the system is in the range of 10 to 50 billion. However, it is understood that some embodiments of the system and method can allow for as few as any plurality of users. (2) The number of possible likely outcomes—based on the states transition matrix and previously collected observations the system can determine when the range of possible future states is small or large. A small set of possible outcomes will enable an embodiment to approach a smaller number of users and query them with a larger interval. Preferably, the number of likely outcomes is in the range of 1 outcome to 1 million outcomes, more preferably the number of likely outcomes is in the range of 1 outcome to 10 million outcomes, and most preferably the likely outcomes is in the range of 1 outcome to 1 billion outcomes. It will be understood that the system and method of one or more embodiments allow for a number of likely outcomes in the range of 1 to more than 100 billion outcomes. (3) How dynamic is the event—events that are more dynamic, for example basketball or football games require more frequent sampling than a chess tournament. As such, a higher sampling frequency will be required to achieve sufficient accuracy, similar to Nyquist—Shannon sampling theorem (see Jerri, A. J., "The Shannon sampling theorem—Its various extensions and applications: A tutorial review," Proceedings of the IEEE, vol. 65, no. 11, pp. 1565,1596, November 1977 doi: 10.1109/PROC.1977.10771; incorporated by reference herein in its entirety). A larger number of human users is also desirous in such cases, as it would be difficult for a small number of human users to respond sufficiently quickly and accurately to maintain statistical accuracy by the system. Automated users may of course respond faster. The more dynamic the event, the more users need to respond in order to get good accuracy—in chess, for example, one user may report and the system may have 2 minutes to do it per move, with a very limited number of options (based on the state of the chess board): so perhaps in chess an approximate 5 legal moves and 2 minutes are needed to decide. By contrast, in the final minute of a basketball game the method prefers to have a lot of users each responding to a very simple question, and the method prefers a lot of various questions because the numbers of options is very large and the rate of change is also very large. Preferably, the frequency in which the system can send questions and receive responses to/from users is in the range of 5 to 20 seconds, more preferably the frequency in which the system can send questions and receive responses to/from users is in the range of 0.1 seconds to 10 minutes, and most preferably the frequency in which the system can send questions and receive responses to/from users is in the range of 1 picosecond to 100 days. (4) The attributes of available users—the users' location, level of reliability, among other attributes, can all be determining factors in the decision on sampling interval.

Sampling is performed by segmenting the users into groups and then querying the groups of users, by assigning a single query to each group per cycle, and with the understanding the multiple cycles can be executed in parallel, either to the same set of groups or to any set of groups. Each group will be assigned a single "observation" per such cycle and asked to respond about its occurrence. Groups may be queried for more than one type of observation at a time. The questions sent to users may be direct or indirect ones; indirect ones being used to mask the actual question, but the users' answers to them enable, at minimum, deduction of a "yes" or "no" answer to the predicate.

Table 2 below illustrates an analysis of the responses of the users in each group and the calculation of the probabilities.

TABLE 2

| Group | Observation | Yes Answers | No Answers | Probability |
|---|---|---|---|---|
| Group_1 | Player X shot from 15 feet | 900 | 100 | 0.9 |
| Group_2 | Player X shot from 25 feet | 600 | 400 | 0.6 |
| Group_3 | Player Y shot from 15 feet | 300 | 700 | 0.3 |

It should be understood that Hidden Markov Models are but one way to implement these steps, and that other algorithms may be available or may become available in the future, all of which are to be considered within the scope of the present invention.

Figure 3:
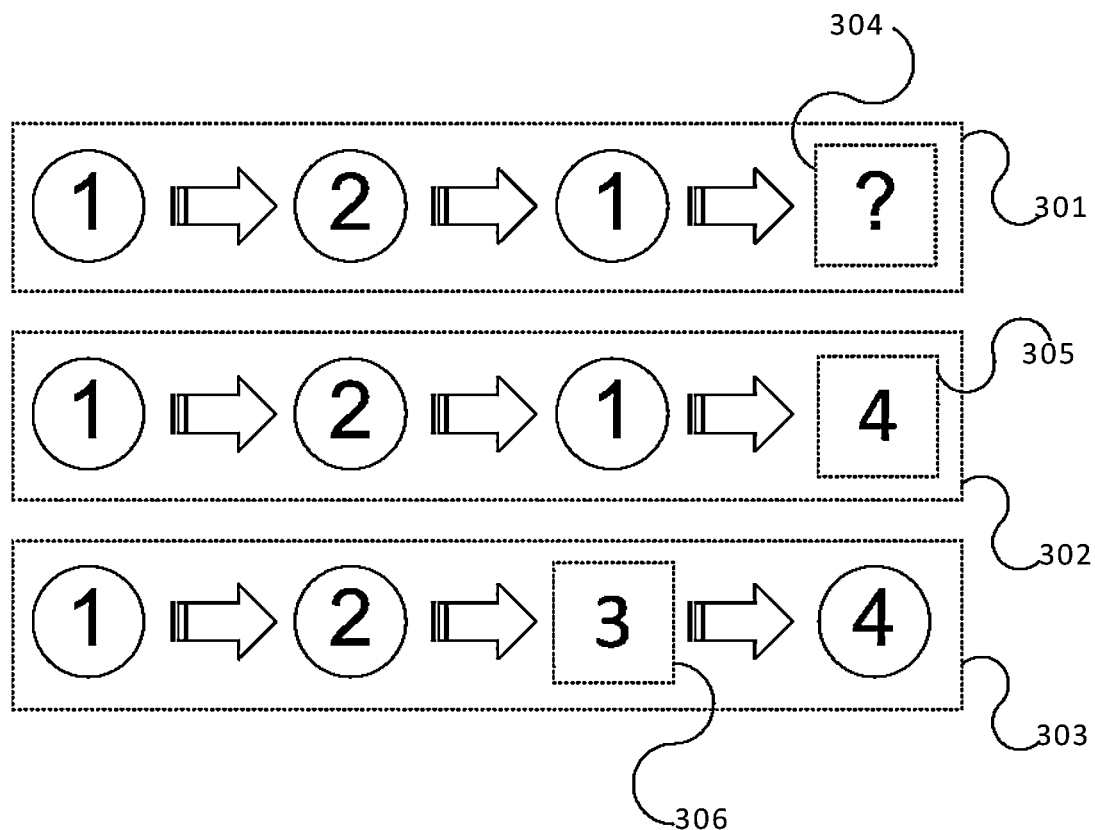
FIG. 3 demonstrates an illustrative process of applying a Hidden Markov Model transformation according to one or more embodiments of the invention.

Referring now to FIG. 3, a generic process of using Hidden Markov Models is depicted, enabling the process to revise its predictions with the arrival of new information. This is especially useful in the case of sports games where the results of a play may be changed due to a judgment call by the referees, or in any other type of event when a series of event elements has one or more elements that can be altered (by after-the-fact revision or by updated calculations with more data). At least one embodiment provides for analyzing event element group 301, wherein the process, analyzes user predictions of a successive number of event element occurrences (shown as an occurrence of "1" transitioning to an occurrence of "2," then transitioning to another occurrence of "1") in order to estimate the probability of the next event element occurrence 304. In event element group 302 the process has used the observations and the transition matrices in order to determine the most likely state of the next event element, 305, which in this illustration is an occurrence of "4." Then, by analyzing the process as a whole in event element group 303, the process can determine that the predicted state of the third event element (or node) 306 of the actual event sequence needs to be updated, in this illustration updating an occurrence of a "1" to and occurrence of a "3."

(1) User Credibility and (2) Time Intervals

At least three major elements dictate a set of users questioning strategy: one element first is how dynamic is the event in question: for example, a football game is much more fast-changing than a chess tournament. A second element is the time that has passed since the user has been presented with the question, and a third element is the user's credibility. While the first element is quite straightforward, the other two elements can be further explained as follows:

(1) The Time that has Passed Since the Event

A prediction about the future that has arrived long after the event itself is of no use to the system. A simple method, such as provided for by one embodiment, could define a simple rule stating that all predictions that arrive after the event are ignored. However, this approach will not be taking other elements into account: delays in broadcast times are the simplest example, along with geographic distance, among others. Communication delays are also a legitimate reason for a delay in the response.

In embodiments, an array of features designed to deduce whether or not the prediction is "legitimate," may be employed. The array of features may include, for example, one or more of the GPS location of the phone, the timestamp of the message, the medium used by the user to view the event and the user's credibility score, without limitation.

In embodiments, one or more algorithms may be utilized and/or executed to perform the functions responsible for determining whether or not to process an answer returned by the user are the Wait_For_Response( ) function, which records the time the response was captured or returned and the Calculate_User_Response_Time_Fraud_Likelihood( ) function, which returns a number that reflects how legitimate the user's response time is, which number is a credibility metric that is then then used this to train the model, group cohorts, and otherwise dynamically adjust the algorithm and which also takes into account how dynamic is the event and the user's credibility.

(2) The User's Credibility

The credibility of the user is determined by several factors: (a) Past behavior—by comparing the user's responses to the actual events (either events a set of human taggers determined happened or events which had a high degree of certainty), the method can obtain a solid estimator of its reliability; (b) Meta-data features—if the user's meta-data contradicts the claims made by that user (for example, the user claims to have seen the event "live" while he was 100 km away in this case whatever score he had would be multiplied by zero—he's a fraud; and (c) Trapped by "honeypot questions"—part of the query mechanism generates "honeypot questions", questions that are known to be false and whose only use is to identify users who are not being true. For example, a question may refer to a commercial not shown is the user's claimed location or refer to a weather condition that did not occur.

One or more of the aforementioned factors, without limitation, can be used to determine the user's "credibility score," along with other data operated in embodiments of the present invention. This score will factor the percentage of truthful answers to honeypot questions, the average likelihood (assigned by the HMM) of the observations made by the user and how dynamic was the event in question (dynamic events are harder to call correctly). For example, comparing the last minute of an NBA basketball game versus the last move of a chess match: In basketball there could be (for example) 17 different options that occur in the next (for example) 10 seconds, whereas in chess there could be (for example) 3 options in the next (for example) 2 minutes.

As such, low latency and high accuracy are very important for the former basketball example, in order to provide accurate statistics and meaningful probability assessment in a minimum amount of time. Having a large body of users will generally decrease average latency, as some users will respond more quickly than others, therefore enabling the system to use a user credibility assessment metric in order to qualify those users that respond quickly and accurately.

A person of ordinary skill in the art can appreciate that the proposed framework for the calculation of the credibility score can be Naïve Bayes or any other classifier, which is capable of taking advantage of the probabilistic nature of the HMI and produce a single value (ranging from 0 to 1) representing the user's credibility. One can further appreciate that in order to simplify the examples herein, a credible user is arbitrarily defined as one that has achieved 80% accuracy in the last 30 minutes, with any further indications of possible fraud. It is further appreciated that in embodiments of the present invention may implement the credibility assessment function illustratively represented in the algorithm by the Calculate_User_Response_Time_Fraud_Likelihood( ) function, which factors a plurality of elements in order to determine if a user is suspected of fraud and to optionally decide whether or not to use the responses provided by the user. For example, a first user might answer 90% correctly over an interval of 30 minutes, however their latency might be more than one standard deviation away from the average latency for the group that first user is assigned to, and the first user's physical location has been determined to be outside of the event venue, such that the process can generate a decision that the first user is viewing the event via some broadcast medium with at least that medium's inherent latency and/or propagation delay. In contrast, a second user who answered only 80% accurately but has been determined to be inside the event venue and the second user's latency was less than half of one standard deviation away from the minimum latency of any user in the system is assumed to be reliable enough and accurate enough for this example purpose.

One or more embodiments of the invention can provide for a series of steps of processing information that are accomplished by machine instructions directing a computer processor. The software program of one such embodiment can be further described below in Tables 16-26, wherein the first column lists the line number (and matching figure and step) of the algorithm, the central column includes descriptive commentary on the function of the software step and the right column depicts pseudo code as may be realized by at least on embodiment of the present invention.

The system can leverage what it knows about what happened or is about to happen and combine that with its analysis of the user's responses to know what teams, actors, and so on (without limitation) the user favors. Then, the system can leverage the propagation delay of the user to anticipate if that user will be happy or sad in the near future and send that signal to an advertising system that will offer that user an emotionally-contextual advertisement.

Example 10. Basketball Use Case

The work process of a method in embodiments can be further illustrated through a use case example. In this example, the basketball game is being analyzed. For simplicity's sake, it can be further assumed that only the following entities exist—"team", "player" and "ball." The following connections exist (among others): (a) "shooting a hoop from X feet"—a connection between player and ball (multiple instances of this connection exist, one for each possible distance); (b) "Has the ball"—a connection between a player and itself; and/or (c) "Blocked by player Y"—a connection between two different player entities Table 3 below illustrates the connections among entities of EXAMPLE 7.

TABLE 3

| Entity_1 | Entity_2 | Connection |
|---|---|---|
| Player | Ball | Has_ball |
| | Player | Block_by |
| | Ball | Shooting_hoop_from_5_feet |
| | Ball | Shooting_hoop_from_10_feet |
| | Ball | Shooting_hoop_from_15_feet |
| | Ball | Shooting_hoop_from_20_feet |

To assure high initial accuracy and to minimize generation of irrelevant questions, it may be desirous to train the model before operating it on a live event in real time. This can be done in any number of simulation scenarios, including by allowing a group of users to watch a pre-recorded past event and to capture their observations and predictions for each point of time within the pre-recorded past event, or to input a prior transcript of the event into the model's training process. Before the training phase event begins, a default time interval is defined (performed when the function is activated, in line 1000 of Table 15). This time interval (for example, 2 seconds) will dictate the frequency for which each group of users will be chosen and queried either about events that have occurred or about their predictions for the future (lines 1020 and 1030 of Table 15). However, this interval may either increase or decrease based on the model's assessment of the current state—while a time out is called, for example, the interval may be increased to 30 seconds in order not to annoy the set(s) of users engaged by the system, yet still allow some observations to be captured, which can be especially important in order to determine the exact time at which the timeout ends and normal play resumes. The current state is updated after every iteration (line 1045 of Table 15) in order to optimally assess what the time interval should be.

In embodiments of the present invention, the querying process works as follows: for the point of time the users are to be queried about (at least once for the past and at least for the future, the process begins by selecting which the states the users are to be queried about (line 1120 of Table 16). For example, an embodiment of the present invention may iterate through all possible states in the state transition table and select the top 50 possibilities based on their statistical likelihood of occurring, although other embodiments may use other methods. Next, analysis of the set of answers (about the past) and prediction (about the future) that were obtained in previous querying rounds is performed. The analysis of the sequence and the selection of the states can be performed by the Hidden Markov Models (HMM), described in later paragraphs below, or by other means. Based on the state of the event that is deduced to be in at the time (for example, "group A has the ball, the ball is 30 feet from the hoop, player X has the ball"). Examples of possible questions are presented in Table 14. It can be appreciated by a person of ordinary skill in the art that functions can be included in the process to iterate through the possible states and connections of an event at any point of time and can further utilize Natural Language Generation techniques, including, for example, without limitation, the SimpleNLG method (A. Gatt and E. Reiter (2009); SimpleNLG: A realisation engine for practical applications. Proceedings of ENLG-2009; herein incorporated by reference in its entirety) to create human-readable questions based on the various possibilities for each future state to occur. It should be further appreciated that such questions can be sent to users via standard HTTP or other IP-based connections to either a standard web browser used by the user and/or to any number of connected proprietary applications employed by an embodiment of the present invention.

The training phase begins by calling the "main" function, which the process initializes with two parameters: a) the event parameter, which contains information about the event its entities, the connection between them and all other relevant attributes; b) the time interval, which provides the default interval for an iteration in the system (within an iteration, sets of questions are sent to users to users and the users' responses are processed).

The process begins by extracting the Current State: the possible initial state(s) of the event and assigning them to a dedicated variable (line 1005). This is done in order to better enable the HMM process to identify the likely states (by providing an initial set from which to deduce the observation about which the users will be queried). In a basketball game, for example, the initial state would be {Team_X_on_the_offensive, Team_Y_on_The_Offensive}.

Once the initial states have been identified, the iterative questioning of the users and the analysis of their responses begins. Every time interval t (whose frequency is determined both by the default time interval and by the current state the model is presumed to be in at the moment), the following process takes place:

First, obtain the users' predictions about the future and impressions about the past (lines 1020, 1030 of Table 15). This process is identical in both cases (except for the time t for which it is executed) and therefore it is described once here in general.

This function begins by initializing the object that will contain the predictions made by the users (line 1110 of Table 16).

Then, the States object (which contains all the possible states according to the definitions of the event) is initialized and populated. The possible states are the states that are reachable from the current presumed state (that is, the transition probability is greater than zero).

The next step consists of generating the User Groups Matrix: the groups of users that will be assigned to each state (line 1130 of Table 16). The number of groups equals the number of possible states (shown in Table 4).

Table 4 below illustrates the segmentations of questions to different groups.

TABLE 4

| Group Assignments | Observation Queried |
| --- | --- |
| Group_1 | Player X shot from 15 feet |
| Group_2 | Player X shot from 25 feet |
| Group_3 | Player Y shot from 15 feet |
| . | . |
| . | . |
| . | . |

Following the creation of the groups, the process creates Questionnaires: the various questionnaires that will be used by the various groups (line 1140 of Table 16). The questions may be direct ("did player X score 3 points?"), implied ("Did player X dance when he scored 3 points?") or negative ("did player X miss the basket?"), but all questions, after data analysis, will enable deduction whether or not the said event took place.

Once this has been completed, for each group the following (starting at line 1160 of Table 16) steps are performed:

First, obtain the details of all users who are available for querying (line 1410 of Table 19). Then, analyze the number of available users and prioritize the possible states in order to determine which of them will be analyzed if the number of users is not sufficient to analyze them all (line 1420 of Table 19).

Following that, attempt to determine how dynamic the event is at the moment (that is, how likely is the next iteration to arrive). This action (line 1430 of Table 19) determines how long to wait for the answers to arrive.

The next step is to assign users to each group. This is executed by the function Assign_Queries_To_Users, called in line 1440 of Table 19. The result of this function is a matrix containing the assignments of users to each group. An example of this is presented in Table 5.

Table 5 below illustrates an assignment of users to query groups, further recording the time each query was sent to each user.

TABLE 5

| Users | Group_Assignment | Transmission Time |
| --- | --- | --- |
| User_1 | Group_1 | T |
| User_1 | Group_1 | T |
| User_1 | Group_1 | T |
| User_1 | Group_2 | T + 1 |
| User_1 | Group_2 | T + 1 |
| User_1 | Group_2 | T + 1 |
| . | . | . |
| . | . | . |
| . | . | . |

Once the users have been assigned, the questionnaires are sent and the system waits for responses (line 1450 of Table 19).

When the responses are obtained, they are translated into a binary representation indicating whether the user replied that the state he was asked about took place (1) or not (0). Once these answers are gathered, the matrix in Table 5 above is populated with two additional columns (shown in Table 6), recording the responses and their respective arrival times Table 6 below illustrates an assignment of users to query groups, further recording the time each query was sent to each user and the time when the response was received.

TABLE 6

| Users | Group_Assignment | Transmission Time | Responses | Response Time |
|---|---|---|---|---|
| User_1 | Group_1 | T | 1 | T + 30 sec |
| User_1 | Group_1 | T | 0 | T + 25 sec |
| User_1 | Group_1 | T | 1 | T + 12 sec |
| User_1 | Group_2 | T + 1 | 0 | T + 30 sec |
| User_1 | Group_2 | T + 1 | 1 | T + 34 sec |
| User_1 | Group_2 | T + 1 | 1 | T + 33 sec |
| . | . | . | . | . |
| . | . | . | . | . |
| . | . | . | . | . |

Once a sufficient number of responses have been gathered, the results (line 1480 of Table 19), are processed to remove responses that appear to be fraud. Since there are "yes" and "no" answers for the occurrence of each event, it is now possible to analyze them and calculate the probability of each event (see Table 7).

Table 7 below illustrates the observation probabilities derived from user responses to queries.

TABLE 7

| Group | Observation | Yes Answers | No Answers | Probability |
|---|---|---|---|---|
| Group_1 | Player X shot from 15 feet | 900 | 100 | 0.9 |
| Group_2 | Player X shot from 25 feet | 600 | 400 | 0.6 |
| Group_3 | Player Y shot from 15 feet | 300 | 700 | 0.3 |
| . | . | . | . | . |
| . | . | . | . | . |
| . | . | . | . | . |

These probabilities are returned in the object Analyzed_Responses.

Once the predictions about the future and the impressions about the past have been obtained, the process combines them in order to calculate the overall probability of each observation. This is done in line 1040 of Table 15, in which the process combines the two sets of probabilities into one (add the right figure with the circles). Once this is done, each observation is assigned with a single probability of its occurrence (see Table 8.

Table 8 below illustrates the collated prediction probabilities.

TABLE 8

| | Player X shot from 15 feet | Player X shot from 25 feet | Player Y shot from 15 feet | Player Y shot from 25 feet | No one shot to the hoop |
|---|---|---|---|---|---|
| Prediction | 0.9 | 0.6 | 0.3 | 0.2 | 0.1 |

When the probabilities in Table 8 are normalized to one, the probabilities in Table 9 are obtained.

Table 9 below illustrates the normalized prediction probabilities from Table 8.

TABLE 9

| | Player X shot from 15 feet | Player X shot from 25 feet | Player Y shot from 15 feet | Player Y shot from 25 feet | No one shot to the hoop |
|---|---|---|---|---|---|
| Prediction (normalized) | 0.428571 | 0.285714 | 0.142857 | 0.095238 | 0.047619 |

After the probabilities are calculated, they can be used to determine what the most likely next state is, and the process iterates again for the next time interval.

Once the event has been concluded, a sequence of observations and states has been obtained. Using these, it's possible to generate the State_Transition_Matrix and Observations_Matrix objects (lines 1070 and 1080 of Table 15).

Table 10 below illustrates an example of an Observation Matrix.

TABLE 10

| State/Observation | Player Y committed foul on Player X | Player Z committed foul on Player X | Ball enters hoop | Ball misses hoop |
|---|---|---|---|---|
| Player_X_Shooting_hoop_from_5_feet | 0.05 | 0 | 0.5 | 0.37 |
| Player_X_Shooting_hoop_from_10_feet | 0.08 | 0.08 | 0.4 | 0.44 |
| Player_X_Shooting_hoop_from_15_feet | 0.1 | 0 | 0.35 | 0.55 |

Table 11 below illustrates an example of a States Transition Matrix.

TABLE 11

| | Team X is on the offensive | Player 1 Shooting hoop from 5 feet | Player 2 Shooting hoop from 5 feet | Player 3 Shooting hoop from 5 feet | Player 4 Shooting hoop from 5 feet | ... |
|---|---|---|---|---|---|---|
| Team X is on the offensive | 0.1 | 0.05 | 0.06 | 0.04 | 0.05 | ... |
| Player 1 Shooting hoop from 5 feet | 0.02 | 0.1 | 0.08 | 0.1 | 0.04 | ... |

TABLE 11-continued

|  | Team X is on the offensive | Player 1 Shooting hoop from 5 feet | Player 2 Shooting hoop from 5 feet | Player 3 Shooting hoop from 5 feet | Player 4 Shooting hoop from 5 feet | ... |
|---|---|---|---|---|---|---|
| Player 2 Shooting hoop from 5 feet | 0.06 | 0.02 | 0.1 | 0.07 | 0.07 | ... |
| Player 3 Shooting hoop from 5 feet | 0.06 | 0.04 | 0.05 | 0.1 | 0.04 | ... |
| Player 4 Shooting hoop from 5 feet | 0.07 | 0.1 | 0.05 | 0.04 | 0.1 | ... |
| . | . | . | . | . | . | ... |
| . | . | . | . | . | . |  |
| . | . | . | . | . | . |  |

The final step of the training phase is the creation of the affinity matrix (using the Affinity_Matrix object). This is a user-entity matrix, where entries in specific user-entity cells indicate that the user has a certain sentiment towards the entity. A numeric values is used to represent the strength of the connection. It should be noted that for some users, the some of the cells in the matrix will remain empty.

Table 12 below illustrates an example of an Affinity Matrix.

TABLE 12

|  | Entity_1 | Entity_2 | Entity_3 | Entity_4 | Entity_5 | ... |
|---|---|---|---|---|---|---|
| User_1 |  | 2 |  | 4 |  | ... |
| User_2 |  |  |  |  | 5 | ... |
| User_3 |  |  | 4 |  |  | ... |
| . | . | . | . | . | . | ... |
| . | . | . | . | . | . | ... |
| . | . | . | . | . | . | ... |

The Runtime Phase

The running phase is initialized with the following parameters: the event (with the same attributes as those of the training phase), the default time interval (can be the same as was used in the training phase, but there is no such requirement) and the two matrices which are among the products of the training phase—the states transitions matrix and the observations matrix.

The runtime phase begins by obtaining the initial state(s) of the event—as was done in the training phase (line 2005 of Table 22).

Then, for each time interval, may do the following: (a) Get the user predictions for the past and the future (lines 2020 and 2022 of Table 22), combine and normalize them (lines 2024 and 2030 of Table 22); and/or (b) Generate a temporary matrix that contains the probabilities of the observations made by the user for the current iteration (line 2040 of Table 22). This temporary matrix may contain the following.

Table 13 below illustrates a temporary matrix containing the user observation probabilities.

TABLE 13

|  | Player X shot from 15 feet | Player X shot from 25 feet | Player Y shot from 15 feet | Player Y shot from 25 feet | No one shot to the hoops |
|---|---|---|---|---|---|
| Prediction (normalized) | 0.428571 | 0.285714 | 0.142857 | 0.095238 | 0.047619 | a) Update the states sequence based on the new information (e.g., with Hidden Markov Models using the Baum-Welch algorithm or any of its derivatives, Baggenstoss, Paul M. "A modified Baum-Welch algorithm for hidden Markov models with multiple observation spaces." Speech and Audio Processing, IEEE Transactions on 9.4 (2001): 411-416.)
b) Present commercial content to the users, based on the current events and their affinity matrix values.
c) Update the user-entity affinity matrix. This matrix is the same one that was generated in the training phase, but additional values will be added to it as more and more information is collected from and about the users, due to the continuous interaction with them.
d) The number of groups is dependent both on the number of available users (spread over the time intervals) and that of the possible states. For demonstration purposes, a simple allocation is applied, designed to ensure that the responses the system obtains are certain to be true with a statistical significance of 90% (assuming a normal distribution in user responses), however one skilled in the art can appreciate that other methods of group segmentation can be realized in one or more embodiments of the present invention, and all such methods are incorporated herein in their entirety. For example purposes, the method only queries users whom the process deems "trustworthy" (users whose past responses have accurately coincided with actual data gathered during past events or within a past timeframe of the current event).
e) Once the groups have been generated, questions are allocated to each group (line 1140 of Table 16). The questions are derived from one state of the set of possible ones the system has previously generated. The questions can be derived automatically (for example, one possible question for the state "group A has the ball, the ball is 30 feet from the hoop, player X has the ball" is "did player X drop the ball 30 feet from the hoop?"), and multiple questions can (and are likely to) be generated for each state. Questions can also come from other users or from cohorts of the system (human or mechanical). Answers can come from the body of users or from cohorts of the system (human or mechanical). In addition to computing user reliability, external data can be used to arbitrarily define the reliability of any user, group or cohort, for example to enable certain trusted users to be assigned a high reliability ranks, for example if an expert basketball referee would become an employee of the operators of an embodiment of the present invention, and would then provide human-tagged input, optionally via the form of past impressions, for which the system will fix their probability and credibility as, for example, 100%. Similarly, external data which is known to be accurate can be incorporated into the process as past impressions that with a fixed probability and credibility, for example, of 100%.

Table 14 below illustrates exemplary questions (both on past and future events) presented to users.

TABLE 14

| State | Question Type | Question Text |
| --- | --- | --- |
| Player_X_Shooting_hoop_from_5_feet | Past | Did player X shoot a hoop? |
| Player_X_Shooting_hoop_from_5_feet | Past | Was a shot made from X feet? |
| Player_X_Shooting_hoop_from_5_feet | Past | Was the shot successful |
| Player_X_Shooting_hoop_from_5_feet | Future | Will a "time out" be called? |
| Player_X_Shooting_hoop_from_5_feet | Future | Will Player X shoot a hoop again in the next minute? |
| Player_X_Shooting_hoop_from_5_feet | Future | Which player will be MVP? |

Once the groups and queries are created, each group is assigned a query (line 1160 of Table 16) and query is sent to all the group's members. Once the queries are sent, the process waits for an answer from the users. The span of time the process may wait for each user to respond depends on a set of factors: for example, preferably the user's reliability metric (past on past interactions), more preferably also the user's location (determined by GPS, user's claims, connection metadata, phone metadata, audio content recognition and other signals as stated herein and otherwise found in the industry), and most preferably the medium through which the user is likely to obtain information about the event and so forth. Different embodiments may opt for any mixture of parameters, and that a person of ordinary skill in the art will appreciate that any number of such parameters can be collected and used by an embodiment for this purpose.

Once the number of obtained answers reaches a satisfactory number—one that enables the method to obtain statistical significance—the system calculates the probabilities of the perceived events (Table 16, line 1170). For example, if 7000 users indicated the basketball shot was "in" and 3000 said it was "out", the probability assigned to the former observation is 70% and the probability assigned to the latter is 30% (for ease of reference, the term "observation" is used in accordance with the terminology used by Hidden Markov Models as previously cited herein and further described below). One can appreciate that Hidden Markov Models are merely one possibility for the sequencing algorithm and that other methods are available and will become available, and the scope of the present invention is intended to not be limited to only that sequence algorithm described for this example.

Once this iterative loop process of Function 1100 shown in Table 16 is completed, the observations made by the groups of users being iterated currently are added to a "container" object (Table 16, line 1180) and once all groups are queried this container is returned to the parent function (Table 16, line 1190). Note that this process can be distributed to a plurality of computing devices, optionally in different geographic regions, which perform this operation in parallel to allow analysis of a very large number of users and/or groups in a very small amount of time.

Once the predictions (about the future) and impressions (about the past) for the entire event are obtained, the event is over, and all the raw data are available), then it is time to combine them (Table 15, line 1040). In one embodiment, this can be done by assigning, for example, a 2:1 ratio to past observations versus future predictions. Obviously, more advanced methods can be applied, but at one or more embodiments can use this approach. This process is presented in FIG. 4. Should the need arise, the model is capable of functioning even when only partial information about the event is available. In embodiments the process may be described utilizing the entire event.

Figure 4:
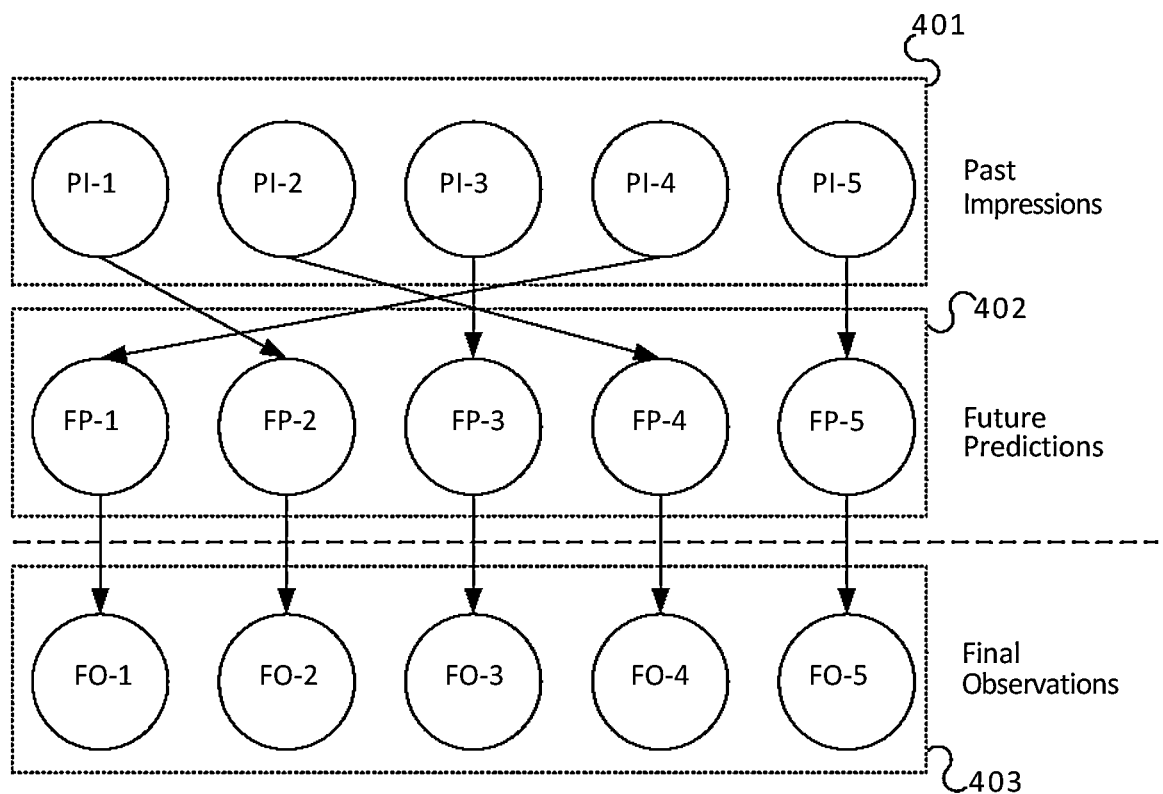
FIG. 4 illustrates paths of reaching a final observation through a state-transition analysis based on past impressions and future predictions according to one or more embodiments of the invention.

Referring to FIG. 4, a generic explanation of the process by which past impressions, future predictions and final observations are determined by the system. In this example, past impressions relating to t–1 401 collected from users at time t are combined with future predictions collected from the users at the same time t, asking the users what they predict will happen at time t+1 402 to create the final state observations 403 that will be used by the HMM. The probabilities of each observation are calculated separately for the past impressions and the future predictions. Once the probabilities are calculated, they are integrated into a final observation. For ease of reference, the method used for combining the probabilities is a weighted averaging technique where the weight assigned to past impressions is by default twice that of future predictions. This ratio may be modified, in embodiments, for example based on user reliability, response latency, external data (such as sensory data from one's phone phone) and/or other external factors, to name a few. Continuing the example, a first past impression, PI–1, can be matched with a second future prediction, FP–2. Once more data is processed by the HMM, resultant Final Observation FO–2 is deemed to have the highest statistical probability that FO–2 has actually occurred.

Once a unified set of observations is created, it is possible to generate the observation states which are an integral part of the Hidden Markov Model (Table 15, line 1050). This is done in the following manner: for each pair of entities ("player and ball" or "player1 and player2"), the method checks whether a connection between them is deemed possible by the definition of the event (Table 17, line 1230), as it was specified during the definition of the event. If the connection is possible and the input provided the users support its existence, then the program creates the observations state that represents the connections and add it to a list of observation states (line 1240 of Table 17). Once all entity combinations have been analyzed, the set of observation states is returned (Table 17, line 1250).

Once all the observations are obtained, the system can generate the states transition matrix (Table 15, line 1060). This matrix can be defined by a set of domain experts, and it defines all the "legal" transition between states in the event "eco system."

Example 11. State Transitions

A further example will assist describing the concept of state transitions in accordance with one or more embodiments of the present invention: during the above-mentioned basketball game, it is possible to transition from a state of "foul committed" to a state of "penalty shot." This state, in turn, can transition to another "penalty shot" or to "Player X has the ball." An illegal transition would be from "player X from team 1 has the ball" to "player Y from team 2 shooting hoop from 30 feet"; a state such as "Player X loses ball to player Y" must first take place. An example of the possible state transitions is presented in FIG. 5.

Figure 5:
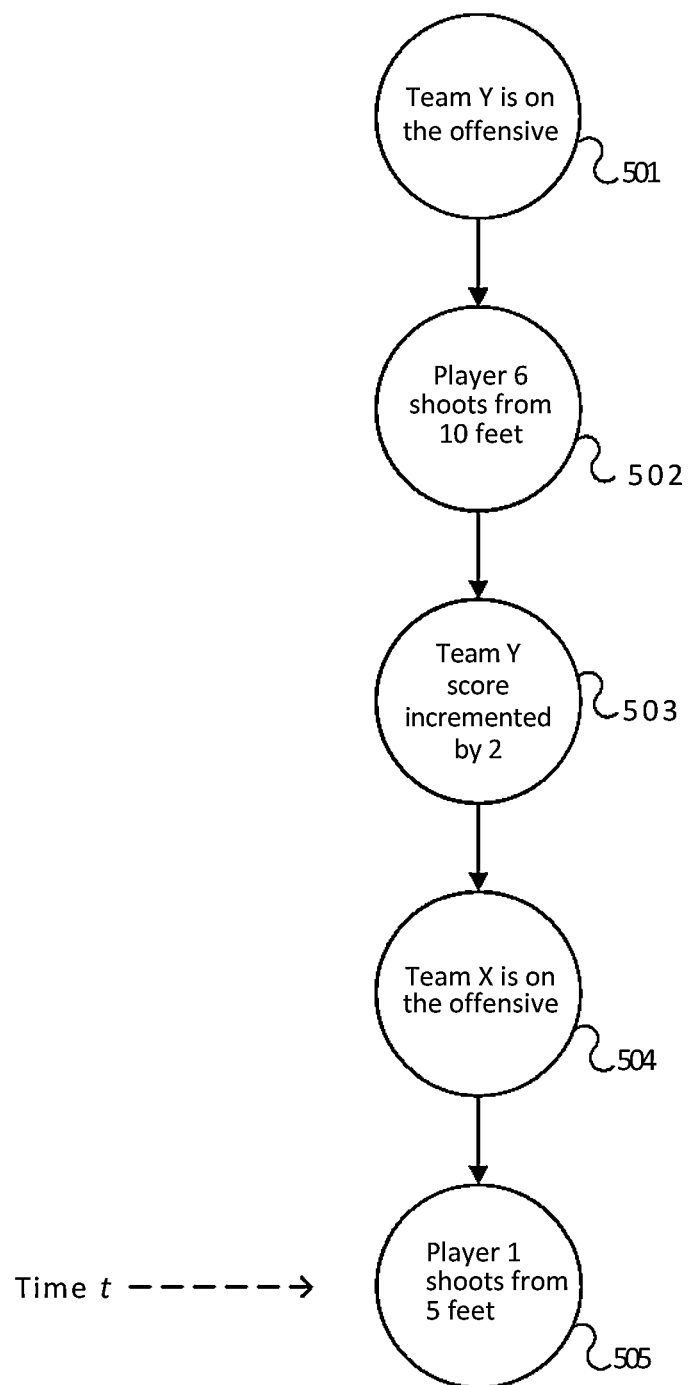
FIG. 5 depicts a potential sequence of event elements within an event according to one or more embodiments of the invention.

Referring to FIG. 5, a chain of events at a point in time t can be depicted, for example, one analyzing an exemplary basketball game. Sequence 501-505 show the sequence of transitions of the state of the game from one to the next, in this case with team Y being on the offensive 501, player 6 (inferred to be from team Y) shooting the ball from 10 feet 502, followed by team Y's score being incremented by two 503, thereby inferring that a basket had been made. Next, the system can infer that team X is now in possession of the ball, as it is on the offensive per 504 and player 1 (inferred to be from team X) shoots the ball from five feet 505 at time t.

As stated, at this point in time, the system begins another iteration of the algorithm (as depicted in line 2010, Table 22). Once again, the time interval between two subsequent runs is determined by the time interval set by the modeling addition to the system's assessment of the current state, as defined in line 2075 of Table 22. Based on the current state of the state transition table, ("player 1 shoots from 5 feet") the system generate queries regarding the chances of the shot succeeding (the future) and regarding the distance from which the shot was thrown (the past). This is described in line 2020 of Table 22.

Once a sufficient number of answers has been obtained, an embodiment provides for normalizing the probabilities of all observations to one (line 2030 of Table 22) and then generating the top likely observations (line 2040 of Table 22). Using these observations, the method can use the matrices presented above to update a perceived chain of events (line 2050 of Table 22).

Figure 6:
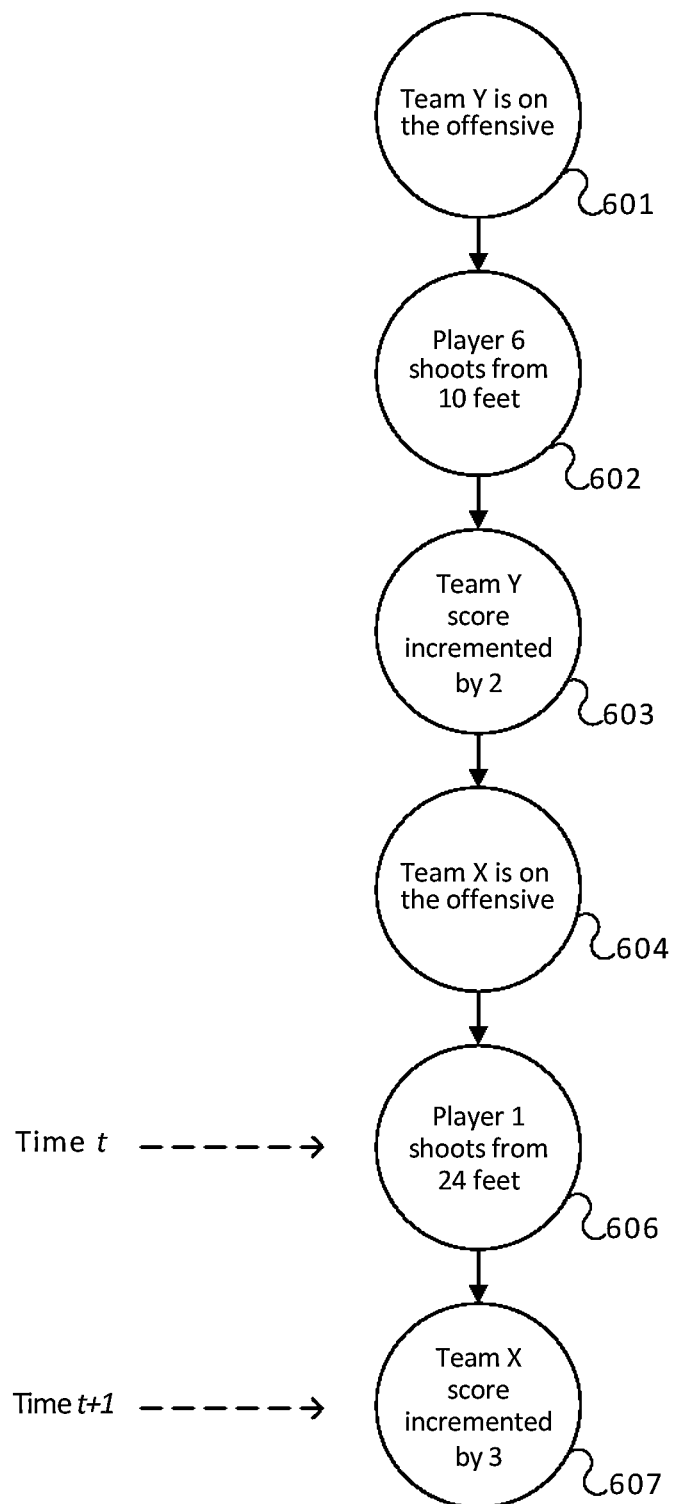
FIG. 6 depicts a further potential sequence of event elements within an event according to one or more embodiments of the invention.
Figure 8:
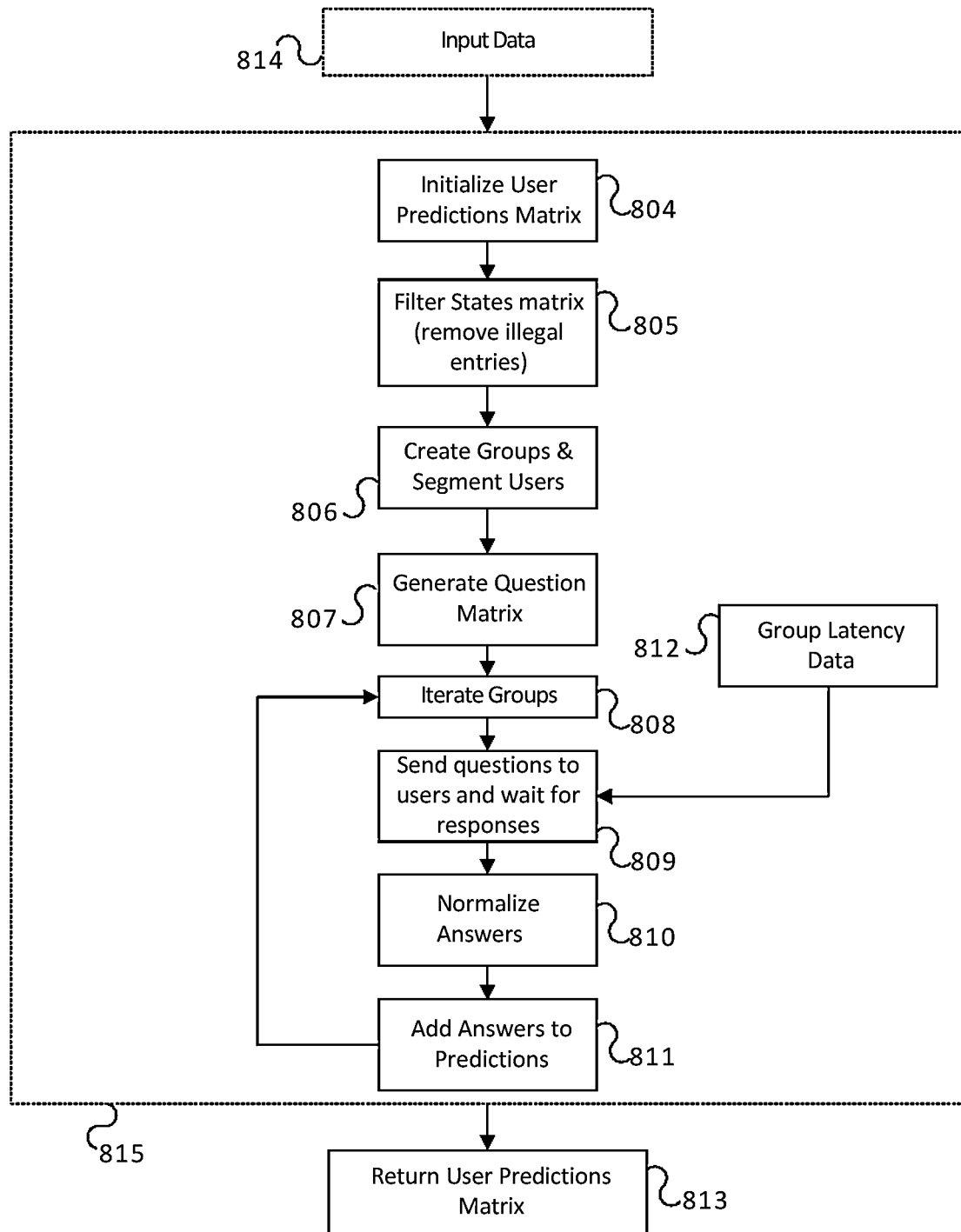
FIG. 8 shows steps for processing and transforming inputs in order to return a user prediction matrix according to one or more embodiments of the invention.

For simplicity of this example, it can be assumed that there is only one likely observation—that player 1 shot 3 points. This conclusion is reached following the analysis of past impressions and future predictions, as depicted in FIG. 4 Given this observation (and since there is zero probability that a shot from 5 feet could result in 3 points), the method can update its model and conclude (after reassessing all state transition probabilities) that player 1 shot the ball from at least 23 feet 9 inches (2013 NBA rules), as defined in the state transition diagram 201 and depicted in FIG. 2. As a result, the system updates the chain of events, as shown in FIG. 6:

Referring to FIG. 6, a revised chain of events at a point in time t+1 (relative to time t of FIG. 5) can be depicted in accordance with one or more embodiments, analyzing an exemplary basketball game. Sequence 601-604 is the same as sequence 501-504 (respectively) of FIG. 8, show the sequence of transitions of the state of the game from one to the next, in this case with team Y being on the offensive in step 601, player 6 (inferred to be from team Y) shooting the ball from 10 feet in step 602, followed by team Y's score being incremented by two in step 503, thereby inferring that a basket had been made. As mentioned in step 504 the system can infer that team X had possession of the ball, as it was on the offensive and player 1 (inferred to be from team X) was believed to have shot the ball from five feet in step 505. However, new observations have since arrived, suggesting that team X's score was incremented by 3 points, mandating an update to the sequence and increasing the distance thrown from 5 feet to at least 23 feet 9 inches, depending on the probabilities defined in the state transition table. As the system iterates through time t+2 and onwards, the actual distance will be derived by analyzing ensuing observations as well.

Finally, the method generates the final component needed for the HMI process—the observation matrix. This matrix denotes the likelihood of obtaining a certain observation at a certain state, thus enabling the probabilistic process of the HMI to "interpret" the observations obtained from a set of users. The process used to generate this matrix is called in line 1070 of Table 15.

In embodiments, the process used to generate this matrix can be as follows: for each state (line 1320 of Table 18) the method analyzes each observation (line 1330 of Table 18) and checks whether the observation is possible (line 1340 of Table 18), as was defined so by the experts who set the parameters of the event prior to the experiment. If the observation is "legal", then the system assigns it to the said state with its probability (line 1350 of Table 18), as was determined during the analysis of the users' responses. This process results in a table (or matrix) where for each state/observation combination, a value representing its likelihood is present. An example of such a data structure is presented in Table 11.

This process is repeated iteratively throughout the course of the event. It should be noted that the present invention is by no means limited to only modifying the latest state in the chain: additional information from users with higher latency will also be taken into account (based on reliability and fraud filtering) and may very well be used to update the events. For example, in the case of a shot that was later disqualified by a referee only the responses received after the referee's call will contain "correct" observations. By maintaining and updating all observations and probabilities (for any amount of time) the method can address this issue.

In embodiments the system may utilize this information for commercial purposes. This is done in the following way: using the affinity matrix (generated in the training phase, if available) and the current affinity of the user to entities involved in the current state of the events chain (line 2060 of Table 22), the system attempts to determine whether the user has a strong positive affinity to any of the relevant entities. By iterating over all possible entities (for every user), it is possible to identify the entities for which the user has the greatest positive affinity (lines 2210-2240 of Table 24) and then either generate and send relevant advertisements, promotions, or other similar material, and/or signal an external system with this data for any action that system may then take. Related methods of targeted advertisement can use existing methods in the field of Recommender Systems presented by academia and others. The methods that can be used for identifying entities for which users have high affinity include collaborative filtering (Koren, Yehuda, and Robert Bell. "Advances in collaborative filtering." In Recommender Systems Handbook, pp. 145-186. Springer US, 2011.) and matrix factorization techniques including SVD (Weng, Xiaoqing, and Junyi Shen. "Classification of multivariate time series using two-dimensional singular value decomposition." Knowledge-Based Systems 21, no. 7 (2008): 535-539), both of which are incorporated herein by reference in their entirety.

Figure 7:
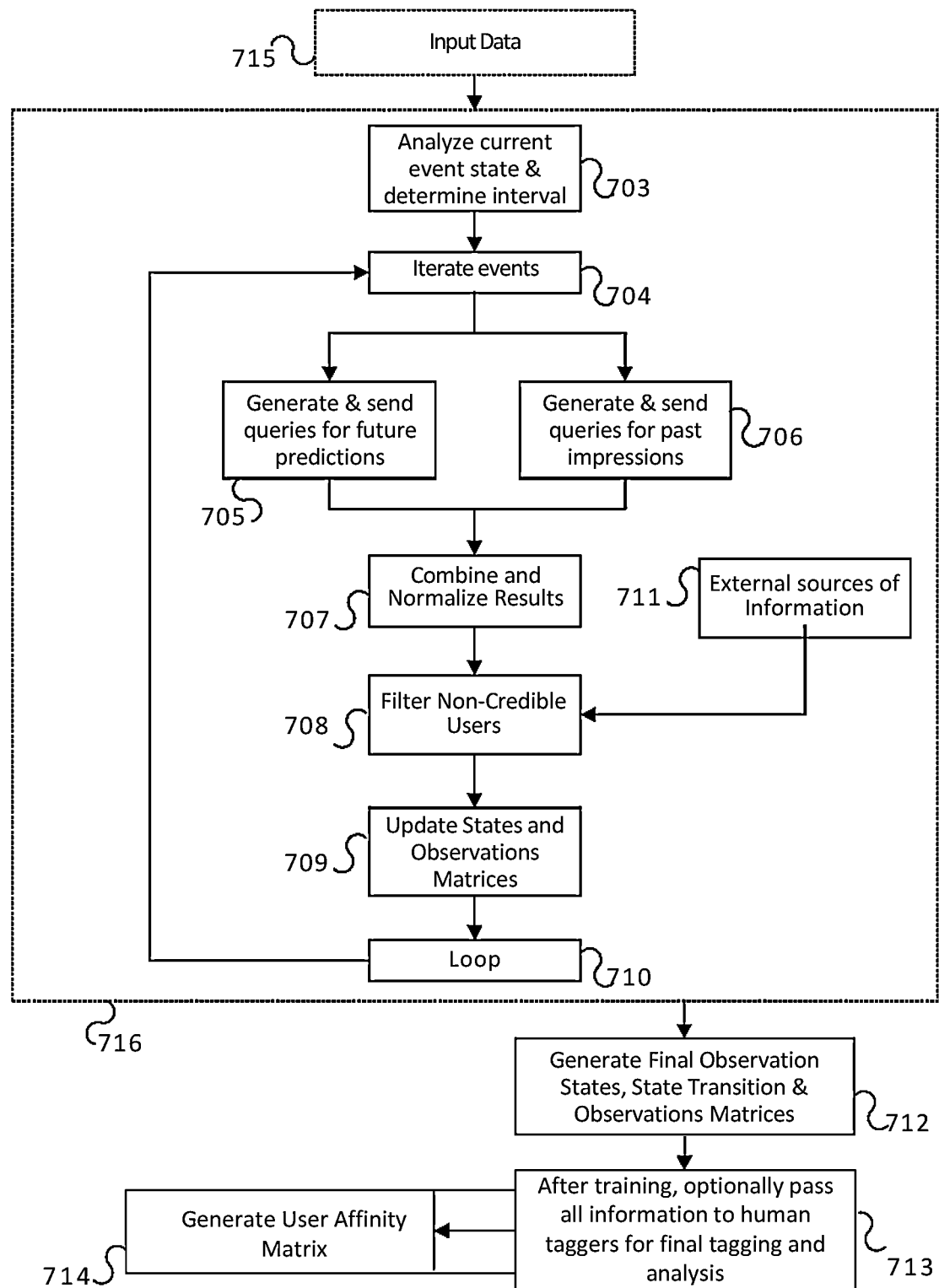
FIG. 7 shows steps for processing and transforming inputs in order to generate output matrices according to one or more embodiments of the invention.

FIG. 7 depicts an exemplary computer function for the training phase of the proposed method. Processing group 715 includes input data including event information and an initial time interval. Main processing group 716 includes the event state query step 703, determines the current event state, followed by loop 704 which iterates through each occurrence within a series of occurrences that include an event. Actual splits between occurrences can be time based, rule based, play based, external input (human, data or otherwise, including wireless signals, GPS location and time, microphone input, social media connections, interactions and check-ins, information prompts responses, without limitation) or otherwise, or any combination thereof, without limitation. Step 705 and 706 may run in parallel, sending questions to users and receiving the user responses by calling the function depicted in FIG. 8 twice: once for future predictions in step 705 that were captured prior to the selected occurrence of the same event (or using data from past events, or any combination thereof) for each of the questions about said selected occurrence, and a second time to receive past impressions in step 706 that were captured after said selected occurrence occurred (following the selected occurrence of the same event or using data from other events, or any combination thereof, without limitation) for each of the questions about said selected occurrence. Then, step 707 combines the results of both the future predictions from step 705 and past impressions from step 706 that were collected into a unified User Predictions Matrix which is then filtered by step 708 by calling the function on FIG. 17, optionally using external data sources 711 which may include human or machine generated data, including wireless signals, GPS location and time, microphone input, social media connections, interactions and check-ins, information prompts responses, without limitation. Step 709 then updates the current Event State and Observation Matrices, assessing most probable State Transitions and selecting the smallest time interval allows the method not to miss any occurrence yet not create excessive questions to users, prior to step 710 looping back to step 704 to process the next occurrence. After processing all event occurrences, step 712 combines the future and past user predictions captured from the users and updates the State_Transition_Matrix and the Observation Matrix, containing a possible a matrix of states (combinations of entities and occurrences whose chance of happening is greater than a threshold), by calling the function on FIG. 19. One ordinarily skilled in the art will appreciate that, in embodiments, the system may then provide for human or external input to be used to further refine the data in step 713, for example using the a supervised learning method such as "The Wekinator" (Fiebrink, R., P. R. Cook, and D. Trueman. "Human model evaluation in interactive supervised learning." Proceedings of the SIGCHI Conference on Human-Computer Interaction (CHI' 11), Vancouver, BC, May 7-12, 2011.). Finally, the User Affinity Matrix is generated in step 714 by calling the function in FIG. 13.

Table 15 below illustrates an exemplary pseudo code implementation of a main program routine for the training aspect, as applicable to one or more embodiments of the present invention.

TABLE 15

| Line (FIG./Step) | Comment | Pseudo Code |
|---|---|---|
| 1000 (7/716) | Main program routine for the training phase. Assumes a State | Main(event, time_interval) |
| 1005 (7/703) | The current state of the event is required so that it would be possible to better assess what the next time interval should be. Initially, the state is defined by the type of the event. | Current_State<-event.Get_Initial_State( ) |
| 1010 (7/704) | Starts a loop that iterates through each occurrence within a series of occurrences that include an event. Actual splits can be time based, rule based, play based, external input (human, data or otherwise) or otherwise, and any combination thereof. | Foreach (t in Split_To_Time_Intervals(event.length, Current_state)) |
| 1020 (7/705) | For each occurrence of the selected event, call function 1100 (FIG. 8) to read user predications that were previously captured (prior to the selected occurrence of the same event or using data from past events, or any combination thereof) for each of the questions about said selected occurrence. | User_predictions_1[t] <- Generate_User_Predictions_For_Time_Interval(t-1, event, False) |

TABLE 15-continued

| Line (FIG./Step) | Comment | Pseudo Code |
|---|---|---|
| 1040 (7/707) | Next, the two types of predictions (past and future) are combined into one matrix and normalized, with the result illustrated in Table 13. | User_predictions[t] <- Combine_Predictions(User_predictions_1, User_Predicitons_2) |
| 1041 (7/708) | Filter non-credible users by calling function 1700 (FIG. 17). | Calculate_User_Response_Time_Fraud_Likelyhood(Response_Time, Event_Dynamic_Level, User_Details) |
| 1045 (7/709) | Now, update the current state. Assess several likely options and choose the smallest time interval that fits one of them, reducing the chance of missing anything, while also not bothering users with extra and redundant questions. | Current_State<- Determine_Current_State(User_predictions[t]) |
| 1048 (7/710) | | End For |
| 1050 (7/712) | Next, combine the user predictions captured from the users in time interval t as depicted in FIG. 4 and generate possible a matrix of "states" (combinations of entities whose chance of happening is greater than the threshold) by calling function 1200 (FIG. 19). | Observation_States<- Generate_Entity_Connections (event, User_Predictions) |
| 1060 (7/712) | Next, optionally employ external data (captured by human or mechanical means) to further analyze the results, and or use any combination of external data sources to remove any invalid states, thereby improving accuracy of the transition matrix. | State_Transition_Matrix<- Generate_State_Transition_Matrix(event) An example of the matrix is presented in Table 11. |
| 1070 (7/712) | Finally, create an observation matrix using the state transition matrix and the various observations that were collected, as illustrated in Table 10. | Observations_Matrix<- Calculate_Observation_Matrix(event, Observation_States, State_Transition_Matrix) |
| 1075 (7/713) | After training, optionally pass all information to human taggers for final tagging and analysis. | (Not illustrated, can use any tagging and supervised learning method e.g. Fiebrink, R., P.R. Cook, and D. Trueman. "Human model evaluation in interactive supervised learning." Proceedings of the SIGCHI Conference on Human-Computer Interaction (CHI'11), herein incorporated by reference) Vancouver, BC, May 7-12, 2011.) |
| 1080 (7/714) | Once the states of the event have been set, it's time to assess the user's affinity (fondness) for each entity. For example, if the user interpreted the facts in a more favorable manner (for an entity) than the probabilities would otherwise suggest, or if the user's predictions were more optimistic than reality, the system can deduce his affinity alignment. A sample Affinity Matrix is illustrated in Table 12. | Affinity_Matrix<- Generate_Users_Affinity_Matrix(State_Transition_Matrix, Observations_Matrix, User_predictions) |
| | | End Main Routine |

Figure 19:
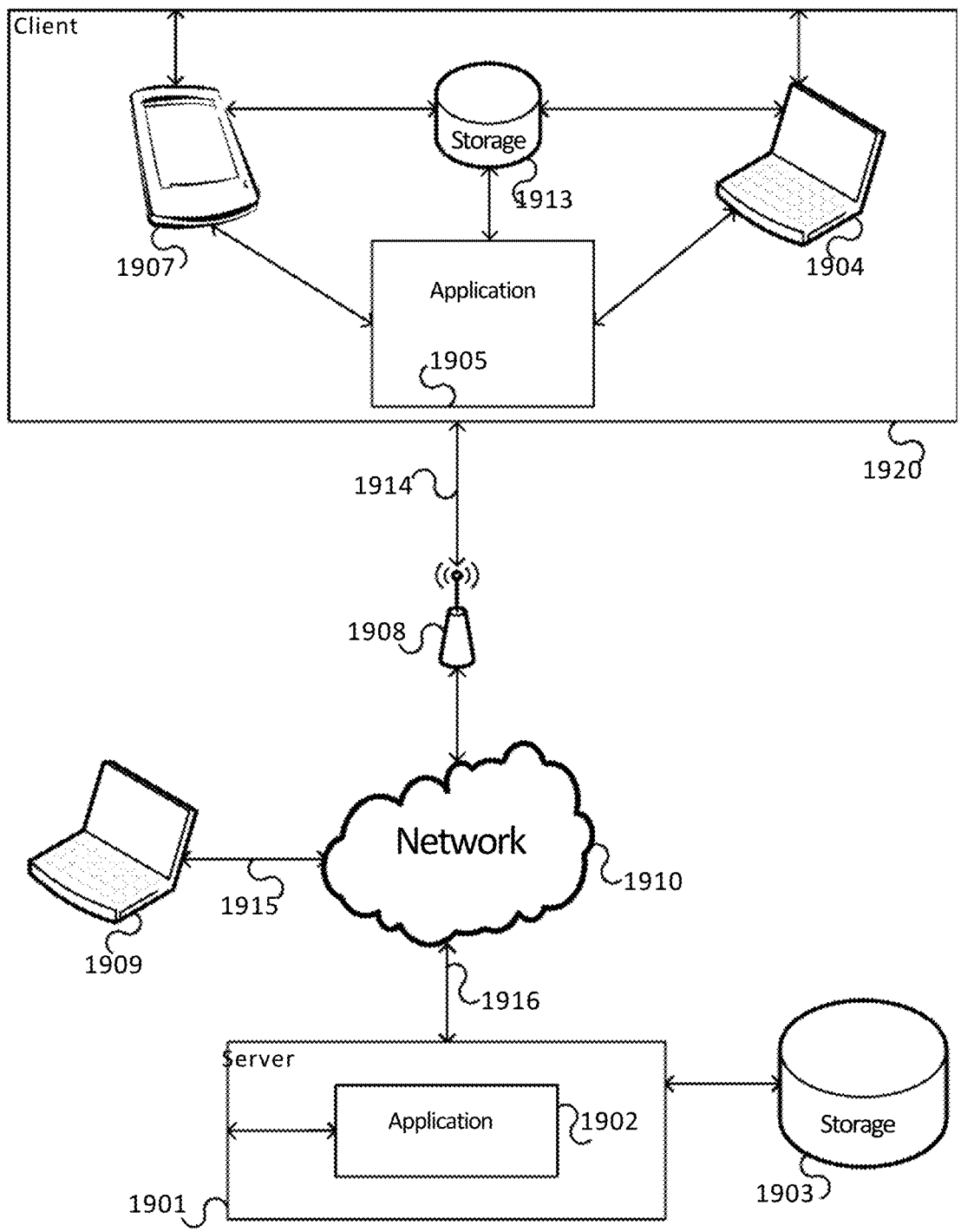
FIG. 19 illustrates various aspects of a communicating network of computing server and a plurality of computing device clients according to one or more embodiments of the invention.

FIG. 8 represents a computer function to generate user predictions for a selected time of an event. Processing group 814 includes input data which is used to provide source data for the function, including information about event data, the selected time, a flag to indicate if past impressions or future predictions are to be processed, and the minimum user credibility score that should be used. Processing group 815 denotes the main execution code, starting with step 804, in which the User Predictions Matrix is initialized. Then, in step 805 the Event State Matrix is filtered to remove any illegal entries (for example, in NFL football, an "incomplete rush" is not a valid state and will thus be removed). Next, users are segmented into groups in step 806, for example by determining that as many groups as needed will be created to enable each possible event state option to be sent to a minimum of 50 users that each have a credibility score over 0.8, and optionally using additional data including user reliability data or other data sources. Next, in step 807 a matrix of possible (and legal) questions is generated; these questions relate to each of the possible states of the event based on the Event State and Event Observation matrices and thus the model's anticipation of what might happen. Then, iteration loop 808 begins iterating all groups created in step 806, sending questions to all users in step 809 (by calling the function in FIG. 11), for example via transmission over a communication network as depicted in FIG. 19 step 1910. Note that the parameters controlling the order and distribution of questions to users may also include latency data of each group 812, which is the system's anticipated latency (based on, for example user phone metadata and past performance) of how quickly members of the group will respond. Upon receipt of user responses, the probabilities are normalized to one in step 810, followed by step 811 in which the normalized user responses are added to the User Prediction Matrix and the iteration cycle is repeated. Finally, step 813 returns the User Prediction Matrix to the calling function.

Table 16 below illustrates an exemplary pseudo code implementation of a program function to capture user predictions based on the number of possible likely observations, as applicable to one or more embodiments of the present invention.

TABLE 16

| Line (FIG./Step) | Comment | Pseudo Code |
|---|---|---|
| 1100 (8/815) | Program function to capture user predictions based on the number of possible likely observations (based on past observations, user data, event state and decision graph, determine the number of makeup of the population to query. | Generate_User_Predictions_For_Time_Interval (t, event, is_prediction_about_future, Min_Credibility_Score) |
| 1110 (8/804) | Initialize User Predictions Matrix. | User_Predictions<-(init) |
| 1120 (8/805) | Then use state diagram to determine ALL possible states for event (for example, in NFL football, an "incomplete rush" is not a valid state) as illustrated in FIG. 2. | States<-Determine_Possible_States(t,event) |
| 1130 (8/806) | Next, segment active users and determine how many groups will be generated, optionally requiring that the users each of those groups them have a high credibility score. Segmentation can include location data from phone or any other source. A sample result of this step is illustrated in Table 5. | User_Groups<-Determine_Users_Groups(t,event, Min_Credibility_Score) |
| 1140 (8/807) | Next, generate matrix of possible (and legal) questions that relate to each of the possible states of the event based on the Event Observation Matrix and thus the prediction of probabilities as to what might happen. | Questionnaires<-Generate_Queries(t,event) |
| 1150 (8/808) | Start iterating through each group in the list of groups created in line 1130. | Foreach (group in User_Groups) |
| 1160 (8/809) | Call function 1400 (FIG. 11) to send questions to users and wait for responses. Note that the latency of each group is also used, as a-a prediction (based on | Answers<-Assign_Questionnaires_To_User_And_Query(Questionnaires,group,event, t, States, group .latency, is_prediction_about_future) |

TABLE 16-continued

| Line (FIG./Step) | Comment | Pseudo Code |
|---|---|---|
| | phone metadata and past performance) how quickly members of the group will respond. A sample result of this step is illustrated in Table 5. | |
| 1170 (8/810) | Normalize answers received from user responses. | Answers<-Normalize_Answers(Answers) |
| 1180 (8/811) | Add user responses from data collected in previous step. | User_Predicitons.Add(Answers) |
| | | End For |
| 1190 (8/813) | Output matrix of user predictions. The result of this function is illustrated in Table 9. | Return User_Predictions |

Figure 9:
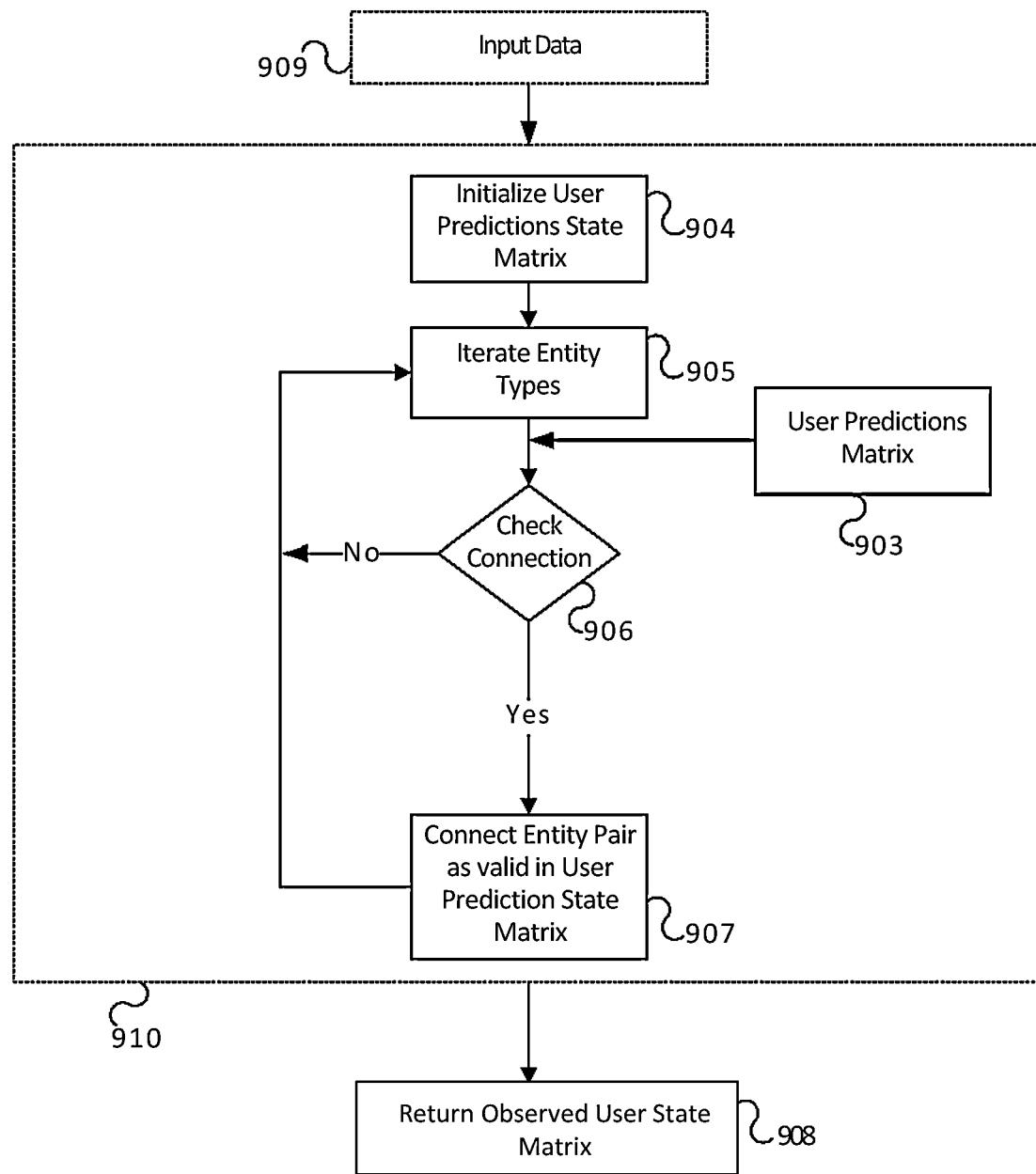
FIG. 9 illustrates steps for processing and transforming inputs in order to return a User Prediction State Matrix according to one or more embodiments of the invention.

FIG. 9 represents a computer function to generate valid connections between various entities of an event (for example, ball is connected to player, player is connected to team, dress is connected to actress, blue is connected to dress, etc.), which will be populated into the User Predictions Matrix in anticipation of derived questions being sent to users. Processing group 909 includes input data including information about event data and the User Predictions Matrix. Processing group 910 denotes the actual execution code, starting with step 904 which initializes the User Predictions State Matrix to initially contain all possible valid entity connection using data derived from State Transition Diagram 201, for example, and using probabilities that were derived from analysis of past events or by human tagging of relationships of entities that appeared in past events. Then, step 905 begins an iteration loop which in step 906 evaluates each entity in relation to every other entity, and when a connection between two entities is found in any prior prediction (for example, from the User Predictions Matrix 903) or observation (including data from the training phase), step 907 adds the connection and its probability to the User Predictions Matrix which is finally returned to the calling function in step 908.

Table 17 below illustrates an exemplary pseudo code implementation of a program function used to generate the states based on the connections between entities of an event, as applicable to a one or more embodiments of the present invention.

TABLE 17

| 1200 (9/ 910) | Program function used to generate the states based on the connections between the entities of an event. | Generate_Entity_Connections (event, User_Predictions) |
| --- | --- | --- |
| 1210 (9/ 904) | The possible list of prediction combinations and likelihoods for each are obtained (for example, by analyzing a past event or by following a decision graph e.g. 201). | User_Prediction_States<-(new) |
| 1220 (9/ 905) | Recursively iterate all entity types. | Foreach (entity_type_1 in event.entities) |
| 1230 (9/ | Within main iterative loop, evaluate each entity | If (entity_type_1.equals(entity_type_2) || |

TABLE 17-continued

| 906) | vs the entity selected in step 1220 to determine, for example, if actress is connected to dress and then if dress is connected to color. | !event.Connection_Exists(entity_type_1, entity_type_2)) then process next item |
| --- | --- | --- |
| 1240 (9/ 907) | Connect list entities for which any relationship was found. | User_Prediction_States<-Connect_Entities_Based_On_Predictions(entity_type_1.items, entity_type_2.items, User_Predictions) End For |
| 1250 (9/ 908) | Return list of possible states to be offered to users. | Return User_Prediction_States |

Figure 10:
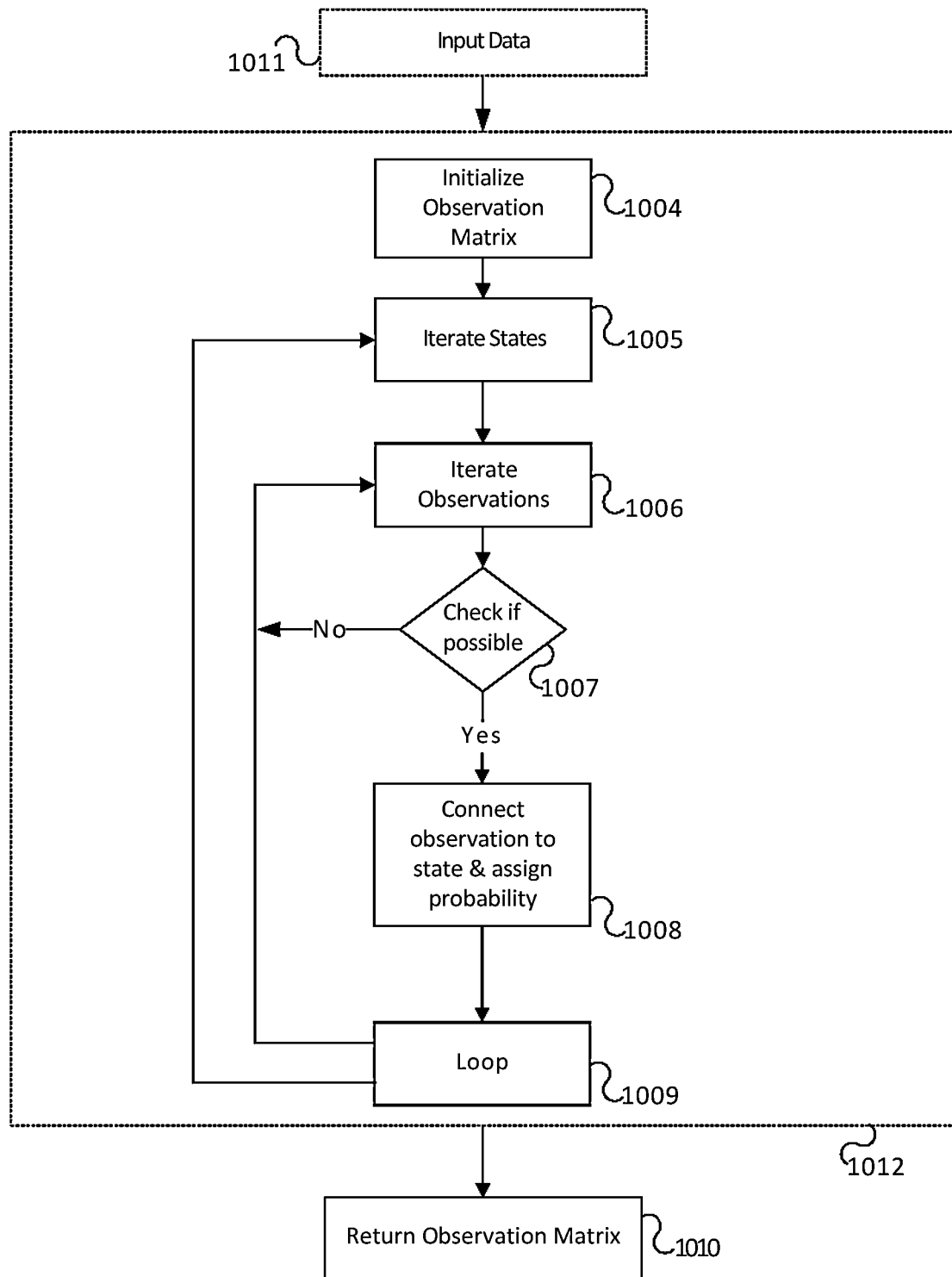
FIG. 10 depicts steps for processing and transforming inputs in order to return an Observation Matrix according to one or more embodiments of the invention.

FIG. 10 represents a computer function to calculate the probability of any particular observation to occur in any particular event state. These values are to be placed in a matrix object, and enable the use Hidden Markov Models (or other analysis methods, without limitation) to infer the true sequence of event elements in the real world. Processing group 1011 includes input data, including event data and the current Observation States and State Transition matrices. Within main execution group 1012, Step 1004 initializes the Observation Matrix, followed by two nested iterative loops 1005 and 1006, respectively. Outer loop 1005 iterates through all states, and inner loop 1006 iterates all observations within the state currently evaluated in step 1005. Step 1007 evaluates the possibility of each observation within occurring within the iterated state, continuing to step 1008 if a possible connection exists or returning to step 1006 if not, in which case the next possible observation is evaluated. If a possible connection exists, step 1008 updates the Observation Matrix to connect the iterated state to the iterated observation using the probability derived from the User Prediction Matrix. Step 1009 returns execution to the relevant iterative loop, once all states and all observations within have been evaluated, step 1010 returns the Observation Matrix (illustrated above in Table 13) to the calling function.

Table 18 below illustrates an exemplary pseudo code implementation of a program function used to calculate the probabilities of a particular observation to occur in a particular state, as applicable to one or more embodiments of the present invention.

TABLE 18

| Line (FIG./Step) | Comment | Pseudo Code |
|---|---|---|
| 1300 (10/1012) | Based on the states and their assigned probabilities, calculate the probabilities of observation O to occur in state S. these values will be placed in a matrix object, and enable the use of Hidden Markov Models to infer the true series of events in the real world. | Calculate_Observation_Matrix (event, Observation_States, State_Transition_Matrix) |
| 1310 (10/1004) | Initialize observation matrix. | Observation_Matrix<-(new) |
| 1320 (10/1005) | Main iterative look that evaluates each state within the state transition matrix. | Foreach (State in State_Transition_Matrix) |
| 1330 (10/1006) | Within main iterative loop, further recursively iterate each observation in the observation states matrix | Foreach (Observation in Observation_States) |
| 1340 (10/1007) | Evaluate if an observation selected in step 1330 is possible in the state selected in line 1320. | If (event.Observation_Is_Possible_In_State(State, Observation) |
| 1350 (10/1008) | Then add the observation selected in line 1330 as a valid possibility for the state selected in line 1320. | Then Observation_Matrix.Add(State, Observation) |
| 1351 (10/1009) |  | End for |
| 1352 (10/1009) |  | End for |
| 1360 (10/1010) | (a sample of such returned matrix is illustrated in Table 10) | Return Observation_Matrix |

Figure 11:
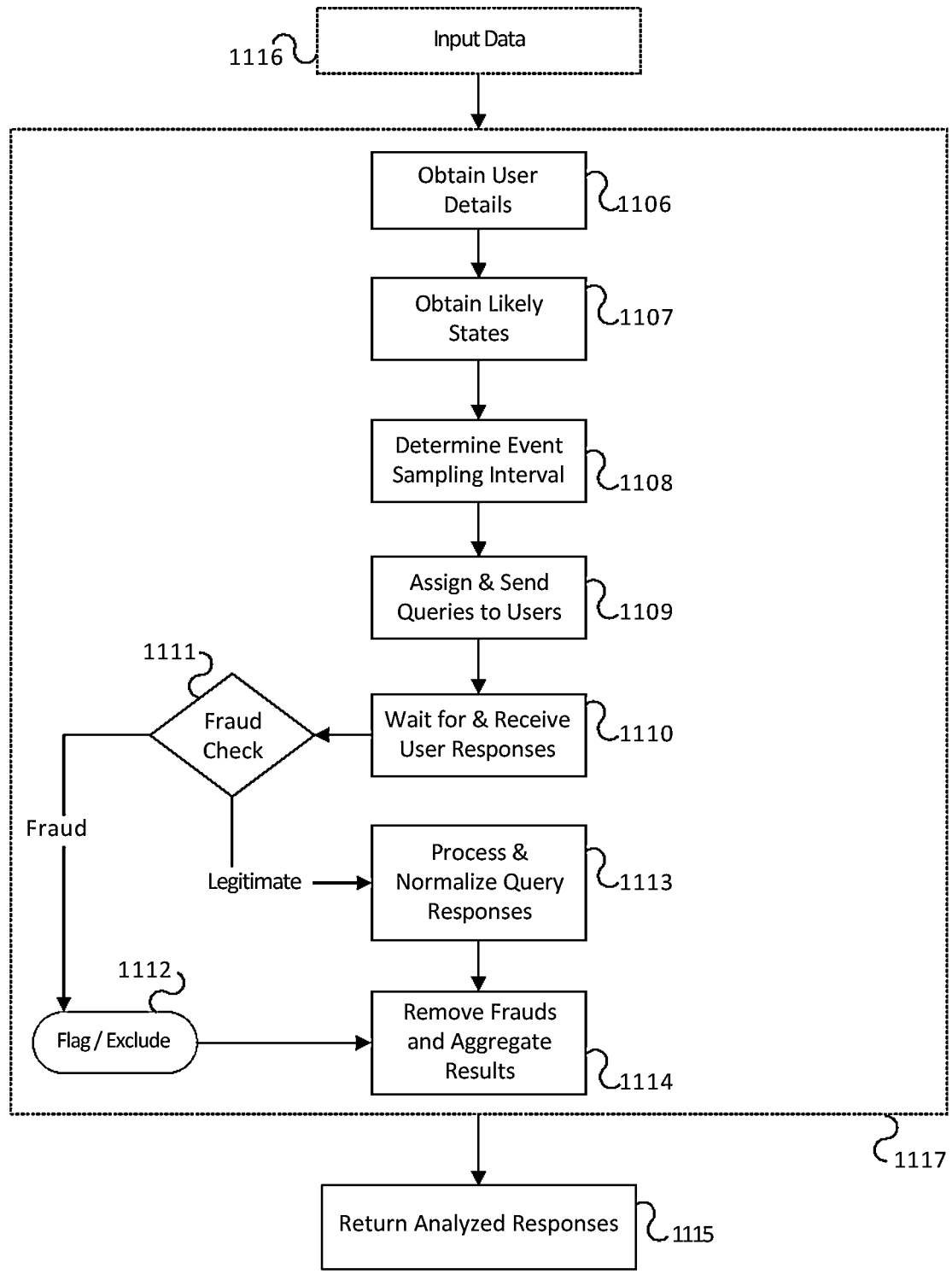
FIG. 11 shows steps for processing and transforming inputs in order to return Analyzed Responses according to one or more embodiments of the invention.

FIG. 11 represents a computer function to send selected questions to selected users and receive their timestamped responses. Processing group 1116 includes input data elements including data elements containing the current Questionnaires and User Prediction States matrices, group assignment and latency, event data and time, and a flag to determine if the generated questions (and ensuing analyzed responses) relate to past impressions or future predictions. Within main execution group 1117, step 1106 analyzes the user's characteristics including location, reliability and latency (without limitation), followed by step 1107 which obtains the most likely possible states (that is, the valid states with the highest probability, including data from the State and Observation matrices, without limitation). Next, step 1108 analyzes the required sampling frequency of the selected event; for example, a football game with its 25 second play timers is substantially "faster" than a chess match with a 2 minute play timer, thus requiring a faster sampling frequency. This information is very important for determining group partitioning (which users to query), as the latency of the various users becomes more and more important the higher the sampling frequency. Step 1109 calls the function on FIG. 12 to assign possible states to the groups most likely to respond accurately and quickly, followed by the actual transmission of the questions (past impressions or future predictions) to the users. It should be noted that more than one question can be sent to any group, and that groups may be partitioned differently for each question. User responses arrive back to the system in step 1110, upon which the responses are evaluated for fraud in step 1111 (using the function on FIG. 15) by analyzing response data for each user and evaluating if it is within a threshold. The threshold can be dynamically adjusted depending on various factors including number of active users, their locations, connectivity methods, broadcast delays, event sampling frequency as well as external data sources, all without limitation. It should further be noted that for the purpose of this example, an exemplary value such as 0.8 can be used, which represents a requirement that the user has provided correct answers at least 80% of the time in the past 30 minutes, and that additional embodiments may make sure of alternate or more advanced methods for fraud detection, all of which are incorporated herein in their entirety. Suspected frauds are flagged in step 1112, while legitimate responses are processed and normalized in step 1113, followed by removal of fraudulent responses and aggregation of the results in step 1114. Finally, the Analyzed Response Matrix is returned to the calling function in step 1115.

Table 19 below illustrates an exemplary pseudo code implementation of a program function used to send selected questions to selected users and collect their timestamped responses, as applicable to one or more embodiments of the present invention.

TABLE 19

| Line (FIG./Step) | Comment | Pseudo Code |
|---|---|---|
| 1400 (11/1117) | Function to send selected questions to selected users and collect their timestamped responses. | Assign_Questionnaires_To_User_And_Query (Questionnaires, group, event, t, User_Prediction_States, group_latency, is_prediction_about_future) |
| 1410 (11/1106) | Calculates the user's characteristics (location, reliability, etc.). | User_Details<-Obtain_Users_Characteristics(group, event, t, User_Prediction_States) |
| 1420 (11/1107) | Determine which are the possible states and what is the likelihood of each, based on evaluating the data in the model's matrices. | Likely_States<-Obtain_Likely_States(User_Prediction_States, t, event, is_prediction_about_future) |

TABLE 19-continued

| Line (FIG./Step) | Comment | Pseudo Code |
|---|---|---|
| 1430 (11/1108) | Factor the "tempo" of an event into the calculations; for example, a football game with its 25 second play timers is substantially "faster" than a chess match with a 2 minute play timer. This information is very important for determining group partitioning (which users to query), as the latency of the various users becomes more and more important the shorter the event timers are. | Event_Dynamic_Level<-Determine_Event_Dynamic_Level(event, t, Likely_states, is_prediction_about_future) |
| 1440 (11/1109) | Based on all these factors (among others and without limitation), the questionnaires can now be generated by calling Function 1500 (FIG. 12), with a sample result illustrated in Table 5. | User_Queries_Assignments<-Assign_Queries_To_Users(event, Questionnaires, group, User_Details, Likely_States, Event_Dynamic_Level, group_latency) |
| 1450 (11/1110) | Send questions to users based on assignments generated in steps above and measure their response times. | Response_Time<-Wait_For_Response( ) |
| 1460 (11/1111) | Call Function 1700 (FIG. 15), to analyze response time for each user and evaluate if it is within a threshold. The threshold can be dynamically adjusted depending on various factors including number of active users, their locations, connectivity methods, broadcast delays, event dynamics etc. | If (Calculate_User_Response_Time_Fraud_Likelyhood (Response_Time, Event_Dynamic_Level, User_Details) < Minimum_Legitimacy_Threshold( ) Note: for the purpose of this example, the function Minimum_Legitimacy_Threshold( ) returns the value 0.8, which represents a requirement that the user has provided correct answers at least 80% of the time in the past 30 minutes. |
| 1470 (11/1112) | Return null if a users' response is considered fraudulent and is excluded. | Return (null) |
| 1480 (11/1113) | Process the responses obtained from the users, as illustrated in Table 7. | Responses<-Process_Query_Responses(group, Questionnaires, User_Queries_Assignments) |
| 1490 (11/1114) | Enhance raw responses obtained in line 1480 by removing fraudulent responses and aggregate responses. | Analyzed_Responses<-Remove_Frauds_And_Aggergate_Results(Responses) |
| 1495 (11/1115) | Return enhanced responses to calling function, as illustrated in Table 9. | Return Analyzed_Responses |

Figure 12:
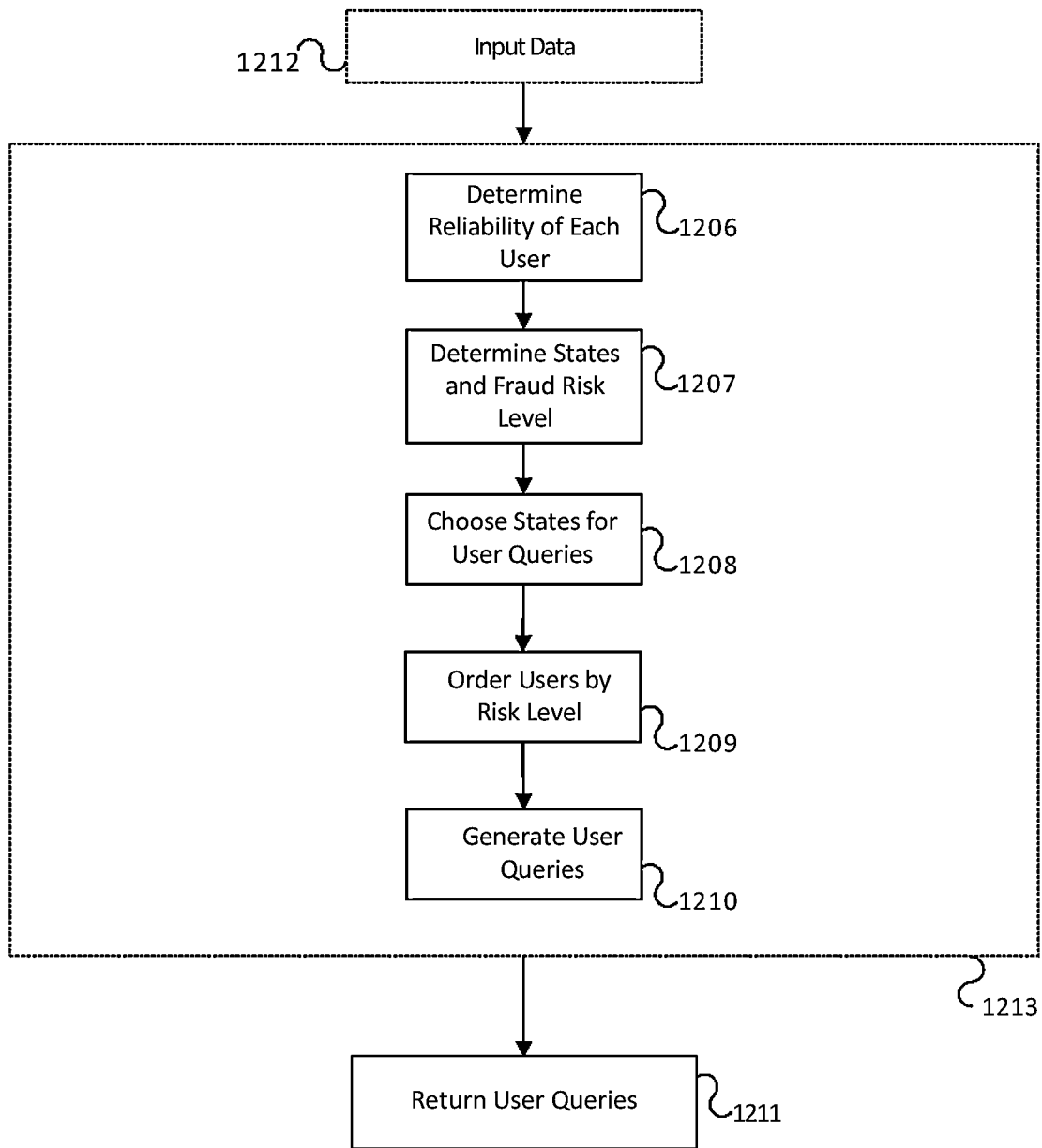
FIG. 12 illustrates steps for processing and transforming inputs in order to return User Queries according to one or more embodiments of the invention.

FIG. 12 represents a computer function to determine what type of question to send to each user. In embodiment, this is determined by the number of available users, the type of the event, the confidence index of possible events and historical user behavior. Processing group 1212 includes input data elements, including event data, Questionnaires, User and Group matrices, group latency data and the current level of activity in the event. Within main execution group 1213, step 1206 analyzes the reliability of each user, using (for example) the users' details and their group assignment. This function is not demonstrated, however, it should be noted that for the purpose of this example, an exemplary value such as 0.8 can be used, which represents a requirement that the user has provided correct answers at least 80% of the time in the past 30 minutes, and that additional embodiments may make sure of alternate or more advanced methods for fraud detection, all of which are incorporated herein in their entirety. In step 1207, the states that the user will be queried about are chosen. Also, the risk level metric is used to determine how vulnerable is the current event, in its present state, to attempted fraud: in fast-changing events it is more difficult to quickly detect fraud than in slower ones. Next, the states the users will be queried about are chosen in step 1208, followed by ordering of the users in step 1209 such that the most reliable users are queried first (long latency also adds to risk, so higher reliability is given to users that respond quickly, thereby improving accuracy of the data). The questions to be sent to the users (in the order determined by step 1209) are then generated in step 1210 and finally the User Queries table returned to the calling function in step 1211.

Table 20 below illustrates an exemplary pseudo code implementation of a program function used to determine what type of question to send to each user, as applicable to one or more embodiments of the present invention.

TABLE 20

| Line (FIG./Step) | Comment | Pseudo Code |
|---|---|---|
| 1500 (12/1213) | Program function to determine what type of question to send to each user. This is determined by the number of available users, the type of the event, the confidence index of possible events and the historical user responses. | Assign_Queries_To_Users(event, Questionnaires, group, User_Details, Likely_States, Event_Dynamic_Level, group_latency) |
| 1510 (12/1206) | Evaluate the reliability of each user, using (for example) the users' details and their group assignment. | User_Reliability<-Determine_User_Reliability(event, User_Details, group_latency) Note: This function is not demonstrated. However, for the present purpose, assume that a reliable user is one whose answers have been 80% correct (or more) in the past 30 minutes. |
| 1520 (12/1207) | Choose the states that the user will be queried about. Also, the risk level is used to determine the vulnerability to fraud attempts: in fast-changing events it is more difficult to detect fraud than in slower ones, given all other factors are equal. | Risk_Level<-Determine_Risk_Level (Event_Dynamic_Level, event, Likely_States, Group_latency, User_Reliability) |
| 1530 (12/1208) | Populate matrix and choose the states the user will be queried about. | Chosen_States<-Select_Relevant_States(Likely_States, User_Reliability, event, Risk_Level) |
| 1540 (12/1209) | Users are ordered so that they are queries by order of the least risky first (long latency also adds to risk, so higher reliability is given to users respond quickly, thereby reducing noise in the model). | User_Order<-Order_Users_By_Risk(User_Reliability, Risk_Level, Chosen_States) |
| 1550 (12/1210) | Table of queries for users is generated. | User_Query<-Generate_User_Query (event, Chosen_States) |
| 1560 (12/1211) | Return user queries table to calling function. | Return User_Query |

Figure 13:
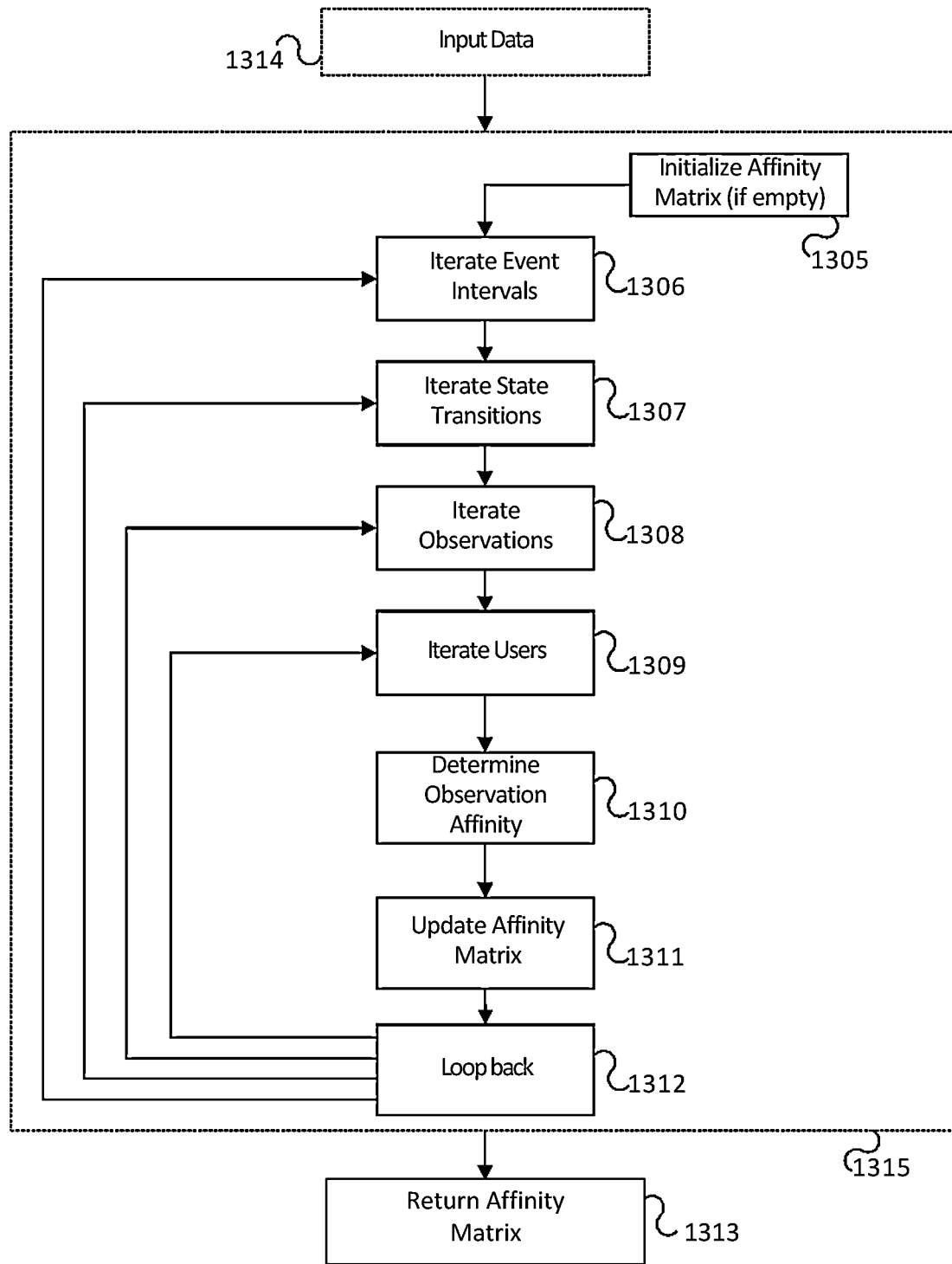
FIG. 13 shows steps for processing and transforming inputs in order to return an Affinity Matrix according to one or more embodiments of the invention.

FIG. 13 represents a computer function to create or update an affinity matrix that stores the predicted sentiment between users and entities, used to determine which entities are liked by each user and to what degree, by analysis of user responses. Processing group 1314 includes input data elements including the Observation, State Transition and User Predictions matrices, among others and without limitation. Processing group 1315 includes the Affinity Matrix initialization step 1305 which initializes the Affinity Matrix, followed by four nested iterative processing loops which iterate event intervals 1306, state transitions 1307, observations 1308 and finally users 1309. For each combination of interval, state transition and observation, the actions of each user are analyzed. For example purposed, a simple increment of observation rate per entity can be used, however one or more embodiments of the present invention can also use more advanced methods which are available or may become available, all of which are incorporated herein by reference. The affinity matrix is then updated in step 1311 and the nested loops are respectively looped back to process the next iteration. Finally, the Affinity Matrix is returned to the calling function in step 1313. It should be further noted that for example purposes no optimization of processing efficiency was depicted and that embodiments of the present invention may further optimize this function. A person skilled in the art would appreciate that such optimizations do not alter the core functionality of this function.

Table 21 below illustrates an exemplary pseudo code implementation of a program function used to create an "affinity matrix" between users and entities, as applicable to one or more embodiments of the present invention.

TABLE 21

| Line (FIG./Step) | Comment | Pseudo Code |
|---|---|---|
| 1600 (13/ 1315) | Creates an "affinity matrix" between users and entities. The goal is to determine which entities are liked by each user and which aren't | Generate_Users_Affinity_Matrix(State_Transition_Matrix, Observations Matrix, User_predictions) |
| 1610 (13/ 1305) | Initialize the object that will be returned | If (Affinity_Matrix.sizeof( ) = 0) then Affinity_Matrix<-(new) |
| 1620 (13/ 1306) | Iterate event elements | Foreach (t in Split_To_Time_Intervals(event.length)) |
| 1630 (13/ 1307) | Iterate states | Foreach (State in State_Transition_Matrix) |
| 1640 (13/ 1308) | Iterate observations | Foreach (Observation in Observation_States) |
| 1650 (13/ 1309) | Iterate users | Foreach (User in User_Prediction.Get_Users( )) |
| 1660 (13/ 1310) | Taking into account the time, state, observation and the input provided by the user (among others and without limitation), determine whether the prediction was (un)favorable enough to deduce there's an affinity. | Affinity<-Determine_Observation_Affinity(State, Observeation, User_Predictions[User][t], event.State_At(t)) |
| 1670 (13/ 1311) | Update the final object with the user's affinities | Update_Affinity_Matrix(Affinity_Matrix, affinity) |
| 1680 (13/ 1312) | | End for |
| 1690 (13/ 1312) | | End For |
| 1695 (13/ 1312) | | End For |
| 1696 (13/ 1312) | | End For |
| 1697 (13/ 1313) | An example of the returned affinity matrix is presented in Table 12. | Return Affinity_Matrix |

Figure 14:
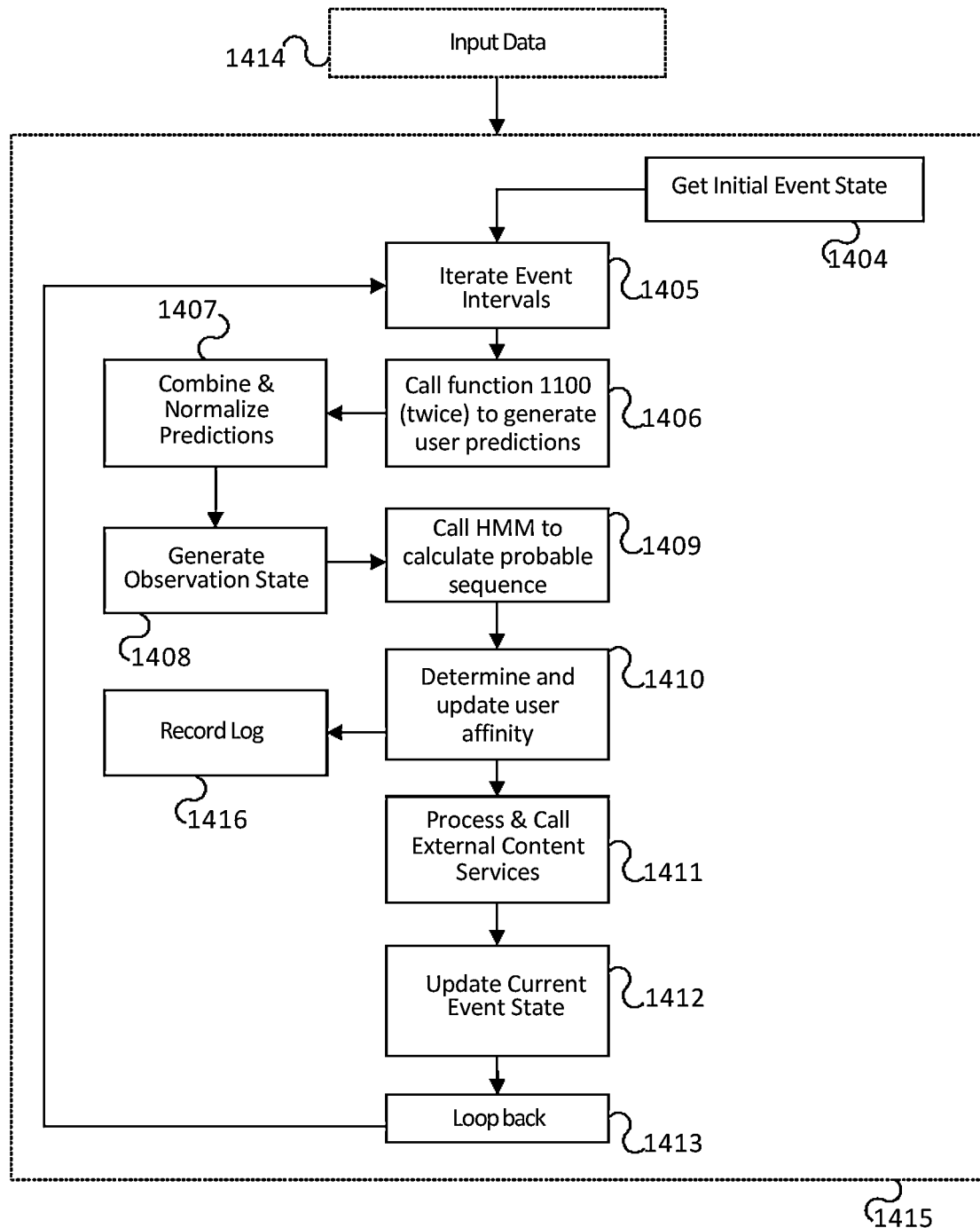
FIG. 14 illustrates a series of ongoing processing steps for an operating or running event prediction system and method in accordance with one or more embodiments of the invention.

FIG. 14 represents an exemplary computer function for the main program execution loop of an embodiment of the present invention. Processing group 1414 includes input data elements including event data, initial time interval, and the State Transition and Observation Matrices. Main processing group 1415 includes the initial event state query step 1404, passing control to the main processing loop 1405 which preferably runs for the selected duration (and optionally longer or shorter) of the selected event. Step 1406 calls the function depicted in FIG. 8, and the user predictions are then normalized to one in step 1407. Step 1408 calls the function depicted in FIG. 15, to generate observations for the current event interval, which are then passed to the Hidden Markov Model 1409 to calculate the most probable sequence of occurrences. User affinity is then determined by calling the function in FIG. 13, which updates the User Affinity Matrix that is then optionally processed by step 1411 by calling the function depicted in FIG. 16. A log of data the current state of the event, user actions and predictions can be recorded in step 1416. The current state of the event is updated in step 1412 before looping back in step 1413 to process the next occurrence within the event.

Table 22 below illustrates an exemplary pseudo code implementation of a main program function used to create the main program execution loop for one or more embodiments of the present invention.

TABLE 22

| Line (FIG./Step) | Comment | Pseudo Code |
|---|---|---|
| 2000 (14/ 1415) | Main program function for system runtime operations. | Main(event, time_interval, State_Transition_Matrix, Observation_Matrix) |

TABLE 22-continued

| Line (FIG./ Step) | Comment | Pseudo Code |
|---|---|---|
| 2005 (14/ 1404) | Initialize the current state variable. | Current_State<-event.Get_Initial_State( ) |
| 2010 (14/ 1405) | Starts a loop that iterates through each occurrence within a series of occurrences that include an event. Actual splits can be time based, rule based, play based, external input (human, data or otherwise) or otherwise, and any combination thereof. | Foreach (t in Split_To_Time_Intervals(event.length, Current_State)) |
| 2020 (14/ 1406) | For each occurrence of the selected event, call function 1100 (FIG. 8) to read user predications that were previously captured (prior to the selected occurrence of the same event or using data from past events, or any combination thereof) for each of the questions about said selected occurrence. | User_predictions_1[t] <- Generate_User_Predictions_For_Time_Interval(t-1, event, False) |
| 2022 (14/ 1406) | For each occurrence of the selected event, function 1100 (FIG. 8) is called to read user predications that were captured after said selected occurrence (following the selected occurrence of the same event or using data from other events, or any combination thereof) for each of the questions about said selected occurrence. | User_predictions_2[t]<- Generate_User_Predictions_For_Time_Interval(t+1, event, True) |
| 2024 (14/ 1407) | Next, the two types of predictions (past and future) are combined into one matrix . . . | User_predictions[t]<- Combine_Predictions(User_predictions_1, User_Predicitons_2) |
| 2030 (14/ 1407) | . . . and normalized. | User_predictions[t]<- Normalize_Predictions(User_predictions[t]) |
| 2040 (14/ 1408) | Call Function 2100 on FIG. 15 to calculate what are the likely states based on the predictions of the users. | Observation_States<- Generate_Observation_States(event, User_predictions) |
| 2050 (14/ 1409) | In at least one embodiment, use the backwards recursion algorithm for HMM. | States_Sequence<- Calculate_Likely_States_Sequence(Observation_States, Observations_Matrix, State_Transition_Matrix) |
| 2060 (14/ 1410) | Get the user's current affinity based on the latest prediction. | Affinity<- Determine_Observation_Affinity(States_Sequence.Get_Current_State( ), Observation, User_Predictions[User][t], event.State At(t)) |
| 2065 (14/ 1416) | Record event log, event timeline, user actions. | Log<-(States_Sequence.Get_Current_State( ), Observation, User_Predictions[User][t], event.State_At(t)) |
| 2070 (14/ 1411) | Monetization and commercial integration options are called via function 2200 on FIG. 16, (using data from both the present affinity calculation and the Affinity Matrix from the training phase). | Generate_And_Send_Relevant_Content(event, State_Sequence, affinity, Affinity_Matrix) |

TABLE 22-continued

| Line (FIG./ Step) | Comment | Pseudo Code |
|---|---|---|
| 2075 (14/ 1412) | Now, update the current state and assess several likely options, choosing the smallest time interval that fits one of them. This way it is less likely to miss anything, while also not creating spurious questions that are sent to users. | Current_State<- Determine_Current_State(User_predictions[t]) |
| 2080 (14/ 1413) | | End For |

Figure 15:
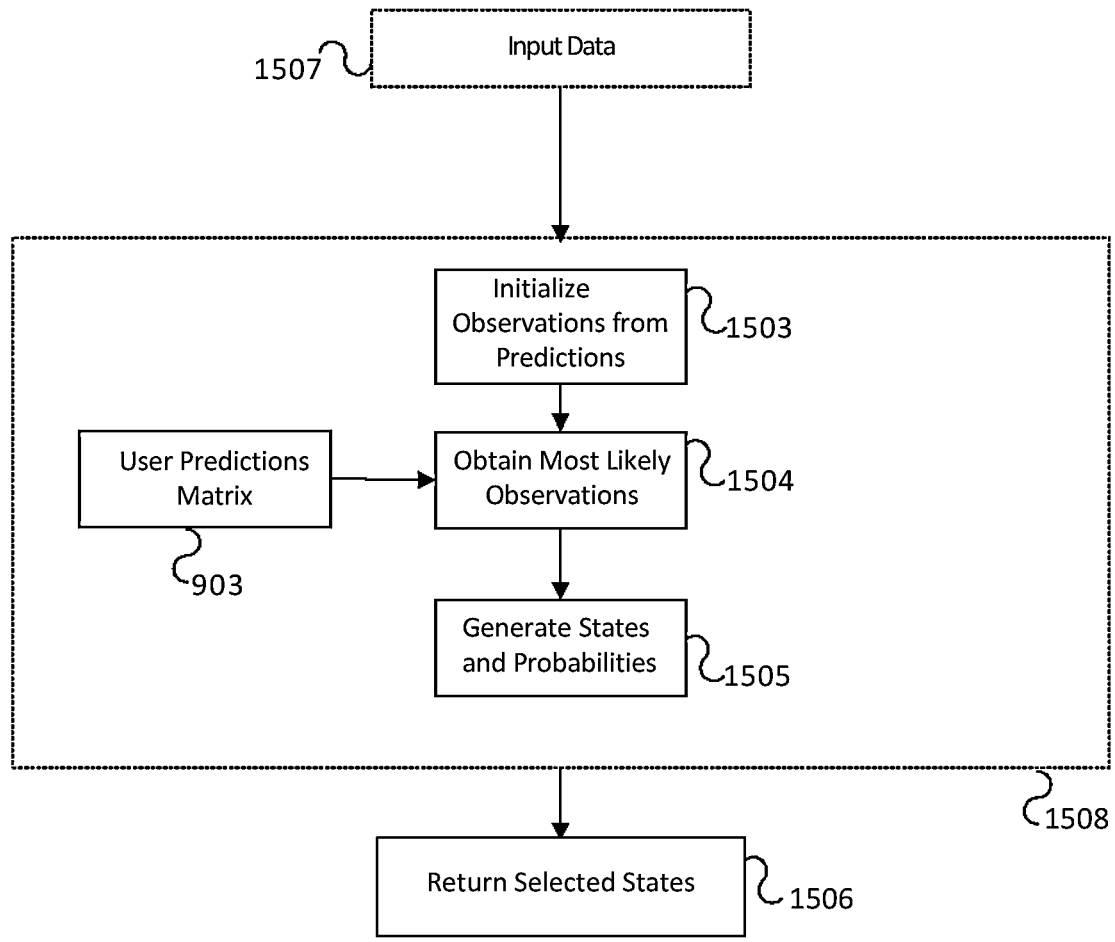
FIG. 15 shows steps for processing and transforming inputs in order to return a set of Selected States, according to one or more embodiments of the invention.

FIG. 15 represents a computer function to create or update observations based on the selected events and the user predictions matrix that was created during the training phase. Processing group 1507 includes input data elements including event data and the User Predictions Matrix. Processing group 1508 includes initialization step 1503 which converts previous user predictions into initial potential observations, followed by step 1504 which calculates the probability of all observations processed by the previous step based on analysis of previous (or trained) user predictions, using, in one or more embodiments, User Predictions Matrix 903. All event state transitions that are over a probability threshold are then created in step 1505, with the processed data returned to the calling function in step 1506.

Table 23 below illustrates an exemplary pseudo code implementation of a program function used to generate a list of observations based on the selected events and the user predictions matrix, as applicable to one or more embodiments of the present invention.

TABLE 23

| Line (FIG./ Step) | Comment | Pseudo Code |
|---|---|---|
| 2100 (15/ 1508) | Program function to generate list of observations based on the selected events and the user predictions matrix that was created during the training phase. | Generate_Observation_States(event, User_predictions) |
| 2110 (15/ 1503) | Populate initial observations matrix. | Initial Observations<- Translate_Predicitons_To_Observations(event, User_predictions) |
| 2120 (15/ 1504) | Calculate probability of observations. | Likely_Observations<- Obtain_Top_Likely_Observations(event, User_predictions) |
| 2130 (15/ 1505) | Generate the most "likely" states based on the chosen likely observations. These states are used in the HMM model in order to deduce the most likely sequence of states. | Chosen_States<- Generate_Chosen_States_And_Probabilities(event, Likely_Observations) |
| 2140 (15/ 1506) | Return matrix of chosen states to the calling function. | Return Chosen_States |

Figure 16:
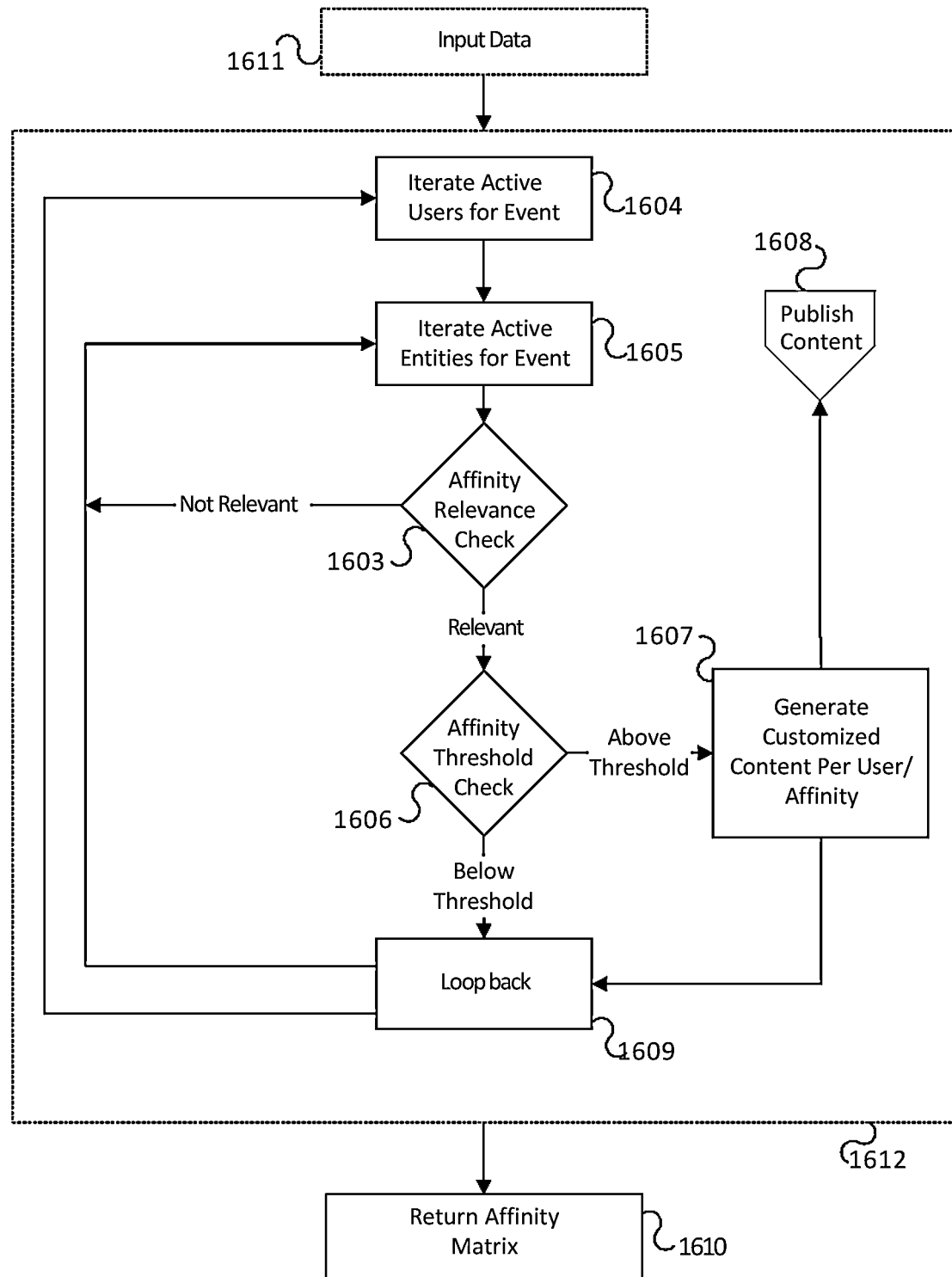
FIG. 16 shows steps for processing and transforming inputs in order to return an Affinity Matrix, according to one or more embodiments of the invention.

FIG. 16 represents a computer function to create and transmit user-directed content as a result of a user's affinity to a particular entity in the event. This function may be used to call an external advertising system, for example, signaling the user's information and enabling display of relevant advertising, promotional messaging, or other similar content on a user's device as a result of the user's actions, their affinity, and possibly in relation to any entity. Processing group 1611 includes input data elements including event data, the desired affinity relationship and the State Sequence and Affinity Matrices. Processing group 1612 contains two nested loops, iterating users 1604 and active entities 1605 respectively. For each combination, the relevance 1603 of the affinity to the iterated entity is evaluated first, followed by evaluation 1606 of the affinity of the specific user is evaluated against all entities, with any affinity value over a threshold is sent to step 1607, which generates relevant content or signals and transmits those to the content publication step, 1608, an example of which is depicted in step 2004 of FIG. 20. In either case (above or below affinity threshold) control is then returned to step 1609 and the nested iteration loops process their next respective iteration. Finally, the updated Affinity_Matrix is returned to the calling function in step 1610.

Table 24 below illustrates an exemplary pseudo code implementation of a program function used to create and transmit user-directed content as a result of a user's affinity to a particular entity in the event, as applicable to one or more embodiments of the present invention.

TABLE 24

Figure 20:
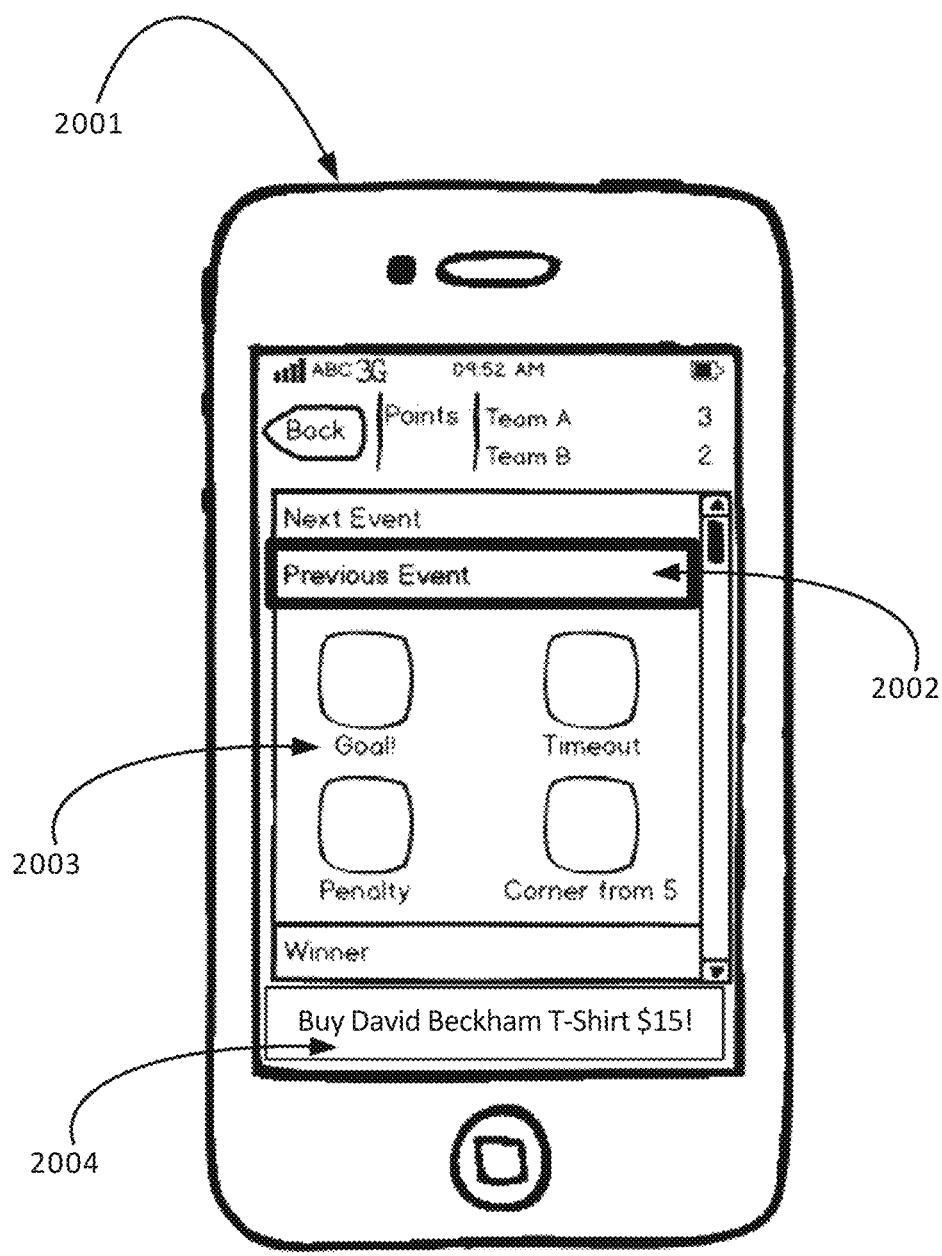
FIG. 20 illustrates a presentation of a screenshot of a graphical user interface on a portable client computing device according to one or more embodiments of the invention.

| Line (FIG./ Step) | Comment | Pseudo Code |
|---|---|---|
| 2200 (16/ 1612) | | Generate_And_Send_Relevant_Content (event, State_Sequence, Affinity, Affinity_Matrix) |
| 2210 (16/ 1604) | Iterate Active Users for Event | Foreach (User in User_Prediction.Get_Users( )) |
| 2220 (16/ 1605) | Iterate Active Entities for Event | Foreach (Entity in event.Entities) |
| 2230 (16/ 1603) | Evaluate affinity relevance against iterated entity | If (State_Sequence.Entity_Is_Relevant(Entity) |
| 2240 (16/ 1606) | Evaluate affinity connection against iterated entity | If (Positive_Affinity_Exists(User, event, Affinity, Affinity_Matrix) |
| 2250 (16/ 1607) | Publish advertising or other content to user device, for example as illustrated on step 2004 of FIG. 20. | Generate_And_Publish_Content_To_User(User, Entity, event.Get_Event_Advertisment( )) |
| 2285 (16/ 1609) | | End For |
| 2285 (16/ 1610) | Return Affinity Matrix to calling function. | Return (Affinity_Matrix) |

Figure 17:
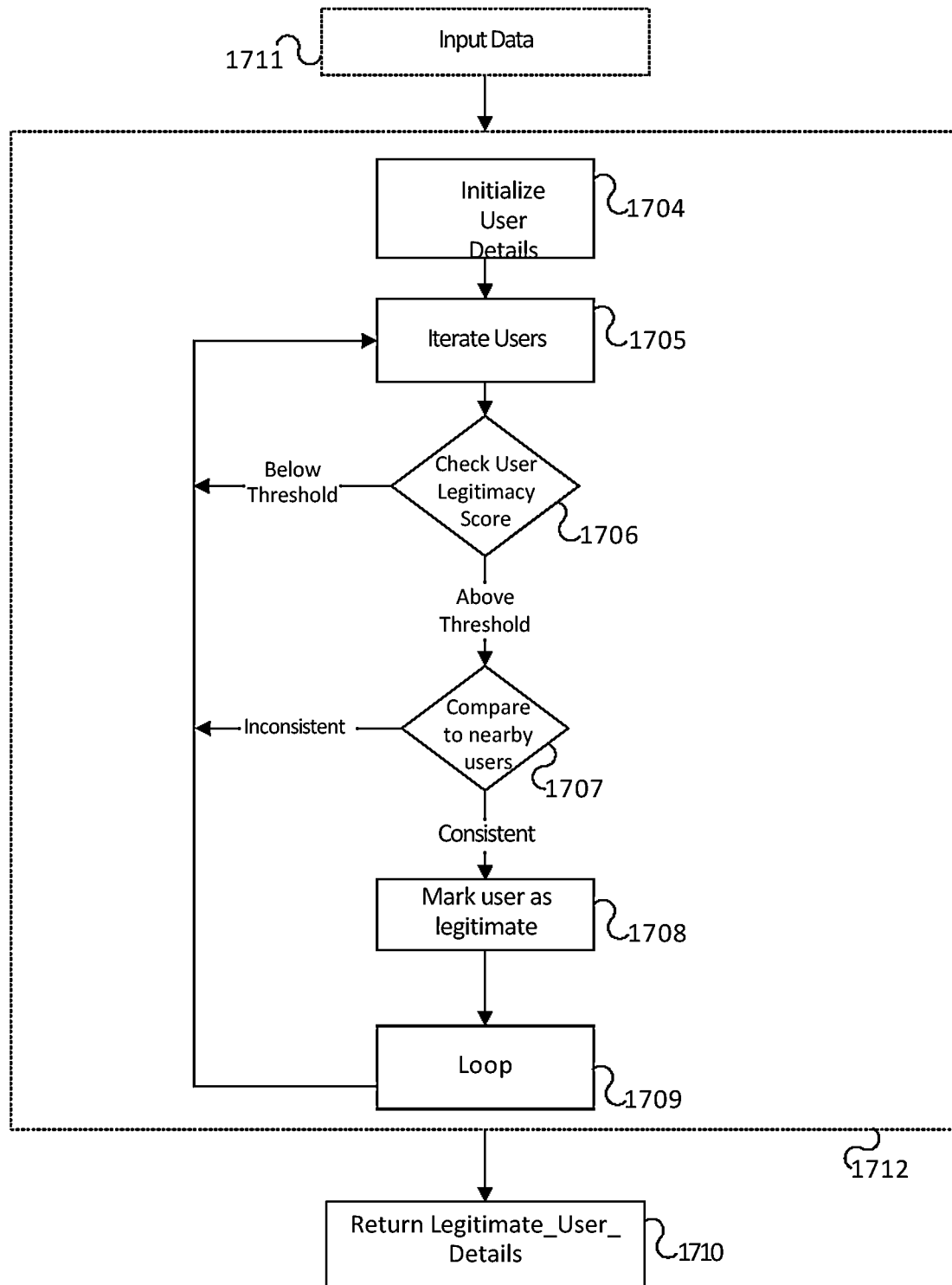
FIG. 17 shows steps for processing and transforming inputs in order to return a credibility score for a plurality of devices, wherein the credibility score is used to evaluate, detect and optionally mitigate malformed data attempts, according to one or more embodiments of the invention.

FIG. 17 represents a computer function to analyze user responses and determine whether a sufficient number of users are available with a sufficient legitimacy score. Processing group 1711 includes input to the function, including response time data, the level of event activity, and the user details matrix. Within main execution group 1712, Step 1704 initializes the legitimate users matrix, followed by iterative loop 1705 which iterates all users, passing them to step 1706 which then determines if each If the user's reliability score is above or below the threshold returned by the Minimum Legitimacy Threshold( ) function. Users with scores below the threshold are skipped, and users with scores above the threshold are passed on to step 1707 which compares the response data (including, but not limited to, response time, connection data, latency data, and so on) of the user is consistent with that of a majority of the users whose geo-location is similar to that user. As before, users with inconsistencies are skipped and users with data that is consistent are passed to step 1708 which marks that user as legitimate in the Legitimate_User_Details table. Finally, step 1710 returns the estimated response reliability of the Legitimate_User_Details table to the calling function.

Table 25 below illustrates an exemplary pseudo code implementation of a program function used to analyze user responses and to determine whether there is a sufficient number of users are available with a sufficient legitimacy score, as applicable to one or more embodiments of the present invention.

TABLE 25

| Line (FIG./ Step) | Comment | Pseudo Code |
|---|---|---|
| 1700 (17/ 1712) | Analyzes the answers provided by all the users and determines whether there is a sufficient number of users with a sufficient legitimacy score. | Calculate_User_Response_Time_ Fraud_Likelyhood (Response_Time, Event_Dynamic_Level, User_Details) |
| 1710 (17/ 1704) | Initialize the object that will contain the users whose reliability exceeds a predefined threshold. | Legitimate_User_Details<-(new) |
| 1720 (17/ 1705) | Iterate users | Foreach (User in User_Details) |
| 1730 (17/ 1706) | If the user's reliability is above the threshold, it will be used for analysis later | If (user.Legitimacy_Score < Minimum_Legitimacy_Threshold( ) |

TABLE 25-continued

| Line (FIG./Step) | Comment | Pseudo Code |
|---|---|---|
| 1740 (17/1706) | | Continue |
| 1750 (17/1707) | If the response of the user is consistent with that of a majority of the users whose geo-location is similar to his, then . . . | If (User_Response_Is_Consistent_With_Proximate_Users(User, User_Details)) |
| 1760 (17/1708) | . . . add the user to the list of legitimate users. | Legitimate_User_Details.Add(User) |
| 1770 (17/1709) | | End For |
| 1780 (17/1710) | Return estimated number and reliability of the remaining users and determine a legitimacy score (the higher the better). | Return (Estimate_Response_Reliability(Legitimate_User_Details)) |

Computing System

Figure 18:
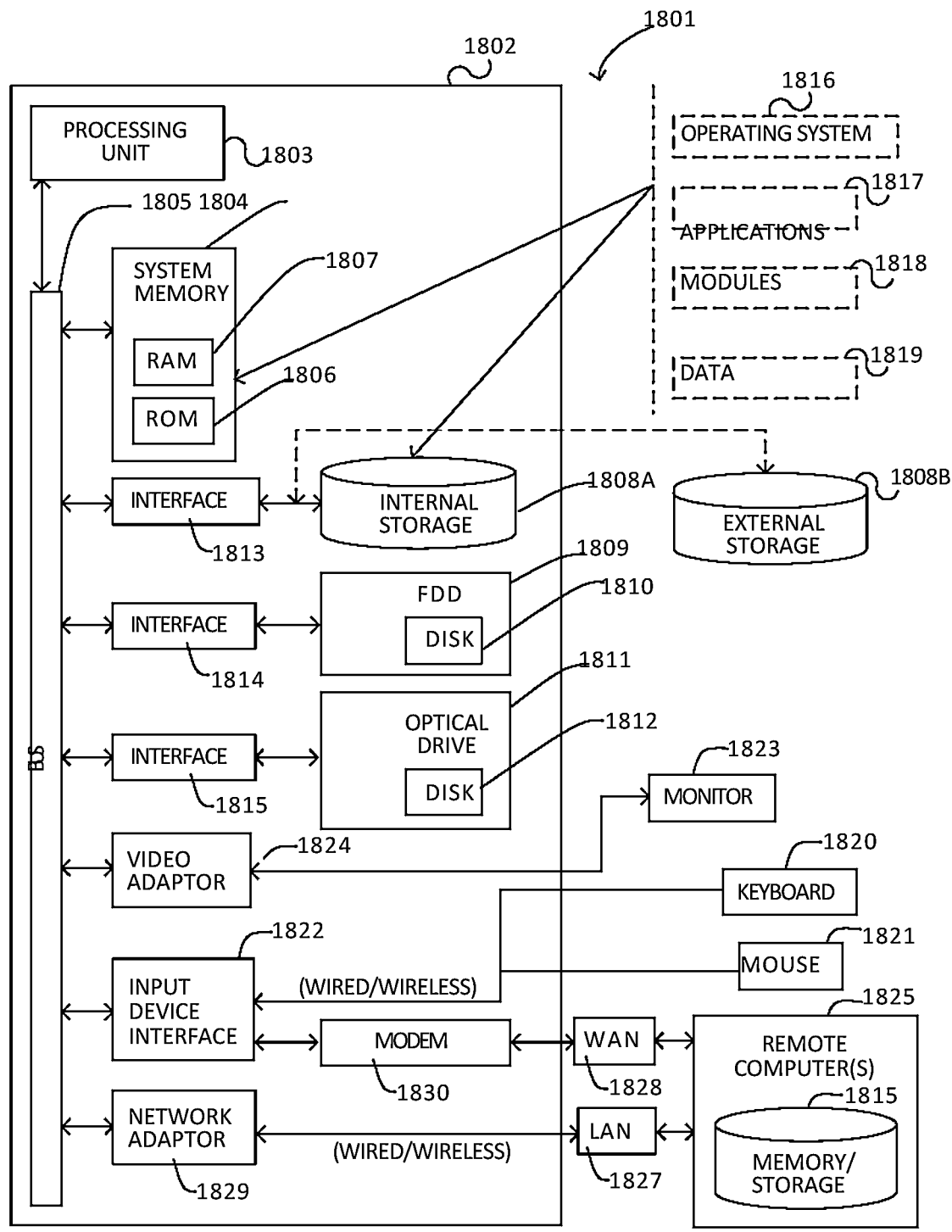
FIG. 18 illustrates various aspects of a networked computing system according to one or more embodiments of the invention.

Referring now to FIG. 18, there is illustrated a block diagram of a computer operable to execute the disclosed architecture. In order to provide additional context for various aspects of the subject invention, FIG. 18 and the following discussion are intended to provide a brief, general description of a suitable computing environment in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices, including various architectures such as cloud computing.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can include computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, cellular, infrared and other wireless media. Combinations of the any of the above should also be included within the scope of computer-readable media.

With reference again to FIG. 18, there is illustrated an exemplary environment 1801 for implementing various aspects of the invention that includes a computer 1802, the computer 1802 may include a processing unit 1803, a system memory 1804 and a system bus 1805.

The computer 1802, may, in embodiments, correspond to any suitable type of electronic device including, but are not limited to, desktop computers, mobile computers (e.g., laptops, ultrabooks), mobile phones, portable computing devices, such as smart phones, tablets and phablets, televisions, set top boxes, smart televisions, personal display devices, large scale display devices (e.g., billboards, street signs, etc.), personal digital assistants ("PDAs"), gaming consoles and/or devices, virtual reality devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), smart security systems, and/or smart accessories (e.g., light bulbs, light switches, electrical switches, etc.), to name a few. In some embodiments, the computer 1802 may be relatively simple or basic in structure such that no, or a minimal number of, mechanical input option(s) (e.g., keyboard, mouse, track pad) or touch input(s) (e.g., touch screen, buttons) are included. For example, the computer 1802 may be able to receive and output audio, and may include power, processing capabilities, storage/memory capabilities, and communication capabilities. However, in other embodiments, the computer 1802 may include one or more components for receiving mechanical inputs or touch inputs, such as a touch screen and/or one or more buttons.

The computer 1802 may, in embodiments, be a voice activated electronic device. A voice activated electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device may be one or more of the following: Amazon Echo®; Amazon Echo Show®; Amazon Echo Dot®; Smart Television (e.g., Samsung® Smart TVs); Google Home®; Voice Controlled Thermostats (e.g., Nest®; Honeywell® Wi-Fi Smart Thermostat with Voice Control), smart vehicles, smart transportation devices, wearable devices (e.g., Fitbit®), and/or smart accessories, to name a few.

The computer 1802 can further include an internal hard disk drive (HDD) 1808A (e.g., EIDE, SATA, NVMe), which internal hard disk drive 1808A may also be configured for external use in a suitable chassis (not shown), a magnetic floppy disk drive (FDD) 1809, (e.g., to read from or write to a removable diskette 1810) and an optical disk drive 1811, (e.g., reading a CD-ROM disk 1812 or, to read from or write to other high capacity optical media such as the DVD). The hard disk drive 1808A, magnetic disk drive 1809 and optical disk drive 1811 can be connected to the system bus 1805 by a hard disk drive interface 1813, a magnetic disk drive interface 1814 and an optical drive interface 1815, respectively. The interface 1813 for external drive implementations includes at least one or more of Universal Serial Bus (USB) and IEEE 1394 interface, PCIe, Thunderbolt, SCSI, or SAS technologies. The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention. The computer 1802 and the components thereof, described more fully below, may be applicable to remote computer(s) 1825, the description of which applying.

Processing unit 1803 may include any suitable processing circuitry capable of controlling operations and functionality of the computer 1802, as well as facilitating communications between various components within the computer 1802. In some embodiments, processing unit 1803 may include a central processing unit ("CPU"), a graphic processing unit ("GPU"), one or more microprocessors, a digital signal processor, or any other type of processor, or any combination thereof. In some embodiments, the functionality of processing unit 1803 may be performed by one or more hardware logic components including, but not limited to, field-programmable gate arrays ("FPGA"), application specific integrated circuits ("ASICs"), application-specific standard products ("AS SPs"), system-on-chip systems ("SOCs"), and/or complex programmable logic devices ("CPLDs"). Furthermore, each of processing unit 1803 may include its own local memory, which may store program systems, program data, and/or one or more operating systems. However, processing unit 1803 may run an operating system ("OS") for the computer 1802, and/or one or more firmware applications, media applications, and/or applications resident thereon. In some embodiments, the processing unit 1803 may run a local client script for reading and rendering content received from one or more websites. For example, the processing unit 1803 may run a local JavaScript client for rendering HTML or XHTML content received from a particular URL accessed by the computer 1802. The processing unit 1803 may include one or more processor(s).

The system bus 1805 may operationally couple the following system 1801 components, which may include, but not limited to, the system memory 1804 to the processing unit 1803. The processing unit 1803 can be any of various commercially available processors. Dual microprocessors and other multi-processor architectures may also be employed as the processing unit 1803. The system bus 1805 can be any of several types of bus structure that may further interconnect to a memory bus (with a memory controller), a memory bus (without a memory controller), a peripheral bus, and a local bus using any of a variety of commercially available bus architectures. The system memory 1804 may include read only memory (ROM) 1806 and random access memory (RAM) 1807. A basic input/output system (BIOS) is stored in a non-volatile memory 1806 such as ROM, EPROM, EEPROM, which BIOS contains the basic routines that help to transfer information between elements within the computer 1802, such as during start-up. The RAM 1807 can also include a high-speed RAM such as static RAM for caching data.

The computer 1802 may include system memory 1807, internal storage 1808A, and/or external storage 1808B. System memory 1807, internal storage 1808A, and/or external storage 1808B may include one or more types of storage mediums such as any volatile or non-volatile memory, or any removable or non-removable memory implemented in any suitable manner to store data for computer 1802. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, system memory 1807 may be implemented as computer-readable storage media ("CRSM"), which may be any available physical media accessible by processing unit 1803 to execute one or more instructions stored within system memory 1807, internal storage 1808A, and/or external storage 1808B. In some embodiments, one or more applications (e.g., mobile application software 3000, gaming, music, video, calendars, lists, banking, social media etc.) may be run by processing unit 1803, and may be stored in system memory 1807, internal storage 1808A, and/or external storage 1808B.

Continuing to refer to FIG. 18, a number of program modules can be stored in the drives and RAM 1807, including an operating system 1816, one or more application programs 1817, other program modules 1818 and program data 1819. All or portions of the operating system, applications, modules, and/or data can also be cached in the RAM 1807. It is appreciated that the invention can be implemented with various commercially available operating systems or combinations of operating systems. A user can enter commands and information into the computer 1802 through one or more wired/wireless input devices, e.g., a keyboard 1820 and a pointing device, such as a mouse 1821. Other input devices (not shown) may include a microphone, an IR remote control, a joystick, a game pad, a stylus pen, touch screen, or the like. These and other input devices are often connected to the processing unit 1803 through an input device interface 1822 that is coupled to the system bus 1805, but can be connected by other interfaces, such as a parallel port, an IEEE 1394 serial port, a game port, a USB port, an IR interface, etc.

FIG. 18 further illustrates a monitor 1823 or other type of display device can be connected to the system bus 1805 via an interface, such as a video adapter 1824. In addition to the monitor 1823, a computer typically includes other peripheral output devices (not shown), such as speakers, printers, etc., without limitation. The monitor 1823, may correspond to a display device and/or touch screen, which may be any size and/or shape and may be located at any portion of the computer 1802. Moreover, the monitor 1823 may be operationally connected to the computer 1802 (e.g. connected via one or more cables and/or wires, wireless connection, etc., to name a few). Various types of display devices may include, but are not limited to, liquid crystal displays ("LCD"), LED, OLED, QLED, monochrome displays, color graphics adapter ("CGA") displays, enhanced graphics adapter ("EGA") displays, video graphics array ("VGA") display, or any other type of display, or any variation or combination thereof. Still further, a touch screen may, in some embodiments, correspond to a display device including capacitive sensing panels capable of recognizing touch inputs thereon. For instance, the monitor 1823 may correspond to a projected capacitive touch ("PCT"), screen include one or more row traces and/or driving line traces, as well as one or more column traces and/or sensing lines. In some embodiments, the monitor 1823 may be an optional component for the computer 1802. For instance, the computer 1802 may not include the monitor 1823. Such devices, sometimes referred to as "headless" devices, may output audio, or may be in communication with a display device for outputting viewable content.

The monitor 1823, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of the monitor 1823, a capacitance between the object and the conductive material may be formed. The processing unit 1803 may be capable of determining a location of the touch screen associated with where the capacitance change is detected and may register a touch input as occurring at that location.

In some embodiments, the monitor 1823 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. One or more additional layers, or spaces between layers, may be included. Furthermore, any suitable number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on the monitor 1823 corresponding to where a conductive object contacted the monitor 1823.

A change in capacitance may be measured to determine a location on the touch screen where the object has contacted the surface. For example, if an individual touches a point on the monitor 1823, then a corresponding driving line and sensing line that intersect at that point may be identified. A location of the point may have one or more pixels associated with that location, and therefore one or more actions may be registered for an item or items that are displayed at that location. The processing unit 1803 of the computer 1802 may be configured to determine which pixels are associated with a particular location point, and which item or items are also displayed at that pixel location. Furthermore, the computer 1802 may be configured to cause one or more additional actions to occur to the item or items being displayed on the monitor 1823 based on a temporal duration the touch input, and or if one or more additional touch inputs are detected. For example, an object (e.g. a user's hand, a stylus, etc., to name a few) that is contacted on the monitor 1823 at a first location may be determined, at a later point in time, to contact the monitor 1823 at a second location. In the illustrative example, the object may have initially contacted the monitor 1823 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen monitor 1823 having 100 driving lines and 100 sensing lines may have 100 intersection points, and therefore 100 individual capacitors, while a touch screen monitor 1823 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by the computer 1802, and therefore the fewer driving lines and/or sensing lines used, the smaller the amount of power that is needed to operate the touch screen display.

In some embodiments, the monitor 1823 may correspond to a high-definition ("HD") display. For example, the monitor 1823 may display images and/or videos of 720p, 1080p, 1080i, or any other image resolution. In these exemplary scenarios, the monitor 1823 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, the aforementioned display ratios and pixel numbers are merely exemplary, and any suitable display resolution or pixel number may be employed for the monitor 1823, such as non-HD displays, 4K displays, and/or ultra displays.

The computer 1802 may operate in a networked environment using logical connections via wired and/or wireless communications to one or more remote computers, such as a remote computer(s) 1825. The remote computer(s) 1825 may be a workstation, a server computer, a router, a personal computer, portable computer, microprocessor-based entertainment appliance, a peer device or other common network node, to name a few. The remote computer(s) 1825 may include many or all of the elements described relative to the computer 1802, although, for purposes of brevity, only a memory storage device 1826 is illustrated.

The logical connections depicted include wired/wireless connectivity to a local area network (LAN) 1827 and/or larger networks, e.g., a wide area network (WAN) 1828. Such LAN and WAN networking environments are commonplace in offices, and companies, and facilitate enterprise-wide computer networks, such as intranets, all of which may connect to a global communication network, e.g., the Internet. For the purposes of the present invention, any and all handheld wireless devices such as Apple Inc.'s iPhone, iPad, any device running Google's Android operating system, or similar devices made by BlackBerry and others are also considered computers. When used in a LAN networking environment, the computer 1802 is connected to the local network 1827 through a wired and/or wireless communication network interface or adapter 1829. The adaptor 1829 may facilitate wired or wireless communication to the LAN 1827, which may also include a wireless access point disposed thereon for communicating with the wireless adaptor 1829.

The computer 1802 and/or remote computer(s) 1825 may, in embodiments, use any communications protocol, such as any of the previously mentioned exemplary communications protocols. In some embodiments, computer 1802 and/or remote computer(s) 1825 may include one or more antennas to facilitate wireless communications with a network using various wireless technologies (e.g., Wi-Fi, Bluetooth®, radiofrequency, etc.). In yet another embodiment, computer 1802 and/or remote computer(s) 1825 may include one or more universal serial bus ("USB") ports, one or more Ethernet or broadband ports, and/or any other type of hardwire access port so that computer 1802 and/or remote computer(s) 1825 are able to communicate with one another or with one or more communications networks.

The computer 1802 depicted in FIG. 18 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth® wireless technologies. Thus, the communication can be a predefined structure as with a conventional network or simply an ad hoc communication between at least two devices. When used in a WAN networking environment, the computer 1802 can include a modem 1830, or is connected to a communications server on the WAN 1828, or has other means for establishing communications over the WAN 1828, such as by way of the Internet. The modem 1830, which can be internal or external and a wired or wireless device, is connected to the system bus 1805 via the serial port interface 1822. In a networked environment, program modules depicted relative to the computer 1802, or portions thereof, can be stored in the remote memory/storage device 1826. It will be appreciated that the network connections shown are exemplary and other means of establishing a communications link between the computers can be used.

Referring now to FIG. 19, a networked system according to one or more embodiments can include a system server 1901 having application 1902 and storage 1903 intercommunicably connected to each other and to a variety of client devices via a plurality of wired and wireless connections. System Server 1901 is running at least one component of one or more embodiments of the present invention 1902 and server 1901 may include further operating, memory and storage features as characterized for a computing system in FIG. 18. System Server 1901 may be similar to the computer 1802, described above in connection with FIG. 18, the description of which applying herein. Storage 1903 may be similar to system memory 1804, internal storage 1808A, and/or external storage 1808B described above in connection with FIG. 18, the descriptions of which applying herein. Connection to network 1910 (which, for example, without limitation, can include the Internet, in full or in part) can be had via any combination of wired or wireless connections 1916.

System server 1901, user device 1909, and/or devices 1909, 1907 and 1904 (devices 1907 and 1904 being grouped as a first group of users 1920 using application 1905) may communicate (e.g. transfer data, receive data, etc.) over the network 1910, such as the Internet. For example, the network 1910 (which may be one or more networks) may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between System server 1901, user device 1909, and/or devices 1909, 1907 and 1904. In some embodiments, System server 1901, user device 1909, and/or devices 1909, 1907 and 1904 may communicate with one another via a web browser using HTTP. Various additional communication protocols may be used to facilitate communications between System server 1901, user device 1909, and/or devices 1909, 1907 and 1904, including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS136/TDMA, iDen, LTE or any other suitable cellular network protocol), infrared, BitTorrent, FTP, RTP, RTSP, SSH, and/or VOIP.

User device 1909 can be connected to network 1910 via any combination of wired or wireless connections 1915, which in turn connects to the system server 1901 via connection 1916. User device 1909 may be similar to the computer 1802, described above in connection with FIG. 18, the description of which applying herein. A network 1910 can further include a wired Internet network 1915 and/or a wireless network 1914 through which transmissions are distributed by wireless transmitters 1908, as well as other forms of computing and transmission networks, all without limitation. A wireless device 1907, according to some embodiments, is preferably a cellular phone, tablet, or other mobile device capable of connecting to a network via any combination of wired, wireless, infrared, auditory or similar means. In other embodiments a PDA, a computer, a laptop 1904 or any other device capable of communicating with the server 1901 is possible. An application 1905 stored on the device 1907 and/or device 1904, which application can include a web browser application and/or a proprietary application, or a combination of such applications working integrated fashion, the application including one or more configurations of machine instructions for controlling a computer processor. In some embodiments, software to identify the physical location of the device 1907 or device 1904 can be stored on the devices, and location data as well as other data can be stored in storage media 1913 resident on such devices or stored in distributed storage locations on the network. Storage media 1913 may be similar to system memory 1804, internal storage 1808A, and/or external storage 1808B described above in connection with FIG. 18, the descriptions of which applying herein. Furthermore, the devices 1909, 1907 and 1904 can receive data that are used to enable the user to respond to questions, and to capture the user's answers as well as the time in which the user responded. Additional applications are able to be included on the server 1901 and on the devices 1909, 1907 and/or 1904, as necessary, for smooth operation of the process and method, according to one or more embodiments. Although some of the applications are described separately above, in some embodiments the applications are included in one large application, or are accessed via any combination of applications on the device.

Still referring to FIG. 19, wireless transceiver 1908 may be WiFi, WiMax, cellular, or other wireless medium (or any other communication protocols mentioned above), and may be connected to network 1910 via any combination of wired or wireless connections (e.g. any communication protocols mentioned above). User devices 1907 and 1904 can be connected to network 1910 via any combination of wired or wireless connections 1914 and to wireless transceiver 1908 running either a standard web browser or a customized application by which they access application 1902 on server 1901 via any combination of wired or wireless transmissions (as mentioned above, devices 1904 and 1907 may communicate via any of the communications protocol mentioned above). Devices 1904 and 1907 may be similar to the computer 1802, described above in connection with FIG. 18, the description of which applying herein.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b/g) data rate, for example, or with other wireless standards that allow transmission using multiple bands and/or multiple antennas (dual band/MIMO etc as used by 802.11n, 802.11ax and so on), so the networks can provide real-world performance similar to (or exceeding) the basic 10/100/1000BaseT wired Ethernet networks used in many offices. A further embodiment can even allow for transmission via a wireless method described in RFC 1149 (See http://tools.ietf.org/pdf/rfc1149.pdf, incorporated herein by reference).

Referring now to FIG. 20, depicted is an illustrative a presentation of a screenshot of a graphical user interface on a portable client computing device 2001, displaying questions about a past event element that the user may respond to. In one or more embodiments of the present invention, the user is informed that the questions relate to a past event element, in this case by a highlighted graphical object 2002. The user may then indicate their past predictions by indicating any of the options presented onscreen within region 2003, at which point the device shall transmit the user's response back to the system. Region 2004 depicts an illustrative example of a first affinity-related advertisement that was generated by the function depicted in FIG. 16 and sent to a user's portable computing device 2001. Computing device 2001 may be similar to the computer 1802 described above in connection with FIG. 18, the description of which applying herein. In embodiments, computing device 2001 may include a display screen, which, may be similar to the monitor 1823 described above in connection with FIG. 18, the description of which applying herein.

Figure 21:
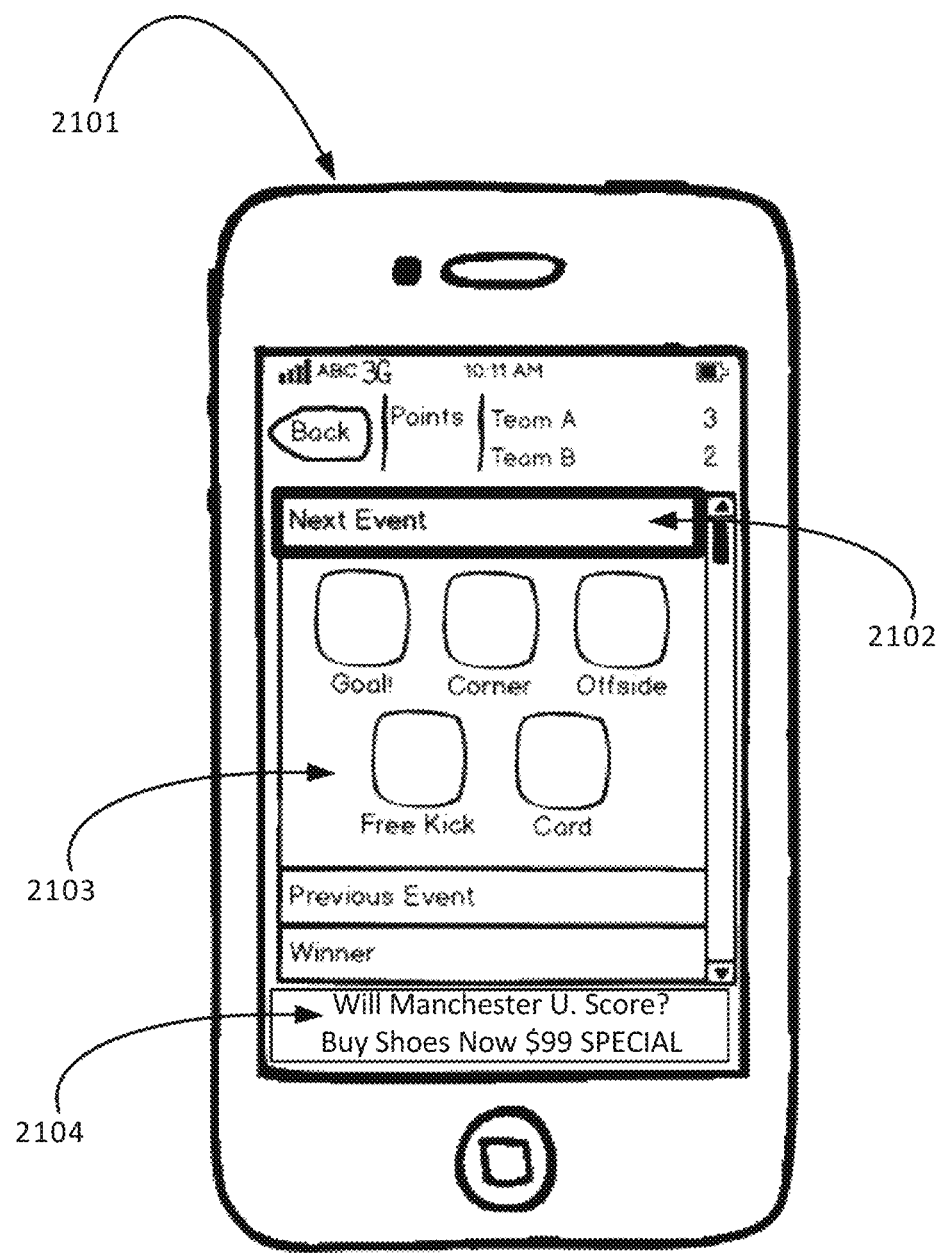
FIG. 21 depicts a further presentation of a screen of a graphical user interface on a portable client computing device according to one or more embodiments of the invention.

Referring now to FIG. 21, depicted is an illustrative a presentation of a screenshot of a graphical user interface on a portable client computing device 2101, displaying questions about a future possible event element so that the user may choose to predict what they believe will happen in the future. In one or more embodiments of the present invention, the user is informed that the questions relate to a past event element, in this case by a highlighted graphical object 2002. The user may then indicate their past predictions by indicating any of the options presented onscreen within region 2003, at which point the device shall transmit the user's response back to the system. Region 2104 depicts an illustrative example of a second affinity-related advertisement that was generated by the function depicted in FIG. 16 and sent to a user's portable computing device 2001. Portable client computing device 2201 may be similar to the computer 1802 described above in connection with FIG. 18, the description of which applying herein. In embodiments, the portable client computing device 2101 may include a display screen, which, may be similar to the monitor 1823 described above in connection with FIG. 18, the description of which applying herein.

Example 12: Method of Generating an Accurate News Report

Figure 22:
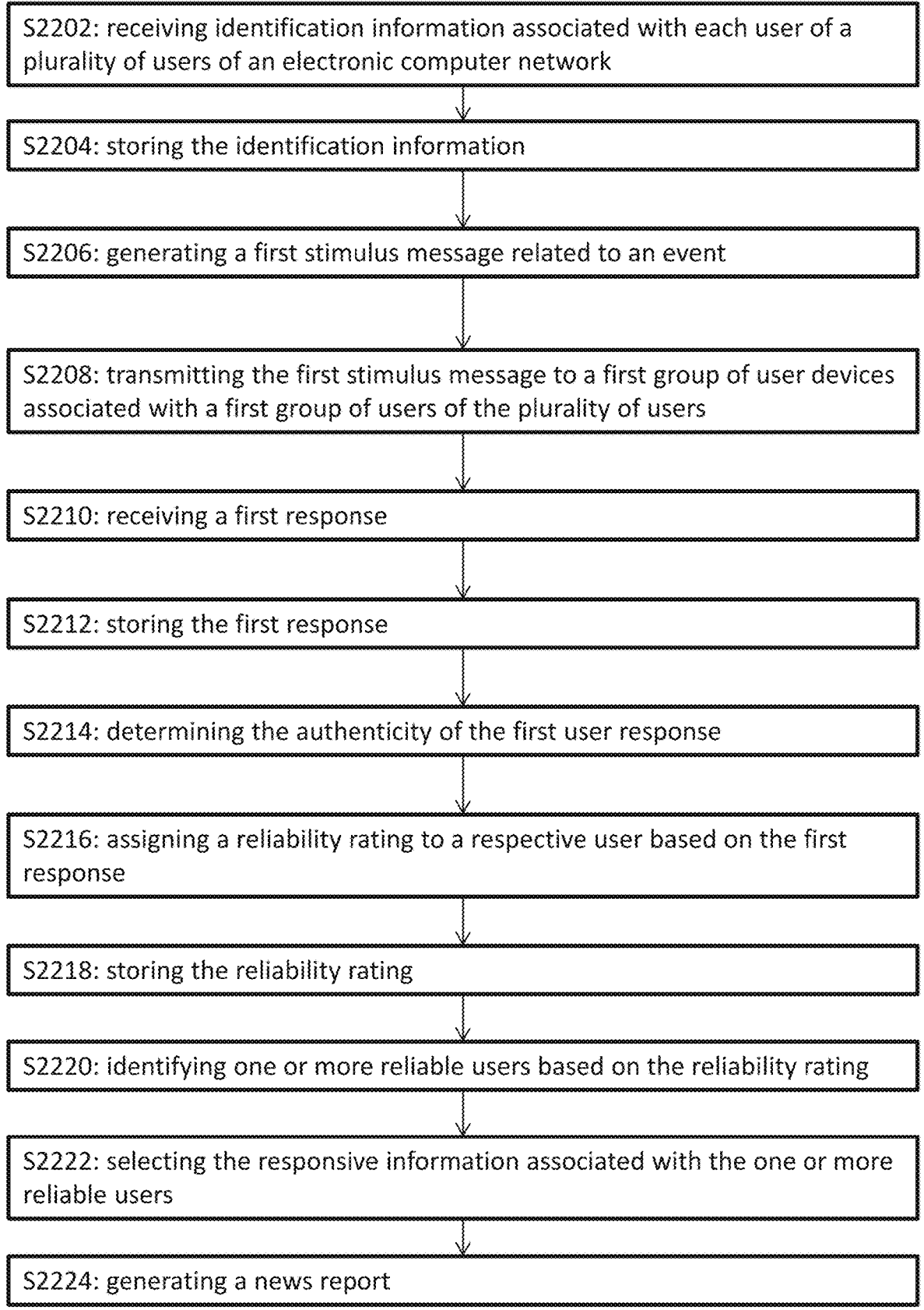
FIG. 22 is a flow chart of a process for generating an accurate report in accordance with an exemplary embodiment of the present invention.

Referring now to FIG. 22, there are illustrated flow charts of a computer-implemented process for generating an accurate news report based on information provided by one or more users of a plurality of users of an electronic computer network (e.g., network 1910 in FIG. 19) in accordance with an exemplary embodiment of the present invention.

The process of FIG. 22 may begin at step S2202. Referring to FIG. 22, at step S2202, identification information associated with each user of the plurality of users (e.g. users associated with the plurality of devices 3006) of the electronic computer network is received by a computing device (e.g., computer 1802 in FIG. 18, server 1901 in FIG. 19, computing device 2702 in FIGS. 27-42, and/or one or more components thereof, to name a few). In embodiments, the identification information may include one or more of the following: a user account associated with a user; an e-mail address associated with a user; a name associated with a user; biometric data associated with a user; gender information of the user associated with the user device; age of the user associated with the user device; personal data of a user associated with the user device, which is either volunteered by the user or received via access that is consented to by the user; past and/or present location information associated with the user device; identification information related to a user device associated with a user of the plurality of users (e.g. metadata, device type, etc., to name a few), electronic identification (e.g. electronic identification card, electronic signature, etc., to name a few), and/or biometric data of the user (e.g. audio sampling(s) of the user's voice, an image of the user, a video of the user, and/or a finger print of the user, to name a few), to name a few.

The computing device 2702 (e.g., a computer system) may determine a first group of users associated with a first group of user devices (e.g. first group of user devices 2708). For example, if a building at a specific 1234 5th Street is on fire, the computing device, once identification information is received, may generate a list of users that are within a predetermined radius of 1234 5th Street. This list of users may, in embodiments, be grouped as a first group of users (e.g. first group of user devices 2708 of FIG. 27). The predetermined radius, in embodiments, may be relative to the type of event that is occurring. In embodiments, a building that is on fire may be visible by users within a half a mile radius of the fire. Thus, continuing the example, the computing device 2702 may determine that the first group of users is every user that is within a half a mile radius of 1234 5th Street. In embodiments, the predetermined radius may be much larger for events that are visible from larger distances. For example, a volcanic eruption may be visible within a 50-mile radius. In embodiments, the predetermined radius may be much smaller for events that are only visible from smaller distances. For example, a delay in a train schedule may only be visible from people within a block of a train station where the train delay is occurring. In embodiments, there may be multiple predetermined radii (or other geofencing/regionalizing approaches e.g. polygonal, vector or bitmaps, to name a few). Continuing the example of a delay in a train schedule, there may be multiple predetermined radii (or regions), each predetermined radius (or region) of the multiple predetermined radii (or regions) may be located a stop on the train line. In embodiments, each predetermined radius (or region) of the multiple predetermined radii (or region) may be used to create different groups of user devices. For example, users within a block of Train Station A may be a first group of user devices. In embodiments, users within a block of Train Station B may be a second group of user devices. Additionally, in embodiments, users within a block of Train Station N may be an N group of user devices. In embodiments, users may be grouped by one or more of the following factors: previous user responses, previous activity of the user; and any of the above listed identification information, to name a few.

At step S2204, the identification information is stored in one or more databases by the computing device. In embodiments, the one or more databases may be: internal storage 1808A, external storage 1808B, memory/storage 1815, system memory 1804, and/or storage 1903, to name a few. The identification information may be stored in accordance with the received identification information. For example, the identification indication may indicate an age of the users. In this example, the computing device 2702 may store the identification information by age range (e.g. 18-25 ages grouped together, 26-40 ages grouped together, etc.). As another example, the identification information may be stored based on whether a user is part of a specific group of users. For example, identification information of the first group of users associated with the first group of user devices 2708 may be stored together.

Figure 27:
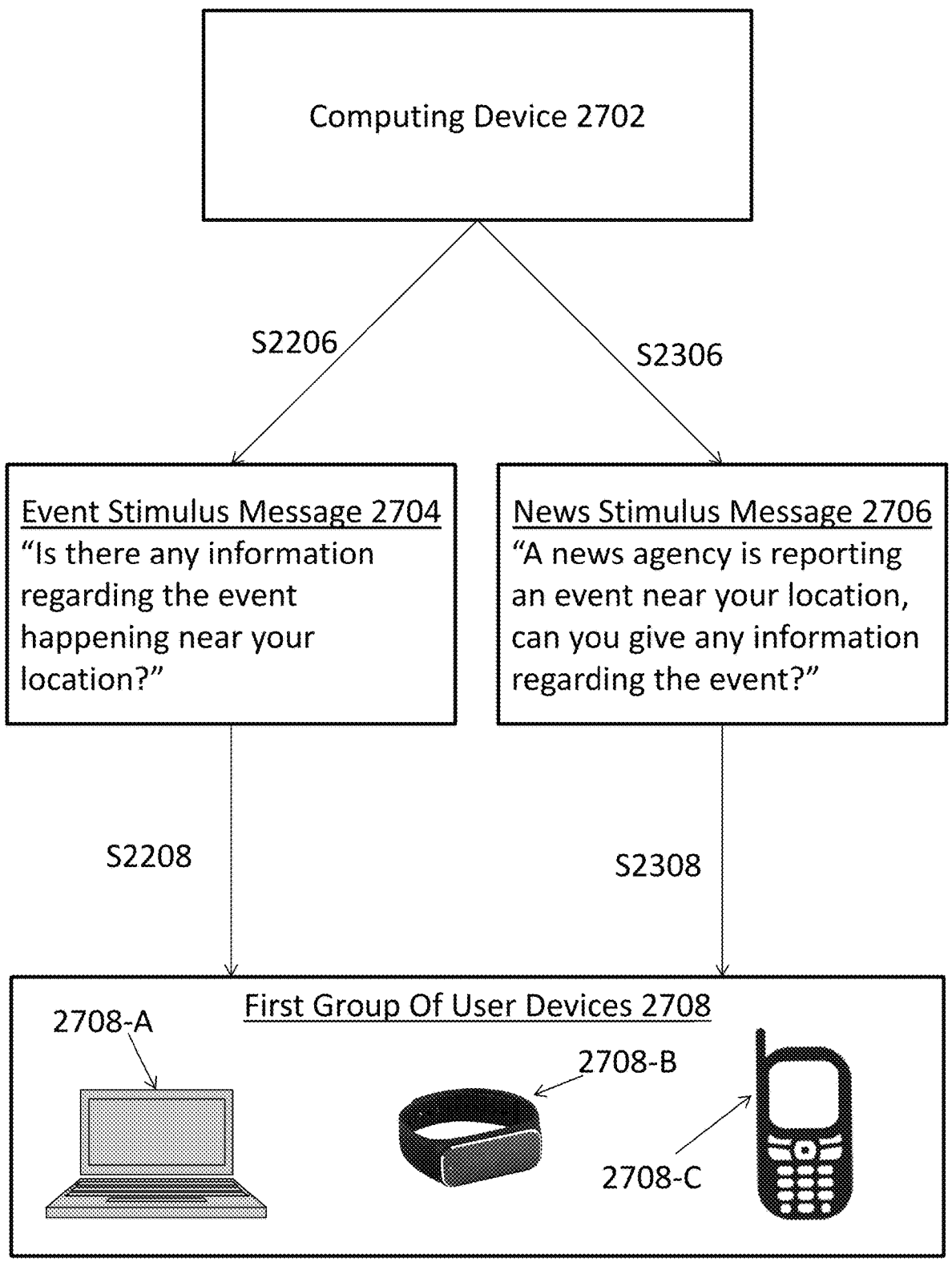
FIG. 27 is an exemplary block diagram illustrating a computing device generating and transmitting an event stimulus message and a new stimulus message to a first group of users in accordance with exemplary embodiments of the present invention.

At step S2206, a first stimulus message related to an event is generated by the computing device. Referring to FIG. 27, in embodiments, computing device 2702 may generate event stimulus message 2704. Event stimulus message 2704, may, for example, include a message stating "Is there any information regarding the event happening near you?" In embodiments, the event stimulus message 2704 may include executable machine readable instructions that allow for the computing device 2702 to determine when one or more user devices of the first group of user devices 2708 received, opened, and/or began to respond to the event stimulus message 2704. For example, the event stimulus message 2704 may include Message Disposition Notification(s) (MDN). The event stimulus message 2704 may be generated in response to determining that an event is occurring. For example, as stated above, if there is a report of a fire occurring at 1234 5th Street, the computing device 2702 may generate event stimulus message 2704 to determine the validity of the report of the fire occurring. The event stimulus message 2704 may be specific to the event happening. For example, event stimulus message 2704 may include text that states, "we have received a report that a fire is happening at 1234 5th street, can you tell us any information regarding this report?" Additionally, in embodiments, event stimulus message 2704 may provide a link to the report and/or an excerpt of the report. Furthermore, in embodiments, the event stimulus message 2704 may also include user specific information. For example, the event stimulus message 2704, may state "Bob, we received a report that a fire is happening near you at 1234 5th street, can you see it? If so, are firemen already present at the scene?" In embodiments, the event stimulus message 2704 may include a question regarding information that the computing device 2702 has already confirmed. For example, the computing device 2702 may have already confirmed that firemen are at the scene. In this example, the event stimulus message 2704 may state "Bob, we received a report that a fire is happening near you at 1234 5th street, can you see it? If so, are firemen already present at the scene? Is there any further details you can tell us?" The first question, "are fireman already present at the scene" may be asked to confirm the reliability of the user. The second question, may be to confirm the reliability of the reporting of the fire. In embodiments, the computing device 2702 may only review answers from users that provide the correct answer to the question, "are fireman already present at the scene."

In embodiments, the computing device 2702 may determine and/or store event start information. Event start information, in embodiments, may refer to the time at which the event (the event of the event stimulus message 2704) was first reported. In embodiments, event start information may refer to the time at which the event (the event of the event stimulus message 2704) began. The time at which an event began may only be based on the reporting of the event, which may need to be authenticated. This authentication process may be similar to the process described in connection with FIG. 22 and/or the process described in connection with FIG. 23, the descriptions of which applying herein.

In embodiments, computing device 2702 may be similar to the computer 1802 described above in connection with FIG. 18, the description of which, including all of the described components, applying herein.

Referring back to FIG. 22, the first stimulus message may include machine readable instructions to present an inquiry message on the one or more user devices of the first group of user devices. In embodiments, the inquiry message may be related to a past event element of the event. For example, a past event element may be whether firemen have responded to a fire. The event, in this example, would be the fire. The event element, in this example, is the presence of the firemen. In embodiments, the inquiry message may be related to a future event element. For example, a future event element may be whether a fire is likely to spread to other buildings. The event, in this example, would be the fire. The event element, in this example, is whether the fire will spread. In embodiments the inquiry message may be related to a past event element of the event that was modified or did not take place. For example, if the computing device has determined that initial event information included incorrect information regarding the presence of firemen, the computing device 2702 may generate a first stimulus message that includes questions regarding the incorrect information. If the user responds correctly, then the user may be determined as a reliable source. If the user responds incorrectly, then the user may be determined as an unreliable source.

At step S2208, the first stimulus message is transmitted by the computing device to a first group of user devices (e.g., a device 1904, 1907 in FIG. 19, a portable client computing device 2001 in FIGS. 20 and 21, first group of devices 2708 in FIG. 27) associated with a first group of users of the plurality of users. Referring back to FIG. 27, computing device 2702, may transmit the event stimulus message 2704 to the first group of user devices 2708. In embodiments, the event stimulus message 2704 may be transmitted over network 1910. In embodiments, the first group of user devices 2708 may include one or more of: laptop 2708-A, wearable device 2708-B, and/or cell phone 2708-C. First group of user devices 2708, in embodiments, may be associated with a first group of users of the plurality of users (e.g. plurality of users 3006 described in connection with FIG. 30). Laptop 2708-A, wearable device 2708-B, and/or cell phone 2708-C may be similar to one or more of the following, the descriptions applying herein: device 1904, 1907 described above in connection with FIG. 19, and/or portable client computing device 2001 described above in connection with FIGS. 20 and 21.

At step S2210, a first response is received by the computing device from one or more user devices of the first group of user devices. In embodiments, the first response (e.g. first response 2802) may include one or more of the following: (i) user information specific to the respective user associated with the respective user device that transmits the first response (e.g. user information 2802A); (ii) responsive information related to the event (e.g. event information 2802B); (iii) location information associated with a location of the respective user device associated with the respective user (e.g. location information 2802C); (iv) a timestamp (e.g. timestamp 2802D) (v) proximity information; (vi) audio data associated with the event and/or observations of the user; (vii) image data associated with the event and/or observations of a user; and/or (viii) video data associated with the event and/or observations of a user, to name a few.

In embodiments, user information 2802A may include information that may enable the computing device 2702 to identify the user device and/or user associated with the first response 2802. In embodiments, user information 2802A may include one or more of the following: a user account associated with a user; an e-mail address associated with a user; a name associated with a user; biometric data associated with a user; gender information of the user associated with the user device; age of the user associated with the user device; personal data of a user associated with the user device, which is either volunteered by the user or received via access that is consented to by the user; location information associated with the user device; identification information related to a user device associated with a user of the plurality of users (e.g. metadata, device type, etc., to name a few), electronic identification (e.g. electronic identification card, electronic signature, etc., to name a few), to name a few. In embodiments, the user information 2802A may include connection information. Connection information may refer to the reliability and/or speed of the wireless and/or wired connection between the user device associated with the first response 2802 (e.g. laptop 2708-A) and the computing device 2702. In embodiments, the connection information may be used to provide context to the timestamp 2802D and/or any time lag computations that may be used to determine the reliability of the first response 2802. For example, if the connection between the computing device 2702 and the laptop 2708-A is a slow connection, the below described predetermined time lag (described below in connection with timestamp 2802D) may be higher (e.g. an expected time lag) and/or the computing device 2702 may not use computed time lag to determine reliability. Additionally, for example, if the connection between the computing device 2702 and the laptop 2708-A is a fast connection, the expected time lag may be low and the computing device 2702 may rely more heavily on the timestamp 2802D to determine the reliability of the first response 2802. In embodiments, the computing device 2702 may compare the identification information received in step S2202 with the user information 2802A received with the first response 2802 to determine and/or verify the user and/or user device associated with the first response 2802. In embodiments, user information 2802A may be automatically included with the first response 2802, without requiring any additional input from a user associated with the responding user device (e.g. laptop 2708-A). In embodiments, user information 2802A may be inputted by a user associated with responding user device, which may be used for verification and/or security purposes. For example, the first stimulus message (e.g. event stimulus message 2704) may include a security question prompt, which may be designed to obtain specific user information 2802A, in order to verify the user responding. The prompt may appear when a user opens and/or accesses the first stimulus message. In embodiments, the prompt may appear when a user opens and/or accesses a mobile application, website, or user interface associated with the computing device 2702.

In embodiments, event information 2802B may include information responsive to the stimulus message (e.g. event stimulus message 2704). For example, event stimulus message 2704 may state, as previously noted, "Is there any information regarding the event happening near your location?" The first response 2802 from the laptop 2708-A, may include event information 2802B, which may responsive to the "any information" question. Event information 2802B may include information that is received via message (e.g. "Yes, the police are arriving at the scene right now") and/or information that is received via answers to a prompt (e.g. a prompt that asks "Are the police arriving at the scene"—where the prompt has a few preselected answers—"(a) Yes; (b) No; (c) I don't know; (d) Maybe, I only hear sirens" and the user selects one or more of the options presented).

Figure 28:
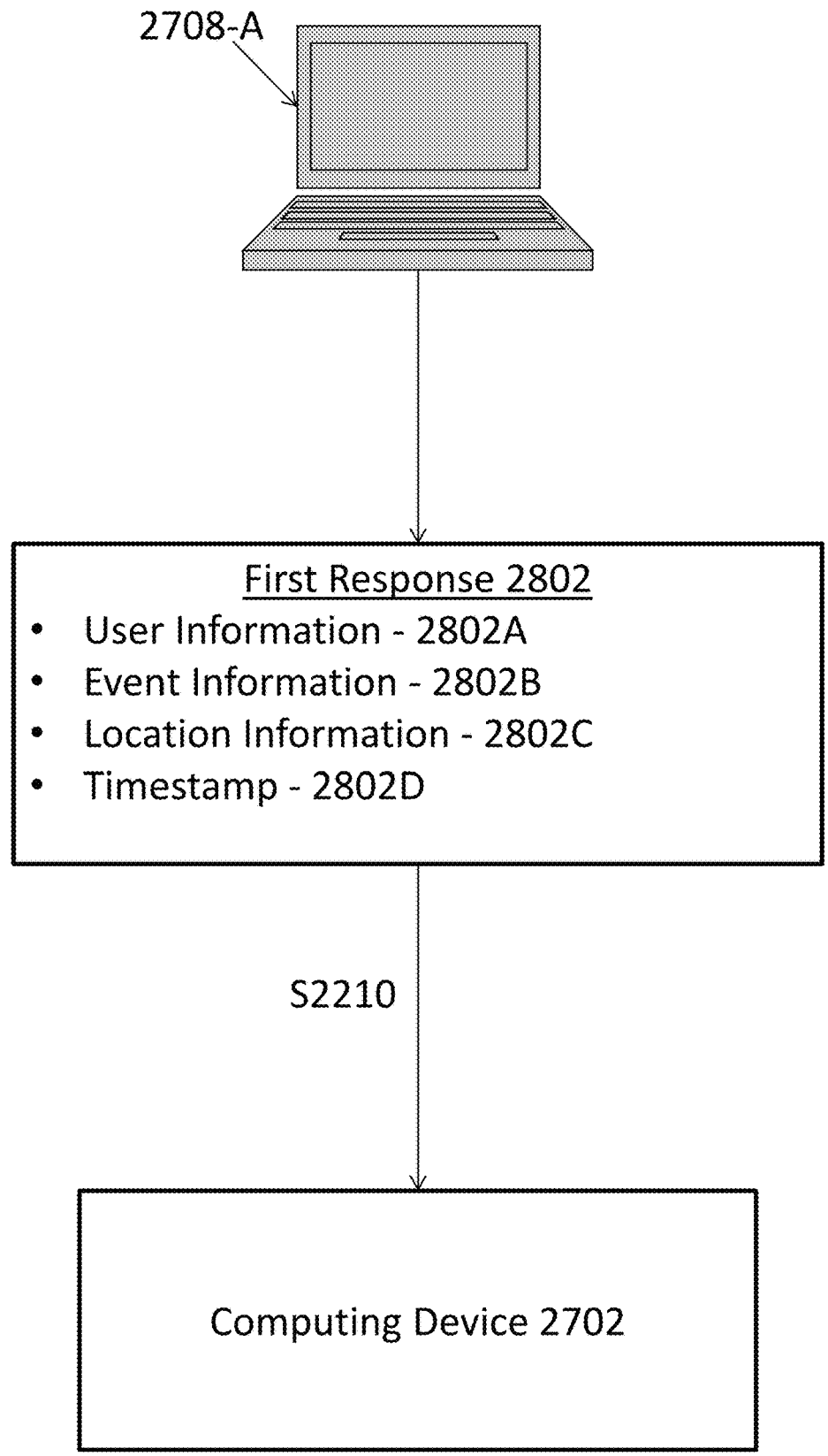
FIG. 28 is an exemplary block diagram illustrating a computing device receiving a first response from a device in accordance with exemplary embodiments of the present invention.
Figure 29:
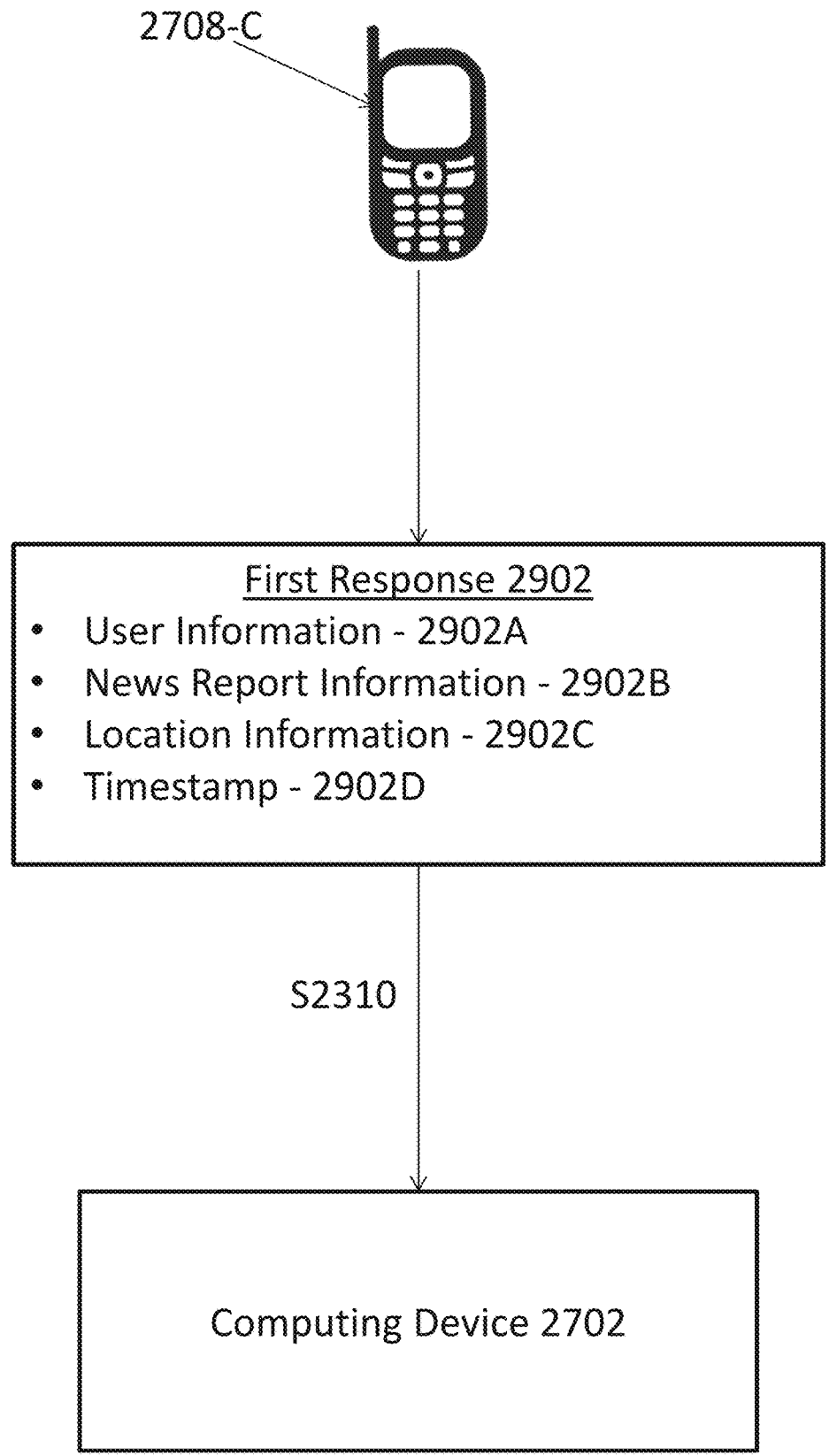
FIG. 29 is an exemplary block diagram illustrating a computing device receiving a first response from a device in accordance with exemplary embodiments of the present invention.

In embodiments, location information 2802C, may include one or more of the types of the following types of data: longitude data (e.g., the longitude of a geographical coordinate of the one or more of the first group of user devices 2708 (e.g. laptop 2708-A—as shown in FIG. 28)); latitude data (e.g., the latitude of a geographical coordinate of the one or more of the first group of user devices 2708 (e.g. laptop 2708-A, wearable device 2708-B, cellphone 2708-C—as shown in FIG. 27)); altitude data (e.g., the altitude of the one or more of the first group of user devices 2708 (e.g. laptop 2708-A, wearable device 2708-B, cellphone 2708-C—as shown in FIG. 27), which may be measured in meters, feet, and miles, to name a few); speed data (e.g., the instantaneous speed of the one or more of the first group of user devices 2708 (e.g. laptop 2708-A, wearable device 2708-B, cellphone 2708-C—as shown in FIG. 27), which may be measured in meters per second, feet per second, kilometers per hour, and miles per hour, to name a few); course data (e.g., the direction in which the one or more of the first group of user devices 2708 (e.g. laptop 2708-A, wearable device 2708-B, cellphone 2708-C—as shown in FIG. 27) are traveling, which may be measured in degrees and may be relative to due north and which may have a value of −1 when the value is not determined by the sensor); bearing data (e.g., a user's relative position or movement in degrees); and/or timestamp data (e.g., the time and/or date at which the first response is sent by one or more of the first group of user devices 2708 (e.g. laptop 2708-A, wearable device 2708-B, cellphone 2708-C—as shown in FIG. 27)) to name a few. Location information 2802C may be provided automatically, with the consent of one or more users associated with the one or more of the first group of user devices 2708 (e.g. laptop 2708-A, wearable device 2708-B, cellphone 2708-C—as shown in FIG. 27). Additionally, location information 2802C may be provided to the one or more of the first group of user devices 2708 (e.g. laptop 2708-A, wearable device 2708-B, cellphone 2708-C—as shown in FIG. 27) via one or more sensors (e.g. a location sensor) of the one or more of the first group of user devices 2708 (e.g. laptop 2708-A, wearable device 2708-B, cellphone 2708-C—as shown in FIG. 27)).

In embodiments the first response may further include proximity information. Proximity information may include one or more of the following data types: distance data (e.g., the distance of a device in relation to a point, which may be for example a user's ear and/or another device which also may be providing data); accuracy data (e.g., a representation of the confidence of the proximity information); and timestamp data (e.g., the time at which data the proximity information is received), to name a few. In embodiments, the accuracy data may be on a scale from 0 to 1, where 1 is the highest amount of confidence and 0 is the lowest amount of confidence. The scale at which the accuracy data may be computed on may include: 0 to 1; 0 to 10; 0 to 100; 0 to 1,000, etc., to name a few. The proximity information may further include proximity data that indicates whether a first user device is within a certain distance of one or more user devices of the first group of user devices. For example, the proximity information may include whether laptop 2708-A is within a certain distance of wearable device 2708-B and/or cellphone 2708-C. In embodiments, the proximity data may be used to determine the authenticity of the first response received by one or more user devices. For example, if the first response received from the laptop 2708-A is inconsistent with responses received from the wearable device 2708-B and the cellphone 2708-C, the computing device 2702 may obtain and analyze the proximity information of the laptop 2708-A as compared to the wearable device 2708-B and the cellphone 2708-C. If the laptop 2708-A is within a certain distance of the wearable device 2708-B and the cellphone 2708-C, the computing device 2702 may determine that the user associated with the laptop 2708-A may be observing and/or experiencing the same event as one or more users associated with the wearable device 2708-B and the cellphone 2708-C, and, thus, the information received in the first response from the laptop 2708-A may be reliable. However, for example, if the laptop 2708-A is not within a certain distance of the wearable device 2708-B and the cellphone 2708-C, the computing device 2702 may determine that the user associated with the laptop 2708-A may not be observing and/or experiencing the same event as one or more users associated with the wearable device 2708-B and the cellphone 2708-C, and, thus, the information received in the first response from the laptop 2708-A may be unreliable.

In embodiments, as mentioned above, the first response may include timestamp 2802D. The timestamp 2802D may refer to the time in which the first response was sent by the one or more user devices of the first group of user devices. The timestamp 2802D may be specific to each of the one or more user devices. For example, the first response may include multiple responses from multiple user devices of the first group of user devices. Continuing the example, if a first user associated with the laptop 2708-A sends a first response at 7:39 AM, the timestamp included with the first response from the laptop 2708-A may indicate the send time of 7:39 AM. Continuing the example, if a second user associated with wearable device 2708-B sends their respective first response (e.g. a second response) at 7:42 AM, the timestamp included with the first response from wearable device 2708-B may indicate the send time of 7:42 AM. In embodiments, the time stamp 2802D may refer to the time in which the first was response was received by the computing device 2702. Continuing the example, if the first user's first response is received by computing device 2702 at 7:40 AM, the timestamp included with the first response may indicate a received time of 7:40 AM. Additionally, continuing the example, if the second user's first response is received by the computing device 2702 at 7:43 AM, the first response may indicate a received time of 7:43 AM. In embodiments, the time stamp 2802D may refer to the time at which the first stimulus message (e.g. the event stimulus message 2704) was sent to the first group of user devices (e.g. first group of user devices 2708). Continuing the example, if the event stimulus message 2704 was sent to the first group of devices 2708 at 7:35 AM, the timestamp received with the first responses from the laptop 2708-A and the wearable device 2708-B may indicate the sent time of the event stimulus message of 7:35 AM. In embodiments, the time stamp 2802D may refer to when one or more user devices of the first group of user devices 2708 opened and/or accessed the event stimulus message 2704. Continuing the example, the first user may have opened and/or accessed the event stimulus message 2704 at 7:37 AM. Additionally, the second user may have opened and/or accessed the event stimulus message 2704 at 7:36 AM. Thus, the timestamp of the first user's first response may indicate an opened/accessed time of 7:37 AM and the timestamp of the second user's first response may indicate an opened/accessed time of 7:36 AM. In embodiments, the time stamp 2802D may refer to when one or more user devices of the first group of user devices 2708 began responding to the event stimulus message 2704. Continuing the example, if the first user began to respond to the event stimulus message 2704 at 7:38 AM, the time stamp associated with the first user's first response may indicate the beginning of the response time at 7:38 AM. Continuing the example, if the second user began to respond to the event stimulus message 2704 at 7:37 AM, the time stamp associated with the second user's first response may indicate the beginning of the response time at 7:37 AM. In embodiments, the timestamp 2802D of the first response 2802 may include one or more of the aforementioned "events"—(1) sent time of the first response; (2) received time of the first response; (3) received time of the first stimulus message; (4) opened time of the first stimulus message; (5) accessed time of the first stimulus message; and/or (6) began drafting first response time of the first stimulus message, to name a few.

The timestamp 2802D may be used to authenticate one or more first responses and/or filter one or more first responses (e.g. one or more responses similar to first response 2802) for accuracy. In embodiments, the timestamp 2802D may be compared with the aforementioned event start information. The computing device 2702 may compute a time lag between the occurrence of the event (e.g. represented by event start information) and the timestamp 2802D. The time lag, in embodiments, may be used to determine the authenticity of one or more first responses. In embodiments, the higher the time lag, the less authentic the response is (for the exemplary reasons that if a lot of time has passed since the event has occurred, the response, even if it is from a user that has knowledge of the event, may not be as accurate or may be biased based on other opinions from news sources and/or other people that are unreliable). For example, the computing device 2702 may determine that the time lag is too long for the first response to be accurate. In embodiments, the computing device 2702 may have a predetermined time lag limit (e.g. 30 minutes). If the time lag equals to and/or exceeds the predetermined time lag limit, the computing device 2702 may determine that the first response is unreliable and thus filter out the response (a more detailed discussion of reliability is located below in connection with steps S2214-S2222). In embodiments, the lower the time lag, the more authentic the response is (for the exemplary reasons that if very little time has passed since the event has occurred, the response may be more accurate or may have less of a chance to be biased based on other opinions from news sources and/or other people that are unreliable). For example, the computing device 2702 may determine that the time lag is low and/or within a predetermined time lag limit, and thus is a reliable response and/or has a higher probability of being a reliable response (a more detailed discussion of reliability is located below in connection with steps S2214-S2222). In embodiments, the predetermined time lag limit may be relative to the type of event. For example, the predetermined time lag limit may be shorter for a car accident event than it would be for a volcanic eruption. This is because, for example, a car accident may have a short window for a user to observe the event, whereas a volcanic eruption may be observed for hours. In embodiments, the predetermined time lag limit may vary from stimulus message to stimulus message, based on, for example, any number of factors, including the amount of information requested in the stimulus message, the type of stimulus message, and/or the urgency of information requested in the stimulus message, to name a few. For example, the event stimulus message 2704 may have a different predetermined time lag limit than a second event stimulus message. In embodiments, the predetermined time lag limit may also vary from user to user, based on, for example, connectivity information, identification information relative to the user (e.g. age, sex, name, etc.), device information relative to the user device, and/or the amount of information within the response that is sent by the user device to the computing device 2702.

In embodiments, audio data may be included with the first response 2802. The audio data, in embodiments, may be audio data representing an account of a user's observation of an event (e.g. the user recording their own voice talking about what is happening, or an audio recording of the event, to name a few). Audio data, in embodiments, may be used to authenticate an individual, via an audio file of the user's voice. For example, if the audio data represents a recording of the user's voice, the computing device 2702 may compare the audio data to previously stored recordings of the user's voice. If there is a match, the computing device 2702 may authenticate the user. If there is no match, the computing device 2702 may, in embodiments, determine that the user is not authenticated, may determine that the first response 2802 needs to be further authenticated, and/or determine that the first response 2802 needs to be scrutinized more heavily in the authentication process. In embodiments, first responses 2802 that include audio data may require a user to input information about the audio data. For example, the information about the audio data may include: whether the recording is of the user, what the recording captures, a summary of the recording, and/or consent for the computing device 2702 to use the audio recording in a generated news report. The audio data, in embodiments, may include one or more of the following types of audio data: RAW, AU/SND, WAVE, AIFF, MP3, OGG, and/or RAM, to name a few.

In embodiments, image data may be included with first response 2802. The image data, in embodiments, may be image data representing a picture of the event (e.g. a picture the user took representing the event). Image data, in embodiments, may be used to authenticate an individual, via an image file of the user's face. For example, if the image data represents a picture of the user at the event, the computing device 2702 may compare the image data to previously stored images of the user's face. If there is a match, the computing device 2702 may authenticate the user. If there is no match, the computing device 2702 may, in embodiments, determine that the user is not authenticated, may determine that the first response 2802 needs to be further authenticated, and/or determine that the first response 2802 needs to be scrutinized more heavily in the authentication process. In embodiments, first responses 2802 that include image data may require a user to input information about the image data. For example, the information about the image data may include: whether the image includes the user, what the image captures, a summary of the image, and/or consent for the computing device 2702 to use the image in a generated news report. The image data, in embodiments, may include one or more of the following types of image data: TIFF, JPEG, GIF, PNG, and/or RAW, to name a few.

In embodiments, video data may be included with first response 2802. The video data, in embodiments, may be video data representing a video of the event (e.g. a video the user captured representing the event, a video of the user at the event, a video). Video data, in embodiments, may be used to authenticate an individual, via a video file including audio of the user and/or an image of the user's face. For example, if the video data represents a video where the user's face is shown and/or the user talks, the computing device 2702 may compare the video data to previously stored images of the user's face which may be generated based on stored videos containing the user's face and/or may compare the video data to previously stored recordings of the user's voice which may be generated based on stored videos containing the user's voice. If there is a match, the computing device 2702 may authenticate the user. If there is no match, the computing device 2702 may, in embodiments, determine that the user is not authenticated, may determine that the first response 2802 needs to be further authenticated, and/or determine that the first response 2802 needs to be scrutinized more heavily in the authentication process. In embodiments, first responses 2802 that include video data may require a user to input information about the video data. For example, the information about the video data may include: whether the video includes the user, what the video captures, a summary of the video, and/or consent for the computing device 2702 to use the video in a generated news report. The video data, in embodiments, may include one or more of the following types of video data: FLV, AVI, Quicktime, MP4, MPG, WMV, MOV, 3GP, Advances Streaming Format, to name a few.

In embodiments, the computing device 2702 may use information within first response 2802, including event information 2802B and timestamp 2802D, to determine reliability and/or filter out unreliable responses. For example, the computing device 2702 may receive the event information 2802B of first response 2802 and timestamp 2802D of first response 2802. In this example, the timestamp 2802D may include the began drafting first response time of the first stimulus message and the sent time of the first response. In embodiments, the computing device 2702 may compare the began drafting first response time of the first stimulus message and the sent time of the first response to calculate a time lag. This time lag may be used to determine the reliability of the first response 2802. In embodiments, this time lag may be viewed in the context of the event information 2802B. If, for example, the time lag is high, and the amount of information is high, the computing device 2702 may determine that the first response 2802 is reliable and/or has a higher probability of being reliable because the high lag time may be due to the amount of information input by the user. If, for example, the time lag is high, and the amount of information is low, the computing device 2702 may determine that the first response 2802 is unreliable and/or has a higher probability of being unreliable because the amount of content sent by the user does not reflect the amount of time spent crafting the first response 2802. If, for example, the time lag is low, and the amount of information is high, the computing device 2702 may determine that the first response 2802 is unreliable and/or has a higher probability of being unreliable because a user may have not been able to send a response within the amount of time with the amount of information contained in the response.

At step S2212 the computing device (e.g. computing device 2702) stores the first response (e.g. first response 2802) in the one or more databases. In embodiments, the one or more databases, as mentioned above with respect to step S2204, may be: internal storage 1808A, external storage 1808B, memory/storage 1815, system memory 1804, and/or storage 1903, to name a few. The first response 2802 may be stored in accordance with the received identification information. For example, the identification indication may indicate an age of the users. In this example, the computing device 2702 may store the first response 2802 by age range (e.g. 18-25 ages grouped together, 26-40 ages grouped together, etc.). As another example, the first response 2802 may be stored based on whether a user is part of a specific group of users. For example, first responses from the first group of users associated with the first group of user devices 2708 may be stored together.

At step S2214, the computing device (e.g. computing device 2702) may determine authenticity of the first response (e.g. first response 2802). In embodiments, the computing device 2702 may determine the authenticity based on one or more of: the user information 2802A, the event information 2802B, the location information 2802C, the timestamp 2802D, proximity information, previously stored authenticity ratings, and/or previously stored responses (which may be related or unrelated to the event). In embodiments, the user information 2802A, the event information 2802B, the location information 2802C, the timestamp 2802D, proximity information, previously stored authenticity ratings, and/or previously stored responses (which may be related or unrelated to the event) may be used individually to determine the authenticity of the first response 2802. For example, if the user information 2802A received with first response 2802 indicates that the user responding to the first response 2802 is not the user associated with the user device (e.g. laptop 2708-A) the event stimulus message 2704 was transmitted to (e.g. in step S2208), the computing device 2702 may determine that the first response received is unauthentic and/or has a higher probability of being unauthentic. As another example, if the event information 2802B received with the first response 2802 contains incorrect information, the computing device 2702 may determine that the first response received is unauthentic and/or has a higher probability of being unauthentic (e.g. the event information 2802B may be a response to a query with an answer the computing device 2702 already knows). As another example, if the location information 2802C received with the first response 2802 indicates that the user was not in the area at the time of the event, the computing device 2702 may determine that the first response received is unauthentic and/or has a higher probability of being unauthentic. As yet another example, if the timestamp 2802D received with the first response 2802 indicates that the user waited too long before sending the first response 2802 (e.g. the time lag is above a predetermined time lag limit), the computing device 2702 may determine that the first response received is unauthentic and/or has a higher probability of being unauthentic. As yet another example, if proximity information received with the first response 2802 indicates that the first response received from the laptop 2708-A is inconsistent with responses received from the wearable device 2708-B and the cellphone 2708-C, the computing device 2702 may obtain and analyze the proximity information of the laptop 2708-A as compared to the wearable device 2708-B and the cellphone 2708-C. If the laptop 2708-A is outside a certain distance of the wearable device 2708-B and the cellphone 2708-C, the computing device 2702 may determine that the user associated with the laptop 2708-A may not be observing and/or experiencing the same event as one or more users associated with the wearable device 2708-B and the cellphone 2708-C, and, thus, the information received in the first response 2802 from the laptop 2708-A may be unauthentic and/or have a higher probability of being unauthentic. As yet another example, if the computing device 2702 has a previously stored authenticity rating attached to one or more users, a response received by the one or more users may be determined to be authentic or unauthentic based on the previous authenticity rating. Additionally, for example, the computing device 2702 may use previously stored messages to determine the authenticity of the first response 2802. The computing device 2702 may accomplish this by determining words and/or phrases typically used by the user associated with the user device transmitting the first response 2802. If the first response 2802 does not contain words or phrases typically used and/or uses words or phrases that are not used by the user associated with the user device transmitting the first response 2802, the computing device 2702 may determine that the first response received is unauthentic and/or has a higher probability of being unauthentic.

The above examples, if the facts are surrounding the information received with the first response 2802 are the opposite (e.g. if the event information 2802C contains correct information), the computing device 2702 may determine that the first response(s) received are authentic and/or have a higher probability of being authentic.

In embodiments, one or more of the user information 2802A, the event information 2802B, the location information 2802C, the timestamp 2802D, proximity information, previously stored authenticity ratings, and/or previously stored responses may be used in combination with one another to determine the authenticity of the first response 2802. For example, as mentioned above, time lag associated with the timestamp 2802D may be viewed in context with connectivity data included with the user information 2802A. Each piece of information received with the first response 2802 may be used in combination with one another to provide context to the information received. This context may increase the accuracy of the authenticity rating determined by the computing device 2702.

The determined authenticity of the first response 2802 may be determined on a scale. The scale, for example, may include authenticity ratings on the scale of: unauthentic, high probability of unauthentic, may be unauthentic or authentic, high probability of authentic, and authentic. As another example, the determined authenticity may have a numbers rating system, which may be, for example, on a 0-100 scale, where 0 represents unauthentic and 100 represents authentic.

At step S2216, the computing device (e.g. computing device 2702) assigns a reliability rating to the respective user associated with the user device (e.g. laptop 2708-A) that transmitted the first response 2802. The reliability rating, in embodiments, may be based on one or more of the following: the first response 2802, any information included within the first response 2802 (e.g. user information 2802A, the event information 2802B, the location information 2802C, the timestamp 2802D, and/or proximity information, to name a few), previously stored authenticity ratings, and/or previously stored responses (which may be related or unrelated to the event), and/or the authenticity determined above in step S2214, to name a few. For example, if the timestamp 2802D is either below a time lag limit (e.g. indicating that the response was automated and not from a user) or above a time lag limit, the computing device 2702 may determine that the user associated with the timestamp 2802D may have a reliability rating of unreliable. In embodiments, the examples provided for authenticity in connection with the description of S2214 may be applied similarly to reliability ratings, the descriptions of which and examples applying herein.

In embodiments the reliability rating may be assigned, for example, by performing one or more of the following steps: (i) assigning the reliability rating to be a reliable rating when the location information 2802C is consistent with a location of the event and/or the timestamp 2802D indicates acceptable delay (e.g. within a predetermined time lag limit); (ii) assigning the reliability rating to be an unreliable rating when the location information 2802C is inconsistent with the location of the event and/or the timestamp 2802D indicates an unacceptable delay (e.g. above a predetermined time lag limit); and/or (iii) assigning the reliability rating as unreliable when event information 2802B includes incorrect information (e.g. the information is incorrect, the information received confirmed the occurrence of a past event element that was modified and/or did not take place). In embodiments, instead of reliable and unreliable binary ratings, a graded reliability rating scheme may be used by the computing device. The determined reliability rating of the user associated with the first response 2802 may be determined on a scale. The scale, for example, may include reliability ratings on the scale of: unreliable, high probability of unreliable, may be unreliable or reliable, high probability of reliable, and reliable. As another example, the determined reliability may have a numbers rating system, which may be, for example, on a 0-100 scale, where 0 represents unreliable and 100 represents reliable.

At step S2218, the computing device (e.g. computing device 2702) stores in the one or more databases the reliability rating. In embodiments, the one or more databases, as mentioned above with respect to steps S2204 and S2212, may be: internal storage 1808A, external storage 1808B, memory/storage 1815, system memory 1804, and/or storage 1903, to name a few. The reliability rating may be stored in accordance with the received identification information. For example, the identification indication may indicate an age of the users. In this example, the computing device 2702 may store the reliability rating by age range (e.g. 18-25 ages grouped together, 26-40 ages grouped together, etc.). As another example, the reliability rating may be stored based on whether a user is part of a specific group of users. For example, reliability rating from the first group of users associated with the first group of user devices 2708 may be stored together. As yet another example, the reliability rating may be stored based on the reliability ratings. For example, reliable reliability ratings may be stored together while unreliable reliability ratings may be stored together.

At step S2220, the computing device (e.g. computing device 2702) may identify one or more reliable users based on the reliability rating. The one or more reliable users may be one or more users associated with the one or more user devices of the first group of user devices 2708 (e.g. a user associated with the laptop 2708-A, a user associated with the wearable device 2708-B, and/or a user associated with the cellphone 2708-C). In embodiments, the computing device 2702 may identify reliable users based on whether the reliable rating meets and/or exceeds a predetermined reliability rating threshold. The reliability rating threshold, in embodiments, may be related to the type of reliability rating the computing device 2702 assigns to the one or more users associated with the one or more user devices of the first group of user devices 2708. For example, if the reliability rating is a binary type of reliability rating (e.g. two ratings, either reliable or unreliable), the predetermined reliability rating threshold may be predetermined to be a reliable reliability rating. Thus, in this example, the computing device 2702 may identify every user with a reliable reliability rating as reliable. As another example, if the reliability rating is a scale type of reliability rating (e.g. unreliable, high probability of unreliable, may be unreliable or reliable, high probability of reliable, and reliable), the predetermined reliability rating may be predetermined to be high probability of reliable. Thus, in this example, the computing device 2702 may identify every user with either a high probability of reliable rating or a reliable reliability rating as reliable. As yet another example, if the reliability rating is a numbers type of reliability rating (e.g. on a scale of 0-100 where 0 is unreliable and 100 is reliable), the predetermined reliability rating may be predetermined to be a reliability rating of 75. Thus, in this example, the computing device 2702 may identify every user with a reliability rating of 75 or above as reliable.

In embodiments, the computing device 2702 may identify one or more reliable users by filtering out one or more unreliable users. Similar to the description above, in embodiments, the computing device 2702 may identify unreliable users based on whether the reliable rating is equal to or below a predetermined reliability rating threshold. The computing device 2702 may identify the unreliable users and exclude the responses received by user devices associated with the unreliable users. After discounting responses from user devices associated with the unreliable users, the computing device 2702 may analyze and/or store responses that were not excluded (e.g. responses from reliable users). In embodiments, the computing device 2702 may assign a reliability rating of reliable (or a rating that meets or is above the predetermined threshold) to each user associated with each user device that transmitted a response that was not excluded. The computing device 2702, in embodiments, may store the one or more unreliable user's reliability rating (in a manner similar to the storage described in steps S2204, S2212, and/or S2218). The computing device 2702, in embodiments, may store the one or more reliable user's reliability rating (in a manner similar to the storage described in steps S2204, S2212, and/or S2218).

In embodiments, the reliability rating of one or more users may affect the respective weight placed on responses by the computing device 2702. In embodiments, information provided form users who have a reliable reliability rating may have more weight than information provided form users who have an unreliable rating. In embodiments, if information from a reliable user conflicts with information from an unreliable user, the computing device 2702 may determine that the information from the reliable user is to be used instead of the information from the unreliable user. If, in embodiments, information from a reliable user does not conflict with information provided from an unreliable user, the computing device 2702 may determine that both pieces of information are to be selected by the computing device (e.g. in step S2222) and used in the news reported to be generated (e.g. in step S2224). In embodiments, the computing device 2702 may flag information used from unreliable sources in any news report that is generated that contains information from an unreliable user. In embodiments, the computing device 2702 may determine that a user has such a low reliability rating that any information that provided by such a user will not be selected and/or used in a generated news report. This low rating, in embodiments, may be any reliability rating below a predetermined reliability rating threshold (e.g. any reliability rating below 20 (on a scale of 0-100)). The predetermined reliability rating threshold may vary based on the type of news, type of details, and/or type of news story to be generated. For example, if the news is related to a death of person, the reliability rating threshold may be higher. Continuing the example, the reliability rating threshold may be higher with regards to specific details, for example, the name of the person who died. In embodiments, the computing device 2702 may generate a news story and the news story may be generated based on reliability rating thresholds. For example, if a user would like as much information as possible, a user may request the computing device 2702 to generate a news story with a low reliability threshold. As another example, if a user would like a news story with only completely reliable facts, a user may request the computing device 2702 to generate a news story with a high reliability threshold. The weighting of information with regards reliability ratings (and the entirety of the embodiments described herein) may be applicable and thus similar to the manner in which the computing device 2702 uses and/or weights information with regards to the processes described below in connection with FIGS. 23, 24, 25A, 25B, and 26, the descriptions applying therein.

At step S2222, the computing device (e.g. computing device 2702) may select the responsive information associated with the one or more reliable users. In embodiments, the responsive information may refer to one or more of: user information 2802A, the event information 2802B, the location information 2802C, the timestamp 2802D, and/or proximity information, to name a few. The responsive information selected, in embodiments, may be any information contained in the first response 2802 that is relevant to the event (e.g. a car accident). In embodiments, the responsive information may be information contained in the first response 2802 that is related to a specific event element (e.g. whether first responders have arrived at the scene). In embodiments, the responsive information may be extracted from the first response 2802. For example, if the first response 2802 contains responses to the event stimulus message 2704 that provided prompts with multiple choice response options, the computing device 2702 may extract the multiple choice option associated with a user that has been assigned a high reliability rating. As another example, if the first response 2802 contains responses to the event stimulus message 2704 that provided questions where users can manually input their observations, the computing device 2702 may extract quotes from the first response 2802 and/or analyze the text data of the first response 2802. The analysis of the text data of the first response, using one or more processor(s) of the computing device 2702, may result in the computing device 2702 determining the observation within the text of the first response 2802. The determining of the text within the first response 2802 may enable the computing device 2702 to generate a reliable observation based on the determined observation within the text of the first response 2802.

Figure 30:
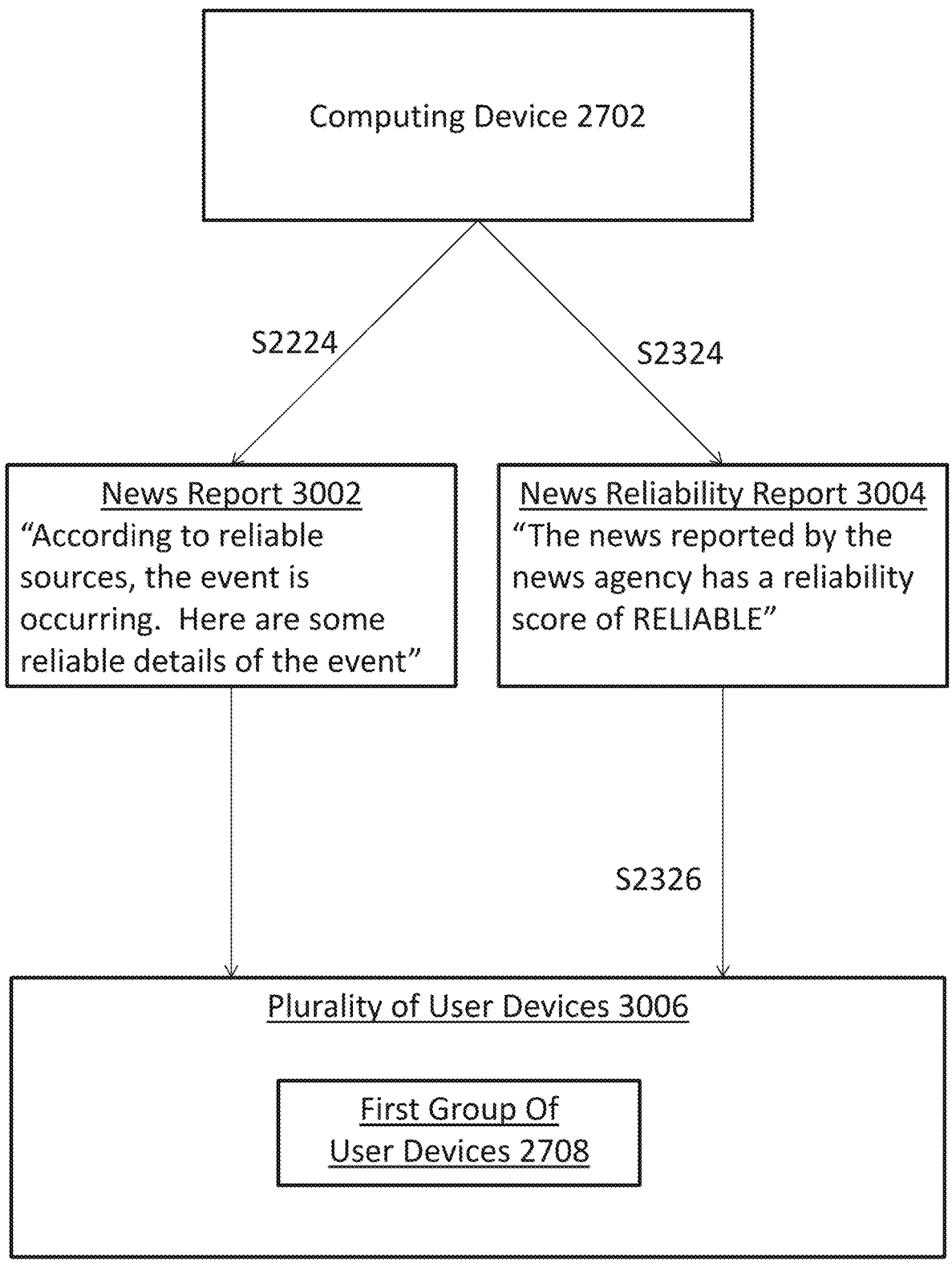
FIG. 30 is an exemplary block diagram illustrating a computing device generating and transmitting a report and a reliability report to a plurality of users in accordance with exemplary embodiments of the present invention.

At step S2224, the computing device (e.g. computing device 2702) may generate a news report (e.g. news report 3002 shown in connection with FIG. 30). based on the selected responsive information. Referring to FIG. 30, the news report 3002 may include a statement "According to reliable sources, the event is occurring. Here are some reliable details of the event." In embodiments, the news report 3002 may include the aforementioned reliable multiple choice option. In embodiments, the news report 3002 may include the aforementioned reliable quotes. In embodiments, the news report 3002 may include the aforementioned reliable observations, which may have been generated by the computing device 2702 based on the reliable information extracted from the reliable first responses. Moreover, the news report 3002 may include audio data, image data, and/or video data that was included in the first response 2802. In embodiments, the generated news report 3002 may include the sources of the reliable details, which may include one or more of above mentioned received identification information that is associated with the reliable details. In embodiments, the generated news report may also provide links to websites (which provide a third party news story of the event, which may include text, audio, and/or video) that align with the reliable details of the generated news report 3002. In those embodiments, the computing device 2702 may, using one or more processor(s) and/or communications circuitry, via network 1910, may third party analyze news reports associated with the event. The analysis of the third party news reports, may result in the computing device 2702 determining the what the news reports are writing, showing, and/or stating. If the third party news report contains videos or images, the analysis may include using digital image analysis, which may include one or more of the following: 2D object recognition, 3D object recognition, image segmentation, motion detection (e.g. single particle tracking), video tracking, optical flow, 3D Pose Estimation, and/or automatic number plate recognition, to name a few. If the third party news report contains text, the analysis may include using text recognition analysis (e.g. using Optical Character Recognition (OCR)). The determining the what the third party news reports are writing, showing, and/or stating may enable the computing device 2702 to compare the third party news reports to the reliable details of the generated news report 3002. If a third party news report is deemed to align with the reliable details of the generated news report 3002, the generated news report 3002 may state "A reliable news report is located at the following website" and include a link or links to the reliable third party news reports.

In embodiments, the generated news report 3002 may include a generated timeline of event components within the event. For example, if there is a car accident, the reliable details of the generated news report 3002 may indicate: the time of the accident, the time traffic started to build up, the time first responders arrived, the time first responders left the scene of the accident, the time the people involved in the car accident left the scene of the accident (e.g. in an ambulance or on their own accord), and/or the time the car accident was cleaned up (e.g. the cars involved were towed). The timeline, and the times associated with the timeline may include the reliability rating of each time. Moreover, in embodiments, the timeline may include the percentage of users that agree on a certain time. For example, if 82% of the reliable users stated that the car accident occurred at 6:32 PM, but 18% of the reliable users stated that the car accident occurred at 6:34 PM, the timeline generated may include both times and note the percentages of reliable users that agree on the time of the car accident. In embodiments, the computing device 2702 may weigh the information received by reliable users when generating the news report 3002. For example, if the news report 3002 includes a generated timeline, the computing device 2702 may include only the most reliable details, if there is a conflict. For example, if 82% of the reliable users stated that the car accident occurred at 6:32 PM, but 18% of the reliable users stated that the car accident occurred at 6:34 PM, the timeline generated may include a car accident time of 6:32 PM.

In embodiments, the news report 3002 may be transmitted to a plurality of users associated with a plurality of user devices 3006. The plurality of user devices 3006, in embodiments, may be each user device associated with and/or connected to the electronic computer network (e.g. network 1910), which may include the first group of user devices 2708.

In embodiments, the computing device 2702, may, after a first predetermined period of time, generate and transmit a second stimulus message related to the event. The second stimulus message may be transmitted to the first group of user devices 2708. In embodiments, the second stimulus message may be transmitted to the plurality of user devices 3006. In embodiments, the second stimulus message may only be provided to the identified one or more reliable users of the first group of users associated with the first group of user devices 2708. In embodiments, the second stimulus message may include information related to the event. For example, the second stimulus message may include "We have received an alert that the situation at the event has changed, can you provide further details regarding this change?" In embodiments, the second stimulus message may include executable machine readable instructions to present a second message to each user that receives the stimulus message, prompting a response from each user that receives the second stimulus message. In embodiments, the predetermined amount of time may be based on the type of event. In embodiments, the predetermined amount of time may not be predetermined, and the second message may be generated and transmitted as a result of a change in circumstance of the event (e.g. a new alert regarding the event).

In embodiments, after the computing device 2702 transmits the second stimulus message, the computing device 2702 may receive a second response from one or more user devices. In embodiments, the second response may be received via the electronic computer network (e.g. network 1910). The second response, in embodiments, may include one or more of the following: second response information related to the second stimulus message, user information 2802A, event information, 2802B, location information 2802C, and/or timestamp 2802D, to name a few. In embodiments, the second response may be similar to first response 2802 described above, the description of which applying herein.

In embodiments, the computing device 2702 may store, in the one or more databases, the second response. In embodiments, the one or more databases, as mentioned above with respect to steps S2204, S2212, and S2218, may be: internal storage 1808A, external storage 1808B, memory/storage 1815, system memory 1804, and/or storage 1903, to name a few. The second response rating may be stored in accordance with the received identification information. For example, the identification indication may indicate an age of the users. In this example, the computing device 2702 may store the second response by age range (e.g. 18-25 ages grouped together, 26-40 ages grouped together, etc.). As another example, the second response may be stored based on whether a user is part of a specific group of users. For example, second response from the first group of users associated with the first group of user devices 2708 may be stored together.

In embodiments, the computing device 2702 may determine the authenticity of the second response. In embodiments, the authenticity of the second response may be determined by performing one or more of the following steps: (i) the computing device 2702 determining whether the second response includes the second response information that corresponds to activity in the event (e.g. using second response information related to the second stimulus message, user information 2802A, event information, 2802B, location information 2802C, and/or timestamp 2802D, to name a few); and/or (ii) the computing device 2702 determining whether the second response includes second response information relating to event elements available to the respective user when the second message was displayed on the user device associated with the respective user (using, second response information related to the second stimulus message, user information 2802A, event information, 2802B, location information 2802C, and/or timestamp 2802D, to name a few). Determining the authenticity of the second response may be similar to determining the authenticity of the first response 2802 described above, the description of which applying herein.

In embodiments, the computing device 2702 may update the reliability rating for the users that transmitted the second response. The reliability rating may be updated by determining the reliability rating for each user, which may be similar to the above description of determining a reliability rating, the description of which applying herein. In embodiments, the reliability rating may be based on the authenticity of the second response. In embodiments, a reliable rating is assigned to a user if: the second response from the user device associated with the respective user includes the second response information that corresponds to the activity in the event; the second response from the user device associated with the respective user includes the second response information available to the respective user of the user device associated with the respective user when the second message was displayed by the user device; the user received a reliable rating for with regards to the first response; the user received a reliable rating with regards to the second response, the user received a reliable rating with regards to both the first and second response; and/or the user received a reliable rating in past responses, to name a few. In embodiments, an unreliable rating may be assigned to a user if: the second response form the user device associated with the respective user includes the second response information that does not correspond to the activity in the event; if the second response from the user device associated with the respective user includes second response information that was not available to the respective user when the second message was displayed by the user device; the user received an unreliable rating for with regards to the first response; the user received an unreliable rating with regards to the second response, the user received an unreliable rating with regards to both the first and second response; and/or the user received an unreliable rating in past responses, to name a few.

In embodiments, once the reliability rating is found for each user, the reliability rating for each user may be updated. The updated rating may include only the new rating. Additionally, the reliability rating may include the updated reliability rating and the first reliability rating. In embodiments, the reliability rating and the updated reliability rating may be transmitted to the user. The transmission of the reliability rating to the user it is associated with may include a message stating the reliability rating(s), a history of the reliability rating(s), and/or whether the information was used in a generated news report.

In embodiments, the computing device 2702 may repeat steps S2218-S2224, based on the information received with regards to the second stimulus message and/or the second user response. In embodiments, the information received and stored from the second user response may be used to update the timeline generated in connection with step S2224. The updated timeline may be generated in a similar manner as the original timeline, the description of which applying herein. The updated timeline may include the updated information received from the second responses, which may be weighted in a similar manner as the first responses were, the description of which applying herein.

In embodiments, the process may continue and repeat steps S2206-S2224, generating more stimulus messages and receiving more responses as the event develops and/or continues. This process may continue until the event ends, or, in some embodiments, until a predetermined amount of time after the event has ended.

The steps of the process described in connection with FIG. 22, in embodiments, may be rearranged or omitted.

Example 13: Method of Determining Accuracy of a News Report

Figure 23:
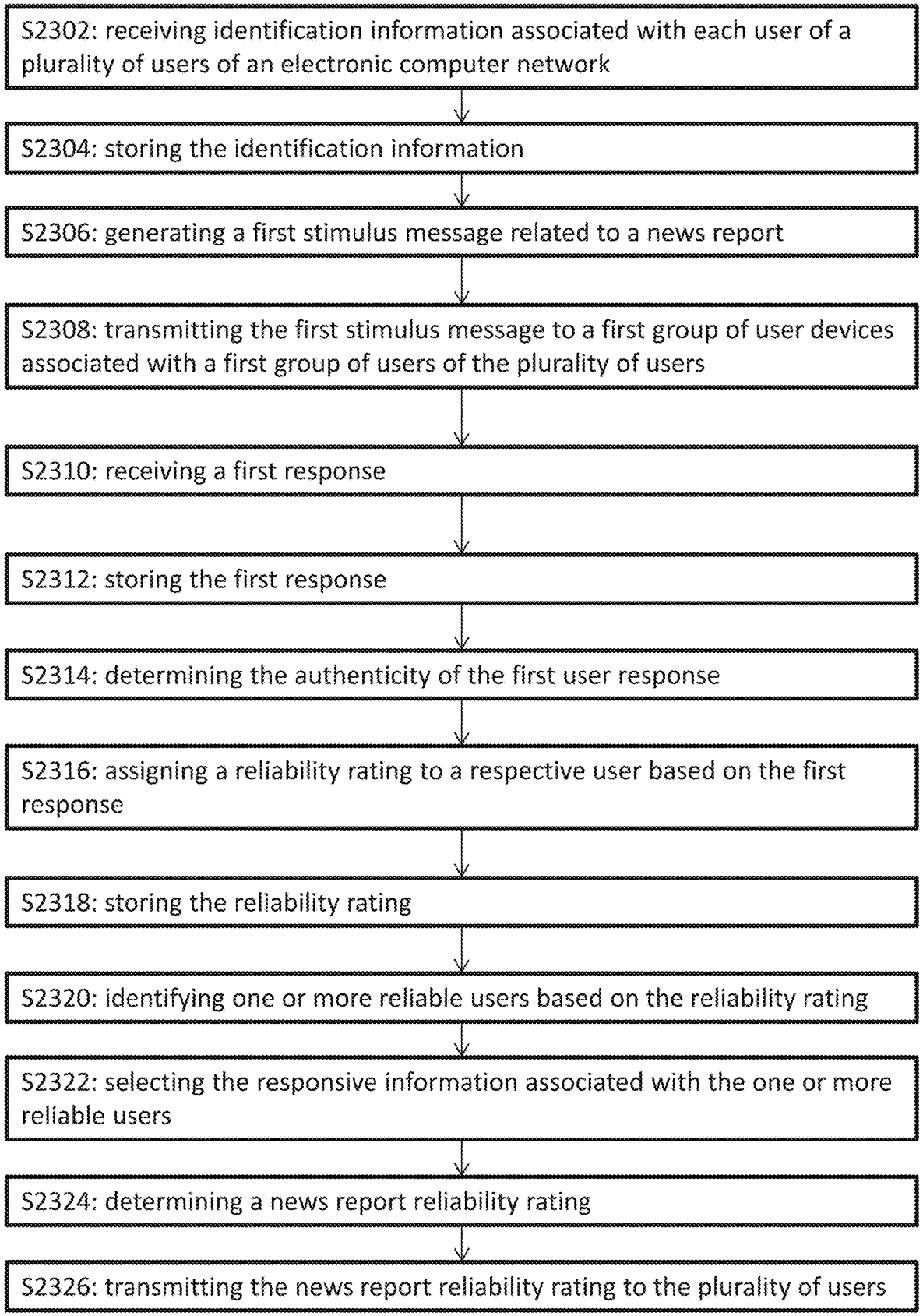
FIG. 23 is a flow chart of a process for determining accuracy of a report in accordance with an exemplary embodiment of the present invention.

Referring now to FIG. 23, illustrates a flow chart of a computer-implemented process for determining accuracy of a news report based on information provided by one or more users of a plurality of users of an electronic computer network (e.g., network 1910 in FIG. 19) in accordance with exemplary embodiments of the present invention.

The process of FIG. 23 may begin at step S2302. At step S2302, a computing device 2702 (e.g., computer 1802 in FIG. 18, server 1901 in FIG. 19) receives identification information associated with each user of the plurality of users of the electronic computer network. The identification information may be received by the computing device 2702 in a manner similar to step S2202 described above in connection with FIGS. 22, 27, and 28, the description of which applying herein. Moreover, the identification information of the process described in connection with FIG. 23 may be similar to the identification information described in connection with FIGS. 22, 27, and 28, the description of which applying herein.

At step S2304, the computing device stores in one or more databases the identification information. In embodiments, the one or more databases may be: internal storage 1808A, external storage 1808B, memory/storage 1815, system memory 1804, and/or storage 1903, to name a few. The identification information may be stored in accordance with the received identification information. For example, the identification indication may indicate an age of the users. In this example, the computing device 2702 may store the identification information by age range (e.g. 18-25 ages grouped together, 26-40 ages grouped together, etc.). As another example, the identification information may be stored based on whether a user is part of a specific group of users. For example, identification information of the first group of users associated with the first group of user devices 2708 may be stored together. Step S2304 may be similar to step S2204 described above in connection with FIGS. 22, 27, and 28, the description of which applying herein.

At step S2306, a first stimulus message (e.g. news stimulus message 2706) related to a news report is generated by the computing device 2702. The news report, in embodiments, may be any text, audio, video, or combination thereof, describing, showing, and/or depicting an event that has, is, or will take place. The news report may be received by the computing device 2702 from a third party website. Additionally, the news report may be received by the computing device 2702 from one or more users of the plurality of users 3006, where one or more users requests the computing device 2702 check the accuracy of a news report. Additionally, the computing device 2702 may decide which news report to check the accuracy of, based on one or more of the following factors: the amount of views the news report has; the amount of links the news report has; and/or the relative importance of the news report (e.g. if the news report relates to an election, or if the news report relates to vaccinations, etc., to name a few). In embodiments, the news report to be vetted for accuracy by the computer device 2702 may be a news report that issued one or more days before the accuracy is to be checked and/or the subject of the news report may be an event that occurred one or more days prior to the computing device 2702 vetting the accuracy of the news report.

Referring to FIG. 27, in embodiments, computing device 2702 may generate news stimulus message 2706. News stimulus message 2706, may, for example, include a message stating "A news agency is reporting an event near your location, can you give any information regarding the event?" In embodiments, the news stimulus message 2706 may include executable machine readable instructions that allow for the computing device 2702 to determine when one or more user devices of the first group of user devices 2708 received, opened, and/or began to respond to the news stimulus message 2706. For example, the news stimulus message 2706 may include Message Disposition Notification(s) (MDN). The news stimulus message 2706 may be generated in response to determining that a news report of importance was just published. For example, as stated above, if there is a news report of a fire occurring at 1234 5th Street, the computing device 2702 may generate a news stimulus message 2706 to determine the validity of the news report of the fire occurring. The news stimulus message 2706 may be specific to the event happening. For example, news stimulus message 2706 may include text that states, "we have received a report that a fire is happening at 1234 5th street, can you tell us any information regarding this report?" Additionally, in embodiments, the news stimulus message 2706 may provide a link to the report and/or an excerpt of the news report. Furthermore, in embodiments, the news stimulus message 2706 may also include user specific information. For example, the news stimulus message 2706, may state "Ken, we received a report that a fire is happening near you at 1234 5th street, can you see it? If so, are firemen already present at the scene?" In embodiments, news stimulus message 2706 may include a question regarding information that the computing device 2702 has already confirmed. For example, the computing device 2702 may have already confirmed that firemen are at the scene. In this example, news stimulus message 2706 may state "Ken, we received a report that a fire is happening near you at 1234 5th street, can you see it? If so, are firemen already present at the scene? Is there any further details you can tell us?" The first question, "are fireman already present at the scene" may be asked to confirm the reliability of the user (e.g. if the user gets the answer correct, the user may be determined to be reliable, if the user gets the answer incorrect, the user may be determined to be unreliable). The second question, may be to confirm the reliability of the news report that is reporting of the fire. In embodiments, the computing device 2702 may only review answers from users that provide the correct answer to the question, "are fireman already present at the scene."

In embodiments, the computing device 2702 may determine and/or store event start information. Event start information, in embodiments, may refer to the time at which the event (the event of the news stimulus message 2706) was first reported. In embodiments, event start information may refer to the time at which the event (the event of the event stimulus message 2704) began. The time at which an event began may only be based on the reporting of the event, which may need to be authenticated. This authentication process may be similar to the process described in connection with FIGS. 22, 27, and 28 and/or the process described in connection with FIG. 23, the descriptions of which applying herein.

Referring back to FIG. 23, the first stimulus message may include machine readable instructions to present an inquiry message on the one or more user devices of the first group of user devices. In embodiments, the inquiry message may be related to a past event element of the news report. For example, a past event element may be whether firemen have responded to a fire. The news report, in this example, would be the fire. The event element, in this example, is the presence of the firemen. In embodiments, the inquiry message may be related to a future event element. For example, a future event element may be whether a fire is likely to spread to other buildings. The news report, in this example, would be the fire. The future event element, in this example, is whether the fire will spread. In embodiments the inquiry message may be related to a past event element of the event that was modified or did not take place. For example, if the computing device has determined that initial news report information included incorrect information regarding the presence of firemen, the computing device 2702 may generate a first stimulus message that includes questions regarding the incorrect information. If the user responds correctly, then the user may be determined as a reliable source. If the user responds incorrectly, then the user may be determined as an unreliable source.

At step S2308, the computing device transmits the first stimulus message to a first group of user devices associated with a first group of users of the plurality of users (e.g., a device 1904, 1907 in FIG. 19, a portable client computing device 2001 in FIGS. 20 and 21, first group of devices 2708 in FIG. 27) associated with a first group of users of the plurality of users. Referring back to FIG. 27, computing device 2702, may transmit the news stimulus message 2706 to the first group of user devices 2708. In embodiments, the news stimulus message 2706 may be transmitted over network 1910. In embodiments, the first group of user devices 2708 may include one or more of: laptop 2708-A, wearable device 2708-B, and/or cell phone 2708-C. First group of user devices 2708, in embodiments, may be associated with a first group of users of the plurality of users (e.g. plurality of users 3006 described in connection with FIG. 30). Laptop 2708-A, wearable device 2708-B, and/or cell phone 2708-C may be similar to one or more of the following, the descriptions applying herein: device 1904, 1907 described above in connection with FIG. 19, and/or portable client computing device 2001 described above in connection with FIGS. 20 and 21.

In embodiments, the first group of users may be determined using identification information. In embodiments, as mentioned above, the identification may include past location information, which, as mentioned above, may include a timestamp related to the past location information. The past location information and related timestamp, in embodiments, may enable the computing device 2702 to determine where users associated with the plurality of user devices 3006 were located during a past event (e.g. an event being the subject of a news report, where the event is not currently taking place). The timestamp related to the past location information may include a time range associated with the location information (e.g. User 1 was at Location 2 between 3:00 PM and 4:00 PM). The past location information may, in embodiments, enable the computing device 2702 to determine which users associated with the plurality of user devices 3006 were within a predetermined distance of the event which is the subject of the news report (e.g. within a predetermined radius, as described above in reference to FIGS. 22, 27, and 28, the description of which applying herein). For example, if the news report details event an event that occurred at a baseball stadium, the computing device 2702 may use past location information to determine which users were within a predetermined radius (e.g. at the baseball stadium) during the time of the event at the baseball stadium. In embodiments, each user at the baseball stadium at the time (or time range) of the event may be placed in a first group of users (e.g. first group of user devices 2708).

In embodiments, the computing device 2702 may determine the first group of users in a similar manner as described above in connection with FIGS. 22, 27, and 28, the description of which applying herein.

At step S2310, the computing device receives, from one or more user devices (e.g. laptop 2708-A, wearable device 2708-B, and/or cellphone 2708-C) of the first group of user devices (e.g. first group of user devices 2708) a first response (e.g. first response 2902). In embodiments, the first response (e.g. first response 2802) may include one or more of the following: (i) user information specific to the respective user associated with the respective user device that transmits the first response (e.g. user information 2902A); (ii) responsive information related to the news report (e.g. news report information 2902B); (iii) location information associated with a location of the respective user device associated with the respective user (e.g. location information 2902C); (iv) a timestamp (e.g. timestamp 2902D) (v) proximity information; (vi) audio data associated with the event and/or observations of the user; (vii) image data associated with the event and/or observations of a user; and/or (viii) video data associated with the event and/or observations of a user, to name a few.

User information 2902A may be similar to user information 2802A described above in connection with FIGS. 22, 27, and 28, the description of which applying herein. As described above, in reference to FIGS. 22, 27, and 28, user information 2902A may include connection information. Connection information, as described above, may enable the computing device 2702 to accurately set an upper and/or lower time lag limit which may be used for authentication of the first response 2902 and/or a determining a reliability rating of a user associated with cellphone 2708-C (e.g. the user device of the first group of user devices 2708 which sent the first response 2902).

News report information 2902B may be information received from a user device (e.g. cellphone 2708-C) that is responsive to the news report stimulus message 2706. For example, the news stimulus message 2706 may state, as previously noted, "A news agency is reporting an event near your location, can you give any information regarding the event?" The first response 2902 from the cellphone 2708-C, may include news report information 2902B, which may responsive to the "any information" question. News report information 2902B may include information that is received via message (e.g. "Yes, the news report missed the fact that the white car caused the accident") and/or information that is received via answers to a prompt (e.g. a prompt that asks "Which car caused the car accident"—where the prompt has a few preselected answers—"(a) the white car; (b) the red car; (c) I don't know; (d) both cars" and the user selects one or more of the options presented).

Location information 2902C may be similar to location information 2802C described above in connection with FIGS. 22, 27, and 28, the description of which applying herein.

Timestamp 2902D may be similar to timestamp 2802D described above in connection with FIGS. 22, 27, and 28, the description of which applying herein. As described above, timestamp 2902D may enable the computing device 2702 to calculate a time lag associated with the first response 2902. The computed time lag, in embodiments and as mentioned above, may be compared to upper and/or lower time lag limits. The comparison of the computed time lag to the upper and/or lower time lag limits, as mentioned above, may be used for authentication of the first response 2902 and/or a determining a reliability rating of a user associated with cellphone 2708-C (e.g. the user device of the first group of user devices 2708 which sent the first response 2902).

Proximity information, as described herein, may be similar to the proximity information described above in connection with FIGS. 22, 27, and 28, the description of which applying herein. As described above, proximity information may be used for determining the authenticity of the first response 2902 and/or determining a reliability rating of a user associated with cellphone 2708-C (e.g. the user device of the first group of user devices 2708 which sent the first response 2902).

Audio data, as described herein, may be similar to the audio data described above in connection with FIGS. 22, 27, and 28, the description of which applying herein. As described above, audio data may be used for determining the authenticity of the first response 2902 and/or determining a reliability rating of a user associated with cellphone 2708-C (e.g. the user device of the first group of user devices 2708 which sent the first response 2902).

Image data, as described herein, may be similar to the image data described above in connection with FIGS. 22, 27, and 28, the description of which applying herein. As described above, image data may be used for determining the authenticity of the first response 2902 and/or determining a reliability rating of a user associated with cellphone 2708-C (e.g. the user device of the first group of user devices 2708 which sent the first response 2902).

Video data, as described herein, may be similar to the video data described above in connection with FIGS. 22, 27, and 28, the description of which applying herein. As described above, video data may be used for determining the authenticity of the first response 2902 and/or determining a reliability rating of a user associated with cellphone 2708-C (e.g. the user device of the first group of user devices 2708 which sent the first response 2902).

At step S2312, the computing device (e.g. computing device 2702) stores the first response (e.g. first response 2902) in the one or more databases. In embodiments, the one or more databases, as mentioned above with respect to step S2304, may be: internal storage 1808A, external storage 1808B, memory/storage 1815, system memory 1804, and/or storage 1903, to name a few. The first response 2802 may be stored in accordance with the received identification information. For example, the identification indication may indicate an age of the users. In this example, the computing device 2702 may store the first response 2802 by age range (e.g. 18-25 ages grouped together, 26-40 ages grouped together, etc.). As another example, the first response 2802 may be stored based on whether a user is part of a specific group of users. For example, first responses from the first group of users associated with the first group of user devices 2708 may be stored together. Step S2312 may be similar to step S2212 described above in connection with FIGS. 22, 27, and 28, the description of which applying herein.

At step S2314, the computing device (e.g. computing device 2702) may determine authenticity of the first response (e.g. first response 2902). In embodiments, the computing device 2702 may determine the authenticity based on one or more of: the user information 2902A, the news report information 2902B, the location information 2902C, the timestamp 2902D, proximity information, previously stored authenticity ratings, and/or previously stored responses (which may be related or unrelated to the news report). In embodiments, the user information 2902A, the news report information 2902B, the location information 2902C, the timestamp 2902D, proximity information, previously stored authenticity ratings, and/or previously stored responses (which may be related or unrelated to the news report) may be used individually to determine the authenticity of the first response 2902. For example, if the user information 2902A received with first response 2902 indicates that the user responding to the first response 2902 is the user associated with the user device (e.g. laptop 2708-A) the news stimulus message 2706 was transmitted to (e.g. in step S2308), the computing device 2702 may determine that the first response 2902 received is authentic and/or has a higher probability of being authentic. As another example, as mentioned above, if the news report information 2902B received with the first response 2902 contains correct information with regards to a query with a confirmed answer within the news stimulus message 2706, the computing device 2702 may determine that the first response received is authentic and/or has a higher probability of being authentic. As another example, if the location information 2902C received with the first response 2902 indicates that the user was indeed in the area at the time of the event that is the subject of the news report, the computing device 2702 may determine that the first response 2706 received is authentic and/or has a higher probability of being authentic. As yet another example, if the timestamp 2902D received with the first response 2902 indicates that the user was within the upper and/or lower limits of the time lag limit when sending the first response 2902 (e.g. the time lag is within the prescribed predetermined time lag limit(s)), the computing device 2702 may determine that the first response received is authentic and/or has a higher probability of being authentic. As yet another example, if proximity information received with the first response 2902 indicates that the first response received from the cellphone 2708-C is consistent with responses received from the wearable device 2708-B and the laptop 2708-A, the computing device 2702 may obtain and analyze the proximity information of the cellphone 2708-C as compared to the wearable device 2708-B and the laptop 2708-A. If the cellphone 2708-A is within a certain distance of the wearable device 2708-B and the laptop 2708-A, the computing device 2702 may determine that the user associated with the cellphone 2708-C may be observing and/or experiencing the same event (which is the subject of the news report) as the one or more users associated with the wearable device 2708-B and the laptop 2708-A, and, thus, the information received in the first response 2902 from the cellphone 2708-C may be authentic and/or have a higher probability of being authentic. As yet another example, if the computing device 2702 has a previously stored authenticity rating attached to one or more users, a response received by the one or more users may be determined to be authentic or unauthentic based on the previous authenticity rating. Additionally, for example, the computing device 2702 may use previously stored messages to determine the authenticity of the first response 2902. The computing device 2702 may accomplish this by determining words and/or phrases typically used by the user associated with the user device transmitting the first response 2902. If the first response 2902 contains words or phrases typically used and/or does not use words or phrases that are not used by the user associated with the user device transmitting the first response 2902, the computing device 2702 may determine that the first response 2902 received is authentic and/or has a higher probability of being authentic.

The above examples, if the facts are surrounding the information received with the first response 2902 are the opposite (e.g. if the news report information 2902C contains incorrect information), the computing device 2702 may determine that the first response(s) received are unauthentic and/or have a higher probability of being unauthentic.

In embodiments, one or more of the user information 2902A, the event information 2902B, the location information 2902C, the timestamp 2902D, proximity information, previously stored authenticity ratings, and/or previously stored responses may be used in combination with one another to determine the authenticity of the first response 2902. For example, as mentioned above, time lag associated with the timestamp 2902D may be viewed in context with connectivity data included with the user information 2902A. Each piece of information received with the first response 2902 may be used in combination with one another to provide context to the information received. This context may increase the accuracy of the authenticity rating determined by the computing device 2702.

The determined authenticity of the first response 2902 may be determined on a scale. The scale, for example, may include authenticity ratings on the scale of: unauthentic, high probability of unauthentic, may be unauthentic or authentic, high probability of authentic, and authentic. As another example, the determined authenticity may have a numbers rating system, which may be, for example, on a 0-100 scale, where 0 represents unauthentic and 100 represents authentic.

Step S2314 may be similar to step S2214 described above in connection with FIGS. 22, 27, and 28, the description of which applying herein.

At step S2316, the computing device (e.g. computing device 2702) assigns a reliability rating to the respective user associated with the user device (e.g. cellphone 2708-C) that transmitted the first response 2902. The reliability rating, in embodiments, may be based one or more of the following: the first response 2902, any information included within the first response 2902 (e.g. user information 2902A, the event information 2902B, the location information 2902C, the timestamp 2902D, and/or proximity information, to name a few), previously stored authenticity ratings, and/or previously stored responses (which may be related or unrelated to the news report), and/or the authenticity determined above in step S2314, to name a few. For example, if the timestamp 2902D is above a lower time lag limit (e.g. indicating that the response was probably not automated) and/or below an upper time lag limit, the computing device 2702 may determine that the user associated with the timestamp 2902D may have a reliability rating of reliable. In embodiments, the examples provided for authenticity in connection with the description of S2314 may be applied similarly to reliability ratings, the descriptions of which and examples applying herein.

In embodiments the reliability rating may be assigned by the computing device 2702, for example, by performing one or more of the following steps: (i) assigning, by the computing device 2702, the reliability rating to be a reliable rating when the location information 2902C is consistent with a location associated with the news report and the timestamp 2902D indicates acceptable delay; (ii) assigning, by the computing device 2702, the reliability rating to be an unreliable rating when the location information 2902C is inconsistent with the location associated with the news report and/or the timestamp 2902D indicates an unacceptable delay; and/or (iii) assigning the reliability rating as unreliable when the news report information 2802B includes incorrect information (e.g. the information is incorrect in response to a query with a known answer, the information received confirmed the occurrence of a past event element that was modified and/or did not take place). In embodiments, instead of reliable and unreliable binary ratings, a graded reliability rating scheme may be used by the computing device. The determined reliability rating of the user associated with the first response 2902 may be determined on a scale. The scale, for example, may include reliability ratings on the scale of: unreliable, high probability of unreliable, may be unreliable or reliable, high probability of reliable, and reliable. As another example, the determined reliability may have a numbers rating system, which may be, for example, on a 0-100 scale, where 0 represents unreliable and 100 represents reliable. Step S2316 may be similar to step S2216 described above in connection with FIGS. 22, 27, and 28, the description of which applying herein.

At step S2318, the computing device (e.g. computing device 2702) stores in the one or more databases the reliability rating. In embodiments, the one or more databases, as mentioned above with respect to steps S2304 and S2312, may be: internal storage 1808A, external storage 1808B, memory/storage 1815, system memory 1804, and/or storage 1903, to name a few. The reliability rating may be stored in accordance with the received identification information. For example, the identification indication may indicate an age of the users. In this example, the computing device 2702 may store the reliability rating by age range (e.g. 18-25 ages grouped together, 26-40 ages grouped together, etc.). As another example, the reliability rating may be stored based on whether a user is part of a specific group of users. For example, reliability rating from the first group of users associated with the first group of user devices 2708 may be stored together. As yet another example, the reliability rating may be stored based on the reliability ratings. For example, reliable reliability ratings may be stored together while unreliable reliability ratings may be stored together. Step S2318 may be similar to step S2218 described above in connection with FIGS. 22, 27, and 28, the description of which applying herein.

At step S2320, the computing device (e.g. computing device 2702) may identify one or more reliable users based on the reliability rating. The one or more reliable users may be one or more users associated with the one or more user devices of the first group of user devices 2708 (e.g. a user associated with the laptop 2708-A, a user associated with the wearable device 2708-B, and/or a user associated with the cellphone 2708-C). In embodiments, the computing device 2702 may identify reliable users based on whether the reliable rating meets and/or exceeds a predetermined reliability rating threshold. The reliability rating threshold, in embodiments, may be related to the type of reliability rating the computing device 2702 assigns to the one or more users associated with the one or more user devices of the first group of user devices 2708. For example, if the reliability rating is a binary type of reliability rating (e.g. two ratings, reliable or unreliable), the predetermined reliability rating threshold may be predetermined to be a reliable reliability rating. Thus, in this example, the computing device 2702 may identify every user with a reliable reliability rating as reliable. As another example, if the reliability rating is a scale type of reliability rating (e.g. unreliable, high probability of unreliable, may be unreliable or reliable, high probability of reliable, and reliable), the predetermined reliability rating may be predetermined to be high probability of reliable. Thus, in this example, the computing device 2702 may identify every user with either a high probability of reliable rating or a reliable reliability rating as reliable. As yet another example, if the reliability rating is a numbers type of reliability rating (e.g. on a scale of 0-100 where 0 is unreliable and 100 is reliable), the predetermined reliability rating may be predetermined to be a reliability rating of 75. Thus, in this example, the computing device 2702 may identify every user with a reliability rating of 75 or above as reliable.

In embodiments, the computing device 2702 may identify one or more reliable users by filtering out one or more unreliable users. Similar to the description above, in embodiments, the computing device 2702 may identify unreliable users based on whether the reliable rating is equal to or below a predetermined reliability rating threshold. The computing device 2702 may identify the unreliable users and exclude the responses received by user devices associated with the unreliable users. After discounting responses from user devices associated with the unreliable users, the computing device 2702 may analyze and/or store responses that were not excluded (e.g. responses from reliable users). In embodiments, the computing device 2702 may assign a reliability rating of reliable (or a rating that meets or is above the predetermined threshold) to each user associated with each user device that transmitted a response that was not excluded. The computing device 2702, in embodiments, may store the one or more unreliable user's reliability rating (in a manner similar to the storage described in steps S2304, S2312, and/or S2318). The computing device 2702, in embodiments, may store the one or more reliable user's reliability rating (in a manner similar to the storage described in steps S2304, S2312, and/or S2318). Step S2320 may be similar to step S2220 described above in connection with FIGS. 22, 27, and 28, the description of which applying herein.

At step S2322, the computing device (e.g. computing device 2702) may select responsive information associated with the one or more reliable users. In embodiments, the responsive information may refer to one or more of: user information 2902A, the news report information 2902B, the location information 2902C, the timestamp 2902D, and/or proximity information, to name a few. The responsive information selected, in embodiments, may be any information contained in the first response 2902 that is relevant to the news report. In embodiments, the responsive information may be information contained in the first response 2902 that is related to a specific event element (e.g. whether first responders have arrived at the scene). In embodiments, the responsive information may be extracted from the first response 2902. For example, if the first response 2902 contains responses to the news report stimulus message 2706 that provided prompts with multiple choice response options, the computing device 2702 may extract the multiple-choice option associated with a user that has been assigned a high reliability rating. As another example, if the first response 2902 contains responses to the news report stimulus message 2706 that provided questions where users can manually input their observations, the computing device 2702 may extract quotes from the first response 2902 and/or analyze the text data of the first response 2902. The analysis of the text data may be similar to the analysis described above in connection with FIGS. 22, 27, and 28, the description of which applying herein. Step S2322 may be similar to step S2222 described above in connection with FIGS. 22, 27, and 28, the description of which applying herein.

At step S2324, the computing device (e.g. computing device 2702) determines a news report reliability rating. In embodiments, the news reliability rating may be determined based on at least the selected responsive information associated with the one or more reliable users.

In embodiments, the computing device 2702 may determine a news report reliability rating by extracting one or more details of the news report. For exemplary purposes, the following are processes that the computing device 2702 may implement in order to extract details from the news report.

The text data of the news report may be provided to one or more processor(s) (e.g. of processing unit 1803) of the computing device 2702. The one or more processor(s) of the computing device 2702, in embodiments, may be capable of processing text data. In embodiments, the one or more processor(s) may include or be operatively connected to one or more language models, which may be specific to one or more of: one or more users associated with the plurality of user devices 3006; one or more news reporting agencies; and/or one or more categories of news reports (e.g. scientific news, political news, sports news, and/or business news, to name a few), to name a few. The language models, in embodiments, may enable the one or more processor(s) of the computing device 2702 to determine one or more details of the news report. In embodiments, the language models described herein may be stored in one or more of the following: system memory 1804, internal storage 1808A, external storage 1808B, and/or memory/storage 1815.

For exemplary purposes, the following is a process that the computing device 2702 may perform for the purposes of analyzing text data. In embodiments, the computing device 2702 may receive text data that represents the text of the news report. The one or more processor(s) of the computing device 2702 may, in embodiments, analyze the text data. The analysis of the text data may begin with the one or more processor(s) parsing out the text data into grammatical objects to determine sentences within the text data. The grammatical objects may be further used to parse out each sentence within the text data to determine portions of each sentence associated with nouns, verbs, prepositions, etc. In embodiments, once each sentence is parsed out, the one or more processor(s) of the computing device 2702 may determine the meaning of each sentence. In embodiments, the one or more processor(s) of the computing device 2702 may determine that the sentence can have more than one meaning. In those cases, the one or more processor(s) of the computing device 2702 may rank the more than one meanings of each sentence, the ranking being by which meaning the one or more processor(s) of the computing device 2702 has the highest likelihood of being correct. In embodiments, the computing device 2702 may use one or more language models to determine the correct meaning of the ranked meanings.

Once the meanings of each sentence have been determined by the computing device 2702, the computing device may store the meanings of each sentence. Moreover, the computing device 2702 may generate a list of details associated with the news report by analyzing the meanings of each sentence, both individually and collectively. The list of details of the news report may be used to determine the news report reliability rating.

For exemplary purposes, the following is a process that the computing device 2702 may perform for the purposes of analyzing audio data. In the case of video data, the computing device 2702 may extract the audio data of the video data (if applicable) and perform the same process that follows. In embodiments, the computing device 2702 may receive audio data that represents the audio of the news report. The one or more processor(s) of the computing device 2702 may, in embodiments, analyze the audio data. The one or more processors of the computing device 2702 may be enabled to perform speech-to-text functionality on audio data. In embodiments, the one or more processor(s) of the computing device 2702 may implement any suitable computer implemented speech to text technique may be used to convert the received audio data into text, such as SOFTSOUND speech processing technologies available from the Autonomy Corporation, which is headquartered in Cambridge, England, United Kingdom.

Once the audio data has been processed by the speech-to-text functionality of the one or more processor(s) of the computing device 2702, the resulting text data may be analyzed in a similar manner as stated above. The analysis of the text data may result with the computing device 2702 generating a list of details associated with the news report. The list of details of the news report may be used to determine the news report reliability rating.

For exemplary purposes, the following is a process that the computing device 2702 may perform for the purposes of analyzing image data. In the case of video data, the computing device 2702 may extract the image data of the video data (if applicable) and perform the same process that follows. In embodiments, the computing device 2702 may receive image data that represents an image associated with or the subject of the news report. The one or more processor(s) of the computing device 2702 may, in embodiments, analyze the image data. The one or more processors of the computing device 2702 may be enabled to perform one or more of the following: 2D object recognition, 3D object recognition, image segmentation, motion detection (e.g. single particle tracking), video tracking, optical flow, 3D Pose Estimation, and/or automatic number plate recognition, to name a few. The image analysis, in embodiments, may be used to determine whether an image of the news report is accurate. In embodiments, images (and/or images within videos) may be compared to images (and/or images within videos) received in connection with the first response 2902.

In embodiments, the extracted details of the news report can be compared to the responsive information received from one or more user devices associated with the one or more reliable users ("reliable responsive information"). In embodiments, the reliable responsive information may be analyzed by the computing device 2702 in a similar manner to the analysis the computing device 2702 performs on the news report (e.g. for the above text data, audio data, image data, and/or video data). Once the details of the news report are extracted and the reliable responsive information is analyzed, the computing device 2702, in embodiments, may compare the extracted details of the news report to the analyzed reliable responsive information.

For example, extracted details of the text data representing the text of the news report and/or extracted details of text data representing audio (including, if applicable, audio from video data of the news report) of the news report may be compared to analyzed text data representing the reliable responsive information. The text comparison (which may be performed by the one or more processor(s) of the computing device 2702), in embodiments, may find similarities and/or differences between the news report and the reliable responsive information. Based on the text comparison, the computing device 2702 may determine a reliability rating of the news report. In embodiments, the reliability rating may be based on at least one of: the amount of similarities between the extracted details and the reliable responsive information; the amount of differences between the extracted details and the reliable responsive information; and/or the amount of conflicting information between the extracted details and the reliable responsive information, to name a few.

As another example, image data representing an image associated with or the subject of the news report (including, if applicable, audio from video data of the news report) may be compared to responsive image data representing images (and images extracted from videos received by reliable users, if applicable) of the reliable responsive information. The image comparison (which may be performed by the one or more processor(s) of the computing device 2702), in embodiments, may find similarities and/or differences between the news report and the reliable responsive information. Based on the image comparison, the computing device 2702 may determine a reliability rating of the news report. In embodiments, the reliability rating may be based on at least one of: the amount of similarities between the extracted details and the reliable responsive information; the amount of differences between the extracted details and the reliable responsive information; and/or the amount of conflicting information between the extracted details and the reliable responsive information, to name a few.

In embodiments, the news report reliability rating may be a general news reliability rating. A general news reliability rating may be a rating of the entire news report —which may state if the news report is reliable, unreliable, mostly reliable, or mostly unreliable, to name a few. For example, as shown in connection with FIG. 30, the computing device 2702 may generate a news reliability report 3004. In embodiments, as shown in FIG. 30 the news reliability report 3004 may state "The news reported by the news agency has a reliability score of RELIABLE." In embodiments, the news reliability report 3004 may include a link to the news report given the reliability rating. In embodiments, the general news reliability rating may be based on a predetermined threshold. The predetermined threshold may require one or more of the following for the news report to be deemed reliable: a predetermined number of similarities between the reliable responsive information and the extracted details of the news report; a predetermined percentage of similarities between the reliable responsive information and the extracted details of the news report; below a certain number of differences between the reliable responsive information and the extracted details of the news report; and/or below a certain number of conflicting information between the reliable responsive information and the extracted details of the news report, to name a few. The predetermined numbers and/or percentages associated with the predetermined threshold may vary based on one or more of the following: the size of the news report, the amount of text in the news report, the amount of video in the news report, the amount of images in the news report, the amount of reliable responsive information, the amount of unique reliable responsive information, the amount of images of the reliable responsive information, and/or the amount of video of the reliable responsive information, to name a few. For example, if the news report is large and the amount of reliable responsive information is large, the computing device 2702 may require the analysis to turn up more similarities and/or less conflicting information (as compared to the following example) in order for the news report to be given a reliable reliability rating. As another example if the news report is small and/or the amount of reliable responsive information is small, the computing device 2702 may require the analysis to turn up less similarities and/or more conflicting information (as compared to the aforementioned example) in order for the news report to be given a reliable reliability rating.

In some embodiments, the general news reliability rating may be one or more of the following: a binary reliability rating (e.g. two ratings, reliable or unreliable); a scale reliability rating; and/or a numbers reliability rating (e.g. on a scale of 0-100 where 0 is unreliable and 100 is reliable), to name a few.

In embodiments, the news reliability rating may be a specific news reliability rating. A specific news reliability rating may rate the reliability of each of the extracted details of the news report in view of the reliable responsive information. A specific news reliability rating may, in embodiments, require the computing device 2702 to analyze each of the extracted details of the news report to the reliable responsive information. The specific analysis, may be completed by using the above analysis for the general news reliability rating for each extracted detail (e.g. a first extracted detail compared to the reliable responsive information, a second extracted detail compared to the reliable responsive information, . . . N extracted detail compared to the reliable responsive information). Each extracted detail (including details of images, audio, and/or video), in embodiments, may receive a rating similar to the general news reliability rating. In some embodiments, the specific news reliability rating may be one or more of the following: a binary reliability rating (e.g. two ratings, reliable or unreliable); a scale reliability rating; and/or a numbers reliability rating (e.g. on a scale of 0-100 where 0 is unreliable and 100 is reliable), to name a few.

In embodiments, there may be extracted details of the news report that are not addressed by the reliable responsive information. In embodiments, in a specific analysis, the news reliability report 3004 may indicate the extracted details that were not able to be verified (e.g. there was no reliable responsive information applicable to the extracted detail). The news reliability report 3004 may indicate which extracted details are either reliable and/or unreliable and/or indicate which extracted details were unable to be verified. In embodiments, the general news report may consider which and how many extracted details were unable to be verified. For example, if too high of a percentage (and/or too many) of extracted details were unable to be verified, the general news report may give the news report a reliability rating of UNRELIABLE or UNABLE TO BE VERIFIED, for example.

In embodiments, the computing device 2702 may determine both a general news reliability rating and a specific news reliability rating.

In embodiments, the news reliability report 3004 may include a generated timeline of event components within the event which is the subject of the news report. For example, if there is a car accident, the reliable responsive information and/or extracted details of the news report may indicate: the time of the accident, the time traffic started to build up, the time first responders arrived, the time first responders left the scene of the accident, the time the people involved in the car accident left the scene of the accident (e.g. in an ambulance or on their own accord), and/or the time the car accident was cleaned up (e.g. the cars involved were towed). The timeline, and the times associated with the timeline may include the reliability rating of each time. Moreover, in embodiments, the timeline may include the percentage of users that agree on a certain time. For example, if 82% of the reliable users stated that the car accident occurred at 6:32 PM, but 18% of the reliable users stated that the car accident occurred at 6:34 PM, the timeline generated may include both times and note the percentages of reliable users that agree on the time of the car accident. In embodiments, the computing device 2702 may weigh the information received by reliable users when generating the news reliability report 3004. For example, if the news reliability report 3004 includes a generated timeline, the computing device 2702 may include only the most reliable details, if there is a conflict. For example, if 82% of the reliable users stated that the car accident occurred at 6:32 PM, but 18% of the reliable users stated that the car accident occurred at 6:34 PM, the timeline generated may include a car accident time of 6:32 PM. In some embodiments, the timeline may include the reliability rating of each extracted detail on the timeline and/or whether the extracted detail was verified. In embodiments, the timeline may include reliable responsive information that was not related to any of the extracted details, noting that the timeline point is reliable, but not available in the news report.

In embodiments, the news report reliability rating may be stored by the computing device 2702 in the one or more databases. In embodiments, the one or more databases, as mentioned above with respect to steps S2304, S2312 and S318, may be: internal storage 1808A, external storage 1808B, memory/storage 1815, system memory 1804, and/or storage 1903, to name a few. The news report reliability rating may be stored in accordance with one or more of the following: stored by news agency, stored by journalist, stored by news report reliability rating, and/or stored by news report category, to name a few.

At step S2326, the computing device (e.g. computing device 2702) may transmit the news report reliability rating to the plurality of users associated with the plurality of user devices 3006. As shown in FIG. 30, the news reliability report 3004 may generated and/or transmitted by the computing device 2702 to the plurality of user devices 3006 which may be associated with the plurality of users. The plurality of user devices 3006 may include the first group of user devices 2708.

In embodiments, the process described in connection with FIG. 23 may continue with the computing device 2702 transmitting a second stimulus message related to the news report. The second stimulus message may be transmitted after a first predetermined amount of time. The second stimulus message, in embodiments, may be transmitted to the first group of user devices 2708. In embodiments, the second stimulus message may be transmitted to the plurality of user devices 3006. In embodiments, the second stimulus message may only be provided to the identified one or more reliable users of the first group of users associated with the first group of user devices 2708. In embodiments, the second stimulus message may be transmitted via network 1910. In embodiments, the second stimulus message may include information related to one or more of the following: extracted details that were not addressed, conflicting details from reliable users, an updated version of the news report and/or an additional news report regarding the same event as the original news report.

For example, the computing device 2702 may determine that too many extracted details from the news report were either not verified or not completely verified. In response, the computing device 2702 may generate and transmit a second stimulus message to the one or more reliable users of the first group of users associated with the first group of devices 2708. In embodiments, the second stimulus message may include "We have more details of the News Report we would like to verify, can you verify if one or more of these details are accurate?"

As another example, the computing device 2702 may determine that the news report was recently updated and published. In response, the computing device 2702 may generate and transmit a second stimulus message to the one or more reliable users of the first group of users associated with the first group of devices 2708. In embodiments, the second stimulus message may include "The News Report was recently updated, can you verify if the updated details are accurate?"

As yet another example, the computing device 2702 may determine that a second news report regarding the same event that was the subject of the news report mentioned above in connection with steps S2302-S2326 ("first news report"). In embodiments, the computing device 2702 may analyze additional news reports to determine if a second news report regarding the same event of the first news report was published. In embodiments, the computing device 2702 may analyze the second news report and compare the extracted details of the second news report to the extracted details of the first news report to determine one or more of the following: if the second news report includes any new details as compared to the first news report; if the second news report mentions the first news report; if the second news report has details that conflict with the first news report; if the second news report has details that differ from the first news report; and/or if the second news report has the same details as the first news report. In embodiments, if there are any new details, differing details, and/or conflicting details, the computing device 2702 may determine that the second news report needs to be verified for the purposes of updating the news report reliability rating of the first news report. In this example, the second stimulus message may include "We have received a second news report for the event the first news report covered, there are additional details within the second news report, can you verify if one or more of these new details are accurate?"

In embodiments, the second stimulus message may include executable machine-readable instructions to present a second message to each user that receives the stimulus message, prompting a response from each user that receives the second stimulus message. In embodiments, the predetermined amount of time may be based on the type of news report. In embodiments, the predetermined amount of time may not be predetermined, and the second message may be generated and transmitted as a result of a change in circumstance of the news report (e.g. a second news report is published, more details of the first news report need to be verified, or an update of the first news report was published, to name a few).

In embodiments, after the computing device 2702 transmits the second stimulus message, the computing device 2702 may receive a second response from one or more user devices. In embodiments, the second response may be received via the electronic computer network (e.g. network 1910). The second response, in embodiments, may include one or more of the following: second response information related to the second stimulus message, user information 2902A, news report information, 2902B, location information 2902C, and/or timestamp 2902D, to name a few. In embodiments, the second response may be similar to first response 2902 described above, the description of which applying herein.

In embodiments, the computing device 2702 may store, in the one or more databases, the second response. In embodiments, the one or more databases, as mentioned above with respect to steps S3204, S2312, and S2318, may be: internal storage 1808A, external storage 1808B, memory/storage 1815, system memory 1804, and/or storage 1903, to name a few. The second response rating may be stored in accordance with the received identification information. For example, the identification indication may indicate an age of the users. In this example, the computing device 2702 may store the second response by age range (e.g. 18-25 ages grouped together, 26-40 ages grouped together, etc.). As another example, the second response may be stored based on whether a user is part of a specific group of users. For example, second response from the first group of users associated with the first group of user devices 2708 may be stored together.

In embodiments, the computing device 2702 may determine the authenticity of the second response. In embodiments, the authenticity of the second response may be determined by performing one or more of the following steps: (i) the computing device 2702 determining whether the second response includes the second response information that corresponds to an activity element (e.g. event element) in the news report (e.g. using second response information related to the second stimulus message, user information 2902A, news report information, 2902B, location information 2902C, and/or timestamp 2902D, to name a few); and/or (ii) the computing device 2702 determining whether the second response includes second response information relating to information (e.g. details) relating to the news report available to the respective user when the second message was displayed on the user device associated with the respective user (using, second response information related to the second stimulus message, user information 2902A, news report information, 2902B, location information 2902C, and/or timestamp 2902D, to name a few). Determining the authenticity of the second response may be similar to determining the authenticity of the first response 2902 described above, the description of which applying herein.

In embodiments, the computing device 2702 may update the reliability rating for the users associated with user devices that transmitted the second response. The reliability rating may be updated by determining the reliability rating for each user, which may be similar to the above description of determining a reliability rating, the description of which applying herein. In embodiments, the reliability rating may be based on the authenticity of the second response. In embodiments, a reliable rating is assigned to a user if: the second response from the user device associated with the respective user includes the second response information that corresponds to the activity event element in the news report; the second response from the user device associated with the respective user includes the second response information available to the respective user of the user device associated with the respective user when the second message was displayed by the user device; the user received a reliable rating for with regards to the first response; the user received a reliable rating with regards to the second response; the user received a reliable rating with regards to both the first and second response; and/or the user received a reliable rating in past responses, to name a few. In embodiments, an unreliable rating may be assigned to a user if: the second response form the user device associated with the respective user includes the second response information that does not correspond to the activity event element in the news report; if the second response from the user device associated with the respective user includes second response information that was not available to the respective user when the second message was displayed by the user device; the user received an unreliable rating for with regards to the first response; the user received an unreliable rating with regards to the second response; the user received an unreliable rating with regards to both the first and second response; and/or the user received an unreliable rating in past responses, to name a few.

In embodiments, once the reliability rating is found for each user, the reliability rating for each user may be updated. The updated rating may include only the new rating. Additionally, the reliability rating may include the updated reliability rating and the first reliability rating. In embodiments, the reliability rating and the updated reliability rating may be transmitted to the user. The transmission of the reliability rating to the user it is associated with may include a message stating the reliability rating(s), a history of the reliability rating(s), and/or whether the information was used in a generated news report.

In embodiments, the computing device 2702 may repeat steps S2318-S2324, based on the information received with regards to the second stimulus message and/or the second user response. In embodiments, the information received and stored from the second user response may be used to update the timeline generated in connection with step S2324. The updated timeline may be generated in a similar manner as the original timeline, the description of which applying herein. The updated timeline may include the updated information received from the second responses and/or the second stimulus message, which may be weighted in a similar manner as the first responses were, the description of which applying herein.

In embodiments, the process may continue and repeat steps S2306-S2326, generating more stimulus messages and receiving more responses as the news report develops and/or continues. This process may continue until the event which is the subject of the news report ends, or, in some embodiments, until a predetermined amount of time after the event which is the subject of the news report has ended.

The steps of the process described in connection with FIG. 23, in embodiments, may be rearranged or omitted.

Example 14: Method of Predicting Financial Market Conditions

Figure 24:
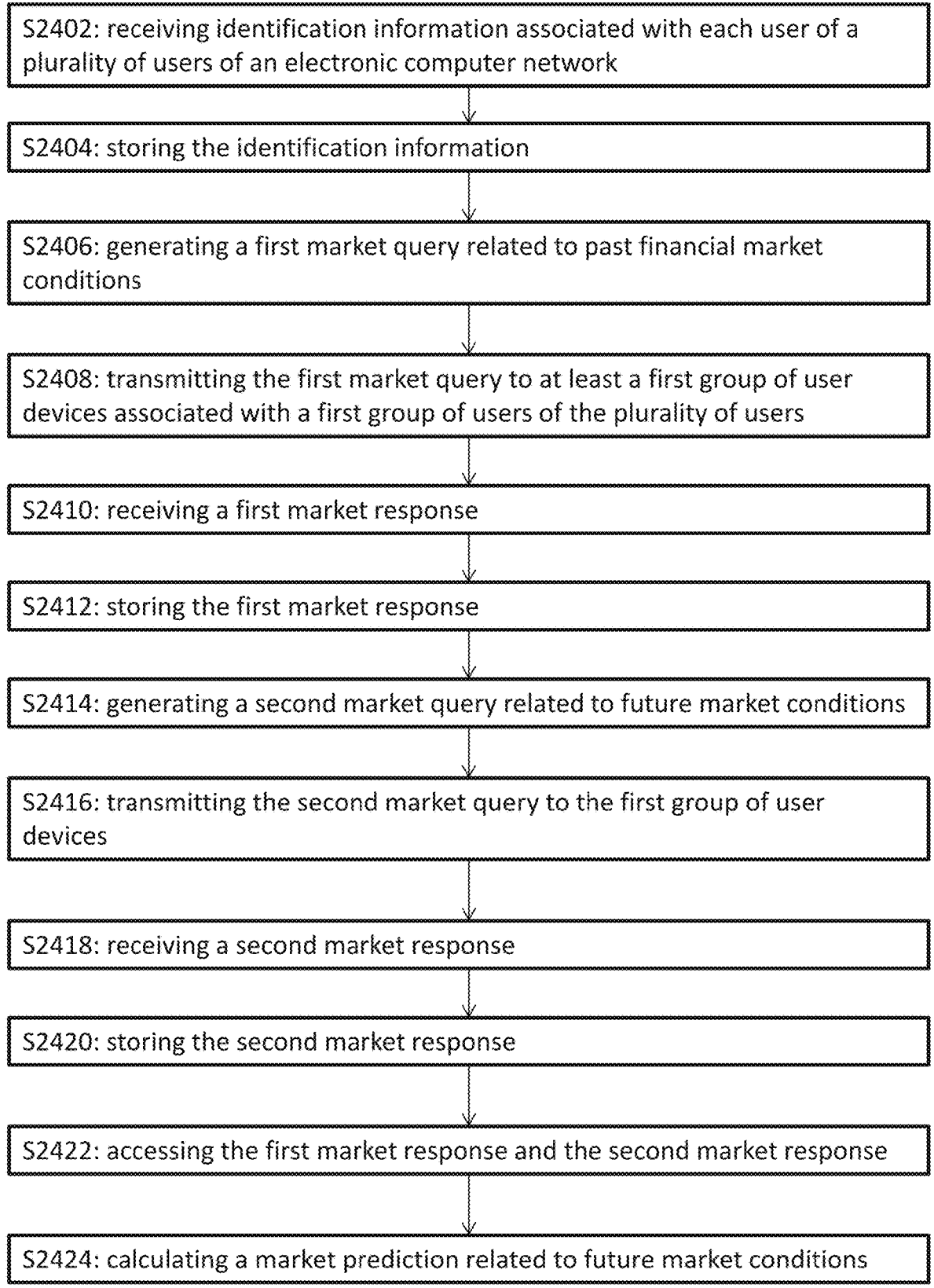
FIG. 24 is a flow chart of a process for predicting conditions in accordance with an exemplary embodiment of the present invention.

Referring now to FIG. 24, an illustrative flow chart of a computer-implemented process for predicting financial market conditions based on information provided by one or more users of a plurality of users of an electronic computer network (e.g., network 1910 in FIG. 19) in accordance with an exemplary embodiment of the present invention is provided.

The process of FIG. 24 may begin at step S2402. Referring to FIG. 24, at step S2402, a computing device (e.g., computer 1802 in FIG. 18, server 1901 in FIG. 19, computing device 2702 in FIGS. 27-42) receives identification information associated with each user of a plurality of users of the electronic computer network. Identification information, in embodiments, may include job history data which may include user specific current and past employment history. In embodiments, identification information may be similar to the identification information described above in connection with FIGS. 22-23, and 27-30, the description of which applying herein. Additionally, step S2402 may be similar to steps S2202 and S2302, described above in connection with FIG. 22 and FIG. 23 respectively, the description of which applying herein.

The computing device 2702 may determine a first group of users associated with a first group of user devices (e.g. first group of user devices 2708). For example, if the computing device 2702 is going to send a market query regarding a specific market (e.g. bonds) once the identification information is received, the computing device 2702 may group users who have a job or who have had a job that is or is related to the specific market. In embodiments, the computing device 2702 may determine the first group of users in a similar manner as described above in connection with FIGS. 22, 23, 27, and 28, the description of which applying herein.

A market, as used herein, may be any asset or assets which an individual and/or corporate entity can invest in. A market can include one or more of the following: stock market (e.g. NYSE), bond market (e.g. for bonds, bills, notes, and/or certificates of deposit, to name a few), foreign exchange market (e.g. Forex), physical assets (e.g. metals, jewelry, real estate, and/or cattle, to name a few), derivatives market (e.g. for options, futures, and/or forwards, to name a few), annuities, and/or investment funds, to name a few.

At step S2404, the computing device (e.g. computing device 2702) stores in one or more databases the identification information. In embodiments, the one or more databases may be: internal storage 1808A, external storage 1808B, memory/storage 1815, system memory 1804, and/or storage 1903, to name a few. The identification information may be stored in accordance with the received identification information. For example, the identification indication may indicate an age of the users. In this example, the computing device 2702 may store the identification information by age range (e.g. 18-25 ages grouped together, 26-40 ages grouped together, etc.). As another example, the identification information may be stored based on whether a user is part of a specific group of users. For example, identification information of the first group of users associated with the first group of user devices 2708 may be stored together. Step S2404 may be similar to step S2204 described above in connection with FIGS. 22, 27, and 28, the description of which applying herein.

At step S2406, the computing device (e.g. computing device 2702) generates a first market query (e.g. first market query 3102). The purpose of the first market query 3102, in embodiments, may be to determine the reliability of one or more users receiving the first market query. In embodiments, the response to the first market query 3102 may be used by the computing device 2702 to determine whether a future market condition predicted by the user should be viewed as reliable information. Thus, in embodiments, the first market query 3102, may be related to past financial market conditions. For example, referring to FIG. 31, the first market query 3102 may include a message stating "Have you purchased any call options in the past quarter? If so, what call option did you purchase and how much did you spend?"

In embodiments, the past financial market conditions may include one or more of: past price information and/or past volume information, to name a few. Past price information may refer to a price that the user has paid for a first specific asset on a market. Past volume information may refer to an amount of a second specific asset that the user has purchased. In embodiments, the first specific asset and the second specific asset may be the same asset.

In embodiments, the first market query 3102 may include executable machine-readable instructions that allow for the computing device 2702 to determine when one or more user devices of the first group of user devices 2708 received, opened, and/or began to respond to the first market query 3102. For example, the first market query 3102 may include Message Disposition Notification(s) (MDN).

In embodiments, the first market query 3102 may be generated in response to the computing device 2702 determining that an event is occurring that is related to a market. For example, if there is a report of a first market dropping in value, the computing device 2702 may generate first market query 3102 to determine which users are reliable with respect to the first market. The first market query 3102 may be specific to the event related to the market. For example, first market query 3102 may include text that states, "we have received a report that the First Market is dropping in value, do you own any assets related to the First Market? If so, how much did you pay for the asset and how much of the assets do you own?" Additionally, in embodiments, the first market query 3102 may provide a link to the report and/or an excerpt of the report. Furthermore, in embodiments, the first market query 3102 may also include user specific information. For example, the first market query 3102, may state "Bob, we have received a report that the First Market is dropping in value, do you own any assets related to the First Market? If so, how much did you pay for the asset and how much of the assets do you own?" In embodiments, the first market query 3102 may include a question regarding information that the computing device 2702 has already confirmed. For example, the computing device 2702 may have already confirmed that the First Market dropped by 3 points last quarter. In this example, the first market query 3102 may state "Bob, do you know how the First Market performed last quarter? Do you own any assets related to the First Market? If so, how much did you pay for the asset and how much of the assets do you own?" The first question, "do you know how the First Market performed last quarter" may be asked to confirm the reliability of the user. The remaining questions, may be to confirm if the user is involved in the First Market, which may also be used to determine the reliability of the user. In embodiments, the computing device 2702 may only review answers from users that provide the correct answer to the question, "do you know how the First Market performed last quarter?"

In embodiments, the computing device 2702 may determine and/or store market start information. Market start information, in embodiments, may refer to the time at which the event (the event which may be the subject of the process described in FIG. 24) started occurring.

The first market query (e.g. first market query 3102) may include machine readable instructions to present an inquiry message on the one or more user devices of the first group of user devices 2708. In embodiments, the inquiry message may be related to the past financial market condition(s) mentioned above.

In embodiments the inquiry message may be related to a past financial market condition(s) that were modified or did not take place. For example, the computing device 2702 may have already confirmed that the First Market dropped by 3 points last quarter. In this example, the computing device 2702 may generate a first market query that may state "Do you know how the First Market performed last quarter?" If the user responds correctly, then the user may be determined as a reliable source. If the user responds incorrectly, then the user may be determined as an unreliable source.

Figure 31:
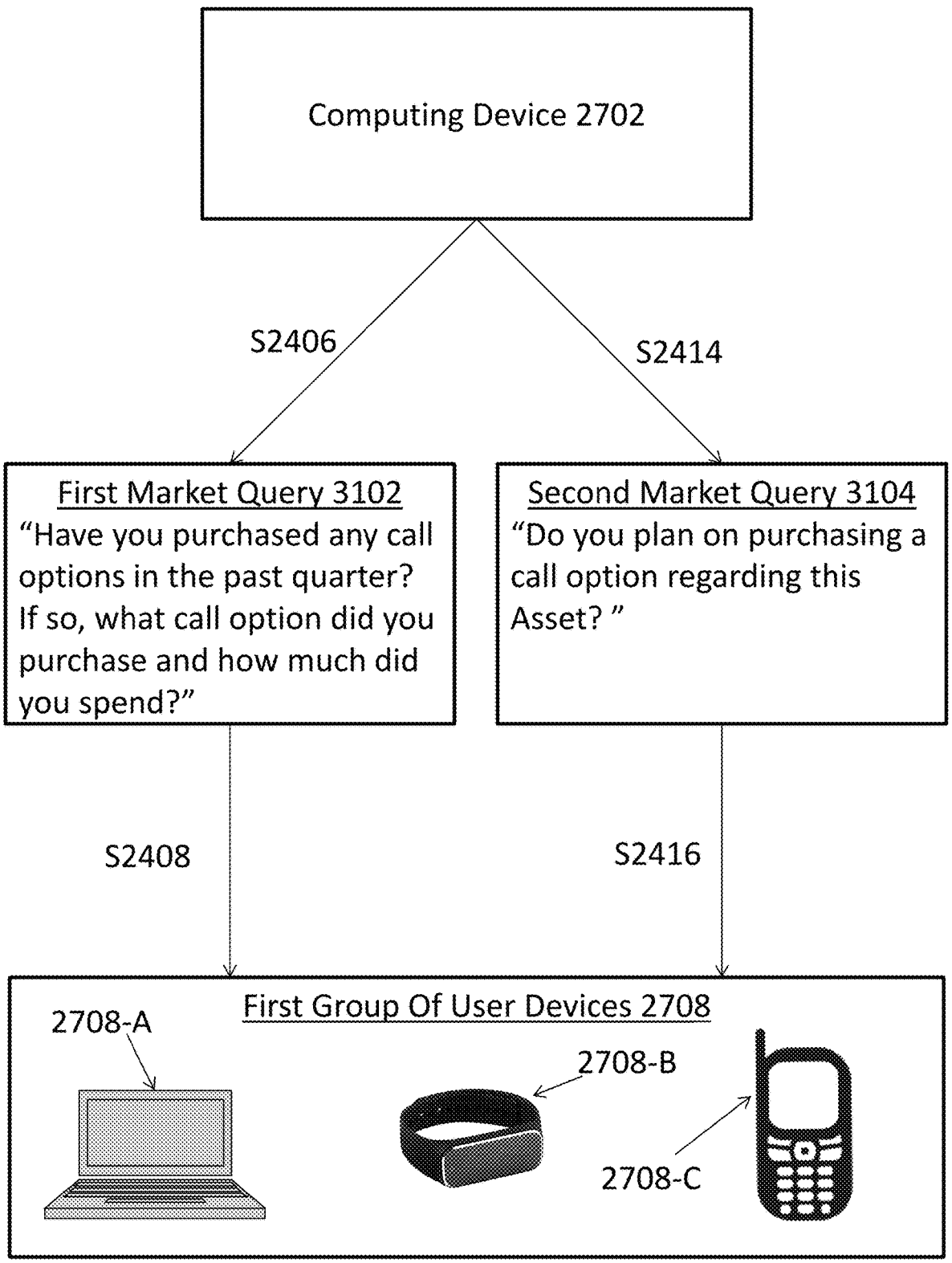
FIG. 31 is an exemplary block diagram illustrating a computing device generating and transmitting a first market and a second query to a first group of devices in accordance with exemplary embodiments of the present invention.

At step S2408, the computing device (e.g. computing device 2702) transmits the first market query (e.g. first market query 3102) to at least a first group of user devices (e.g. first group of user devices 2708) associated with a first group of users of the plurality of users (e.g. users associated with plurality of user devices 3006) of the electronic computer network (e.g. network 1910). Referring to FIG. 31, computing device 2702, may transmit the first market query 3102 to the first group of user devices 2708. In embodiments, the first market query 3102 may be transmitted over network 1910. In embodiments, the first group of user devices 2708 may include one or more of: laptop 2708-A, wearable device 2708-B, and/or cell phone 2708-C. First group of user devices 2708, in embodiments, may be associated with a first group of users of the plurality of users (e.g. plurality of users 3006 described in connection with FIG. 30). The step S2408 may be similar to step S2208 described above in connection with FIGS. 22 and 27, the description of which applying herein.

Figure 32:
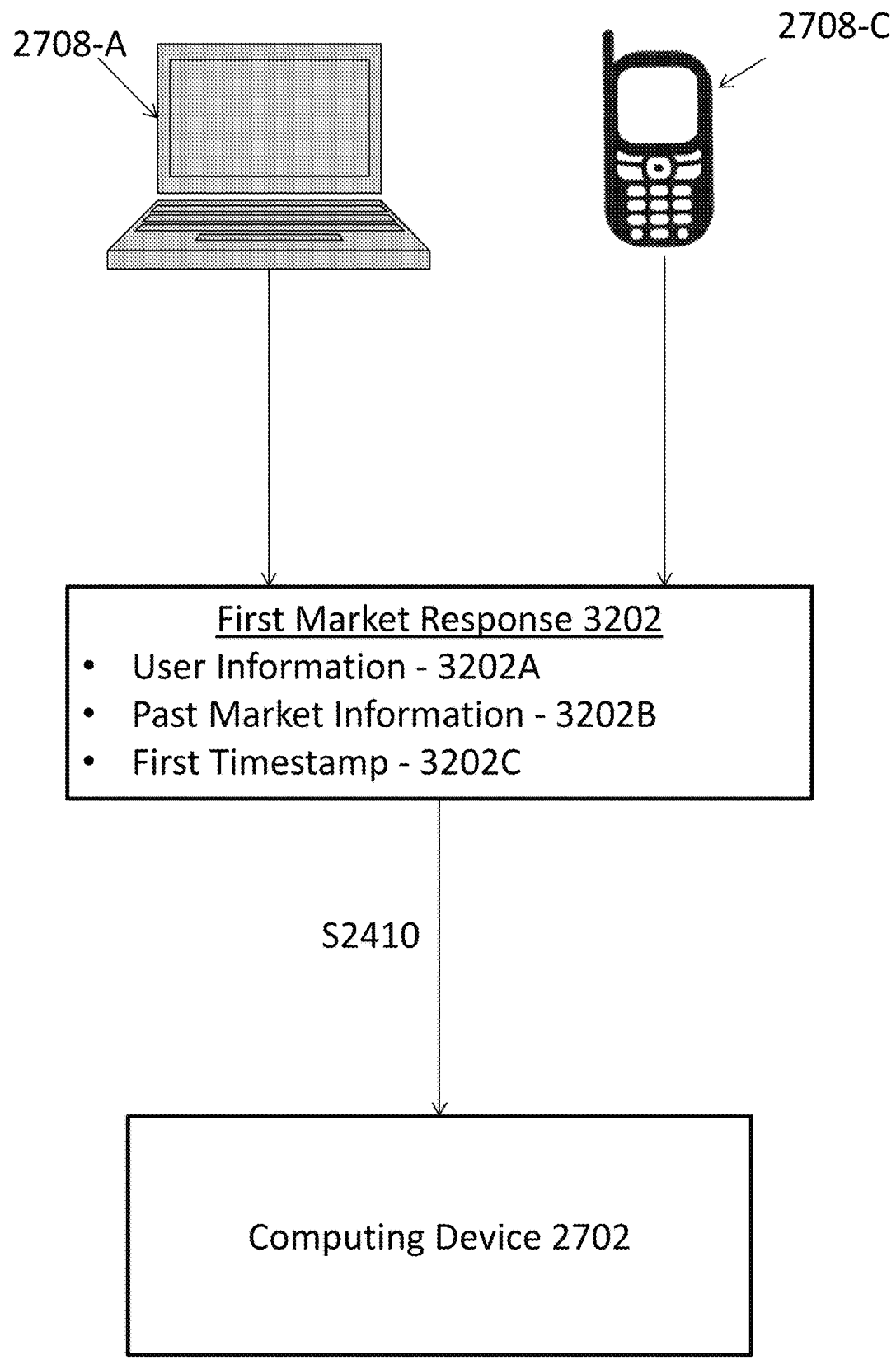
FIG. 32 is an exemplary block diagram illustrating a computing device receiving a first response from a plurality of devices in accordance with exemplary embodiments of the present invention.

At step S2410, the computing device (e.g. computing device 2702) may receive a first market response (e.g. First Market Response 3202). The first market response, in embodiments, may be received from one or more user devices of the first group of user devices (e.g. first group of user devices 2708). Referring to FIG. 32, in embodiments, the computing device 2702 may receive the first market response 3202 from a first user associated with the laptop 2708-A and a second user associated with the cellphone 2708-C. The first market response 3202, in embodiments, may include multiple responses specific to each user. For example, the first market response 3202 may include a specific first user market response and a specific second user market response. While not shown in FIG. 32, continuing the example, the first user market response may be received by the computing device 2702 at a different time than the time at which the computing device 2702 receives the second user market response. While it is clear in the art that messages from different electronic devices do not need to be received at the same time, for brevity and clarity purposes, only one first market response (First Market Response 3202) is shown in FIG. 32.

In embodiments, the first market response 3202 may include one or more of the following: (i) user information 3202A unique to the respective user associated with the respective user device providing the first market response; (ii) past market information 3202B related to prior market conditions; (iii) a first timestamp 3202C; (iv) location information associated with a location of the respective user device associated with the respective user; (v) proximity information; (vi) audio data associated with the past financial market conditions and/or observations of the user; (vii) image data associated with the past financial market conditions and/or observations of a user; and/or (viii) video data associated with the past financial market conditions and/or observations of a user, to name a few.

User information 3202A may be similar to user information 2802A and user information 2902A described above in connection with FIGS. 22, 23, 27, and 28, the description of which applying herein. User information 3202A, in embodiments, may also include one or more of the following: job history data which may include user specific current and past employment history (similar to the job history data described above in connection with the identification information received in step S2402), a user account associated with a user; an e-mail address associated with a user; a name associated with a user; biometric data associated with a user; gender information of the user associated with the user device; age of the user associated with the user device; personal data of a user associated with the user device, which is either volunteered by the user or received via access that is consented to by the user; location information associated with the user device; identification information related to a user device associated with a user of the plurality of users (e.g. metadata, device type, etc., to name a few), and/or electronic identification (e.g. electronic identification card, electronic signature, etc., to name a few), to name a few. Furthermore, as described above in connection with FIGS. 22, 23 27, and 28, user information 3202A may include connection information. Connection information, as described above, may enable the computing device 2702 to accurately set an upper and/or lower time lag limit which may be used for authentication of the first market response 3202 and/or a determining a reliability rating of a user associated with the laptop 2708-A and/or the reliability rating of a user associated with the cellphone 2708-C (e.g. the user devices of the first group of user devices 2708 which sent the first market response 3202).

Past market information 3202B may be information received from a user device (e.g. cellphone 2708-C) that is responsive to the first market query 3102. For example, past market information 3202B may be responsive to a query in which the computing device 2702 may have already confirmed. As with the example stated above, the computing device 2702 may have confirmed that the First Market dropped by 3 points last quarter. In this example, the first market query 3102 may state "Bob, do you know how the First Market performed last quarter? Do you own any assets related to the First Market? If so, how much did you pay for the asset and how much of the assets do you own?" The first question, "do you know how the First Market performed last quarter" may be asked to confirm the reliability of the user. The remaining questions, may be to confirm if the user is involved in the First Market, which may also be used to determine the reliability of the user. In embodiments, continuing the example, the past market information 3202B contained in the first market response 3202 may be responsive to "Bob, do you know how the First Market performed last quarter? Do you own any assets related to the First Market? If so, how much did you pay for the asset and how much of the assets do you own?" The first market response 3202 from the laptop 2708-A and/or the cellphone 2708-C, may include information that is received via message (e.g. "Yes, the First Market dropped by three points last quarter. I own 100 dollars' worth of assets in the First Market") and/or information that is received via answers to a prompt (e.g. a prompt that asks "How did the First Market perform last quarter"—where the prompt has a few preselected answers—"(a) Up 3 Points; (b) Down 3 Points; (c) I don't know" and the user selects one or more of the options presented).

First timestamp 3202C may be similar to timestamp 2802D and timestamp 2902D described above in connection with FIGS. 22, 23, 27, and 28, the description of which applying herein. As described above, first timestamp 3202C may enable the computing device 2702 to calculate a time lag associated with the first market response 3202. To compute the time lag, the first timestamp 3202C may include multiple time stamps (e.g. a time at which the first market query 3102 was sent, a time at which the first market query 3102 was opened, a time at which the first market response 3202 was started, a time at which the first market response 3202 was transmitted, and/or a time at which the first market response 3202 was received, to name a few). The multiple times within the first timestamp 3202C may be used to compute the time lag. For example, the computing device 2702 may determine a time lag by finding the amount of time between a first time when the first market query 3102 was opened by the laptop 2708-A and a second time when the first market response was transmitted by the laptop 2708-A to the computing device 2702. As another example, in embodiments, the computed time lag may be the time difference between a first time which is not associated with the first time stamp 3202C (e.g. a time of a particular market event element of the past financial market conditions) and a second time which is associated with the first time stamp 3202C (e.g. the time at which the first market response 3202 was received by the computing device 2702). The computed time lag, in embodiments and as mentioned above, may be compared to upper and/or lower time lag limits. The comparison of the computed time lag to the upper and/or lower time lag limits, as mentioned above, may be used for authentication of the first market response 3202 and/or a determining a reliability rating of a user associated with the laptop 2708-A and/or the cellphone 2708-C (e.g. the user device(s) of the first group of user devices 2708 which sent the first market response 3202). Moreover, as mentioned above, the upper and/or lower time lag limits (thresholds) may be predetermined. The predetermined upper and/or lower time lag limits may be determined in the context of the previously mentioned connection information (e.g. if the connection is poor, the lower and/or upper limits may be increased to account for the poor connection, if the connection is good, the lower and/or upper limits may be decreased to account for the good connection, etc.).

Location information as described herein, may be similar to location information 2802C and location information 2902C described above in connection with FIGS. 22, 23, 27, and 28, the description of which applying herein. As described above, location information may be used for determining the authenticity of the first market response 3202 and/or determining a reliability rating of a user associated with the laptop 2708-A and/or the cellphone 2708-C (e.g. the user device(s) of the first group of user devices 2708 which transmitted the first market response 3202).

Proximity information, as described herein, may be similar to the proximity information described above in connection with FIGS. 22, 23, 27, and 28, the description of which applying herein. As described above, proximity information may be used for determining the authenticity of the first market response 3202 and/or determining a reliability rating of a user associated with the laptop 2708-A and/or the cellphone 2708-C (e.g. the user device(s) of the first group of user devices 2708 which transmitted the first market response 3202).

Audio data, as described herein, may be similar to the audio data described above in connection with FIGS. 22, 23, 27, and 28, the description of which applying herein. As described above, audio data may be used for determining the authenticity of the first market response 3202 and/or determining a reliability rating of a user associated with the laptop 2708-A and/or the cellphone 2708-C (e.g. the user device(s) of the first group of user devices 2708 which transmitted the first market response 3202).

Image data, as described herein, may be similar to the image data described above in connection with FIGS. 22, 23, 27, and 28, the description of which applying herein. As described above, image data may be used for determining the authenticity of the first market response 3202 and/or determining a reliability rating of a user associated with the laptop 2708-A and/or the cellphone 2708-C (e.g. the user device(s) of the first group of user devices 2708 which transmitted the first market response 3202).

Video data, as described herein, may be similar to the video data described above in connection with FIGS. 22, 23, 27, and 28, the description of which applying herein. As described above, video data may be used for determining the authenticity of the first market response 3202 and/or determining a reliability rating of a user associated with the laptop 2708-A and/or the cellphone 2708-C (e.g. the user device(s) of the first group of user devices 2708 which transmitted the first market response 3202).

In embodiments, the computing device 2702 may use information within first market response 3202, (including e.g. user information 3202A, past market information 3202B, first timestamp 3202C, location information, proximity information, audio data, and/or image data, to name a few) to determine reliability and/or filter out unreliable responses. For example, the computing device 2702 may receive the past market information 3202B of first market response 3202 and the first timestamp 3202C of first market response 3202. In this example, the first timestamp 3202C may include the began drafting first market response time of the first market query and the sent time of the first market response. In embodiments, the computing device 2702 may compare the began drafting first market response time and the sent time of the first market response to calculate a time lag. This time lag may be used to determine the reliability of the user associated with a user device that transmitted the first market response 3202. In embodiments, this time lag may be viewed in the context of the past market information 3202B. If, for example, the time lag is high, and the amount of information contained within the past market information 3202B is high, the computing device 2702 may determine that the user associated with the transmission of the first market response 3202 is reliable and/or has a higher probability of being reliable because the high lag time may be due to the amount of information input by the user. If, for example, the time lag is high and the amount of information contained within the past market information 3202B is low, the computing device 2702 may determine that the first market response 3202 is unreliable and/or has a higher probability of being unreliable because the amount of content sent by the user does not reflect the amount of time spent crafting the first market response 3202. If, for example, the time lag is low and the amount of information contained within the past market information 3202B is high, the computing device 2702 may determine that the first market response 3202 is unreliable and/or has a higher probability of being unreliable because a user may have not been able to send a response with the high amount of information within the amount of time.

Referring to FIG. 24, at step S2412, the computing device (e.g. computing device 2702) stores in the one or more databases the first market response (e.g. first market response 3202) of each user device of the plurality of user devices of the first group of user devices (e.g. first group of user devices 2708) from which the first market response (e.g. first market response 3202) was received. In embodiments, the one or more databases, as mentioned above with respect to step S2404, may be: internal storage 1808A, external storage 1808B, memory/storage 1815, system memory 1804, and/or storage 1903, to name a few. Step S2412 may be similar to step S2212 described above in connection with FIGS. 22, 27, and 28, the description of which applying herein.

In embodiments, once the computing device 2702 receives and/or stores the first market response 3202, the computing device may determine the authenticity of the first market response 3202. The process of determining the authenticity of the first market response 3202 may be similar to the process of authenticating the first response 2802 of FIG. 28 and/or the first response 2902 of FIG. 29, described above in connection with FIGS. 22, 23, 27, 28, 29, and 30, the descriptions of which applying herein.

In embodiments, once the computing device 2702 receives and/or stores the first market response 3202, the computing device may determine the reliability of the plurality of users associated with the electronic devices (e.g. laptop 2708-A, cellphone 2708-C) that transmitted the first market response 3202. The process of determining the reliability of the plurality of users associated with the electronic devices (e.g. laptop 2708-A, cellphone 2708-C) that transmitted the first market response 3202 may be similar to the process of determining the reliability of the users associated with electronic devices that transmitted the first response 2802 of FIG. 28 and/or the first response 2902 of FIG. 29, described above in connection with FIGS. 22, 23, 27, 28, 29, and 30, the descriptions of which applying herein.

At step S2414, the computing device (e.g. computing device 2702) generates a second market query (e.g. second market query 3104). The purpose of the second market query, in embodiments, may be to predict future market conditions. In embodiments, the second market query may be related to future market conditions. For example, referring to FIG. 31, the second market query 3104 may include a message stating "Do you plan on purchasing a call option regarding this Asset?" In embodiments, the second market query 3104 may include a query relating to future market conditions of the market that was the subject of the past market conditions of the first market query 3102. Thus, the computing device 2702 may use the first market query 3102 to determine whether a user is reliable in regard to a specific market, then use the second market query 3104 to ask relevant questions regarding the specific market, the questions being directed at the reliable users in regard to the specific market.

In embodiments, second market query 3104 may include a query regarding future market conditions, which may include one or more of: future price information, future volume information, future plans of purchasing, timing of the future plans of purchasing, future market predictions and/or reasons regarding the decisions and/or predictions related to the future market conditions, to name a few. Future price information may refer to a price that the user will pay for a first specific asset on a market. Future volume information may refer to an amount of a second specific asset that the user will purchase. The future plans of purchasing may refer to whether the user will purchase a third specific asset. Timing of the future plans of purchasing may refer to when the user is planning on purchasing a fourth specific asset. Future market predictions may refer to a prediction of how a fifth specific asset will perform over a certain period of time. In embodiments, the first specific asset, the second specific asset, the third specific asset, the fourth specific asset and/or the fifth specific asset may be the same asset. In embodiments, the reasons regarding the decisions and/or predictions related to the future market conditions may refer to a query that allows the user to give his or her reasons for their plans to or not to purchase and/or his or her reasons for their predictions in the market.

In embodiments, the second market query 3104 may include executable machine-readable instructions that allow for the computing device 2702 to determine when one or more user devices of the first group of user devices 2708 received, opened, and/or began to respond to the second market query 3104. For example, the second market query 3104 may include Message Disposition Notification(s) (MDN).

In embodiments, the second market query 3104 may be generated in response to the computing device 2702 determining that an event (e.g. a market event) is occurring that is related to a market. For example, if there is a report of a First Market increasing in value, the computing device 2702 may generate the second market query 3104 to determine if reliable users associated with the first group of user devices 2708 believes the First Market will continue to increase in value. The second market query 3104 may be specific to the market event related to the market. For example, second market query 3104 may include text that states, "we have received a report that the First Market is increasing in value, do you believe the First Market will continue to perform well?" Additionally, in embodiments, the second market query 3104 may provide a link to the report and/or an excerpt of the report. Furthermore, in embodiments, the second market query 3104 may also include user specific information. For example, the second market query 3104, may state "John, we have received a report that the First Market is increasing in value, as someone who works in the First Market, do you believe the First Market will continue to perform well?" In embodiments, the second market query 3104 may include a question regarding information that the computing device 2702 has already confirmed, similar to the first market query 3102 described above, the same description applying herein.

In embodiments, the computing device 2702 may determine and/or store market start information. Market start information, in embodiments, may refer to the time at which the event (the event which may be the subject of the process described in FIG. 24) started occurring.

The second market query (e.g. second market query 3104) may include machine readable instructions to present an inquiry message on the one or more user devices of the first group of user devices 2708. In embodiments, the inquiry message may be related to the future financial market condition(s) mentioned above.

In embodiments the inquiry message of the second market query 3104 may be related to financial market condition(s) that were modified or did not take place. This may be similar to the conditions that were modified or did not take place that may be sent with the first market query 3102, the description of which applying herein.

At step S2416, the computing device (e.g. computing device 2702) transmits the second market query (e.g. second market query 3104) via a network (e.g. network 1910). In embodiments, the second market query may be transmitted to the first group of devices (e.g. first group of devices 2708). In embodiments, the second market query may be transmitted to a second group of user devices. The second group of user devices, in embodiments, may be user devices associated with one or more of the following: authenticated users who transmitted the first market responses 3202 (the authentication process, in embodiments, being performed by the computing device 2702B), and/or users who transmitted the first market responses 3202 where the computing device 2702 has given the users a reliability rating of RELIABLE (or given a reliability rating which exceeds a predetermined threshold). In embodiments, the second market query may be transmitted to a plurality of user devices (e.g. plurality of user devices 3006) associated with the plurality of users of an electronic computer network (e.g. network 1910).

Referring to FIG. 31, computing device 2702, may transmit the second market query 3104 to the first group of user devices 2708. In embodiments, the second market query 3104 may be transmitted over network 1910. In embodiments, the first group of user devices 2708 may include one or more of: laptop 2708-A, wearable device 2708-B, and/or cell phone 2708-C. First group of user devices 2708, in embodiments, may be associated with a first group of users of the plurality of users (e.g. plurality of users 3006 described in connection with FIG. 30). The step S2416 may be similar to step S2208 described above in connection with FIGS. 22 and 27, the description of which applying herein.

Figure 33:
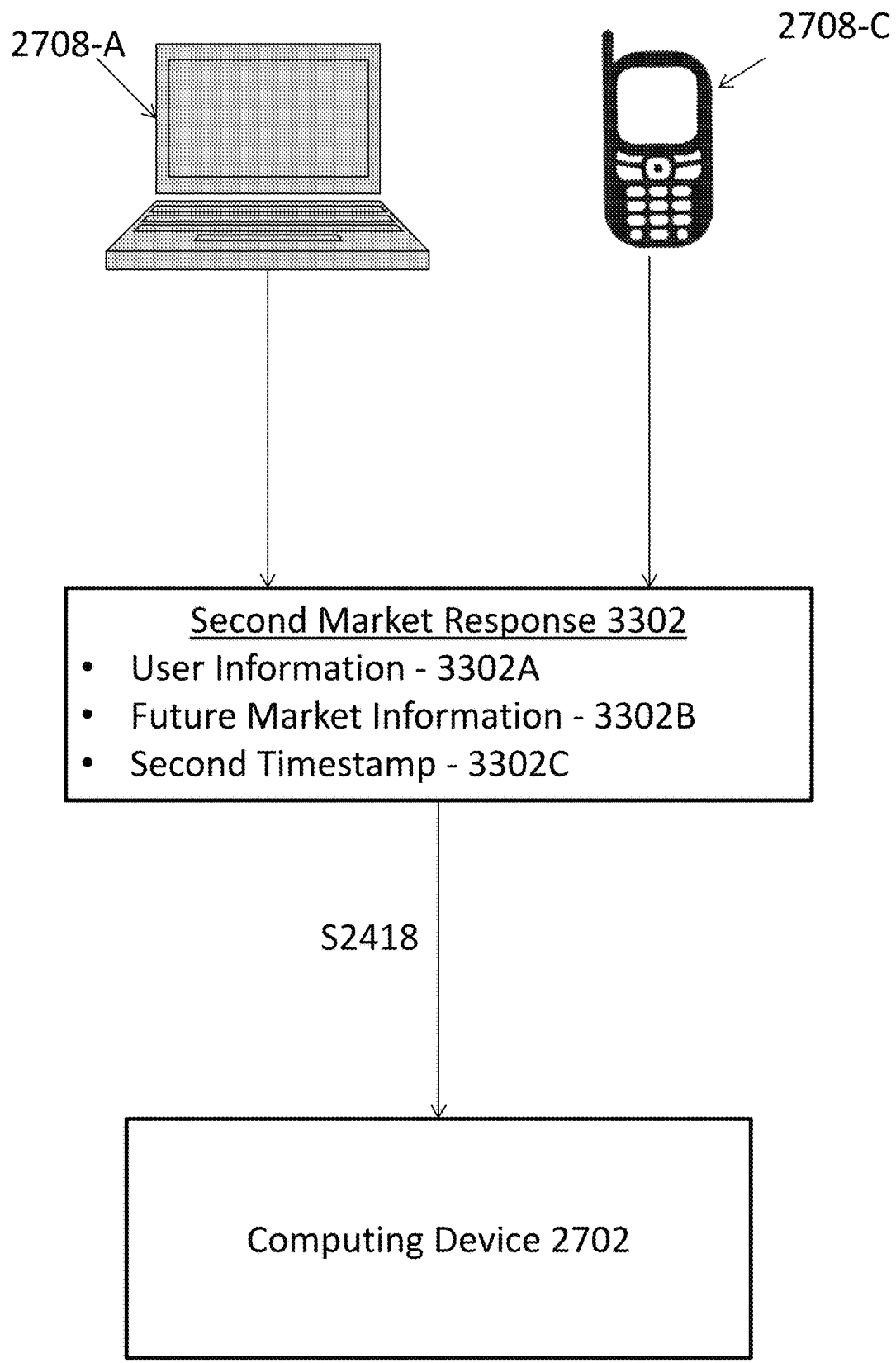
FIG. 33 is an exemplary block diagram illustrating a computing device receiving a second response from a plurality of devices in accordance with exemplary embodiments of the present invention.

Referring back to FIG. 24, At step S2418, the computing device (e.g. computing device 2702) may receive a second market response (e.g. second market response 3302). The second market response, in embodiments, may be received from one or more user devices of the first group of user devices (e.g. first group of user devices 2708). In embodiments, the second market response may be received from one or more user devices of the aforementioned (with regards to the process of FIG. 24) second group of user devices. Referring to FIG. 33, the computing device 2702 may receive the second market response 3302 from a first user associated with the laptop 2708-A and a second user associated with the cellphone 2708-C. The second market response 3302, in embodiments, may include multiple responses specific to each user. For example, the second market response 3302 may include a specific first user market response and a specific second user market response. While not shown in FIG. 33, continuing the example, the first user market response may be received by the computing device 2702 at a different time than the time at which the computing device 2702 receives the second user market response. While it is clear in the art that messages from different electronic devices do not need to be received at the same time, for brevity and clarity purposes, only one second market response (second market response 3302) is shown in FIG. 33.

In embodiments, the second market response 3302 may include one or more of the following: (i) user information 3302A unique to the respective user associated with the respective user device providing the second market response; (ii) future market information 3302B related to future market conditions; (iii) a second timestamp 3302C; (iv) location information associated with a location of the respective user device associated with the respective user; (v) proximity information; (vi) audio data associated with the future financial market conditions and/or observations of the user; (vii) image data associated with the future financial market conditions and/or observations of a user; and/or (viii) video data associated with the future financial market conditions and/or observations of a user, to name a few.

User information 3302A may be similar to user information 3202A, user information 2802A, and user information 2902A described above in connection with FIGS. 22, 23, 24, 27, 28, and 32 the descriptions of which applying herein.

Future market information 3302B may be information received from a user device (e.g. cellphone 2708-C) that is responsive to the second market query 3104. For example, future market information 3302B may be responsive to a query related to a future market condition that the computing device 2702 is attempting to predict. For example, in response to a market query that states "John, we have received a report that the First Market is increasing in value, as someone who works in the First Market, do you believe the First Market will continue to perform well?" the future market information 3302B may include information that answers the question of "do you believe the First Market will continue to perform well?" For example, the future market information 3302B may include text data representing a message that states: "Yes, the First Market will continue to perform well because of their recent earnings statements."

As another example, in response to a market query that states "Do you plan on purchasing a call option regarding this Asset?" the future market information 3302B may include information that answers the question "Do you plan on purchasing a call option regarding this Asset?" For example, the future market information 3302B may include text data representing a message that states: "Yes, I plan on purchasing a call option of the Asset this quarter." In embodiments, information from one or more users regarding whether a purchase is to be made in a specific market may enable the computing device 2702 to make a prediction on the future performance of the specific market. Additionally, in order to gather more information relating to potential purchases of an asset, the query and/or future market information 3302B may include information regarding timing, prices, volume, and/or reasoning, to name a few.

Second timestamp 3302C may be similar to first timestamp 3202C, timestamp 2802D, and timestamp 2902D described above in connection with FIGS. 22, 23, 24, 27, 28, and 32, the descriptions of which applying herein.

As described above, second timestamp 3302C may enable the computing device 2702 to calculate a time lag associated with the second market response 3302. To compute the time lag, the second timestamp 3302C may include multiple time stamps (e.g. a time at which the second market query 3104 was sent, a time at which the second market query 3104 was opened, a time at which the second market response 3302 was started, a time at which the second market response 3302 was transmitted, and/or a time at which the second market response 3302 was received, to name a few). The multiple times within the second timestamp 3302C may be used to compute the time lag. For example, the computing device 2702 may determine a time lag by finding the amount of time between a first time when the second market query 3104 was opened by the laptop 2708-A and a second time when the second market response 3302 was transmitted by the laptop 2708-A to the computing device 2702. As another example, in embodiments, the computed time lag may be the time difference between a first time which is not associated with the second time stamp 3302C (e.g. a time of a particular market event element of the future financial market conditions) and a second time which is associated with the second timestamp 3302C (e.g. the time at which the second market response 3302 was received by the computing device 2702). The computed time lag, in embodiments and as mentioned above, may be compared to upper and/or lower time lag limits. The comparison of the computed time lag to the upper and/or lower time lag limits, as mentioned above, may be used for authentication of the second market response 3302 and/or a determining a reliability rating of a user associated with the laptop 2708-A and/or the cellphone 2708-C (e.g. the user device(s) of the first group of user devices 2708 which sent the second market response 3302). Moreover, as mentioned above, the upper and/or lower time lag limits (thresholds) may be predetermined. The predetermined upper and/or lower time lag limits may be determined in the context of the previously mentioned connection information (e.g. if the connection is poor, the lower and/or upper limits may be increased to account for the poor connection, if the connection is good, the lower and/or upper limits may be decreased to account for the good connection, etc.).

Location information as described herein, may be similar to location information 2802C and location information 2902C described above in connection with FIGS. 22, 23, 27, and 28, the description of which applying herein. As described above, location information may be used for determining the authenticity of the second market response 3302 and/or determining a reliability rating of a user associated with the laptop 2708-A and/or the cellphone 2708-C (e.g. the user device(s) of the first group of user devices 2708 which transmitted the second market response 3302).

Proximity information, as described herein, may be similar to the proximity information described above in connection with FIGS. 22, 23, 27, and 28, the description of which applying herein. As described above, proximity information may be used for determining the authenticity of the second market response 3302 and/or determining a reliability rating of a user associated with the laptop 2708-A and/or the cellphone 2708-C (e.g. the user device(s) of the first group of user devices 2708 which transmitted the second market response 3302).

Audio data, as described herein, may be similar to the audio data described above in connection with FIGS. 22, 23, 27, and 28, the description of which applying herein. As described above, audio data may be used for determining the authenticity of the second market response 3302 and/or determining a reliability rating of a user associated with the laptop 2708-A and/or the cellphone 2708-C (e.g. the user device(s) of the first group of user devices 2708 which transmitted the second market response 3302).

Image data, as described herein, may be similar to the image data described above in connection with FIGS. 22, 23, 27, and 28, the description of which applying herein. As described above, image data may be used for determining the authenticity of the second market response 3302 and/or determining a reliability rating of a user associated with the laptop 2708-A and/or the cellphone 2708-C (e.g. the user device(s) of the first group of user devices 2708 which transmitted the second market response 3302).

Video data, as described herein, may be similar to the video data described above in connection with FIGS. 22, 23, 27, and 28, the description of which applying herein. As described above, video data may be used for determining the authenticity of the second market response 3302 and/or determining a reliability rating of a user associated with the laptop 2708-A and/or the cellphone 2708-C (e.g. the user device(s) of the first group of user devices 2708 which transmitted the second market response 3302).

In embodiments, the computing device 2702 may use information within second market response 3302, (including e.g. user information 3302A, future market information 3302B, second timestamp 3302C, location information, proximity information, audio data, and/or image data, to name a few) to determine reliability of a user and/or filter out unreliable responses. The process of determining the reliability of a user and/or filtering out unreliable responses may be similar to the processes described above in connection with FIGS. 22, 23, 24, 27, 28, 29, and 32, the descriptions of which applying herein.

Referring to FIG. 24, at step S2420, the computing device (e.g. computing device 2702) stores in the one or more databases the second market response (e.g. second market response 3302) of each user device of the plurality of user devices from which the second market response was received (e.g. first group of user devices 2708). In embodiments, the one or more databases, as mentioned above with respect to step S2412, may be: internal storage 1808A, external storage 1808B, memory/storage 1815, system memory 1804, and/or storage 1903, to name a few. Step S2420 may be similar to step S2212 described above in connection with FIGS. 22, 27, and 28, the description of which applying herein.

In embodiments, once the computing device 2702 receives and/or stores the first market response 3202 and/or the second market response 3302, the computing device 2702 may determine the authenticity of the first market response 3202 and/or the second market response 3302. The process of determining the authenticity of the first market response 3202 and/or the second market response 3302 may be similar to the process of authenticating the first response 2802 of FIG. 28 and/or the first response 2902 of FIG. 29, described above in connection with FIGS. 22, 23, 27, 28, 29, and 30, the descriptions of which applying herein.

In embodiments, once the computing device 2702 receives and/or stores the first market response 3202 and/or the second market response 3302, the computing device may determine the reliability of the plurality of users associated with the electronic devices (e.g. laptop 2708-A, cellphone 2708-C) that transmitted the first market response 3202 and/or the second market response 3302. The process of determining the reliability of the plurality of users associated with the electronic devices (e.g. laptop 2708-A, cellphone 2708-C) that transmitted the first market response 3202 and/or the second market response 3302 may be similar to the process of determining the reliability of the users associated with electronic devices that transmitted the first response 2802 of FIG. 28 and/or the first response 2902 of FIG. 29, described above in connection with FIGS. 22, 23, 27, 28, 29, and 30, the descriptions of which applying herein.

In embodiments, if the second market response 3302 indicates that the user associated with the user device that transmitted the second market response 3302 planned on purchasing an asset in the future, the computing device 2702 may use that information to determine the reliability of that user for future market queries (e.g. a third market query, a fourth market query, . . . an N market query). For example, the computing device 2702 may generate an additional market query to determine whether the user actually made the purchase that the user stated he or she was planning on making. The additional market query may be sent after a predetermined amount of time. The predetermined amount of time, in embodiments, may be a default amount of time. The predetermined amount of time may be related to, or the same as, the timing given by the user in the future market information 3302B (e.g. if the user stated plans to purchase Asset A within the next quarter, the predetermined amount of time may be one day after the next quarter ends). Once the additional market query is transmitted to one or more users that transmitted future market information 3302B, the one or more users may respond. If, for example, the user's response to the additional market inquiry indicates that the user did not make the purchase as planned, the user may be given an UNRELIABLE reliability rating, which may be used for future market queries. If, for example, the user's response to the additional market inquiry indicates that the user did make the purchase as planned, the user may be given a RELIABLE reliability rating, which may be used for future market queries.

In embodiments, if the computing device 2702 has previously determined the reliability rating of a user, the computing device 2702 may update the reliability rating of the user. The updating of the reliability rating may be similar to the updating of the reliability rating described above in connection with the processes of FIGS. 22 and 23, the descriptions of which applying herein.

At step S2422, the computing device (e.g. computing device 2702) accesses at least the first market response (e.g. first market response 3202) and the second market response (e.g. second market response 3302) provided by each user device of the first group of user devices (e.g. first group of user devices 2708). In embodiments, the computing device 2702 may access the first market response 3202 and/or second market response 3302 by receiving the stored first market response 3202 and/or the stored second market response 3302 from one or more of: internal storage 1808A, external storage 1808B, memory/storage 1815, system memory 1804, and/or storage 1903, to name a few. In embodiments, the computing device 2702 may access and/or receive the stored identification information from one or more of: internal storage 1808A, external storage 1808B, memory/storage 1815, system memory 1804, and/or storage 1903, to name a few.

At step S2424, the computing device (e.g. computing device 2702) calculates a market prediction related to the future market conditions (e.g. the subject of the second market query 3104) based on at least the first market response (e.g. first market response 3202) and the second market response (e.g. second market response 3302). In embodiments, the calculation may be based on the first market response (e.g. first market response 3202) and the second market response (e.g. second market response 3302) provided by the first group of user devices (e.g. first group of user devices 2708). In embodiments, the calculation may be based on the first market response (e.g. first market response 3202) and the second market response (e.g. second market response 3302) provided by the second group of user devices (e.g. the aforementioned group of user devices associated with reliable users).

In embodiments, the calculation may use the future market information 3302B that was transmitted by user devices associated with reliable users (the reliability rating, in embodiments, being based on past market information 3202B that was transmitted by user devices of the first group of user devices 2708). If, for example, the future market information 3302B shows that users are planning on purchasing assets related to the specific market (the market which is the subject of the second market query 3104), the computing device 2702 may determine that the specific market will increase in value. If, for example, the future market information 3302B shows that users are planning on not purchasing and/or selling assets related to the specific market (the market which is the subject of the second market query 3104), the computing device 2702 may determine that the specific market will decrease in value. The specific calculations regarding future market information 3302B may be the calculations currently used in the respective industry of the specific market, using information received in the first market response (e.g. first market response 3202) and the second market response (e.g. second market response 3302).

In embodiments, the calculated market prediction may be based on one or more of the following: the first market response 3202, the second market response 3302, additional historical data, and/or third party information (e.g. additional information from external data sources), to name a few. Additional data (e.g. additional historical data and/or third party information) may enable the computing device 2702 to make more accurate market predictions. The additional historical data may include historical data specific to the market which was queried in the second market query 3104. For example, historical data may include: spot prices, futures prices, previously predicted higher prices, current stock prices, past stock prices, and/or past performance of the market, to name a few. The third party information, in embodiments, may include: additional historical data, earnings reports, price-to-earnings ratios, products associated with the market and whether the products are coming to market soon, tariffs, taxes, legal dispute information, and/or corporate information regarding one or more corporations within the market, to name a few. In embodiments, the additional historical data and/or third party information may be received by the computing device 2702 via network 1910 from one or more third party vendors and/or third party sources. In embodiments, the additional historical data and/or third party information may be already stored on one or more databases of the computing device 2702. In embodiments where the additional information is already stored, the computing device 2702 may regularly (e.g. once a day, week, month, quarter, year, etc.) receive the additional information from third party vendors and/or third party sources and store that information on one or more databases of the computing device 2702.

In embodiments, the computing device 2702 may implement a machine learning technique to calculate the market prediction. In embodiments, the machine learning technique may be based on one or more of the following: the first market response 3202, the second market response 3302, additional historical data, and/or third party information (e.g. additional information from external data sources), to name a few. The machine learning technique, in embodiments, may implement a machine learning algorithm, such as supervised learning algorithms (e.g. classification supervised learning, regression supervised learning), unsupervised learning algorithms (e.g. association unsupervised learning, clustering unsupervised learning, dimensionality reduction unsupervised learning), reinforcement learning algorithms (e.g. through trial and error), semi-supervised algorithms, Naïve Bayes Classifier Algorithm, K Means Clustering Algorithm, Support Vector Machine Algorithm, Apriori Algorithm, Linear Regression, Logistic Regression, Artificial Neural Networks, Random Forests, Decision Trees, and/or Nearest Neighbours, to name a few. In embodiments, the machine learning technique may be a deep learning technique, which may be based on learning data representations as opposed to task-specific algorithms. The deep learning technique may be supervised, semi-supervised, and/or unsupervised. In embodiments, the market prediction calculation may be performed by using a neural network technique, which may include a deep learning neural network technique (e.g. DNN). A DNN may be an artificial neural network with multiple layers between the input (e.g. the first market response 3202 and the second market response 3302) and output (e.g. the market prediction).

In embodiments, the market prediction may be calculated using a quantitative trading strategy. The computing device 2702, in embodiments, may implement the quantitative trading strategy using the first market response 3202, the second market response 3302, additional historical data, and/or third party information (e.g. additional information from external data sources), to name a few. For example, the computing device 2702 may receive and/or obtain third party information from more than one source, which, may include, for example, one or more of the following: social media accounts associated with the users associated with the plurality of user devices 3006, social media accounts associated with the users associated with the first group of user devices 2708, social media accounts associated with users associated with the aforementioned second group of user devices, and/or one or more of market research sources (e.g. Motley Fool, Investopedia, Yahoo! Finance, The Street, Wall Street Journal, MSN Money, Zacks Investment Research, Investor Guide, Seeking Alpha, and/or Online Brokerages (e.g. E*TRADE, Ally Invest, and/or OptionsHouse, to name a few), to name a few).

When implementing the quantitative trading strategy, for example, the computing device 2702 may receive, monitor, and/or obtain market signals (e.g. market technical indicators, news, tweets, and/or other objective and/or subjective correlation(s), to name a few) in the context of the first market response 3202, and/or the second market response 3302. In embodiments, the aforementioned market signals may be determined to be relevant and/or useful to the market prediction by one or more machine learning algorithms being implemented by the computing device 2702 in the context of data received in connection with the first market response 3202, and/or the second market response 3302. In embodiments, as mentioned above, the machine learning algorithms may be implemented by the computing device 2702 to calculate the market prediction.

Before the current invention, machine learning algorithms (which are typically trained by a human analyst) typically used only the aforementioned market signals to calculate market predictions. The human analyst typically sets the relationship between the market signal and a market trading action (e.g. quants). Unfortunately, before the current invention, the human trained machine learning algorithms, on their own, lead to false positives. The technical problem that continued to surface was that, although machine learning algorithms are typically well equipped for interpolation (e.g. filling in missing data between two points or classifying if a data point is more closely associated with one market action and/or market signal or another), the machine learning algorithms are typically bad at extrapolation based on the data. For example, machine learning algorithms that are implemented typically use key words to obtain and/or receive information that may be relevant to a particular market. Continuing the example, the machine learning algorithms, may search for a key word associated with a particular stock. Thus, if the machine learning algorithms are searching for whether Berkshire-Hathaway is being mentioned frequently on social media, the machine learning algorithm may be receiving and/or obtaining hits on the following key words: "Berkshire-Hathaway"; "Berkshire"; "Hathaway"; "Warren Buffett"; "Warren" and "Buffett." This type of key word search has led to false positives, especially when other related key words may be populating social media. For example, when Anne Hathaway was up for an Oscar, the word "Hathaway" was all over social media. The machine learning algorithms took this information with the belief that the public was interested in Berkshire Hathaway, instead of reading the information as irrelevant.

Exemplary embodiments may solve this technical problem with machine learning algorithms by extrapolating data based on the incorporation of data received with the first market response 3202, the second market response 3302, historical data, and/or additional third party information. For example, the first market query 3102 may have inquired as to the reasoning behind the uptick in the key word "Hathaway." A quick reliable response from one or more users would have enabled the computing device 2702 to have avoided the false positive associated with the above "Hathaway" example. In embodiments, the disclosed invention confers an accuracy advantage because today most automated trading and/or high frequency trading focuses on latency (e.g. the speed at which trading companies can send their instructions to the market)—valuing speed over accuracy. The current invention, on the other hand, focuses on both speed and accuracy due to the human-derived indicators based on the data received with the first market response 3202, the second market response 3302. In embodiments, this solution may also apply to the predictions made below in connection with Example 16, the description here applying therein.

In embodiments, once the market prediction is calculated, the computing device 2702 may generate a market prediction message. The market prediction message may include one or more of the following: the market prediction, the amount of users that sent the first market response 3202, the amount of users that sent the second market response 3302, the amount of reliable users, the amount of reliable users that gave information that was used in the market prediction, and/or a recommendation based on the market prediction.

In embodiments, the generated market prediction message may be transmitted, via network 1910, to one or more of: the plurality of user devices 3006, the first group of user devices 2708, the second group of user devices, and/or a group of user devices associated with users who provided information that was used in the market prediction. In embodiments, the market prediction message may not be sent to unreliable users. In those embodiments, a notification message may be generated and transmitted by the computing device 2702 to user devices associated with the unreliable users. The notification may state why the market prediction was not sent to the unreliable user (e.g. because your information was not reliable).

The steps of the process described in connection with FIG. 24, in embodiments, may be rearranged or omitted.

Example 15: Method of Predicting Stock Market Conditions

Figure 25A:
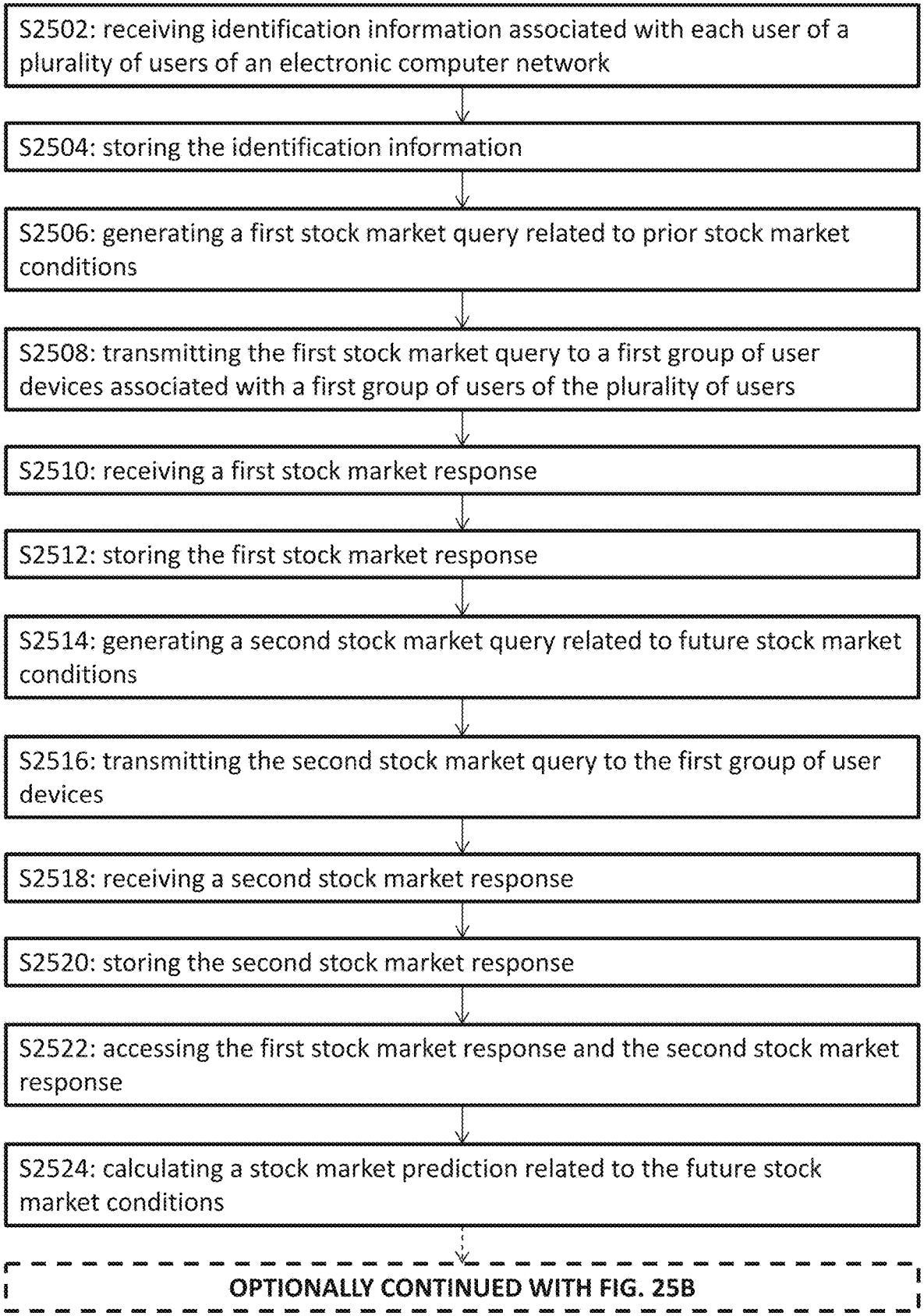
FIGS. 25A and 25B are flow charts of a process for predicting market conditions in accordance with exemplary embodiments of the present invention.

Referring now to FIG. 25A, an illustrative flow chart of a computer-implemented process for predicting stock market conditions based on information provided by one or more users of a plurality of users of an electronic computer network (e.g., network 1910 in FIG. 19) in accordance with an exemplary embodiment of the present invention.

The process of FIG. 25A may begin at step S2502. At step S2502, a computing device (e.g., computer 1802 in FIG. 18, server 1901 in FIG. 19, computing device 2702 in FIGS. 27-42) receives identification information associated with each user of a plurality of users (e.g. the users associated with the plurality of devices 3006) of the electronic computer network (e.g. network 1910). Identification information, in embodiments, may include job history data which may include user specific current and past employment history. In embodiments, identification information may be similar to the identification information described above in connection with FIGS. 22-23, 24 and 27-31, the description of which applying herein. Additionally, step S2502 may be similar to steps S2202, S2302, and S2402 described above in connection with FIGS. 22-24 respectively, the description of which applying herein.

The computing device 2702 may determine a first group of users associated with a first group of user devices (e.g. first group of user devices 2708). For example, if the computing device 2702 is going to send a stock market query regarding a specific stock (e.g. Apple®) once the identification information is received, the computing device 2702 may group users who have a job or who have had a job that is or is related to Apple®. Additionally, for example, the computing device may group users who own and/or are planning to purchase Apple® stock. In embodiments, the computing device 2702 may determine the first group of users in a similar manner as described above in connection with FIGS. 22, 23, 24, 27, 28, and 31 the description of which applying herein.

A stock market, as used herein, may be any asset or assets which an individual and/or corporate entity can invest in. A stock may be any stock of any business or corporation, or a set of stocks grouped together, an indexed metric, and/or any variation or combination thereof.

At step S2504, the computing device (e.g. computing device 2702) stores in one or more databases the identification information. In embodiments, the one or more databases may be: internal storage 1808A, external storage 1808B, memory/storage 1815, system memory 1804, and/or storage 1903, to name a few. The identification information may be stored in accordance with the received identification information. For example, the identification indication may indicate an age of the users. In this example, the computing device 2702 may store the identification information by age range (e.g. 18-25 ages grouped together, 26-40 ages grouped together, etc.). As another example, the identification information may be stored based on whether a user is part of a specific group of users. For example, identification information of the first group of users associated with the first group of user devices 2708 may be stored together. Step S2504 may be similar to step S2204 described above in connection with FIGS. 22, 27, and 28, the description of which applying herein.

At step S2506, the computing device (e.g. computing device 2702) generates a first stock market query (e.g. first stock market query 3402). The purpose of the first stock market query 3402, in embodiments, may be to determine the reliability of one or more users receiving the first stock market query. In embodiments, the response to the first stock market query 3402 may be used by the computing device 2702 to determine whether a future stock market condition predicted by the user should be viewed as reliable information. Thus, in embodiments, the first stock market query 3402, may be related to prior stock market conditions. For example, referring to FIG. 34, the first stock market query 3402 may include a message stating "Has stock from Corporation A risen above 100 dollars a share?"

In embodiments, the prior stock market conditions may include one or more of: past price information for stock (e.g. Stock A), volume information for stock (e.g. Stock B) and/or past price/volume information for a sector, to name a few. In embodiments, Stock A and Stock B may be the same particular stock (e.g. Google® Stock). Past price information may refer to a price that the user has paid for Stock A. Past price information may also refer to general past price information regarding Stock A. Past volume information may refer to an amount of a Stock B that the user has purchased. Past volume information may also refer to general past volume information regarding Stock B. Past price/volume information for a sector may refer to past price information with regards to a sector (i.e. an area of the economy in which businesses and/or corporations share the same or a related product or service and/or an industry or market that shares common operating characteristics). Past price/volume information for a sector may refer to past volume information with regards to a sector.

In embodiments, the first stock market query 3402 may include executable machine readable instructions that allow for the computing device 2702 to determine when one or more user devices of the first group of user devices 2708 received, opened, and/or began to respond to the first stock market query 3402. For example, the first stock market query 3402 may include Message Disposition Notification(s) (MDN).

In embodiments, the first stock market query 3402 may be generated in response to the computing device 2702 determining that an event (e.g. a stock market event) is occurring that is related to a stock. For example, if there is a report of a Stock A dropping in value, the computing device 2702 may generate first stock market query 3402 to determine which users are reliable with respect to the Stock A. The first stock market query 3402 may be specific to the event. For example, first stock market query 3402 may include text that states, "we have received a report that Stock A is dropping in value, do you own Stock A? If so, how much did you pay for the Stock A and how much of Stock A do you own?" Additionally, in embodiments, the first stock market query 3402 may provide a link to the report and/or an excerpt of the report. Furthermore, in embodiments, the first stock market query 3402 may also include user specific information. For example, the first stock market query 3402, may state "Christina, we have received a report that Stock A is dropping in value, do you own? If so, how much did you pay for Stock A and how much of Stock A do you own?" In embodiments, the first stock market query 3402 may include a question regarding information that the computing device 2702 has already confirmed. For example, the computing device 2702 may have already confirmed that Stock A dropped by 5 dollars a share last quarter. In this example, the first stock market query 3402 may state "Christina, do you know how Stock A performed last quarter? Do you own Stock A? If so, how much did you pay for Stock A and how much of Stock A do you own?" The first question, "do you know how Stock A performed last quarter?" may be asked to confirm the reliability of the user. The remaining questions, may be to confirm if the user is involved in the Stock A, which may also be used to determine the reliability of the user. For example, if the user paid too much for Stock A, then the computing device 2702 may determine that the user is not a reliable source of information. As another example, if the user got a good deal for Stock A, then the computing device 2702 may determine that the user is a reliable source of information. As yet another example, if the user owns a lot of Stock A, the computing device 2702 may determine that the user is a reliable source of information. As yet another example, if the user owns very little of Stock A, the computing device 2702 may determine that the user is not a reliable source of information. In embodiments, the computing device 2702 may only review answers of the second stock market query 3404 from users that provide the correct answer to the question, "do you know how Stock A performed last quarter?"

In embodiments, the computing device 2702 may determine and/or store stock market start information. Stock market start information, in embodiments, may refer to the time at which the event (the event which may be the subject of the process described in FIG. 25A) started occurring.

The first stock market query (e.g. first stock market query 3402) may include machine readable instructions to present an inquiry message on the one or more user devices of the first group of user devices 2708. In embodiments, the inquiry message may be related to the prior stock market condition(s) mentioned above.

In embodiments the inquiry message may be related to a past stock market condition(s) that were modified or did not take place. For example, the computing device 2702 may have already confirmed that the Stock A dropped by 5 dollars a share last quarter. In this example, the computing device 2702 may generate a first market query that may state "Do you know how Stock A performed last quarter?" If the user responds correctly, then the user may be determined as a reliable source. If the user responds incorrectly, then the user may be determined as an unreliable source.

Step S2506 may be similar to step S2406 described above in connection with FIG. 24, the description of which applying herein.

Figure 34:
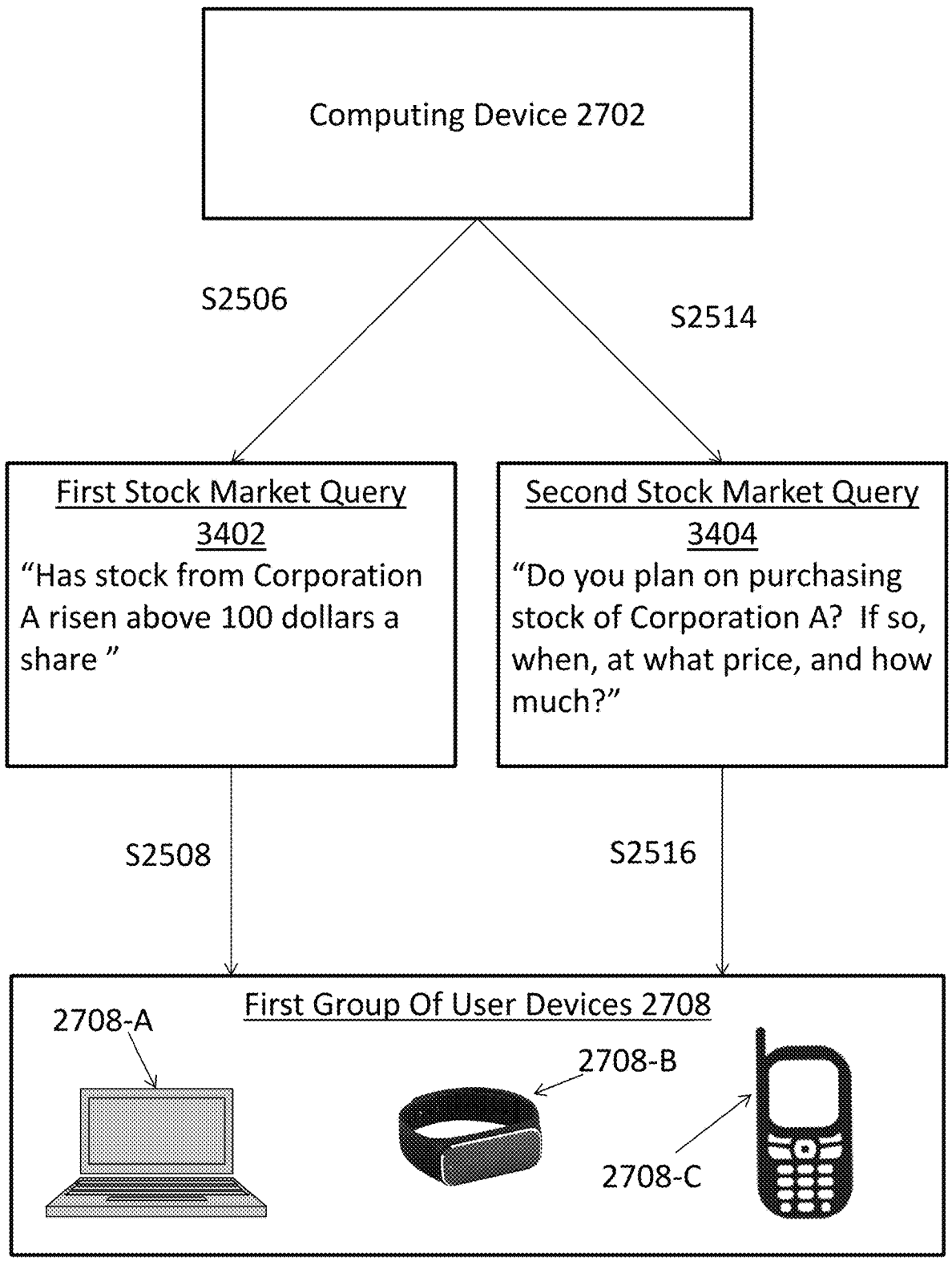
FIG. 34 is an exemplary block diagram illustrating a computing device generating and transmitting a first query and a second query to a first group of users in accordance with exemplary embodiments of the present invention.

Referring back to FIG. 25A, at step S2508, the computing device (e.g. computing device 2702) transmits the first stock market query (e.g. first stock market query 3402) to at least a first group of user devices (e.g. first group of user devices 2708) associated with a first group of users of the plurality of users (e.g. users associated with plurality of user devices 3006) of the electronic computer network (e.g. network 1910). Referring to FIG. 34, computing device 2702, may transmit the first stock market query 3402 to the first group of user devices 2708. In embodiments, the first market query 3102 may be transmitted over network 1910. In embodiments, the first group of user devices 2708 may include by way of example such devices as laptop 2708-A, wearable device 2708-B, and/or cell phone 2708-C. In embodiments, other devices such as desk top computers, tablets, phablets, to name a few, may also be used consistent with the present invention. First group of user devices 2708, in embodiments, may be associated with a first group of users of the plurality of users (e.g. plurality of users 3006 described in connection with FIG. 30). The step S2508 may be similar to step S2208 described above in connection with FIGS. 22 and 27, the description of which applying herein.

Figure 35:
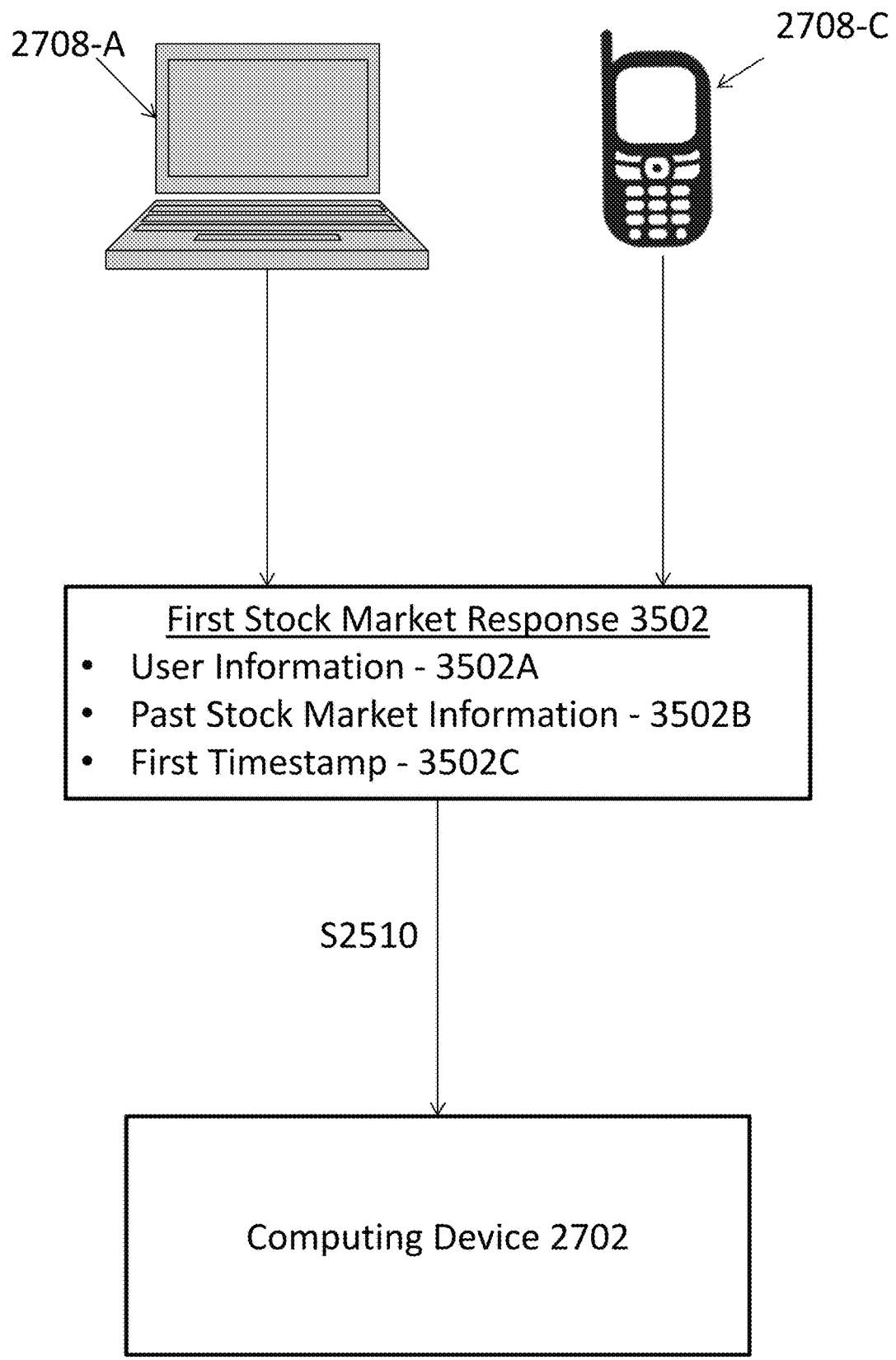
FIG. 35 is an exemplary block diagram illustrating a computing device receiving a first response from a plurality of user devices in accordance with exemplary embodiments of the present invention.

At step S2510, the computing device (e.g. computing device 2702) may receive a first stock market response (e.g. first stock market response 3502). The first stock market response, in embodiments, may be received from one or more user devices of the first group of user devices (e.g. first group of user devices 2708). Referring to FIG. 35, in embodiments, the computing device 2702 may receive the first stock market response 3502 from a first user associated with the laptop 2708-A and a second user associated with the cellphone 2708-C. The first stock market response 3502, in embodiments, may include multiple responses specific to each user. For example, the first stock market response 3502 may include a specific first user stock market response and a specific second user stock market response. While not shown in FIG. 35, continuing the example, the first user stock market response may be received by the computing device 2702 at a different time than the time at which the computing device 2702 receives the second user stock market response. While it is clear in the art that messages from different electronic devices do not need to be received at the same time, for brevity and clarity purposes, only one first stock market response (first stock market response 3502) is shown in FIG. 35.

In embodiments, the first stock market response 3502 may include one or more of the following: (i) user information 3502A unique to the respective user associated with the respective user device providing the first market response; (ii) past stock market information 3502B related to the prior stock market conditions; (iii) a first timestamp 3502C; (iv) location information associated with a location of the respective user device associated with the respective user; (v) proximity information; (vi) audio data associated with the prior stock market conditions and/or observations of the user; (vii) image data associated with the prior stock market conditions and/or observations of a user; and/or (viii) video data associated with the prior stock market conditions and/or observations of a user, to name a few.

User information 3502A may be similar to user information 3202A, user information 2802A and user information 2902A described above in connection with FIGS. 22, 23, 24, 27, 28, 29 and 32 the description of which applying herein. User information 3502A, in embodiments, may also include one or more of the following: job history data which may include user specific current and past employment history (similar to the job history data described above in connection with the identification information received in step S2502), a user account associated with a user; an e-mail address associated with a user; a name associated with a user; biometric data associated with a user; gender information of the user associated with the user device; age of the user associated with the user device; personal data of a user associated with the user device, which is either volunteered by the user or received via access that is consented to by the user; location information associated with the user device; identification information related to a user device associated with a user of the plurality of users (e.g. metadata, device type, etc., to name a few), and/or electronic identification (e.g. electronic identification card, electronic signature, etc., to name a few), to name a few. Furthermore, as described above in connection with FIGS. 22, 23, 24, 27, 28, 29, and 32, user information 3502A may include connection information. Connection information, as described above, may enable the computing device 2702 to accurately set an upper and/or lower time lag limit which may be used for authentication of the first stock market response 3502 and/or a determining a reliability rating of a user associated with the laptop 2708-A and/or the reliability rating of a user associated with the cellphone 2708-C (e.g. the user devices of the first group of user devices 2708 which sent the first stock market response 3502).

Past stock market information 3502B may be information received from a user device (e.g. cellphone 2708-C) that is responsive to the first stock market query 3402. For example, past market information 3502B may be responsive to a query in which the computing device 2702 may have already confirmed the answer. As with the example stated above, the computing device 2702 may have confirmed that Stock A dropped by 5 dollars a share last quarter. In this example, the first stock market query 3402 may state "Bob, do you know how Stock A performed last quarter? Do you own Stock A? If so, how much did you pay for Stock A and how much of Stock A do you own?" The first question, "do you know how Stock A performed last quarter?" may be asked to confirm the reliability of the user. The remaining questions, may be to confirm if the user is involved in Stock A and if the user is involved in Stock A, how have their decisions been, which may also be used to determine the reliability of the user. In embodiments, continuing the example, the past stock market information 3502B contained in the first stock market response 3502 may be responsive to "Bob, do you know how Stock A performed last quarter? Do you own Stock A? If so, how much did you pay for Stock A and how much of Stock A do you own?" The first stock market response 3502 from the laptop 2708-A and/or the cellphone 2708-C, may include information that is received via message (e.g. "Yes, the Stock A dropped by five dollars a share last quarter. I own 50 shares of Stock A.") and/or information that is received via answers to a prompt (e.g. a prompt that asks "Bob, do you know how Stock A performed last quarter?—where the prompt has a few pre-selected answers—"(a) Up 3 dollars a share; (b) Up 5 dollars a share; (c) I don't know" and the user selects one or more of the options presented).

First timestamp 3502C may be similar to first timestamp 3202C, timestamp 2802D, and timestamp 2902D described above in connection with FIGS. 22, 23, 24, 27, 28, 29, 30, 31, and 32, the description of which applying herein. As described above, first timestamp 3502C may enable the computing device 2702 to calculate a time lag associated with the first stock market response 3502. To compute the time lag, the first timestamp 3502C may include multiple time stamps (e.g. a time at which the first stock market query 3402 was sent, a time at which the first stock market query 3402 was opened, a time at which the first stock market response 3502 was started, a time at which the first stock market response 3502 was transmitted, and/or a time at which the first stock market response 3502 was received, to name a few). The multiple times within the first timestamp 3502C may be used to compute the time lag. For example, the computing device 2702 may determine a time lag by finding the amount of time between a first time when the first stock market query 3402 was opened by the laptop 2708-A and a second time when the first stock market response 3502 was transmitted by the laptop 2708-A to the computing device 2702. As another example, in embodiments, the computed time lag may be the time difference between a first time which is not associated with the first time stamp 3502C (e.g. a time of a particular stock market event element of the prior stock market conditions) and a second time which is associated with the first time stamp 3502C (e.g. the time at which the first stock market response 3502 was received by the computing device 2702). The computed time lag, in embodiments and as mentioned above, may be compared to upper and/or lower time lag limits. The comparison of the computed time lag to the upper and/or lower time lag limits, as mentioned above, may be used for authentication of the first stock market response 3502 and/or a determining a reliability rating of a user associated with the laptop 2708-A and/or the cellphone 2708-C (e.g. the user device(s) of the first group of user devices 2708 which sent the first stock market response 3502). Moreover, as mentioned above, the upper and/or lower time lag limits (thresholds) may be predetermined. The predetermined upper and/or lower time lag limits may be determined in the context of the previously mentioned connection information (e.g. if the connection is poor, the lower and/or upper limits may be increased to account for the poor connection, if the connection is good, the lower and/or upper limits may be decreased to account for the good connection, etc.).

Location information as described herein, may be similar to location information 2802C and location information 2902C described above in connection with FIGS. 22, 23, 27, and 28, the description of which applying herein. As described above, location information may be used for determining the authenticity of the first stock market response 3502 and/or determining a reliability rating of a user associated with the laptop 2708-A and/or the cellphone 2708-C (e.g. the user device(s) of the first group of user devices 2708 which transmitted the first stock market response 3502).

Proximity information, as described herein, may be similar to the proximity information described above in connection with FIGS. 22, 23, 27, and 28, the description of which applying herein. As described above, proximity information may be used for determining the authenticity of the first stock market response 3502 and/or determining a reliability rating of a user associated with the laptop 2708-A and/or the cellphone 2708-C (e.g. the user device(s) of the first group of user devices 2708 which transmitted the first stock market response 3502).

Audio data, as described herein, may be similar to the audio data described above in connection with FIGS. 22, 23, 27, and 28, the description of which applying herein. As described above, audio data may be used for determining the authenticity of the first stock market response 3502 and/or determining a reliability rating of a user associated with the laptop 2708-A and/or the cellphone 2708-C (e.g. the user device(s) of the first group of user devices 2708 which transmitted the first stock market response 3502).

Image data, as described herein, may be similar to the image data described above in connection with FIGS. 22, 23, 27, and 28, the description of which applying herein. As described above, image data may be used for determining the authenticity of the first stock market response 3502 and/or determining a reliability rating of a user associated with the laptop 2708-A and/or the cellphone 2708-C (e.g. the user device(s) of the first group of user devices 2708 which transmitted the first stock market response 3502).

Video data, as described herein, may be similar to the video data described above in connection with FIGS. 22, 23, 27, and 28, the description of which applying herein. As described above, video data may be used for determining the authenticity of the first stock market response 3502 and/or determining a reliability rating of a user associated with the laptop 2708-A and/or the cellphone 2708-C (e.g. the user device(s) of the first group of user devices 2708 which transmitted the first stock market response 3502).

In embodiments, the computing device 2702 may use information within first stock market response 3502, (including e.g. user information 3502A, past stock market information 3502B, first timestamp 3502C, location information, proximity information, audio data, and/or image data, to name a few) to determine reliability and/or filter out unreliable responses. For example, the computing device 2702 may receive the past stock market information 3502B of first stock market response 3502 and the first timestamp 3502C of first stock market response 3502. In this example, the first timestamp 3502C may include the began drafting first stock market response time of the first stock market query 3402 and the sent time of the first market response 3502. In embodiments, the computing device 2702 may compare the began drafting first market response time and the sent time of the first market response 3502 to calculate a time lag. This time lag may be used to determine the reliability of the first stock market response 3502. In embodiments, this time lag may be viewed in the context of the past stock market information 3502B. If, for example, the time lag is high, and the amount of information contained within the past stock market information 3502B is high, the computing device 2702 may determine that the first stock market response 3502 is reliable and/or has a higher probability of being reliable because the high lag time may be due to the amount of information input by the user. If, for example, the time lag is high and the amount of information contained within the past stock market information 3502B is low, the computing device 2702 may determine that the first stock market response 3502 is unreliable and/or has a higher probability of being unreliable because the amount of content sent by the user does not reflect the amount of time spent crafting the first stock market response 3502. If, for example, the time lag is low and the amount of information contained within the past stock market information 3502B is high, the computing device 2702 may determine that the first stock market response 3502 is unreliable and/or has a higher probability of being unreliable because a user may have not been able to send a response with the high amount of information within the amount of time.

Referring to FIG. 25A at step S2512, the computing device (e.g. computing device 2702) stores in the one or more databases the first stock market response (e.g. first stock market response 3502) of each user device of the plurality of user devices of the first group of user devices (e.g. first group of user devices 2708) from which the first stock market response (e.g. first stock market response 3502) was received. In embodiments, the one or more databases, as mentioned above with respect to step S2504, may be: internal storage 1808A, external storage 1808B, memory/storage 1815, system memory 1804, and/or storage 1903, to name a few. Step S2512 may be similar to step S2212 described above in connection with FIGS. 22, 27, and 28, the description of which applying herein.

In embodiments, once the computing device 2702 receives and/or stores the first stock market response 3502, the computing device 2702 may determine the authenticity of the first stock market response 3502. The process of determining the authenticity of the first stock market response 3502 may be similar to the process of authenticating the first response 2802 of FIG. 28 and/or the first response 2902 of FIG. 29, described above in connection with FIGS. 22, 23, 27, 28, 29, and 30, the descriptions of which applying herein.

In embodiments, once the computing device 2702 receives and/or stores the first stock market response 3502, the computing device 2702 may determine the reliability of the plurality of users associated with the electronic devices (e.g. laptop 2708-A, cellphone 2708-C) that transmitted the first stock market response 3502. The process of determining the reliability of the plurality of users associated with the electronic devices (e.g. laptop 2708-A, cellphone 2708-C) that transmitted the first stock market response 3502 may be similar to the process of determining the reliability of the users associated with electronic devices that transmitted the first response 2802 of FIG. 28 and/or the first response 2902 of FIG. 29, described above in connection with FIGS. 22, 23, 27, 28, 29, and 30, the descriptions of which applying herein.

At step S2514, the computing device (e.g. computing device 2702) generates a second stock market query (e.g. second stock market query 3404). The purpose of the second stock market query, in embodiments, may be to predict future stock market conditions. In embodiments, the second stock market query may be related to future market conditions. For example, referring to FIG. 34, the second stock market query 3404 may include a message stating "Do you plan on purchasing stock of Corporation A? If so, when, at what price, and how much?" In embodiments, the second stock market query 3404 may include a query relating to future stock market conditions of the stock that was the subject of the past stock market conditions of the first market query 3402. Thus, the computing device 2702 may use the first market query 3402 to determine whether a user is reliable in regard to a specific stock, then use the second stock market query 3404 to ask relevant questions regarding the specific stock, the questions, in embodiments, being directed at the reliable users in regard to the specific stock.

In embodiments, second stock market query 3404 may include a query regarding future market conditions, which may include one or more of: future stock price information, future stock volume information, future plans of purchasing stock, timing of the future plans to purchase stock, future stock market predictions and/or reasons regarding the decisions and/or predictions related to the future stock market conditions, to name a few. Future stock price information may refer to a price that the user will pay for Stock A. Future volume information may refer to an amount of Stock B the user will purchase. The future plans of purchasing may refer to whether the user will purchase Stock C and/or why (e.g. under what conditions, e.g. price/volume thresholds, news, or other events). Timing of the future plans of purchasing may refer to when the user is planning on purchasing Stock D. Future market predictions may refer to a prediction of how a Stock E will perform over a certain period of time. In embodiments, Stock A, Stock B, Stock C, Stock D, and/or Stock E may be the same stock. In embodiments, the reasons regarding the decisions and/or predictions related to the future stock market conditions may refer to a query that allows the user to give his or her reasons for their plans to or not to purchase a stock and/or his or her reasons for their predictions in the stock market.

In embodiments, the second stock market query 3404 may include executable machine readable instructions that allow for the computing device 2702 to determine when one or more user devices of the first group of user devices 2708 received, opened, and/or began to respond to the second stock market query 3404. For example, the second stock market query 3404 may include Message Disposition Notification(s) (MDN).

In embodiments, the second stock market query 3404 may be generated in response to the computing device 2702 determining that an event (e.g. a stock market event) is occurring that is related to a stock. For example, if there is a report of a Stock A decreasing in value, the computing device 2702 may generate the second stock market query 3404 to determine if reliable users associated with the first group of user devices 2708 believes the Stock A will continue to decrease in value. The second stock market query 3404 may be specific to the stock market event related to the market. For example, second stock market query 3404 may include text that states, "we have received a report that Stock A is decreasing in value, do you believe the value of Stock A will continue to fall?" Additionally, in embodiments, the second stock market query 3404 may provide a link to the report and/or an excerpt of the report. Furthermore, in embodiments, the second stock market query 3404 may also include user specific information. For example, the second stock market query 3404, may state "Joe, we have received a report that Stock A is decreasing in value, as someone who has purchased Stock A, do you believe the value of Stock A will continue to fall?" In embodiments, the second stock market query 3404 may include a question regarding information that the computing device 2702 has already confirmed, similar to the first stock market query 3402 described above, the same description applying herein.

In embodiments, the computing device 2702 may determine and/or store stock market start information. Stock market start information, in embodiments, may refer to the time at which the stock market event (the event which may be the subject of the process described in FIG. 25A) started occurring.

The second stock market query (e.g. second stock market query 3404) may include machine readable instructions to present an inquiry message on the one or more user devices of the first group of user devices 2708. In embodiments, the inquiry message may be related to the future stock market condition(s) mentioned above.

In embodiments the inquiry message of the second stock market query 3404 may be related to stock market condition(s) that were modified or did not take place. This may be similar to the conditions that were modified or did not take place that may be sent with the first market stock query 3402, the description of which applying herein.

At step S2516, the computing device (e.g. computing device 2702) transmits the second stock market query (e.g. second stock market query 3404) via a network (e.g. network 1910). In embodiments, the second stock market query may be transmitted to the first group of devices (e.g. first group of devices 2708). In embodiments the second stock market query may be transmitted to a second group of user devices. The second group of user devices, in embodiments, may be user devices associated with one or more of the following: authenticated users who transmitted the first stock market responses 3502 (the authentication process, in embodiments, being performed by the computing device 2702B), and/or users who transmitted the first stock market responses 3502 where the computing device 2702 has given the users a reliability rating of RELIABLE (or given a reliability rating which exceeds a predetermined threshold). In embodiments, the second stock market query may be transmitted to a plurality of user devices (e.g. plurality of user devices 3006) associated with the plurality of users of an electronic computer network (e.g. network 1910).

Referring to FIG. 34, computing device 2702, may transmit the second stock market query 3404 to the first group of user devices 2708. In embodiments, the second stock market query 3404 may be transmitted over network 1910. In embodiments, the first group of user devices 2708 may include one or more of: laptop 2708-A, wearable device 2708-B, and/or cell phone 2708-C. First group of user devices 2708, in embodiments, may be associated with a first group of users of the plurality of users (e.g. plurality of user devices 3006 described in connection with FIG. 30). The step S2516 may be similar to step S2208 described above in connection with FIGS. 22 and 27, the description of which applying herein.

Figure 36:
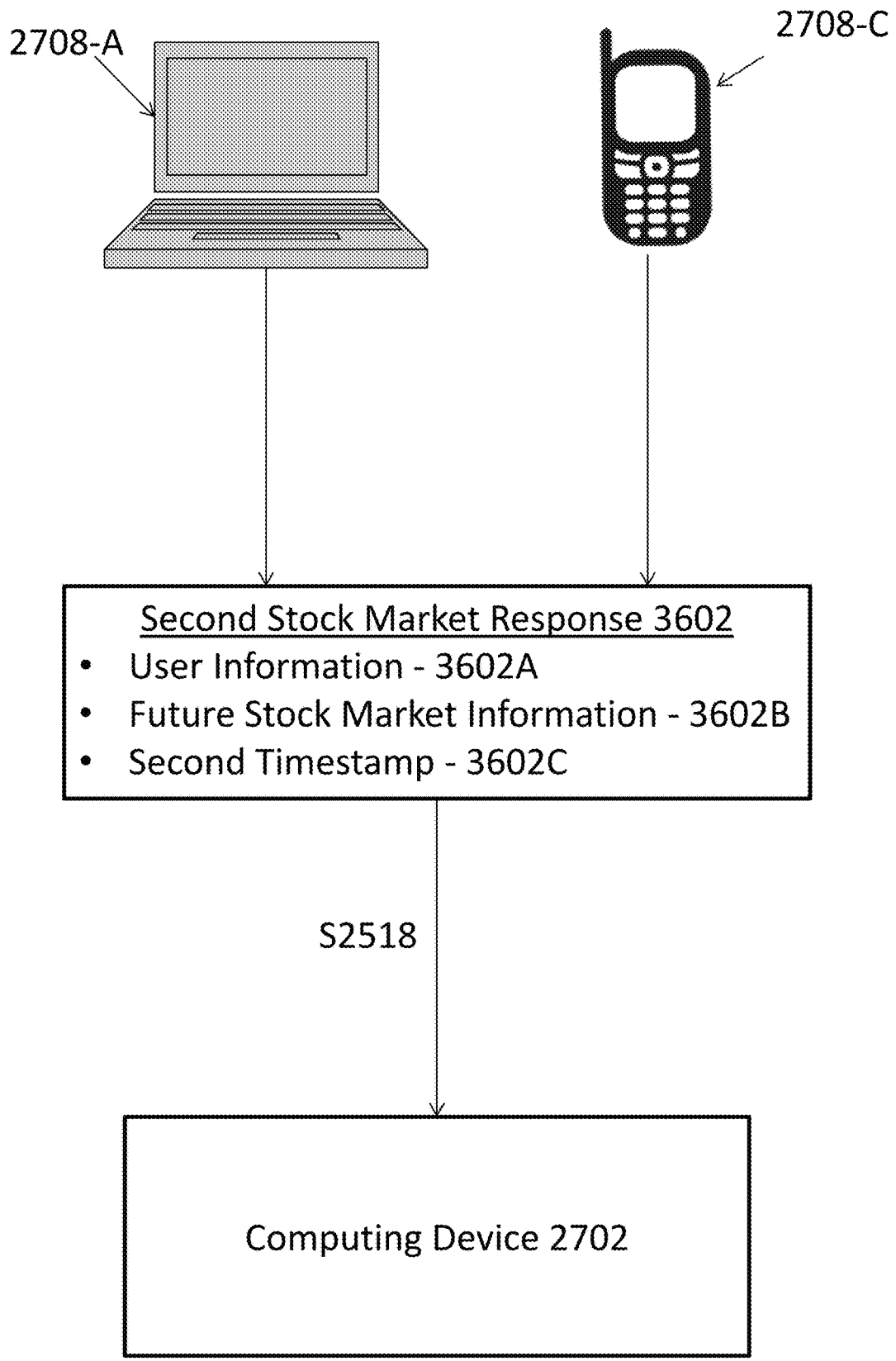
FIG. 36 is an exemplary block diagram illustrating a computing device receiving a second response from a plurality of user devices in accordance with exemplary embodiments of the present invention.

Referring back to FIG. 25A, at step S2518, the computing device (e.g. computing device 2702) may receive a second stock market response (e.g. second stock market response 3602). The second stock market response, in embodiments, may be received from one or more user devices of the first group of user devices (e.g. first group of user devices 2708). In embodiments, the second stock market response may be received from one or more user devices of the aforementioned (with regards to the process of FIG. 25A) second group of user devices. Referring to FIG. 36, the computing device 2702 may receive the second stock market response 3602 from a first user associated with the laptop 2708-A and a second user associated with the cellphone 2708-C. The second stock market response 3602, in embodiments, may include multiple responses specific to each user. For example, the second stock market response 3602 may include a specific first user stock market response and a specific second user stock market response. While not shown in FIG. 36, continuing the example, the first user stock market response may be received by the computing device 2702 at a different time than the time at which the computing device 2702 receives the second user stock market response. While it is clear in the art that messages from different electronic devices do not need to be received at the same time, for brevity and clarity purposes, only one second stock market response (second stock market response 3602) is shown in FIG. 36.

In embodiments, the second stock market response 3602 may include one or more of the following: (i) user information 3602A unique to the respective user associated with the respective user device providing the second market response; (ii) future stock market information 3602B related to a prediction for the future stock market conditions; (iii) a second timestamp 3602C; (iv) location information associated with a location of the respective user device associated with the respective user; (v) proximity information; (vi) audio data associated with the future stock market conditions and/or observations of the user; (vii) image data associated with the future stock market conditions and/or observations of a user; and/or (viii) video data associated with the future stock market conditions and/or observations of a user, to name a few.

User information 3602A may be similar to user information 3502A, user information 3202A, user information 2802A, and user information 2902A described above in connection with FIGS. 22-35, the descriptions of which applying herein.

Future stock market information 3602B may be information received from a user device (e.g. cellphone 2708-C) that is responsive to the second stock market query 3404. For example, future stock market information 3602B may be responsive to a query related to a future stock market condition that the computing device 2702 is attempting to predict. For example, in response to a market query that states "John, we have received a report that Stock A is increasing in value, as someone who buys and sells Stock A, do you believe Stock A will continue to perform well?" the future stock market information 3602B may include information that answers the question of "do you believe Stock A will continue to perform well?" For example, the future stock market information 3602B may include text data representing a message that states: "No, Stock A will not continue to perform well because of their recent earnings statements." As another example, in response to a market query that states "Do you plan on purchasing Stock A" the future stock market information 3602B may include information that answers the question "Do you plan on purchasing Stock A?" For example, the future stock market information 3602B may include text data representing a message that states: "No, I do not plan on purchasing Stock A." As yet another example, in response to a query that states "How high do you believe the price of Stock A will climb, the future stock market information 3602B may include text data representing a message that states: "I believe Stock A will climb to 101 dollars a share then fall in price." In embodiments, information from one or more users regarding whether a purchase is to be made of a stock may enable the computing device 2702 to make a prediction on the future performance of the specific stock. Additionally, in order to gather more information relating to potential purchases of a stock, the query and/or future stock market information 3602B may include information regarding timing, prices, volume, and/or reasoning, to name a few.

Second timestamp 3602C may be similar to first timestamp 3502C, timestamp 2802D, and timestamp 2902D described above in connection with FIGS. 22-35, the descriptions of which applying herein.

As described above, the second timestamp 3602C may enable the computing device 2702 to calculate a time lag associated with the second stock market response 3602. To compute the time lag, the second timestamp 3602C may include multiple time stamps (e.g. a time at which the second stock market query 3404 was sent, a time at which the second stock market query 3404 was opened, a time at which the second stock market response 3602 was started, a time at which the second stock market response 3602 was transmitted, and/or a time at which the second stock market response 3602 was received, to name a few). The multiple times within the second timestamp 3602C may be used to compute the time lag. For example, the computing device 2702 may determine a time lag by finding the amount of time between a first time when the second stock market query 3404 was opened by the cellphone 2708-C and a second time when the second stock market response 3602 was transmitted by the cellphone 2708-C to the computing device 2702. As another example, in embodiments, the computed time lag may be the time difference between a first time which is not associated with the second time stamp 3602C (e.g. a time of a particular stock market event element of the future stock market conditions) and a second time which is associated with the second timestamp 3602C (e.g. the time at which the second stock market response 3602 was received by the computing device 2702). The computed time lag, in embodiments and as mentioned above, may be compared to upper and/or lower time lag limits. The comparison of the computed time lag to the upper and/or lower time lag limits, as mentioned above, may be used for authentication of the second stock market response 3602 and/or a determining a reliability rating of a user associated with the laptop 2708-A and/or the cellphone 2708-C (e.g. the user device(s) of the first group of user devices 2708 which sent the second stock market response 3602). Moreover, as mentioned above, the upper and/or lower time lag limits (thresholds) may be predetermined. The predetermined upper and/or lower time lag limits may be determined in the context of the previously mentioned connection information (e.g. if the connection is poor, the lower and/or upper limits may be increased to account for the poor connection, if the connection is good, the lower and/or upper limits may be decreased to account for the good connection, etc.).

Location information as described herein, may be similar to location information 2802C and location information 2902C described above in connection with FIGS. 22, 23, 27, and 28, the description of which applying herein. As described above, location information may be used for determining the authenticity of the second stock market response 3602 and/or determining a reliability rating of a user associated with the laptop 2708-A and/or the cellphone 2708-C (e.g. the user device(s) of the first group of user devices 2708 which transmitted the second stock market response 3602).

Proximity information, as described herein, may be similar to the proximity information described above in connection with FIGS. 22, 23, 27, and 28, the description of which applying herein. As described above, proximity information may be used for determining the authenticity of the second stock market response 3602 and/or determining a reliability rating of a user associated with the laptop 2708-A and/or the cellphone 2708-C (e.g. the user device(s) of the first group of user devices 2708 which transmitted the second stock market response 3602).

Audio data, as described herein, may be similar to the audio data described above in connection with FIGS. 22, 23, 27, and 28, the description of which applying herein. As described above, audio data may be used for determining the authenticity of the second stock market response 3602 and/or determining a reliability rating of a user associated with the laptop 2708-A and/or the cellphone 2708-C (e.g. the user device(s) of the first group of user devices 2708 which transmitted the second stock market response 3602).

Image data, as described herein, may be similar to the image data described above in connection with FIGS. 22, 23, 27, and 28, the description of which applying herein. As described above, image data may be used for determining the authenticity of the second stock market response 3602 and/or determining a reliability rating of a user associated with the laptop 2708-A and/or the cellphone 2708-C (e.g. the user device(s) of the first group of user devices 2708 which transmitted the second stock market response 3602).

Video data, as described herein, may be similar to the video data described above in connection with FIGS. 22, 23, 27, and 28, the description of which applying herein. As described above, video data may be used for determining the authenticity of the second stock market response 3602 and/or determining a reliability rating of a user associated with the laptop 2708-A and/or the cellphone 2708-C (e.g. the user device(s) of the first group of user devices 2708 which transmitted the second stock market response 3602).

In embodiments, the computing device 2702 may use information within second stock market response 3602, (including e.g. user information 3602A, future stock market information 3602B, second timestamp 3602C, location information, proximity information, audio data, and/or image data, to name a few) to determine reliability of a user and/or filter out unreliable responses. The process of determining the reliability of a user and/or filtering out unreliable responses may be similar to the processes described above in connection with FIGS. 22, 23, 24, 27, 28, 29, and 32, the descriptions of which applying herein.

Referring to FIG. 25A, at step S2520, the computing device (e.g. computing device 2702) stores in the one or more databases the second stock market response (e.g. second stock market response 3602) of each user device of the plurality of user devices from which the second market response was received (e.g. first group of user devices 2708). In embodiments, the one or more databases, as mentioned above with respect to step S2512, may be: internal storage 1808A, external storage 1808B, memory/storage 1815, system memory 1804, and/or storage 1903, to name a few. Step S2520 may be similar to step S2212 described above in connection with FIGS. 22, 27, and 28, the description of which applying herein.

In embodiments, once the computing device 2702 receives and/or stores the first stock market response 3502 and/or the second stock market response 3602, the computing device 2702 may determine the authenticity of the first stock market response 3502 and/or the second stock market response 3602. The process of determining the authenticity of the first stock market response 3502 and/or the second stock market response 3602 may be similar to the process of authenticating the first response 2802 of FIG. 28 and/or the first response 2902 of FIG. 29, described above in connection with FIGS. 22, 23, 27, 28, 29, and 30, the descriptions of which applying herein.

In embodiments, once the computing device 2702 receives and/or stores the first stock market response 3502 and/or the second stock market response 3602, the computing device 2702 may determine the reliability of the plurality of users associated with the electronic devices (e.g. laptop 2708-A, cellphone 2708-C) that transmitted the first stock market response 3502 and/or the second stock market response 3602. The process of determining the reliability of the plurality of users associated with the electronic devices (e.g. laptop 2708-A, cellphone 2708-C) that transmitted the first stock market response 3502 and/or the second stock market response 3602 may be similar to the process of determining the reliability of the users associated with electronic devices that transmitted the first response 2802 of FIG. 28 and/or the first response 2902 of FIG. 29, described above in connection with FIGS. 22, 23, 27, 28, 29, and 30, the descriptions of which applying herein.

In embodiments, if the second stock market response 3602 indicates that the user associated with the user device that transmitted the second stock market response 3602 planned on purchasing a stock in the future, the computing device 2702 may use that information to determine the reliability of that user for future stock market queries (e.g. a third market query, a fourth market query, . . . , an N market query). For example, the computing device 2702 may generate an additional stock market query to determine whether the user actually made the purchase that the user stated he or she was planning on making. The additional market query may be sent after a predetermined amount of time. The predetermined amount of time, in embodiments, may be a default amount of time. The predetermined amount of time may be related to, or the same as, the timing given by the user in the future stock market information 3602B (e.g. if the user stated plans to purchase Stock A within the next quarter, the predetermined amount of time may be one day after the next quarter ends). Once the additional market query is transmitted to one or more users that transmitted future stock market information 3602B, the one or more users may respond via one or more electronic devices associated with the one or more users. If, for example, the user's response to the additional market inquiry indicates that the user did not make the purchase as planned, the user may be given an UNRELIABLE reliability rating, which may be used for future stock market queries. If, for example, the user's response to the additional market inquiry indicates that the user did make the purchase as planned, the user may be given a RELIABLE reliability rating, which may be used for future stock market queries.

In embodiments, if the computing device 2702 has previously determined the reliability rating of a user, the computing device 2702 may update the reliability rating of the user based on the reliability rating associated with the first stock market response 3502, the second stock market response 3602, and/or any additional responses to additional stock market queries. The updating of the reliability rating may be similar to the updating of the reliability rating described above in connection with the processes of FIGS. 22 and 23, the descriptions of which applying herein.

At step S2522, the computing device accesses at least the first stock market response and the second stock market response provided by each user device of the first group of user devices, the computing device (e.g. computing device 2702) accesses at least the first stock market response (e.g. first stock market response 3502) and the second stock market response (e.g. second stock market response 3602) provided by each user device of the first group of user devices (e.g. first group of user devices 2708). In embodiments, the computing device 2702 may access the first stock market response 3502 and/or the second stock market response 3602 by receiving the stored first stock market response 3502 and/or the stored second stock market response 3602 from one or more of: internal storage 1808A, external storage 1808B, memory/storage 1815, system memory 1804, and/or storage 1903, to name a few. In embodiments, the computing device 2702 may access and/or receive the stored identification information from one or more of: internal storage 1808A, external storage 1808B, memory/storage 1815, system memory 1804, and/or storage 1903, to name a few.

At step S2524, the computing device (e.g. computing device 2702) calculates a stock market prediction related to the future stock market conditions based on at least the first stock market response and second stock market response provided by the first group of user devices. In embodiments, the stock market prediction may be based on one or more of the following: the first stock market response (e.g. first stock market response 3502) the second stock market response (e.g. second stock market response 3602), additional historical data, and/or third party information (e.g. additional information from external data sources), to name a few. In embodiments, the calculation may be based on the first stock market response (e.g. first stock market response 3502) and the second stock market response (e.g. second stock market response 3602) provided by the first group of user devices (e.g. first group of user devices 2708). In embodiments, the calculation may be based on the first stock market response (e.g. first stock market response 3502) and the second stock market response (e.g. second stock market response 3602) provided by the second group of user devices (e.g. the aforementioned group of user devices associated with reliable users).

In embodiments, the calculation may use the future stock market information 3602B that was transmitted by user devices associated with reliable users (the reliability rating, in embodiments, being based on past stock market information 3502B that was transmitted by user devices of the first group of user devices 2708). If, for example, the future stock market information 3602B shows that users are planning on purchasing Stock A (the stock which is the subject of the second stock market query 3404), the computing device 2702 may determine that Stock A will increase in value. If, for example, the future stock market information 3602B shows that users are planning on not purchasing and/or selling Stock A, the computing device 2702 may determine that Stock A will decrease in value. The specific calculations regarding future stock market information 3602B may be the calculations currently used in the respective industry of the stock associated with the stock market prediction, using information received in the first stock market response (e.g. first stock market response 3502) and the second stock market response (e.g. second stock market response 3602).

In embodiments, as mentioned above, the calculated stock market prediction may be based on one or more of the following: the first stock market response 3502, the second stock market response 3602, additional historical data, and/or third party information (e.g. additional information from external data sources), to name a few. Additional data (e.g. additional historical data and/or third party information) may enable the computing device 2702 to make more accurate stock market predictions. The additional historical data may include historical data specific to the industry of the stock and/or specific to the stock which was queried in the second stock market query 3404. For example, historical data may include: previous open stock prices, previous high stock prices, previous low stock prices, spot prices, futures prices, previously predicted higher prices, current stock prices, past stock prices, past volumes and/or past performance of the market related to the stock, to name a few. The third party information, in embodiments, may include: additional historical data, earnings reports, price-to-earnings ratios, products associated with the market and whether the products are coming to market soon, tariffs, taxes, legal dispute information, and/or corporate information regarding one or more corporations associated with the stock and/or the industry related to the stock, to name a few. In embodiments, the additional historical data and/or third party information may be received by the computing device 2702 via network 1910 from one or more third party vendors and/or third party sources. In embodiments, the additional historical data and/or third party information may be already stored on one or more databases of the computing device 2702. In embodiments where the additional information is already stored, the computing device 2702 may regularly (e.g. once a day, week, month, quarter, year, etc.) receive the additional information from third party vendors and/or third party sources and store that information on one or more databases of the computing device 2702.

In embodiments, the computing device 2702 may implement a machine learning technique to calculate the stock market prediction. In embodiments, the machine learning technique may be based on one or more of the following: the first stock market response 3502, the second stock market response 3602, additional historical data, and/or third party information (e.g. additional information from external data sources), to name a few. The machine learning technique, in embodiments, may implement a machine learning algorithm, such as supervised learning algorithms (e.g. classification supervised learning, regression supervised learning), unsupervised learning algorithms (e.g. association unsupervised learning, clustering unsupervised learning, dimensionality reduction unsupervised learning), reinforcement learning algorithms (e.g. through trial and error), semi-supervised algorithms, Naïve Bayes Classifier Algorithm, K Means Clustering Algorithm, Support Vector Machine Algorithm, Apriori Algorithm, Linear Regression, Logistic Regression, Artificial Neural Networks, Random Forests, Decision Trees, and/or Nearest Neighbors, to name a few. In embodiments, the machine learning technique may be a deep learning technique, which may be based on learning data representations as opposed to task-specific algorithms. The deep learning technique may be supervised, semi-supervised, and/or unsupervised. In embodiments, the stock market prediction calculation may be performed by using a neural network technique, which may include a deep learning neural network technique (e.g. DNN). A DNN may be an artificial neural network with multiple layers between the input (e.g. the first stock market response 3402 and the second stock market response 3602) and output (e.g. the stock market prediction).

In embodiments, once the stock market prediction is calculated, the computing device 2702 may generate a stock market prediction message. The stock market prediction message may include one or more of the following: the stock market prediction, the amount of users that sent the first stock market response 3502, the amount of users that sent the second stock market response 3602, the amount of reliable users, the amount of reliable users that gave information that was used in the stock market prediction, and/or a recommendation based on the stock market prediction.

In embodiments, the generated stock market prediction message may be transmitted, via network 1910, to one or more of: the plurality of user devices 3006, the first group of user devices 2708, the second group of user devices, and/or a group of user devices associated with users who provided information that was used in the stock market prediction. In embodiments, the stock market prediction message may not be sent to unreliable users. In those embodiments, a notification message may be generated and transmitted by the computing device 2702 to user devices associated with the unreliable users. The notification may state why the stock market prediction was not sent to the unreliable user (e.g. because your information was not reliable).

The steps of the process described in connection with FIG. 25A, in embodiments, may be rearranged or omitted.

In embodiments, the process of predicting stock market conditions may continue with the computing device (e.g. computing device 2702) further include the step of detecting, by the computing device, a trading pattern. The trading pattern, in embodiments, may be detected in accordance with the process illustrated by the flow chart of FIG. 25B., which may be performed with the following steps in accordance with an exemplary embodiment of the present invention.

As shown in the process illustrated by FIG. 25B, the process described in connection with FIG. 25A may continue at a step S2500. At step S2500, a computing device (e.g. computing device 2702) may detect a trading pattern. A trading pattern may refer to a price fluctuation of one or more of: a stock (or commodity), market, and/or economy, to name a few. For example, a trading pattern may indicate that Stock A is trending up in value. A trade pattern, in embodiments as used herein, may include information regarding one or more of: price, volume, a time associated with the price, a time associated with the volume, and/or a time associated with both the price and volume, to name a few. For example, a trading pattern may show that Stock A was valued at 300 dollars in June of 2017. As another example, a trading pattern may show that 5,000 shares of Stock A were owned in June of 2017.

Detecting a trading pattern may, in embodiments, begin at step S2552. Referring now to FIG. 25B, at step S2552, the computing device (e.g. computing device 2702) generates a third stock market query related to past transactions. The purpose of the third stock market query 3702, in embodiments, may be to determine and/or detect a trading pattern of a specific stock (e.g. Google® stock) and/or industry. An industry, as used in this application, may refer to any industry, including one or more of the following: aerospace, agriculture, arms, fishing, chemical, computer, construction, defense, education, electrical power, energy, entertainment, financial services, food, fruit production, health care, hospitality, information, insurance, internet, manufacturing (e.g. automotive, electronics, pulp and paper, steel, ship building, etc.), mass media (e.g. film, music, news, publishing, world wide web, etc.), mining, petroleum, pharmaceutical, service, software, telecommunications, and/or service, to name a few. In embodiments, the response(s) to the second stock market query 3502 may be used by the computing device 2702 to determine whether a trading pattern may exist with regards to a specific stock.

Figure 37:
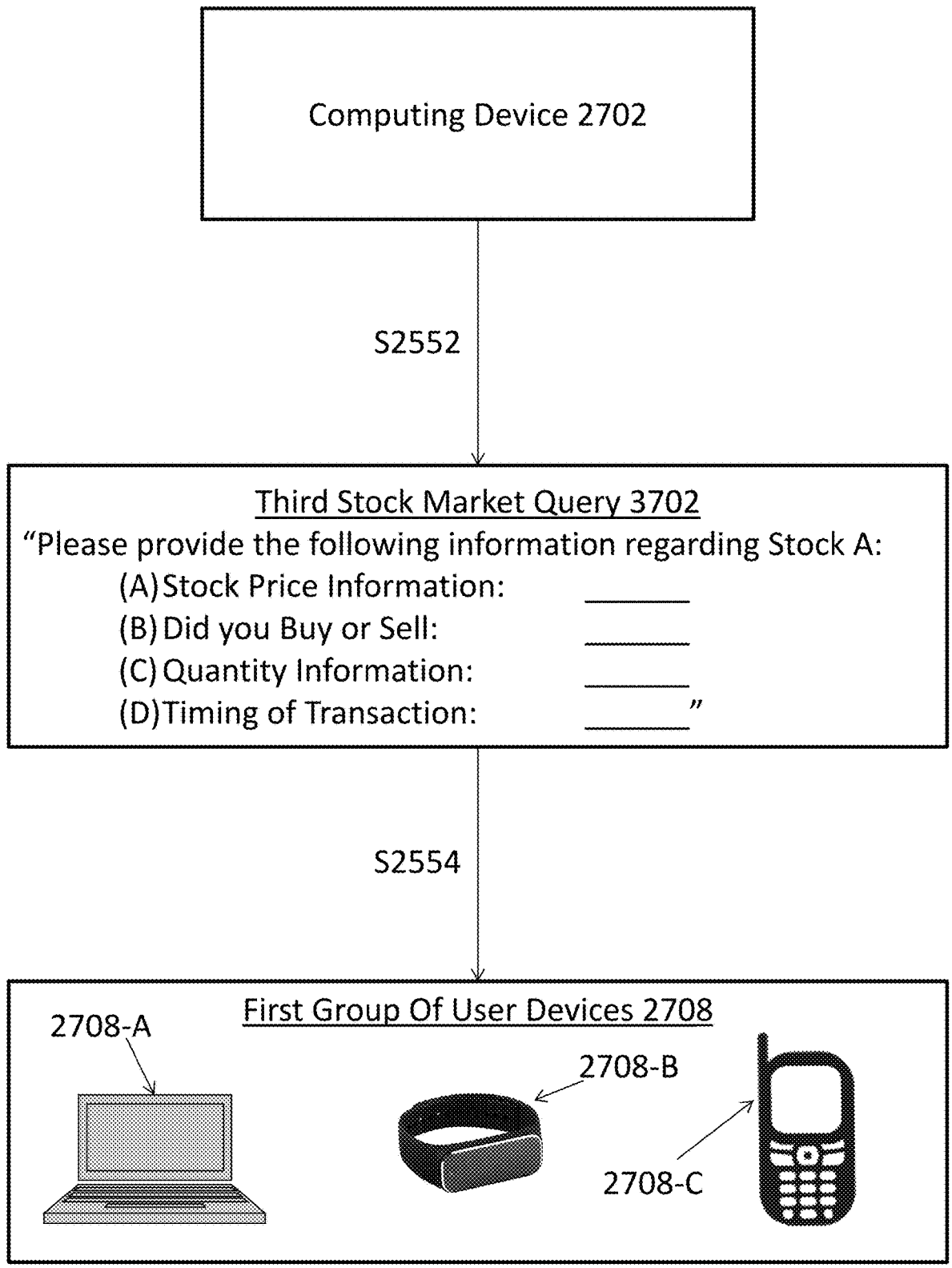
FIG. 37 is an exemplary block diagram illustrating a computing device generating and transmitting a third query to a first group of users in accordance with exemplary embodiments of the present invention.

Thus, in embodiments, the third stock market query 3702, may be related to past transactions. In embodiments, the past transactions may be stock and/or industry specific. For example, referring to FIG. 37, third stock market query 3702 may include text data representing a message that states, "Please provide the following information regarding Stock A: (A) Stock Price Information; (B) Did you Buy or Sell; (C) Quantity Information; (D) Timing of Transaction." In embodiments, as described above, stimulus questions and/or queries can be guide users to providing specific data by limiting the options of the response to the stimulus question and/or query (e.g. by using multiple choice options). In embodiments, as shown in FIG. 37, the stimulus questions and/or queries may be presented in a manner where the user must fill out a blank form. In embodiments, the stimulus questions and/or queries may include executable instructions that do not allow a user device to transmit a response to the stimulus questions and/or queries unless all of the parts of the form are filled (this also may be true with multiple choice selections or any response to a stimulus question and/or query). In embodiments, the stimulus questions and/or queries may include executable instructions that allow a user device to transmit a response to the stimulus questions and/or queries even if all of the parts of the form are not filled out (this also may be true with multiple choice selections or any response to a stimulus question and/or query). In embodiments, if all of the form (or all of the questions contained within a stimulus question and/or query) is not filled out, the computing device 2702 may determine that the user does not know the answer to the specific question that was not filled out. In embodiments, not answer a question may affect the authenticity and/or reliability rating of the user associated with the device that is transmitting the response. For example, if a response to the third stock market query 3702 may provide information that states the user bought Stock A at 500 dollars a share in June of 2015. Continuing the example, if the computing device 2702 has already confirmed that the price of Stock A fluctuated between 200 dollars and 300 dollars during June of 2015, the computing device 2702 may determine that the user is unreliable. The unreliable reliability rating may, for example, be assigned to the user because either the user paid too much for Stock A or it was not possible to buy Stock A at that price during that time. The information regarding the Stock A price and time period, in this example, may be received from third party sources and/or third party vendors. Additionally, the information may have already been previously stored (similar to historical data and additional information described above).

In embodiments, the past transactions may include one or more of: past purchases of stocks, past purchases of commodities, past purchases of assets, past selling of stocks, past selling of commodities, and/or past selling of assets, to name a few.

In embodiments, the third stock market query 3702 may include executable machine readable instructions that allow for the computing device 2702 to determine when one or more user devices of the first group of user devices 2708 received, opened, and/or began to respond to the third stock market query 3702. For example, the third stock market query 3702 may include Message Disposition Notification(s) (MDN).

In embodiments, the third stock market query 3702 may be generated in response to the computing device 2702 receiving a plurality of second stock market responses from a plurality of users associated with the first group of user devices 2708. For example, if the computing device 2702 receives more than a predetermined number of second stock market responses. The predetermined number, in embodiments, may be based on one or more of the following: a number of users who responded to the second stock market query 3404, a number of users who received a reliable reliability rating that responded to the second stock market query 3404, a number of users who responded to the second stock market query 3404 as compared to the number of stock holders of the stock (the stock being the subject of the second stock market query), and/or a number of consistent second market responses, to name a few.

In embodiments, the third stock market query 3702 may be generated in response to the computing device 2702 receiving a plurality of consistent second stock market responses from a plurality of users associated with the first group of user devices 2708. For example, if a majority of users are planning on buying Stock A within the next quarter, the computing device 2708 may detect that a trading pattern is forming, and thus initiate the process described in connection with FIG. 25A.

The third stock market query (e.g. third stock market query 3702) may include machine readable instructions to present an inquiry message on the one or more user devices of the first group of user devices 2708. In embodiments, the inquiry message may be related to the prior transactions mentioned above.

In embodiments the inquiry message may be related to a prior transaction that was modified or did not take place. For example, the computing device 2702 may have already confirmed that the Stock A was valued at 400 dollars a share last quarter. In this example, the computing device 2702 may generate a third market query that may state "How much did you pay for Stock A last quarter?" If the user responds correctly (e.g. the price the user alleged to pay is possible), then the user may be determined as a reliable source. If the user responds incorrectly (e.g. the price the user alleged to pay is not possible), then the user may be determined as an unreliable source.

Step S2552 may be similar to step S2506 described above in connection with FIG. 25A, the description of which applying herein. The third stock market query 3702, in embodiments, may be similar to the first stock market query 3402 described above in connection with FIGS. 25A and 34-36, the description of which applying herein.

Referring back to FIG. 25B, at step S2554, the computing device transmits the third stock market query (e.g. third stock market query 3702) to the first group of user devices (e.g. first group of user devices 2708) associated with a first group of users of the plurality of users (e.g. users associated with plurality of user devices 3006) of the electronic computer network (e.g. network 1910). Referring to FIG. 37, the computing device 2702, may transmit the third stock market query 3702 to the first group of user devices 2708. In embodiments, the third market query 3702 may be transmitted over network 1910. In embodiments, the first group of user devices 2708 may include one or more of: laptop 2708-A, wearable device 2708-B, and/or cell phone 2708-C. First group of user devices 2708, in embodiments, may be associated with a first group of users of the plurality of users (e.g. plurality of users 3006 described in connection with FIG. 30). The step S2554 may be similar to step S2208 described above in connection with FIGS. 22 and 27, the description of which applying herein.

Figure 38:
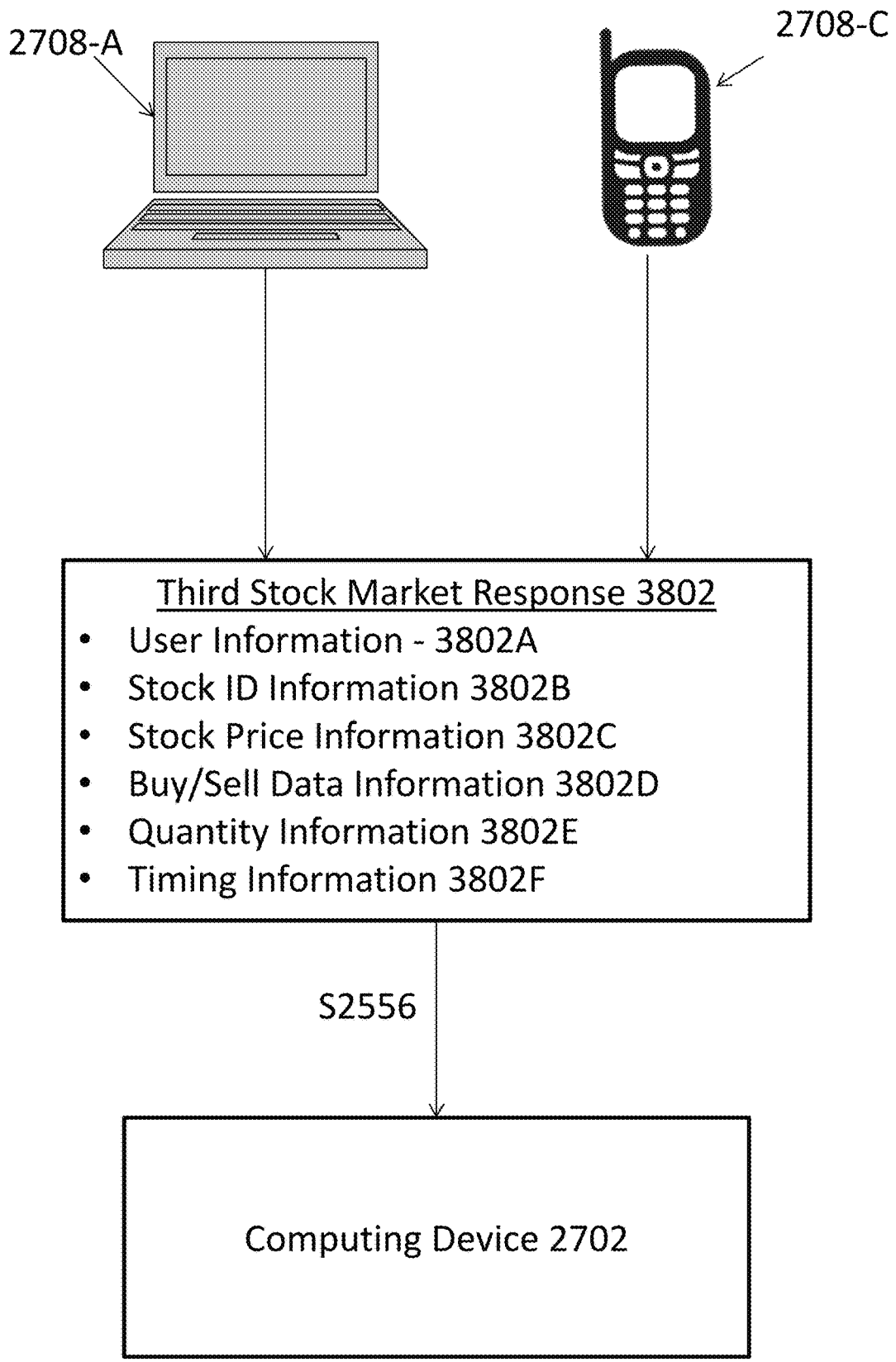
FIG. 38 is an exemplary block diagram illustrating a computing device receiving a third response from a plurality of user devices in accordance with exemplary embodiments of the present invention.

Referring back to FIG. 25B, at step S2556, the computing device (e.g. computing device 2702) may receive a third stock market response (e.g. third stock market response 3802). The second market response, in embodiments, may be received from one or more user devices of the first group of user devices (e.g. first group of user devices 2708). In embodiments, the second market response may be received from one or more user devices of the aforementioned (with regards to the process of FIGS. 24 and 25A) second group of user devices. Referring to FIG. 38, the computing device 2702 may receive the third market response 3802 from a first user associated with the laptop 2708-A and a second user associated with the cellphone 2708-C. The third market response 3802, in embodiments, may include multiple responses specific to each user. For example, the third stock market response 3802 may include a specific first user stock market response and a specific second user market response. While not shown in FIG. 38, continuing the example, the first user stock market response may be received by the computing device 2702 at a different time than the time at which the computing device 2702 receives the second user stock market response. While it is clear in the art that messages from different electronic devices do not need to be received at the same time, for brevity and clarity purposes, only one third stock market response (third stock market response 3802) is shown in FIG. 38.

The computing device 2702 may receive the third stock market response 3802 from at least a plurality of user devices of the first group of user devices 2708. In embodiments, the third stock market response 3802 includes: (i)

user information 3802A unique to the respective user associated with the respective user device providing the third stock market response; (ii) stock ID information 3802B for a particular stock; (iii) stock price information 3802C for the particular stock; (iv) buy/sell data information 3802D for the particular stock; and (v) quantity information 3802E for the particular stock; (vi) timing information 3802F with respect to the buy/sell data information 3802D; (vii) timestamp information; (viii) location information associated with a location of the respective user device associated with the respective user; (ix) proximity information; (x) audio data associated with the particular stock and/or observations related to the particular stock; (xi) image data associated with the particular stock and/or observations related to the particular stock; and/or (xii) video data associated with the particular stock and/or observations related to the particular stock, to name a few.

User information 3802A may be similar to user information 3602A, user information 3502A, user information 3302A, user information 3202A, user information 2802A, and user information 2902A described above in connection with FIGS. 22-25A and 26-36, the descriptions of which applying herein.

Stock ID information 3802B may be information that relates to the identification of one or more of: a particular stock, stocks, particular commodity, commodities, particular market, and/or or markets, to name a few. For example, the stock ID information 3802B, may be a stock symbol or ticker.

Stock price information 3802C may be information that relates to the price of one or more of: a particular stock, stocks, particular commodity, commodities, particular market, and/or or markets, to name a few. For example, the stock price information 3802C may indicate that Google® is trading at 500 dollars a share. In embodiments, stock price information 3802C may be information relating to the stock price at the time that the stock was purchased by the user. For example, if Stock A was purchased by user one year ago at a price of 100 dollars a share, stock price information 3802C may indicate the price of 100 dollars a share, as opposed to the value that Stock A is currently trading at. In embodiments, stock price information 3802C may include multiple stock prices. For example, stock price information 3802C may include the price at which the user bought the stock and the price at which the stock is currently trading (e.g. purchase price and current price respectively).

Buy/sell data information 3802D may be information that relates to whether the user bought or sold the stock, commodity, or asset within a market which was identified in Stock ID information 3802B. The buy/sell data information 3802D may be whether or not the user has purchased a specific stock. The buy/sell data information 3802D may be whether or not the user has sold the specific stock. In embodiments the buy/sell data information 3802D, may indicate where or through what exchange the user purchased or sold the specific stock through. Buy/sell data information 3802D may refer to multiple instances of the user buying and/or selling a specific product. In embodiments, buy/sell data information 3802D may be associated with one or more of the product identified in stock ID information 3802B; quantity information 3802E, and/or timing information 3802F. For example, if Stock A is identified in stock ID information 3802B, the buy/sell data information 3802D may indicate whether the user bought or sold (or neither) Stock A.

Quantity information 3802E be information that relates to whether the volume of a stock, commodity, or asset within a market purchased and/or sold (where the value of each could be zero—i.e. the user did not purchase or sell any stock). Quantity information 3802E, in embodiments, may have multiple entries. For example, if there were multiple instances of a user buying and/or selling the product identified in stock ID information 3802B, quantity information 3802E may include the volume of product sold and/or bought at each instance of the user buying and/or selling the product. In embodiments, quantity information 3802E may be associated with one or more of the product identified in stock ID information 3802B; buy/sell data information 3802D, and/or timing information 3802F. For example, the quantity information 3802E may be the quantity of stock (identified in stock ID information 3802A) that was sold (identified as sold in buy/sell data 3802D) by the user.

Timing information 3802F may be information that relates to the time at which a user bought or sold a product identified in stock ID information 3802B. In embodiments, time may refer to one or more of the following: the time of day, the date, the month, the quarter, and/or the year. In embodiments, timing information 3802F may be multiple times. For example, if the user had multiple instances identified in buy/sell data information 3802D, the timing information may include the time at which each instance occurred. In embodiments, timing information 3802F may be associated with one or more of the product identified in stock ID information 3802B; quantity information 3802E, and/or buy/sell data 3802D.

Timestamp information may be similar to first timestamp 3502C and second timestamp 3602C described above in connection with FIGS. 25A, 35, and 36, the descriptions of which applying herein.

Location information as described herein, may be similar to location information 2802C and location information 2902C described above in connection with FIGS. 22, 23, 27, and 28, the description of which applying herein. As described above, location information may be used for determining the authenticity of the third stock market response 3802 and/or determining a reliability rating of a user associated with the laptop 2708-A and/or the cellphone 2708-C (e.g. the user device(s) of the first group of user devices 2708 which transmitted the third stock market response 3802).

Proximity information, as described herein, may be similar to the proximity information described above in connection with FIGS. 22, 23, 27, and 28, the description of which applying herein. As described above, proximity information may be used for determining the authenticity of the third stock market response 3802 and/or determining a reliability rating of a user associated with the laptop 2708-A and/or the cellphone 2708-C (e.g. the user device(s) of the first group of user devices 2708 which transmitted the third stock market response 3802).

Audio data, as described herein, may be similar to the audio data described above in connection with FIGS. 22, 23, 27, and 28, the description of which applying herein. As described above, audio data may be used for determining the authenticity of the third stock market response 3802 and/or determining a reliability rating of a user associated with the laptop 2708-A and/or the cellphone 2708-C (e.g. the user device(s) of the first group of user devices 2708 which transmitted the third stock market response 3802).

Image data, as described herein, may be similar to the image data described above in connection with FIGS. 22, 23, 27, and 28, the description of which applying herein. As described above, image data may be used for determining the authenticity of the third stock market response 3802 and/or determining a reliability rating of a user associated with the laptop 2708-A and/or the cellphone 2708-C (e.g. the user device(s) of the first group of user devices 2708 which transmitted the third stock market response 3802).

Video data, as described herein, may be similar to the video data described above in connection with FIGS. 22, 23, 27, and 28, the description of which applying herein. As described above, video data may be used for determining the authenticity of the third stock market response 3802 and/or determining a reliability rating of a user associated with the laptop 2708-A and/or the cellphone 2708-C (e.g. the user device(s) of the first group of user devices 2708 which transmitted the third stock market response 3802).

In embodiments, the computing device 2702 may use information within the third stock market response 3802, (including e.g. user information 3802A, Stock ID information 3802B, Stock price information 3802C, Buy/sell data information 3802D, Quantity information 3802E, Timing information 3802F, timestamp information, location information, proximity information, audio data, and/or image data, to name a few) to determine the authenticity of the third stock market response 3802 and/or the reliability of a user (and/or filter out unreliable responses). The process of determining the reliability of a user and/or filtering out unreliable responses may be similar to the processes described above in connection with FIGS. 22, 23, 24, 27, 28, 29, and 32, the descriptions of which applying herein.

Figure 25B:
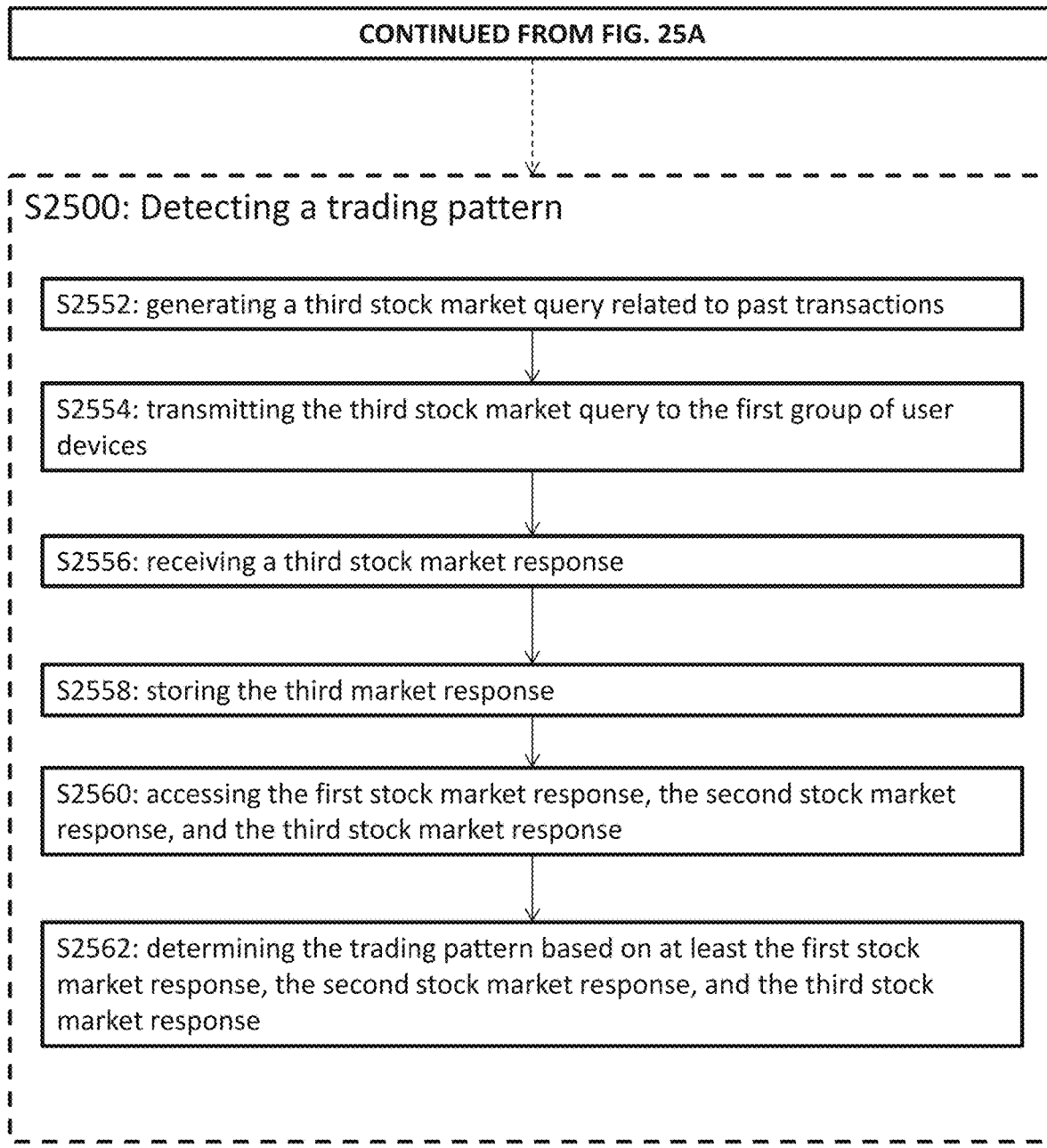

Referring to FIG. 25B, at step S2558, the computing device (e.g. computing device 2702) stores, in one or more databases, the third stock market response (e.g. third stock market response 3802) of each user device of the plurality of user devices from which the second market response was received (e.g. first group of user devices 2708). in the one or more databases. In embodiments, the one or more databases, as mentioned above with respect to step S2520, may be: internal storage 1808A, external storage 1808B, memory/storage 1815, system memory 1804, and/or storage 1903, to name a few. Step S2520 may be similar to step S2212 described above in connection with FIGS. 22, 27, and 28, the description of which applying herein.

In embodiments, once the computing device 2702 receives and/or stores the third stock market response 3802, the computing device 2702 may determine the authenticity of the third stock market response 3802. The process of determining the authenticity of the third stock market response 3802 may be similar to the process of authenticating the first response 2802 of FIG. 28 and/or the first response 2902 of FIG. 29, described above in connection with FIGS. 22, 23, 27, 28, 29, and 30, the descriptions of which applying herein.

In embodiments, once the computing device 2702 receives and/or stores the third stock market response 3802, the computing device may determine the reliability of the plurality of users associated with the electronic devices (e.g. laptop 2708-A, cellphone 2708-C) that transmitted the third stock market response 3802. The process of determining the reliability of the plurality of users associated with the electronic devices (e.g. laptop 2708-A, cellphone 2708-C) that transmitted the third stock market response 3802 may be similar to the process of determining the reliability of the users associated with electronic devices that transmitted the first response 2802 of FIG. 28 and/or the first response 2902 of FIG. 29, described above in connection with FIGS. 22, 23, 27, 28, 29, and 30, the descriptions of which applying herein.

In embodiments, if the computing device 2702 has previously determined the reliability rating of a user, the computing device 2702 may update the reliability rating of the user. The updating of the reliability rating may be similar to the updating of the reliability rating described above in connection with the processes of FIGS. 22 and 23, the descriptions of which applying herein.

At step S2560, the computing device (e.g. computing device 2702) accesses at least the first stock market response (e.g. first stock market response 3502), the second stock market response (e.g. second stock market response 3602), and the third stock market response (e.g. third stock market response 3802) provided by each user device of the first group of user devices (e.g. first group of user devices 2708). In embodiments, the computing device 2702 may access the first stock market response 3502 and/or the second stock market response 3602 by receiving the stored first stock market response 3502, the stored second stock market response 3602, and/or the stored third stock market response 3802 from one or more of: internal storage 1808A, external storage 1808B, memory/storage 1815, system memory 1804, and/or storage 1903, to name a few. In embodiments, the computing device 2702 may access and/or receive the stored identification information from one or more of: internal storage 1808A, external storage 1808B, memory/ storage 1815, system memory 1804, and/or storage 1903, to name a few.

At step S2562, the computing device (e.g. computing device 2702) determines the trading pattern based on at least the first stock market response (e.g. first stock market response 3502), the second stock market response (e.g. second stock market response 3602), and the third stock market response (e.g. third stock market response 3802) provided by the first group of user devices (e.g. first group of user devices 2708), and/or the second group of user devices (associated with the second group mentioned herein). The trading pattern may also be based on historical data and/or third party information (similar to the historical data and third party information described above). The computing device 2702, in embodiments, may use the information provided to generate a graph that maps one or more of the following pieces of information: price, volume, a time associated with the price, a time associated with the volume, and/or a time associated with both the price and volume, to name a few. In embodiments, the generated graph may be transmitted by the computing device 2702 to one or more of: the first group of user devices 2708, the second group of user devices, and/or the plurality of user devices 3006. Based on the resulting trading pattern, the trading pattern may be analyzed by the computing device 2702.

In embodiments, the trading pattern may be analyzed by the computing device 2702 to determine whether a pattern has emerged that one or more users associated with the plurality of user devices 3006 could take advantage of by buying, selling, and/or holding. For example, the computing device 2702 may identify one or more of the following patterns: head and shoulders, cup and handle, double tops, double bottoms, triangles, (e.g. symmetrical triangles, ascending triangles, and/or descending triangles, to name a few), flags and pennants, wedges, gaps, triple tops, triple bottoms, and/or saucer bottom (e.g. rounding bottom), to name a few. If an advantageous pattern is detected the computing device 2702 may generate and send a message to one or more users (e.g. users associated with the plurality of user devices 3006, users associated with the first group of user devices 2708, to name a few).

In embodiments, the computing device 2702 may determine that one or more users specifically can benefit from a particular action based on the information determined in the trading pattern. The computing device 2702, in embodiments, may compare the trading pattern to available information of at least one user of the plurality of users associated with the plurality of user devices 3006. The available information may, in embodiments, be one or more of the following: identification information associated with the at least one user of the plurality of users; the first stock market response 3502, the second stock market response 3602, and/or the third stock market response 3802. For example, if the trading pattern suggests that Stock A is about to fall in value and Charley (a user associated with an electronic device of the first group of user devices 2708) indicated that he owns a lot of Stock A, the computing device 2702 may generate and transmit a trading suggestion that advises Charley to sell Stock A. The generated trading suggestion may further include one or more of the following, a message indicating the trading suggestion, an image of the generated trading pattern graph, a summary of information of the trading pattern, a link to any third party information used in connection with determining the trading pattern, and/or a link to a third party that may enable the user to follow the suggestion (e.g. a link to E-Trade®). Continuing the example, Charley may have indicated that he owns a lot of Stock A in one or more of the following: the first stock market response 3502, the second stock market response 3602, the third stock market response 3802, and/or identification information, to name a few. In embodiments, the trading pattern may also indicate when a stock market event (e.g. Stock A falling in price) will occur. Continuing the example, the trading pattern may indicate that Stock A is going to fall in value in the next quarter. Thus, the message generated and transmitted by the computing device 2702 to a device associated with Charley, may advise Charley to sell before the next quarter begins.

In embodiments, the trading pattern may be compared to other users so that the computing device can generate trading suggestions based on similar patterns.

In embodiments, the determined trading pattern may be compared to one or more third party trading patterns that may be received by the computing device 2702 from a third party source and/or a third party vendor. One or more third party trading patterns, in embodiments, may also be stored by the computing device 2702 in a similar manner that the above mentioned historical data and additional information from external data sources, the description of which applying herein. In embodiments, the received third party trading pattern may supplement, inform, and/or alter the calculated stock market prediction of the process described above in connection with FIG. 25A. Furthermore, in embodiments, the received third party trading pattern may supplement, inform, and/or alter the determined stock market prediction.

The steps of the process described in connection with FIG. 25B, in embodiments, may be rearranged or omitted.

Example 16: Method of Gathering Opinion Information

Figure 26:
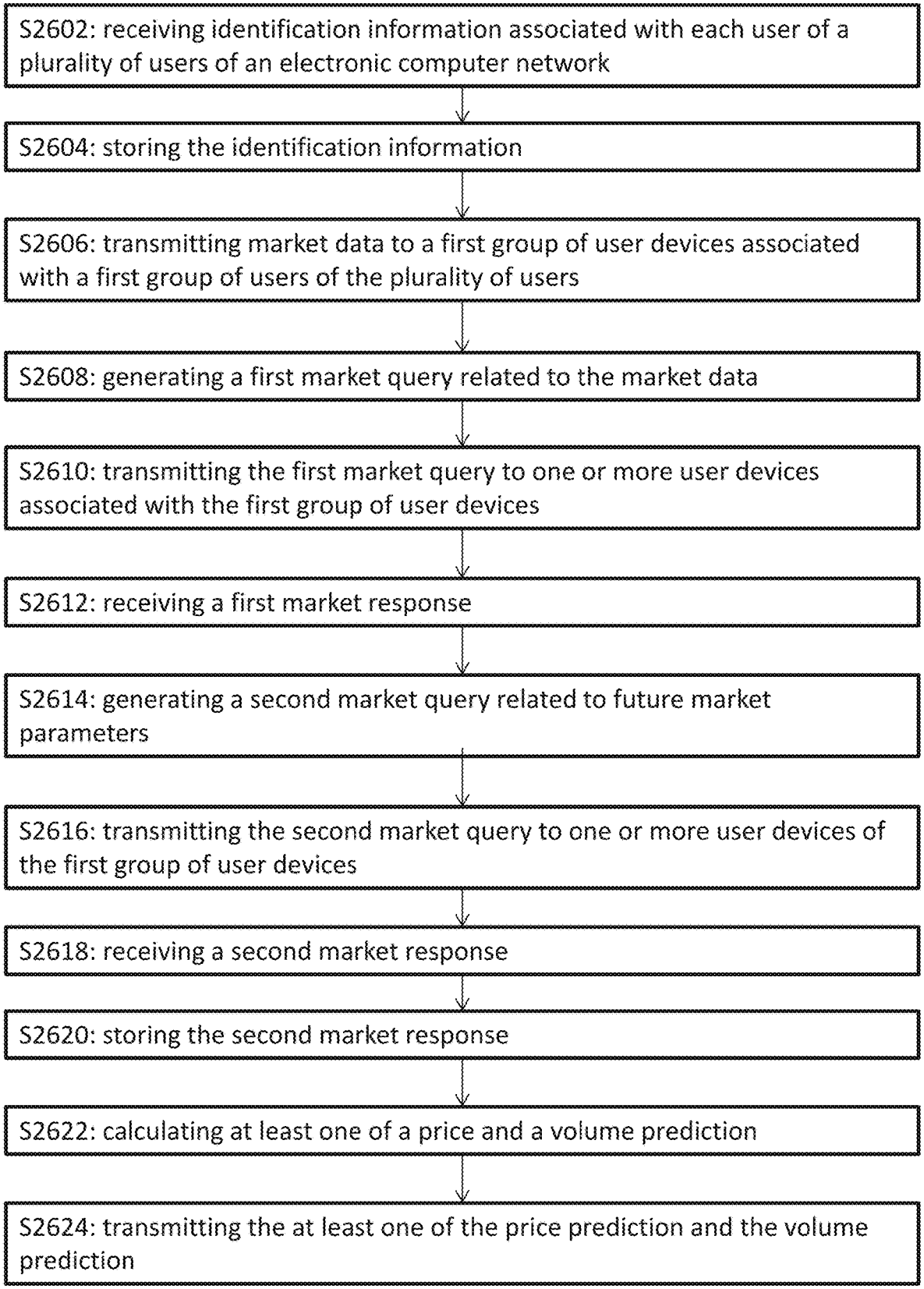
FIG. 26 is a flow chart of a process for gathering information in accordance with an exemplary embodiment of the present invention.

Referring now to FIG. 26. FIG. 26, is an illustrative flow chart of a computer-implemented process there are illustrated flow charts of a computer-implemented process for gathering opinion information provided by one or more users of a plurality of users of an electronic computer network (e.g., network 1910 in FIG. 19) in accordance with an exemplary embodiment of the present invention.

The process of FIG. 26 may begin at step S2602. At step S2602, a computing device (e.g., computing device 2702 in FIG. 27, computer 18012 in FIG. 18, server 1901 in FIG. 19) may receive identification information associated with each user of a plurality of users (e.g. users associated with the plurality of user devices 3006) of the electronic computer network (e.g. network 1910). In embodiments, the identification information may include one or more of the following: a user account associated with a user; an e-mail address associated with a user; a name associated with a user; job history data which may include user specific current and past employment history, biometric data associated with a user; gender information of the user associated with the user device; age of the user associated with the user device; personal data of a user associated with the user device, which is either volunteered by the user or received via access that is consented to by the user; past and/or present location information associated with the user device; identification information related to a user device associated with a user of the plurality of users (e.g. metadata, device type, etc., to name a few), electronic identification (e.g. electronic identification card, electronic signature, etc., to name a few), and/or biometric data of the user (e.g. audio sampling(s) of the user's voice, an image of the user, a video of the user, and/or a finger print of the user, to name a few), to name a few. In embodiments, identification information may be similar to the identification information described above in connection with FIGS. 22-25B, and 27-38, the description of which applying herein. Additionally, step S6402 may be similar to steps S2202, S2302, S2402, and/or S2502 described above in connection with FIGS. 22-25A respectively, the description of which applying herein.

The computing device 2702 may determine a first group of users associated with a first group of user devices (e.g. first group of user devices 2708). For example, if the computing device 2702 is going to send a market query regarding a specific market (e.g. bonds) once the identification information is received, the computing device 2702 may group users who have a job or who have had a job that is or is related to the specific market. In embodiments, the computing device 2702 may determine the first group of users in a similar manner as described above in connection with FIGS. 22, 23, 24, 27-38, the description of which applying herein.

At step S2604, the computing device (e.g. computing device 2702) stores in one or more databases the identification information. In embodiments, the one or more databases may be: internal storage 1808A, external storage 1808B, memory/storage 1815, system memory 1804, and/or storage 1903, to name a few. The identification information may be stored in accordance with the received identification information. For example, the identification indication may indicate an age of the users. In this example, the computing device 2702 may store the identification information by age range (e.g. 18-25 ages grouped together, 26-40 ages grouped together, etc.). As another example, the identification information may be stored based on whether a user is part of a specific group of users. For example, identification information of the first group of users associated with the first group of user devices 2708 may be stored together. Step S2604 may be similar to step S2204 described above in connection with FIGS. 22, 27, and 28, the description of which applying herein.

At step S2606, the computing device (e.g. computing device 2702) may transmits market data to at least a first group of user devices (e.g. first group of user devices 2708) associated with a first group of users of the plurality of users (e.g. users associated with the plurality of user devices 3006) of the electronic computer network (e.g. network 1910). The purpose of the market data may be, in embodiments, to lay the groundwork to enable a user to make a prediction related to a specific market, for example, Market A. Thus, in embodiments, referring to FIG. 39A, the market data may include text data representing a message which may include one or more of: (i) past price information 3902A; (ii) past volume information 3902B; (iii) a first timestamp 3902C, (iv) additional historical data (described above in connection with FIGS. 35-36); (v) third party information (described above in connection with FIGS. 35-36); (vi) stock ID information related to one or more of the past price information 3902A and/or past volume information 3902B (e.g. stock ID information 3802B where the information is related to the market which is the subject of the market data); (vii) audio data associated with the market data (e.g. a podcast related to the market data); (viii) image data associated with the market data (e.g. one or more graphs of the market data); and/or (ix) video data associated with the market data (e.g. a televised interview related to the market data), to name a few.

Before transmitting the market data, in embodiments, the computing device (e.g. computing device 2702) may generate a market data message (e.g. market data 3902). the market data message may be generated by the computing device 2702, by first receiving the information to be included with the market data message. The information to be included in the market data message may be received by the computing device 2702 from third party sources and/or third party vendors. Additionally, as mentioned above with respect to historical data and third party information, the market data information may be retrieved from the one or more databases of the computing device 2702. Once the message is generated, in embodiments, market data 3902 may transmitted from computing device 2702 to the first group of user devices 2708.

Past price information 3902A may refer to information that includes one or more prices associated with a first specific market and/or first specific industry. In embodiments, the past price information 3902A may include past price information for the first specific market and/or first specific industry over a predetermined period of time. The predetermined period of time may be one or more of: hours, days, weeks, months, quarters, seasons, and/or years. The computing device 2702 may determine the predetermined period of time based on the first specific market and/or first specific industry. For example, a user may make require price information over a period of five years to have the ability to make an accurate prediction regarding future price of Market A. Continuing the example, a user may make require price information over a period of three years to have the ability to make an accurate prediction regarding future pricing of Market B. Thus, the computing device 2702 may provide past price information 3902A, including price information over the past five years, for market data 3902 related to Market A. Additionally, the computing device 2702 may provide past price information 3902A, including price information over the past three years, for market data 3902 related to Market B. The predetermined amount of time may also be a default amount of time. The predetermined amount of time may also be based on the received identification information. If, for example, the computing device 2702 determines that the first group of users associated with the first group of user device 2708 is a sophisticated group of investors, the computing device 2702 may generate and transmit a market data message for a sophisticated group of investors. Additionally, if, for example, the computing device 2702 determines that the first group of users associated with the first group of user device 2708 is an unsophisticated group of investors, the computing device 2702 may generate and transmit a market data message for a group of unsophisticated groups of investors.

Past volume information 3902B may refer to information that includes one or more volumes associated with a second specific market and/or second specific industry. In embodiments, the past volume information 3902B may include past pricing information for the second specific market and/or second specific industry over a predetermined period of time. The predetermined amount of time may be the same predetermined amount of time associated with past price information 3902A. For example, the market data 3902 may provide past price information 3902A and past volume information 3902B in a generated graph, the graph showing past prices and volumes over the predetermined amount of time. In embodiments, the past volume information 3902B may be over a different predetermined amount of time (which may be determined in a similar manner to the past price information 3902A).

In embodiments, the first specific market and/or first specific industry may be the same as the second specific market and/or second specific industry.

Past price information 3902A and past volume information 3902B, may be similar to the past financial market conditions described above in connection with the first market query 3102 of FIG. 31, the description of which applying herein.

First timestamp 3902C may refer to a timestamp associated with the past price information 3902A and/or past volume information 3902B. For example, the first timestamp 3902C may include the aforementioned (with respect to the past price information 3902A and/or past volume information 3902B) predetermined amount of time. In embodiments, first timestamp 3902C may be similar to first timestamp 3502C, second timestamp 3602C, first timestamp 3202C, second timestamp 3302C, timestamp 2802D, and timestamp 2902D described above in connection with FIGS. 22-35, the descriptions of which applying herein. In embodiments, the market data comprises: (i) past price information; (ii) past volume information; and (iii) a first timestamp.

In embodiments, the market data 3902 may include executable machine readable instructions that allow for the computing device 2702 to determine when one or more user devices of the first group of user devices 2708 received, opened, and/or began to respond to the market data 3902. For example, the market data 3902 may include Message Disposition Notification(s) (MDN). In embodiments, if the user never opens (thus did not read or begin to respond to the market data 3902) the market data 3902. The computing device 2702 may determine via the executable machine instructions. If, for example, the user never opened the market data 3902, but sent the first market response 4002 and/or the second market response 4102, the computing device 2702 may determine that the information received in the first market response 4002 and/or the second market response 4102 is not authentic. If, for example, the user never opened the market data 3902, but sent the first market response 4002 and/or the second market response 4102, the computing device 2702 may determine that the user associated with the device that sent the first market response 4002 and/or the second market response 4102 is unreliable or has a higher probability of being unreliable (e.g. the first market response may include the user(s) impressions of the market data and/or answers to queries regarding the market data).

In embodiments, the market data 3902 may be generated in response to the computing device 2702 determining that an event is occurring that is related to a market. For example, if there is a report of a first market dropping in value, the computing device 2702 may generate market data 3902 to give users context to determine a prediction regarding the first market's future performance. The market data 3902 may be specific to the event related to the market. For example, market data 3902 may include text that states, "we have received a report that the First Market is dropping in value, here is some relevant information regarding the First Market." Additionally, in embodiments, the market data 3902 may provide a link to the report and/or an excerpt of the report. Furthermore, in embodiments, the market data 3902 may also include user specific information. For example, the market data 3902, may state "John, we have received a report that the First Market is dropping in value, here is some relevant information regarding the First Market."

In embodiments, the computing device 2702 may determine and/or store market data start information. Market data start information, in embodiments, may refer to the time at which an event related to the market data started occurring.

The market data message (e.g. market data 3902) may include machine readable instructions to present a message on the one or more user devices of the first group of user devices 2708. In embodiments, the message may be related to the market data mentioned above.

At step S2608, the computing device (e.g. computing device 2702) generates a first market query (e.g. first market query 3904) related to the market data (e.g. market data 3902). The purpose of the first market query 3904, in embodiments, may be to determine one or more impressions of one or more users receiving the market data. In embodiments, the first market query 3904, may be related to market data 3902. For example, referring to FIG. 39B, the first market query 3104 may include a message stating "Does the market data you received give you an impression as to how the market is performing?"

In embodiments, the first market query 3904 may include executable machine readable instructions that allow for the computing device 2702 to determine when one or more user devices of the first group of user devices 2708 received, opened, and/or began to respond to the first market query 3904. For example, the first market query 3904 may include Message Disposition Notification(s) (MDN).

In embodiments, the first market query 3904 may be generated in response to the computing device 2702 generating and/or transmitting the market data 3902. In embodiments, the first market query 3904 may be generated in response to the computing device 2702 determining that an event is occurring that is related to a market. For example, if there is a report of a first market dropping in value, the computing device 2702 may generate the first market query 3904 to give users context to determine a prediction regarding the first market's future performance. The first market query 3904 may be specific to the event related to the market. For example, first market query 3904 may include text that states, "we have received a report that the First Market is dropping in value, after viewing the market data we sent you, do you have any impressions with regards to the First Market?" Additionally, in embodiments, the first market query 3904 may provide a link to the report and/or an excerpt of the report. Furthermore, in embodiments, the first market query 3904 may also include user specific information. For example, the first market query 3904, may state "Jason, we have received a report that the First Market is dropping in value, after viewing the market data we sent you, do you have any impressions with regards to the First Market?"

In embodiments, the first market query 3902 may include a question regarding information that the computing device 2702 has already confirmed. For example, the computing device 2902 may have already confirmed that the First Market dropped by 5 points last quarter. In this example, the first market query 3902 may state "Bob, how did the First Market perform last quarter? Additionally, do you have any impressions with regards to the First Market's performance?" The first question, "how did the First Market perform last quarter?" may be asked to confirm the reliability of the user. The reliability of the user, in this case, may be related to whether the user reviewed the market data 3902. The remaining question, "do you have any impressions with regards to the First Market's performance?" may be asked to query the impressions of the user with regards to the First Market performance. In embodiments, the computing device 2702 may only review answers of the second question from users that provide the correct answer to the first question.

In embodiments, the computing device 2702 may determine and/or store market start information. Market start information, in embodiments, may refer to the time at which one or more events related to the market data 3902 started occurring.

The first market query (e.g. first market query 3904) may include machine readable instructions to present an inquiry message on the one or more user devices of the first group of user devices 2708. In embodiments, the inquiry message may be related to the market data mentioned above. In embodiments the inquiry message may be related to market data that was modified or did not take place. For example, the computing device 2702 may have already confirmed that the First Market dropped by 3 points last quarter. In this example, the computing device 2702 may generate a first market query that may state "Do you know how the First Market performed last quarter?" If the user responds correctly, then the user may be determined as a reliable source. If the user responds incorrectly, then the user may be determined as an unreliable source. As another example, the first market query 3904 may include an inquiry message that queries the user about information regarding the subject to of the market data 3902 that has changed since market data 3902 was sent to the first group of user devices 2708. If the user responds correctly to the inquiry, then the user may be determined as a reliable source. If the user responds incorrectly to the inquiry, then the user may be determined as an unreliable source. As yet another example, the first market query 3904 may include an inquiry message that queries the user about information regarding the subject to of the market data 3902 that was incorrect. The market data 3902 may have been purposely incorrect to check the reliability of one or more users or the market data 3902 may have included information that has since been found to be incorrect. If the user responds correctly to the inquiry, then the user may be determined as a reliable source. If the user responds incorrectly to the inquiry, then the user may be determined as an unreliable source.

Figure 39A:
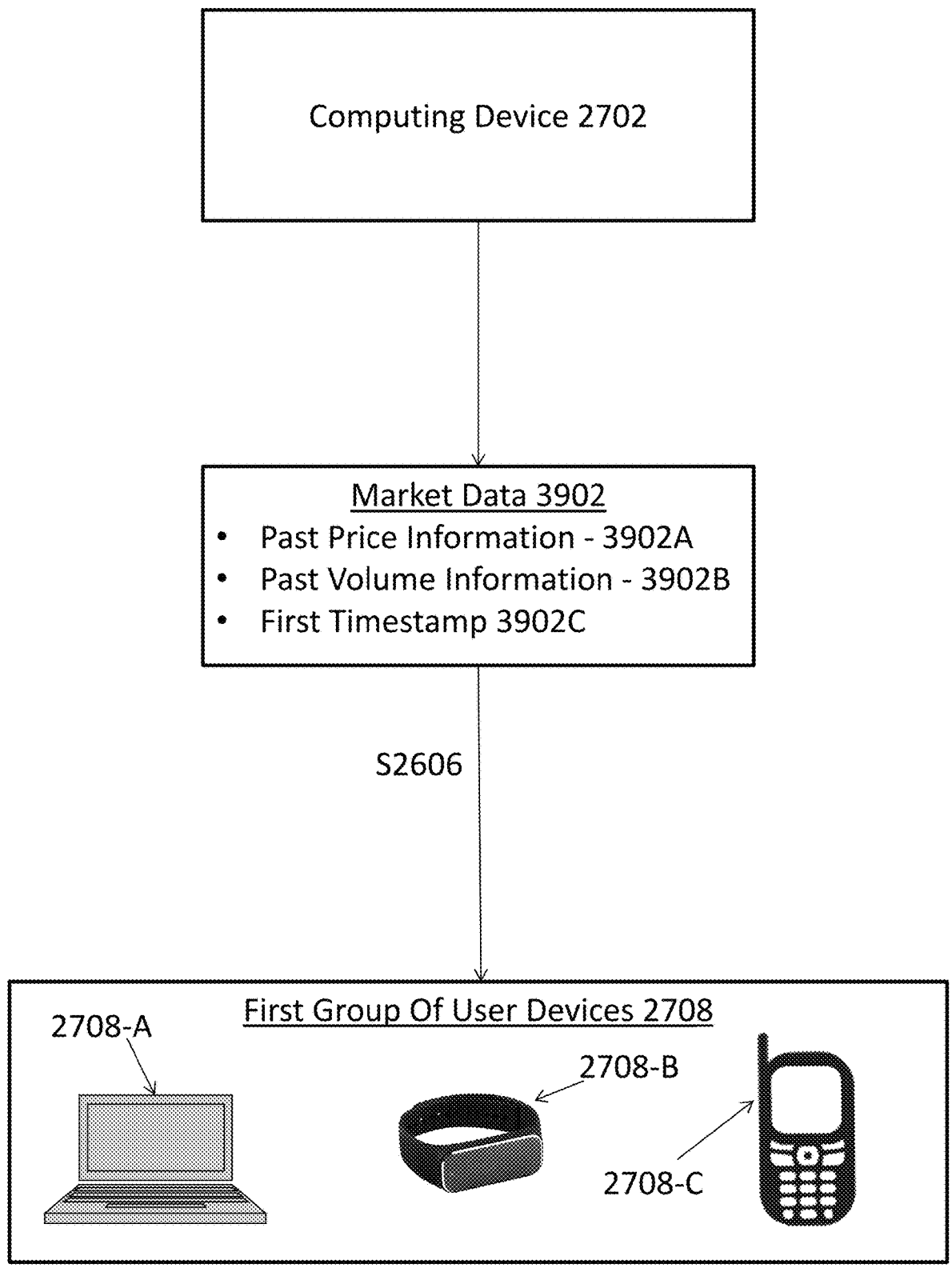
FIGS. 39A and 39B are exemplary block diagrams illustrating a computing device transmitting data and queries to a first group of users in accordance with exemplary embodiments of the present invention.
Figure 39B:
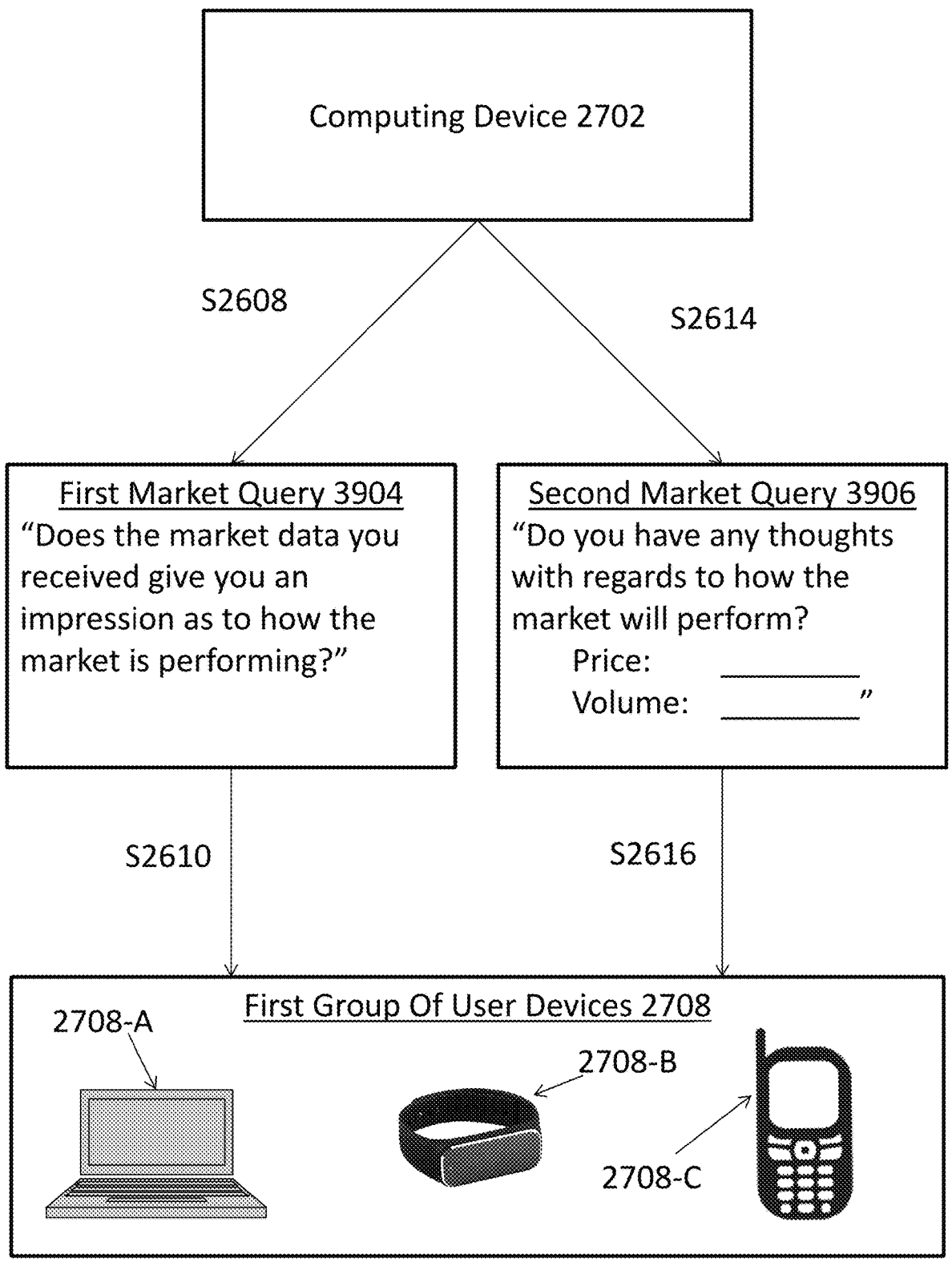

At step S2610, the computing device transmits the first market query to one or more user devices of the first group of user devices. The computing device (e.g. computing device 2702) transmits the first market query (e.g. first market query 3904) to at least a first group of user devices (e.g. first group of user devices 2708) associated with a first group of users of the plurality of users (e.g. users associated with plurality of user devices 3006) of the electronic computer network (e.g. network 1910). Referring to FIG. 39B, computing device 2702, may transmit the first market query 3904 to the first group of user devices 2708. In embodiments, the first market query 3904 may be transmitted over network 1910. In embodiments, the first group of user devices 2708 may include one or more of: laptop 2708-A, wearable device 2708-B, and/or cell phone 2708-C. First group of user devices 2708, in embodiments, may be associated with a first group of users of the plurality of users (e.g. plurality of users 3006 described in connection with FIG. 30). The step S2610 may be similar to step S2208 described above in connection with FIGS. 22 and 27, the description of which applying herein.

Figure 40:
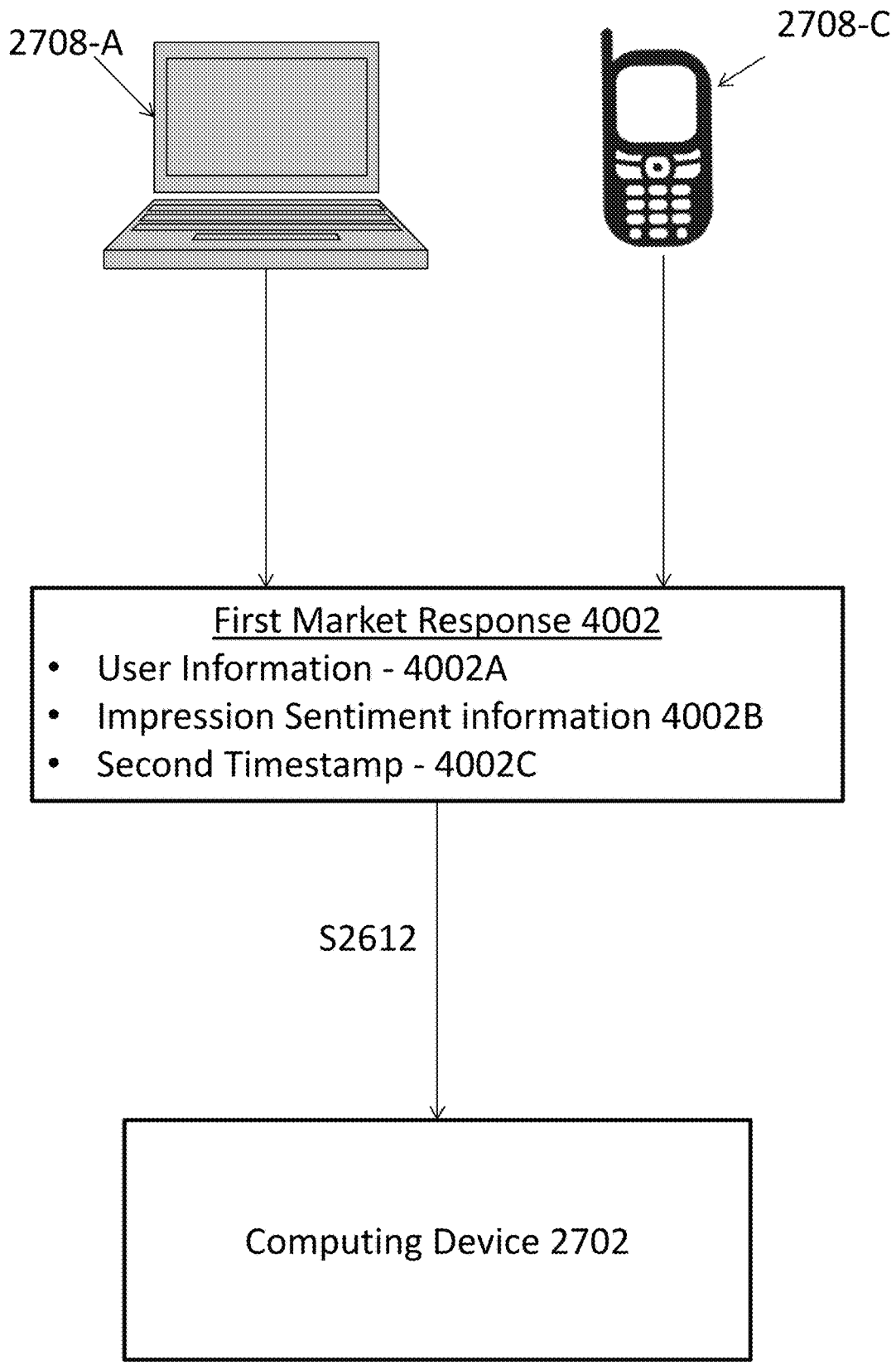
FIG. 40 is an exemplary block diagram illustrating a computing device receiving a first response from a plurality of user devices in accordance with exemplary embodiments of the present invention.

Referring back to FIG. 26, at step S2612, the computing device may receive a first market response (e.g. first market response 4002). The first market response, in embodiments, may be received from one or more user devices of the first group of user devices (e.g. first group of user devices 2708). Referring to FIG. 40, in embodiments, the computing device 2702 may receive the first market response 3202 from a first user associated with the laptop 2708-A and a second user associated with the cellphone 2708-C. The first market response 4002, in embodiments, may include multiple responses specific to each user. For example, the first market response 4002 may include a specific first user market response and a specific second user market response. While not shown in FIG. 40, continuing the example, the first user market response may be received by the computing device 2702 at a different time than the time at which the computing device 2702 receives the second user market response. While it is clear in the art that messages from different electronic devices do not need to be received at the same time, for brevity and clarity purposes, only one first market response (First Market Response 4002) is shown in FIG. 40 from at least one user device of the first group of user devices. In embodiments, the first market response comprises: (i) user identification information unique to the respective user device and associated with the respective user associated with the respective user device; (ii) impression sentiment information related to the respective user's impression of the market data; and (iii) a second timestamp.

In embodiments, the first market response 3202 may include one or more of the following: (i) user information 4002A unique to the respective user associated with the respective user device providing the first market response; (ii) impression sentiment information 4002B related to the respective user's impression of the market data; (iii) a second timestamp 4002C; (iv) location information associated with a location of the respective user device associated with the respective user; (v) proximity information; (vi) audio data associated with the impressions of the user; (vii) image data associated with the impressions of the user; and/or (viii) video data associated with the impressions of the user, to name a few.

User information 4002A may be similar to user information 2802A and user information 2902A described above in connection with FIGS. 22, 23, 27, and 28, the description of which applying herein. User information 4002A, in embodiments, may also include one or more of the following: job history data which may include user specific current and past employment history (similar to the job history data described above in connection with the identification information received in step S2602), a user account associated with a user; an e-mail address associated with a user; a name associated with a user; biometric data associated with a user; gender information of the user associated with the user device; age of the user associated with the user device; personal data of a user associated with the user device, which is either volunteered by the user or received via access that is consented to by the user; location information associated with the user device; identification information related to a user device associated with a user of the plurality of users (e.g. metadata, device type, etc., to name a few), and/or electronic identification (e.g. electronic identification card, electronic signature, etc., to name a few), to name a few. Furthermore, as described above in connection with FIGS. 22, 23 27, and 28, user information 4002A may include connection information. Connection information, as described above, may enable the computing device 2702 to accurately set an upper and/or lower time lag limit which may be used for authentication of the first market response 4002 and/or a determining a reliability rating of a user associated with the laptop 2708-A and/or the reliability rating of a user associated with the cellphone 2708-C (e.g. the user devices of the first group of user devices 2708 which sent the first market response 4002).

Impression sentiment information 4002B may be information received from a user device (e.g. cellphone 2708-C) that is responsive to one or more of the market data 3902 and/or the first market query 3904. For example, impression sentiment information 4002B may include information that states the thoughts of the user with regards to the performance of the market (the market being the subject of one or more of: the market data 3902 and/or the first market query 3904). In embodiments, impression sentiment information 4002B may include audio, image, and/or video data, allowing the user to more fully express his or her impression. In embodiments, continuing the examples mentioned above, the first market response 4002 may be responsive to a query in which the computing device 2702 may have already confirmed. As with the example above, the computing device 2702 may have confirmed that the First Market dropped by 5 points last quarter. In this example, the first market query 3904 may state "Bob, how did the First Market perform last quarter? Additionally, do you have any impressions with regards to the First Market's performance?" The first question, "how did the First Market perform last quarter?" may have been asked to confirm the reliability of the user. The remaining question, "do you have any impressions with regards to the First Market's performance?" may be to illicit a response in which the user will give his or her impressions. The first market response 3202 from the laptop 2708-A and/or the cellphone 2708-C, may include information that is received via message (e.g. "Yes, the First Market dropped by five points last quarter. The First Market is doing fine, a little bump in the road.") and/or information that is received via answers to a prompt (e.g. a prompt that asks "How did the First Market perform last quarter"—where the prompt has a few preselected answers—"(a) Up 5 Points; (b) Down 5 Points; (c) I don't know" and the user selects one or more of the options presented).

Second timestamp 4002C may be similar to first timestamp 3902C, first timestamp 3502C, second timestamp 3602C, first timestamp 3202C, second timestamp 3302C, timestamp 2802D, and timestamp 2902D described above in connection with FIGS. 22-39, the descriptions of which applying herein. As described above, second timestamp 4002C may enable the computing device 2702 to calculate a time lag associated with the first market response 4002, the market data 3902, and/or the first market query 3904. To compute the time lag, the second timestamp 4002C may include multiple time stamps (e.g. a time at which the first market query 3904 was sent, a time at which the first market query 3904 was opened, a time at which the first market response 4002 was started, a time at which the first market response 4002 was transmitted, and/or a time at which the first market response 4002 was received, to name a few). The multiple times within the second timestamp 4002C may be used to compute the time lag. For example, the computing device 2702 may determine a time lag by determining the amount of time between a first time when the first market query 3904 was opened by the laptop 2708-A and a second time when the first market response 4002 was transmitted by the laptop 2708-A to the computing device 2702. As another example, the computed time lag may be the time difference between a first time associated with the first timestamp 3902C (e.g. a time at which the market data 3902 was sent, a time at which the market data 3902 was opened, to name a few) and a second time associated with the second timestamp 4002C. As another example, in embodiments, the computed time lag may be the time difference between a first time which is not associated with the second timestamp 4002C (e.g. a time of a particular market event element of the market data 3902) and a second time which is associated with the second timestamp 4002C (e.g. the time at which the first market response 4002 was received by the computing device 2702). The computed time lag, in embodiments and as mentioned above, may be compared to upper and/or lower time lag limits. The comparison of the computed time lag to the upper and/or lower time lag limits, as mentioned above, may be used for authentication of the first market response 4002 and/or a determining a reliability rating of a user associated with the laptop 2708-A and/or the cellphone 2708-C (e.g. the user device(s) of the first group of user devices 2708 which sent the first market response 4002). Moreover, as mentioned above, the upper and/or lower time lag limits (thresholds) may be predetermined. The predetermined upper and/or lower time lag limits may be determined in the context of the previously mentioned connection information (e.g. if the connection is poor, the lower and/or upper limits may be increased to account for the poor connection, if the connection is good, the lower and/or upper limits may be decreased to account for the good connection, etc.).

Location information as described herein, may be similar to location information 2802C and location information 2902C described above in connection with FIGS. 22, 23, 27, and 28, the description of which applying herein. As described above, location information may be used for determining the authenticity of the first market response 4002 and/or determining a reliability rating of a user associated with the laptop 2708-A and/or the cellphone 2708-C (e.g. the user device(s) of the first group of user devices 2708 which transmitted the first market response 4002).

Proximity information, as described herein, may be similar to the proximity information described above in connection with FIGS. 22, 23, 27, and 28, the description of which applying herein. As described above, proximity information may be used for determining the authenticity of the first market response 4002 and/or determining a reliability rating of a user associated with the laptop 2708-A and/or the cellphone 2708-C (e.g. the user device(s) of the first group of user devices 2708 which transmitted the first market response 4002).

Audio data, as described herein, may be similar to the audio data described above in connection with FIGS. 22, 23, 27, and 28, the description of which applying herein. As described above, audio data may be used for determining the authenticity of the first market response 4002 and/or determining a reliability rating of a user associated with the laptop 2708-A and/or the cellphone 2708-C (e.g. the user device(s) of the first group of user devices 2708 which transmitted the first market response 4002).

Image data, as described herein, may be similar to the image data described above in connection with FIGS. 22, 23, 27, and 28, the description of which applying herein. As described above, image data may be used for determining the authenticity of the first market response 4002 and/or determining a reliability rating of a user associated with the laptop 2708-A and/or the cellphone 2708-C (e.g. the user device(s) of the first group of user devices 2708 which transmitted the first market response 4002).

Video data, as described herein, may be similar to the video data described above in connection with FIGS. 22, 23, 27, and 28, the description of which applying herein. As described above, video data may be used for determining the authenticity of the first market response 4002 and/or determining a reliability rating of a user associated with the laptop 2708-A and/or the cellphone 2708-C (e.g. the user device(s) of the first group of user devices 2708 which transmitted the first market response 4002).

In embodiments, the computing device 2702 may use information within first market response 4002, (including e.g. user information 4002A, impression sentiment information 4002B, second timestamp 4002C, location information, proximity information, audio data, and/or image data, to name a few) to determine reliability and/or filter out unreliable responses. For example, the computing device 2702 may receive the impression sentiment information 4002B of first market response 4002 and the second timestamp 4002C of first market response 4002. In this example, the second timestamp 4002C may include the began drafting first market response time of the first market query 3904 and the sent time of the first market response 4000. In embodiments, the computing device 2702 may compare the began drafting first market response time and the sent time of the first market response to calculate a time lag. This time lag may be used to determine the reliability of the user associated with a user device that transmitted the first market response 4002. In embodiments, this time lag may be viewed in the context of the impression sentiment information 4002B. If, for example, the time lag is high, and the amount of information contained within the impression sentiment information 4002B is high, the computing device 2702 may determine that the user associated with the first market response 4002 is reliable and/or has a higher probability of being reliable because the high lag time may be due to the amount of information input by the user. If, for example, the time lag is high and the amount of information contained within the impression sentiment information 4002B is low, the computing device 2702 may determine that the first market response 4002 is unreliable and/or has a higher probability of being unreliable because the amount of content sent by the user does not reflect the amount of time spent crafting the first market response 4002. If, for example, the time lag is low and the amount of information contained within the impression sentiment information 4002B is high, the computing device 2702 may determine that the first market response 4002 is unreliable and/or has a higher probability of being unreliable because a user may have not been able to send a response with the high amount of information within the amount of time.

In embodiments, the computing device computing device 2702 may store, in the one or more databases, the first market response 4002 of each user device of the plurality of user devices of the first group of user devices (e.g. first group of user devices 2708) from which the first market response 4002 was received. In embodiments, the one or more databases, as mentioned above, may be: internal storage 1808A, external storage 1808B, memory/storage 1815, system memory 1804, and/or storage 1903, to name a few.

In embodiments, once the computing device 2702 receives and/or stores the first market response 4002, the computing device 2702 may determine the authenticity of the first market response 4002. The process of determining the authenticity of the first market response 4002 may be similar to the process of authenticating the first response 2802 of FIG. 28 and/or the first response 2902 of FIG. 29, described above in connection with FIGS. 22, 23, 27, 28, 29, and 30, the descriptions of which applying herein.

In embodiments, once the computing device 2702 receives and/or stores the first market response 4002, the computing device 2702 may determine the reliability of the plurality of users associated with the electronic devices (e.g. laptop 2708-A, cellphone 2708-C) that transmitted the first market response 4002. The process of determining the reliability of the plurality of users associated with the electronic devices (e.g. laptop 2708-A, cellphone 2708-C) that transmitted the first market response 4002 may be similar to the process of determining the reliability of the users associated with electronic devices that transmitted the first response 2802 of FIG. 28 and/or the first response 2902 of FIG. 29, described above in connection with FIGS. 22, 23, 27, 28, 29, and 30, the descriptions of which applying herein.

Referring to FIG. 26, at step S2614, the computing device (e.g. computing device 2702) may generates a second market query (e.g. second market query 3906) related to future market parameters. The purpose of the second market query, in embodiments, may be to receive predictions (with regards to the market of the market data 3902) from a plurality of users. In embodiments, the second market query may be related to eliciting predictions from one or more users with regards to prices associated with the market of the market data 3902 and/or volume associated with the market of the market data 3902. For example, referring to FIG. 39B, the second market query 3906 may include a message stating: "Do you have any thoughts with regards to how the market will perform?

Price: _____

Volume: _____"

In embodiments, the second market query 3906 may include a query relating to future market conditions of the market that was the subject of the one of the market data 3902 and/or the first market query 3904. Thus, the computing device 2702 may use the first market query 3904 to determine whether a user is reliable in regard to information within market data 3902, then use the second market query 3906 to ask for a prediction with regards to the specific market, the predictions, in embodiments, being a price prediction and/or a volume prediction. In embodiments, second market query 4002 may include predictions, which may include one or more of: price prediction, volume prediction, future plans of purchasing, timing of the future plans of purchasing, future market predictions and/or reasons regarding the decisions and/or predictions related to the specific market, to name a few. Price prediction may refer to a price that the user believes the market will be worth and/or trading at. Volume prediction may refer to the future volume of purchasers, sellers, and/or owners within the market. The future plans of purchasing may refer to whether the user will purchase a first specific asset. Timing of the future plans of purchasing may refer to when the user is planning on purchasing a second specific asset. Future market predictions may refer to a prediction of how a third specific asset will perform over a certain period of time. In embodiments, the first specific asset, the second specific asset, and/or the third specific asset may be the same asset. In embodiments, the reasons regarding the decisions and/or predictions related to the future market conditions may refer to a query that allows the user to give his or her reasons for their predictions.

In embodiments, the second market query 3906 may include executable machine readable instructions that allow for the computing device 2702 to determine when one or more user devices of the first group of user devices 2708 received, opened, and/or began to respond to the second market query 3906. For example, the second market query 3906 may include Message Disposition Notification(s) (MDN).

In embodiments, the second market query 3906 may be generated in response to the computing device 2702 determining that an event (e.g. a market event) is occurring that is related to a market. For example, if there is a report of a First Market increasing in value, the computing device 2702 may generate the second market query 3906 to determine if reliable users associated with the first group of user devices 2708 believes the First Market will continue to increase in value. The second market query 3906 may be specific to the market event related to the market. For example, second market query 3906 may include text that states, "we have received a report that the First Market is increasing in value, do you believe the First Market will continue to perform well?" Additionally, in embodiments, the second market query 3906 may provide a link to the report and/or an excerpt of the report. Furthermore, in embodiments, the second market query 3906 may also include user specific information. For example, the second market query 3906, may state "Jennifer, we have received a report that the First Market is increasing in value, as someone who works in the First Market, do you believe the First Market will continue to perform well?" In embodiments, the second market query 3906 may include a question regarding information that the computing device 2702 has already confirmed, similar to the first market query 3906 described above, the same description applying herein.

In embodiments, the computing device 2702 may determine and/or store market start information. Market start information, in embodiments, may refer to the time at which the event (the event which may be the subject of the process described in FIG. 26) started occurring.

The second market query (e.g. second market query 3906) may include machine readable instructions to present an inquiry message on the one or more user devices of the first group of user devices 2708. In embodiments, the inquiry message may be related to the future financial market condition(s) mentioned above.

In embodiments the inquiry message of the second market query 3906 may be related to financial market condition(s) that were modified or did not take place. This may be similar to the conditions that were modified or did not take place that may be sent with the first market query 3904, the description of which applying herein.

At step S2616, the computing device transmits the second market query to one or more user devices of the first group of user devices. Referring back to FIG. 26, at step S2616, the computing device (e.g. computing device 2702) transmits the second market query (e.g. second market query 3906) via a network (e.g. network 1910). In embodiments, the second market query may be transmitted to the first group of devices (e.g. first group of devices 2708). In embodiments, the second market query may be transmitted to a second group of user devices. The second group of user devices, in embodiments, may be user devices associated with one or more of the following: authenticated users who transmitted the first market responses 4002 (the authentication process, in embodiments, being performed by the computing device 2702B), and/or users who, via an associated user device, transmitted the first market responses 4002 where the computing device 2702 has given the users a reliability rating of RELIABLE (or given a reliability rating which exceeds a predetermined threshold). In embodiments, the second market query 3906 may be transmitted to a plurality of user devices (e.g. plurality of user devices 3006) associated with the plurality of users of an electronic computer network (e.g. network 1910).

Referring to FIG. 39B, computing device 2702, may transmit the second market query 3906 to the first group of user devices 2708. In embodiments, the second market query 3906 may be transmitted over network 1910. In embodiments, the first group of user devices 2708 may include one or more of: laptop 2708-A, wearable device 2708-B, and/or cell phone 2708 C. First group of user devices 2708, in embodiments, may be associated with a first group of users of the plurality of users (e.g. plurality of users associated with the plurality of user devices 3006 described in connection with FIG. 30). The step S2616 may be similar to step S2208 described above in connection with FIGS. 22 and 27, the description of which applying herein.

Figure 41:
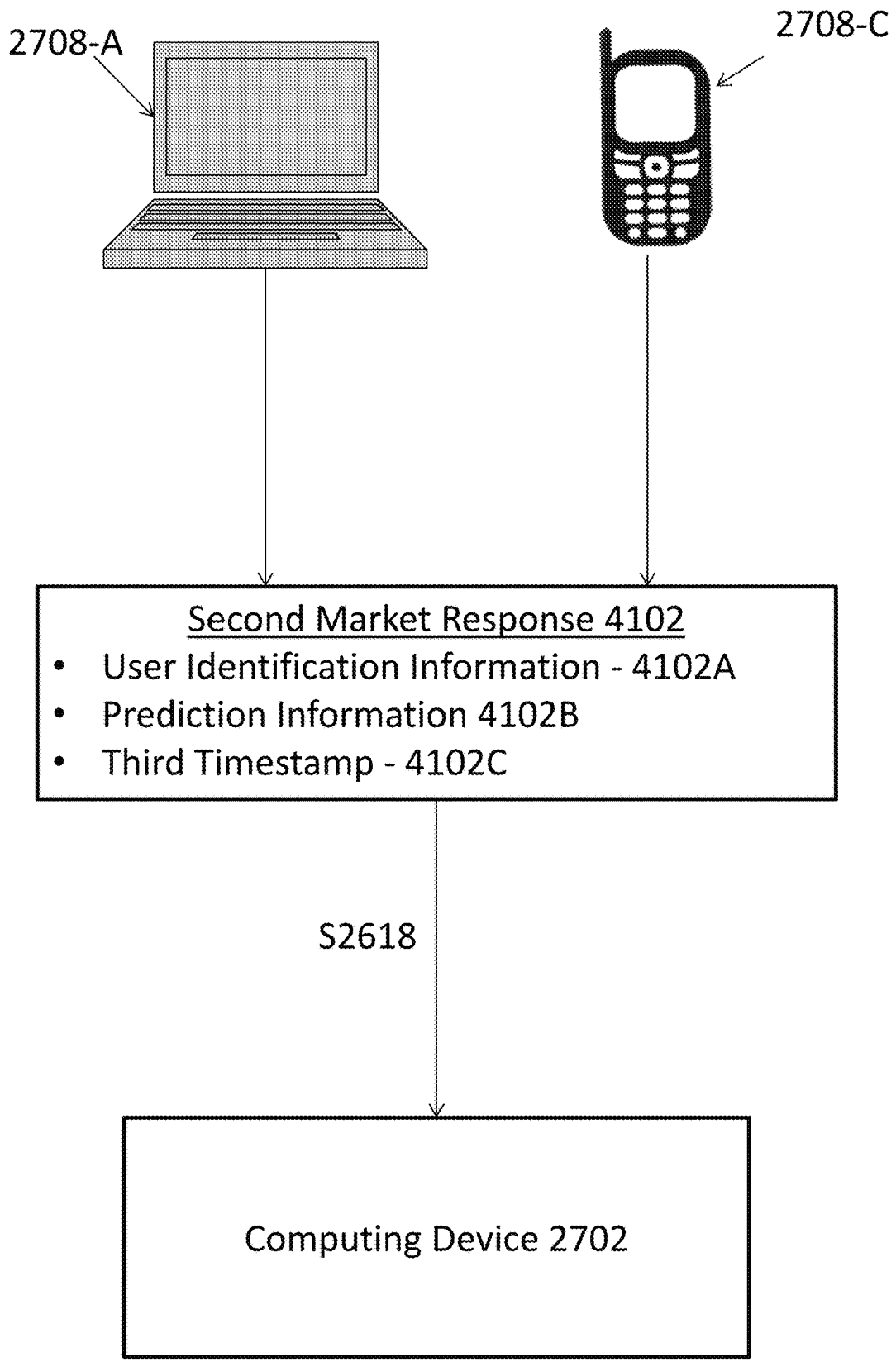
FIG. 41 is an exemplary block diagram illustrating a computing device receiving a second response from a plurality of user devices in accordance with exemplary embodiments of the present invention.

Referring back to FIG. 26, at step S2618, the computing device (e.g. computing device 2702) may receive a second market response (e.g. second market response 4102). The second market response, in embodiments, may be received from one or more user devices of the first group of user devices (e.g. first group of user devices 2708). In embodiments, the second market response may be received from one or more user devices of the aforementioned (with regards to the process of FIG. 24) second group of user devices. Referring to FIG. 41, the computing device 2702 may receive the second market response 4102 from a first user associated with the laptop 2708-A and a second user associated with the cellphone 2708-C. The second market response 4102, in embodiments, may include multiple responses specific to each user. For example, the second market response 4102 may include a specific first user market response and a specific second user market response. While not shown in FIG. 41, continuing the example, the first user market response may be received by the computing device 2702 at a different time than the time at which the computing device 2702 receives the second user market response. While it is clear in the art that messages from different electronic devices do not need to be received at the same time, for brevity and clarity purposes, only one second market response (second market response 4102) is shown in FIG. 41.

In embodiments, second market response 4102 may include one or more of the following: (i) user identification information 4102A unique to the respective user associated with the respective user device; (ii) prediction information 4102B related to at least one of future price information and future volume information; (iii) a third timestamp 4102C; (iv) location information associated with a location of the respective user device associated with the respective user; (v) proximity information; (vi) audio data associated with the prediction information 4102B and/or observations of the user; (vii) image data associated with the prediction information 4102B and/or observations of a user; and/or (viii) video data associated with the prediction information 4102B and/or observations of a user, to name a few.

User identification information 4102A may be similar to user information 4002A, user information 3802A, user information 3602A, user information 3502A, user information 3302A, user information 3202A, user information 2802A, and user information 2902A described above in connection with FIGS. 22-40, the descriptions of which applying herein.

Prediction information 4102B may be information received from a user device (e.g. laptop 2708-A) that is responsive to the second market query 3906. For example, prediction information 4102B may be responsive to a query related to a future price and/or future volume that the computing device 2702 is attempting to predict. For example, in response to a market query that states "John, after reviewing the First Market market data and detailing your impressions, do you have a prediction of the price and volume of the First Market?" the prediction information 4102B may include information that answers the question of "do you have a prediction of the price and volume of the First Market" For example, the prediction information 4102B may include text data representing a message that states: "Yes, the First Market will be trading at 100 dollars a share and have a volume of 5,000 shareholders by the end of the first quarter." As another example, as shown in FIG. 39B, the second market query 3906 may state:

"Do you have any thoughts with regards to how the market will perform?

Price: _____

Volume: _____"

In response to the second market query 3906, prediction information 4102B may include text data representing a message that states: fills out the "blanks." For example, a user may input the following as a response:

"Price: $100

Volume: 5,000."

In embodiments, the user may input the data into blanks provided in the second market query 3906. To send the response from the user device associated with the user responding (e.g. laptop 2708-A) to the computing device 2702, in embodiments, the user may simply press "send" on a touch screen. In embodiments, if all of the blanks are not filled out (e.g. the user only fills out price, but not volume), the application associated with the interface on the user device (e.g. application 1905), may prevent the user from clicking send (e.g. giving an "incomplete form" message, stating that only complete forms may be submitted as responses). In embodiments, if all of the blanks are not filled out, the application 1905 may allow the second market response 4102 to be transmitted from a user device to the computing device 2702. In embodiments, incomplete forms may be flagged by the computing device 2702. The flagging, in embodiments, may cause the computing device 2702 to do a more substantive authenticity and/or reliability rating determination. This is because an incomplete form, in embodiments, may indicate that the user is unauthentic and/or unreliable. However, in embodiments, a user may be transmitting an incomplete form simply because the user does not have a prediction with regards to either price and/or volume. In these embodiments, even if the user is more strictly scrutinized for authenticity and/or reliability ratings, the user's incomplete prediction may demonstrate that the user is reliable because the user is only willing to make a prediction if he or she is comfortable with the prediction. In embodiments, in order to gather more information relating to potential price and/or volume predictions associated with the market subject of the second market query 3906, the query and/or prediction information 4102B may include information regarding timing, prices, volume, and/or reasoning, to name a few.

Third timestamp 4102C may be similar to second timestamp 4002C, first timestamp 3902C, first timestamp 3502C, second timestamp 3602C, first timestamp 3202C, second timestamp 3302C, timestamp 2802D, and timestamp 2902D described above in connection with FIGS. 22-40, the descriptions of which applying herein. As described above, the third timestamp 4102C may enable the computing device 2702 to calculate a time lag associated with the second market response 4102, the first market response 4002, market data 3902, the first market query 3904, and/or the second market query 3906. To compute the time lag, the third timestamp 4102C may include multiple time stamps (e.g. a time at which the first market query 3904 was sent, a time at which the second market query 3906 was opened, a time at which the second market response 4102 was started, a time at which the second market response 4102 was transmitted, and/or a time at which the second market response 4102 was received, to name a few). The multiple times within the third timestamp 4102C may be used to compute the time lag. For example, the computing device 2702 may determine a time lag by determining the amount of time between a first time when the second market query 3906 was opened by the laptop 2708-A and a second time when the second market response 4102 was transmitted by the laptop 2708-A to the computing device 2702. As another example, the computed time lag may be the time difference between a first time associated with the first timestamp 3902C (e.g. a time at which the market data 3902 was sent, a time at which the market data 3902 was opened, to name a few) and a second time associated with the third timestamp 4102C. As another example, the computed time lag may be the time difference between a first time associated with the second timestamp 4002C (e.g. a time at which the first market response 4002 was sent, a time at which the first market response 4002 was opened, to name a few) and a second time associated with the third timestamp 4102C. As yet another example, in embodiments, the computed time lag may be the time difference between a first time which is not associated with the third timestamp 4102C (e.g. a time of a particular market event element of the market data 3902) and a second time which is associated with the third timestamp 4102C (e.g. the time at which the second market response 4102 was received by the computing device 2702). The computed time lag, in embodiments and as mentioned above, may be compared to upper and/or lower time lag limits (e.g. thresholds). The comparison of the computed time lag to the upper and/or lower time lag limits, as mentioned above, may be used for authentication of the second market response 4102 and/or a determining a reliability rating of a user associated with the laptop 2708-A and/or the cellphone 2708-C (e.g. the user device(s) of the first group of user devices 2708 which sent the second market response 4102). Moreover, as mentioned above, the upper and/or lower time lag limits (thresholds) may be predetermined. The predetermined upper and/or lower time lag limits may be determined in the context of the previously mentioned connection information (e.g. if the connection is poor, the lower and/or upper limits may be increased to account for the poor connection, if the connection is good, the lower and/or upper limits may be decreased to account for the good connection, etc.).

Location information as described herein, may be similar to location information 2802C and location information 2902C described above in connection with FIGS. 22, 23, 27, and 28, the description of which applying herein. As described above, location information may be used for determining the authenticity of the second market response 4102 and/or determining a reliability rating of a user associated with the laptop 2708-A and/or the cellphone 2708-C (e.g. the user device(s) of the first group of user devices 2708 which transmitted the second market response 4102).

Proximity information, as described herein, may be similar to the proximity information described above in connection with FIGS. 22, 23, 27, and 28, the description of which applying herein. As described above, proximity information may be used for determining the authenticity of the second market response 4102 and/or determining a reliability rating of a user associated with the laptop 2708-A and/or the cellphone 2708-C (e.g. the user device(s) of the first group of user devices 2708 which transmitted the second market response 4102).

Audio data, as described herein, may be similar to the audio data described above in connection with FIGS. 22, 23, 27, and 28, the description of which applying herein. As described above, audio data may be used for determining the authenticity of the second market response 4102 and/or determining a reliability rating of a user associated with the laptop 2708-A and/or the cellphone 2708-C (e.g. the user device(s) of the first group of user devices 2708 which transmitted the second market response 4102).

Image data, as described herein, may be similar to the image data described above in connection with FIGS. 22, 23, 27, and 28, the description of which applying herein. As described above, image data may be used for determining the authenticity of the second market response 4102 and/or determining a reliability rating of a user associated with the laptop 2708-A and/or the cellphone 2708-C (e.g. the user device(s) of the first group of user devices 2708 which transmitted the second market response 4102).

Video data, as described herein, may be similar to the video data described above in connection with FIGS. 22, 23, 27, and 28, the description of which applying herein. As described above, video data may be used for determining the authenticity of the second market response 4102 and/or determining a reliability rating of a user associated with the laptop 2708-A and/or the cellphone 2708-C (e.g. the user device(s) of the first group of user devices 2708 which transmitted the second market response 4102).

In embodiments, the computing device 2702 may use information within second market response 4102, (including e.g. user identification information 4102A, prediction information 4102B, third timestamp 4102C, location information, proximity information, audio data, and/or image data, to name a few) to determine the reliability rating of a user and/or filter out unreliable responses. The process of determining the reliability rating of a user and/or filtering out unreliable responses may be similar to the processes described above in connection with FIGS. 22, 23, 24, 27, 28, 29, and 32, the descriptions of which applying herein. from at least one respective user device of the first group of user devices. In embodiments, the second market response comprises: (i) user identification information unique to the respective user associated with the respective user device; (ii) prediction information related to at least one of future price information and future volume information; and (iii) a third timestamp.

Referring back to FIG. 26, at step S2620, the computing device (e.g. computing device 2702) stores the second market response (e.g. second market response 4102) of each user device of the plurality of user devices from which the second market response was received (e.g. first group of user devices 2708). in the one or more databases. In embodiments, the one or more databases, as mentioned above, may be: internal storage 1808A, external storage 1808B, memory/storage 1815, system memory 1804, and/or storage 1903, to name a few. Step S2620 may be similar to step S2212 described above in connection with FIGS. 22, 27, and 28, the description of which applying herein.

In embodiments, once the computing device 2702 receives and/or stores the first market response 4002 and/or the second market response 4102, the computing device 2702 may determine the authenticity of the first market response 4002 and/or the second market response 4102. The process of determining the authenticity of the first market response 4002 and/or the second market response 4102 may be similar to the process of authenticating the first response 2802 of FIG. 28 and/or the first response 2902 of FIG. 29, described above in connection with FIGS. 22, 23, 27, 28, 29, and 30, the descriptions of which applying herein.

In embodiments, once the computing device 2702 receives and/or stores the first market response 4002 and/or the second market response 4102, the computing device may determine the reliability of the plurality of users associated with the electronic devices (e.g. laptop 2708-A, cellphone 2708-C) that transmitted the first market response 4002 and/or the second market response 4102. The process of determining the reliability of the plurality of users associated with the electronic devices (e.g. laptop 2708-A, cellphone 2708-C) that transmitted the first market response 4002 and/or the second market response 4102 may be similar to the process of determining the reliability of the users associated with electronic devices that transmitted the first response 2802 of FIG. 28 and/or the first response 2902 of FIG. 29, described above in connection with FIGS. 22, 23, 27, 28, 29, and 30, the descriptions of which applying herein.

In embodiments, if the second market response 4102 indicates that the user associated with the user device that transmitted the second market response 4102 made a price and/or volume prediction, the computing device 2702 may use that information to determine the reliability of that user for future market queries (e.g. a third market query, a fourth market query, . . . , an N market query). For example, the computing device 2702 may use third party sources to determine whether the predictions received from users turned out to be correct, or within a certain predetermined factor of error (the predetermined factor of error, in embodiments, depending on the type of prediction made, the difficulty of the prediction, the percentage of users who were incorrect, and/or the percentage of users who were correct, to name a few). In embodiments, the computing device 2702 may store "correct" and/or "incorrect" predictions associated with each user. In embodiments, the stored correct and/or incorrect predictions may be accessed and/or used by the computing device to update and/or determine a reliability rating associated with the user who made the prediction. In embodiments, if the user made a "correct" (or correct within a predetermined factor of error), the computing device 2702 may generate and transmit a message, the message indicating the user made a correct prediction. In embodiments, if the user made a "incorrect", the computing device 2702 may generate and transmit a message, the message indicating the user made an incorrect prediction. The message (either correct message or incorrect message or both), in embodiments, may also list past stored "correct" and/or "incorrect" predictions, allowing the user to see how well they are predicting markets. The past stored correct and/or incorrect predictions may be accessed and/or used by the computing device 2702 to give a user a prediction score and/or a prediction grade. The score and/or grade may be based on one or more of the following: the amount of correct predictions as compared to the overall number of predictions made by the user, the amount of incorrect predictions as compared to the overall number of predictions made by the user, an amount of correct predictions as compared to the amount of incorrect predictions made by the user, the type of prediction made, the difficulty of the prediction, the percentage of users who were incorrect, and/or the percentage of users who were correct, to name a few. In embodiments, if a user is consistently making correct predictions, the computing device 2702 may flag that user as a VIP user, which, in embodiments, may enable the computing device 2702 to weight responses by the VIP user more heavily than responses from other users. In embodiments, if a user is consistently making incorrect predictions, the computing device 2702 may flag that user as an Incorrect User, which, in embodiments, may enable the computing device 2702 to weight responses by the Incorrect User less heavily than responses from other users. In embodiments, if a VIP user response conflicts with an Incorrect User response, the computing device 2702 may discount the Incorrect User response and rely on the VIP response.

In embodiments, if the computing device 2702 has previously determined the reliability rating of a user, the computing device 2702 may update the reliability rating of the user. The updating of the reliability rating may be similar to the updating of the reliability rating described above in connection with the processes of FIGS. 22 and 23, the descriptions of which applying herein.

Referring to FIG. 26, at step S2622, the computing device (e.g. computing device 2702) calculates at least one of: a price prediction and/or a volume prediction. The computation of at least one of price prediction and/or a volume prediction may be based on one or more of the following: the first market response (e.g. first market response 4002) the second market response (e.g. second market response 4102), the market data (e.g. market data 3902), additional historical data, third party information (e.g. additional information from external data sources), and/or identification information, to name a few. In embodiments, the computing device may access, via one or more databases and/or third parties to obtain one or more of: the first market response (e.g. first market response 4002) the second market response (e.g. second market response 4102), the market data (e.g. market data 3902), additional historical data, and/or third party information (e.g. additional information from external data sources). In embodiments, the computing device 2702 may access the first market response 4002, the second market response 4102, and/or the market data 3902 by receiving the first market response 4002, the second market response 4102, and/or the market data 3902 from one or more of: internal storage 1808A, external storage 1808B, memory/storage 1815, system memory 1804, and/or storage 1903, to name a few. In embodiments, the additional historical data and/or third party information may be received by the computing device 2702 via network 1910 from one or more third party vendors and/or third party sources. In embodiments, the additional historical data and/or third party information may be already stored on one or more databases of the computing device 2702. In embodiments where the additional information is already stored, the computing device 2702 may regularly (e.g. once a day, week, month, quarter, year, etc.) receive the additional information from third party vendors and/or third party sources and store that information on one or more databases of the computing device 2702. In embodiments, the computing device 2702 may access and/or receive the stored identification information from one or more of: internal storage 1808A, external storage 1808B, memory/storage 1815, system memory 1804, and/or storage 1903, to name a few. based on at least the first market response and the second market response. In embodiments, at step S2622, the computing device calculates at least one of the price prediction and the volume prediction based on the first market response and the second market response, as well as additional information from external data sources.

In embodiments, the calculation of the price prediction and/or volume prediction may be based on the first market response (e.g. first market response 4002) and the second market response (e.g. second market response 4102) provided by the first group of user devices (e.g. first group of user devices 2708). In embodiments, the calculation of the price prediction and/or volume prediction may be based on the first market response (e.g. first market response 4002) and the second market response (e.g. second market response 4102) provided by the second group of user devices (e.g. the aforementioned group of user devices associated with reliable users).

In embodiments, the calculation may use the prediction information 4102B that was transmitted by the user devices associated with reliable users (the reliability rating, in embodiments, being based on the first market response 4002 and/or the second market response 4102 that was transmitted by user devices of the first group of user devices 2708). If, for example, the prediction information 4102B shows that users are predicting that the First Market is going to increase in price and in volume, the computing device 2702 may predict that the First Market will increase in price and in volume. If, for example, the prediction information 4102B shows that the First Market is going to decrease in price and in volume, the computing device 2702 may determine that the First Market will decrease in value and in volume. The specific calculations regarding the prediction information 4102B may be the calculations currently used in the respective industry of the market associated with the market prediction, using information received in the first market response (e.g. first market response 4002) and the second market response (e.g. second market response 4102).

In embodiments, as mentioned above, the calculated market price prediction and/or volume prediction may be based on one or more of the following: the first market response (e.g. first market response 4002) the second market response (e.g. second market response 4102), the market data (e.g. market data 3902), additional historical data, third party information (e.g. additional information from external data sources), and/or identification information, to name a few. Additional data (e.g. additional historical data and/or third party information) may enable the computing device 2702 to make more accurate market predictions. The additional historical data may include historical data specific to the industry of the market and/or specific to the market which was queried in the second market query 3906. For example, historical data may include: previous open stock prices, previous high stock prices, previous low stock prices, spot prices, futures prices, previously predicted higher prices, current stock prices, past stock prices, past volumes past performance of the market, past volume of market, and/or past pricing of the market, to name a few. The third party information, in embodiments, may include: additional historical data, earnings reports, price-to-earnings ratios, products associated with the market and whether the products are coming to market soon, tariffs, taxes, legal dispute information, and/or corporate information regarding one or more corporations associated with the market and/or the industry related to the market, to name a few.

In embodiments, the computing device 2702 may implement a machine learning technique to calculate the market prediction. In embodiments, the machine learning technique may be based on one or more of the following: the first market response (e.g. first market response 4002) the second market response (e.g. second market response 4102), the market data (e.g. market data 3902), additional historical data, third party information (e.g. additional information from external data sources), and/or identification information, to name a few. The machine learning technique, in embodiments, may implement a machine learning algorithm, such as supervised learning algorithms (e.g. classification supervised learning, regression supervised learning), unsupervised learning algorithms (e.g. association unsupervised learning, clustering unsupervised learning, dimensionality reduction unsupervised learning), reinforcement learning algorithms (e.g. through trial and error), semi-supervised algorithms, Naïve Bayes Classifier Algorithm, K Means Clustering Algorithm, Support Vector Machine Algorithm, Apriori Algorithm, Linear Regression, Logistic Regression, Artificial Neural Networks, Random Forests, Decision Trees, and/or Nearest Neighbors, to name a few. In embodiments, the machine learning technique may be a deep learning technique, which may be based on learning data representations as opposed to task-specific algorithms. The deep learning technique may be supervised, semi-supervised, and/or unsupervised. In embodiments, the stock market prediction calculation may be performed by using a neural network technique, which may include a deep learning neural network technique (e.g. DNN). A DNN may be an artificial neural network with multiple layers between the input (e.g. the first market response 4002 and the second market response 41020) and output (e.g. the price prediction and/or volume prediction).

Figure 42:
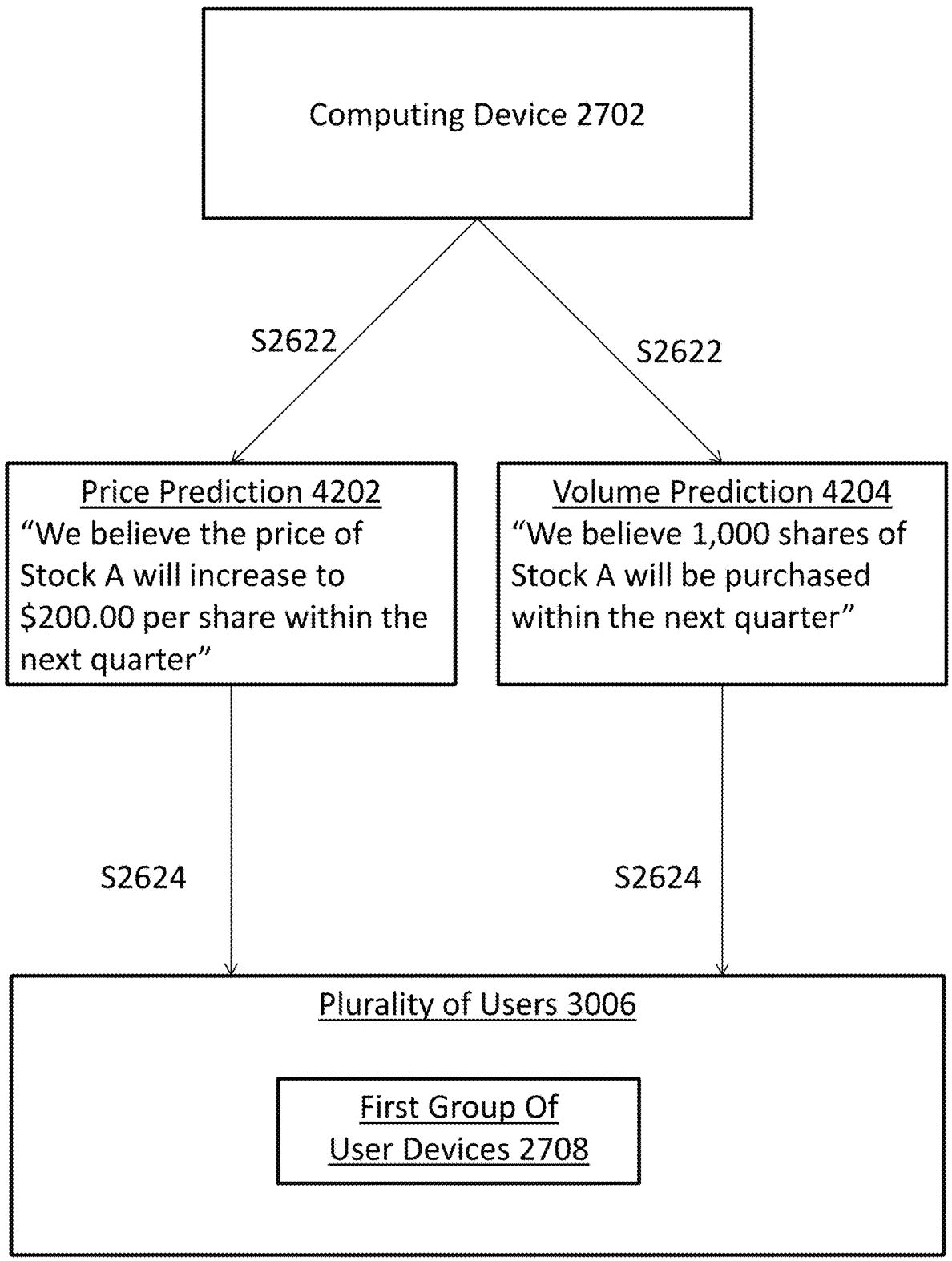
FIG. 42 is an exemplary block diagram illustrating a computing device generating and transmitting a prediction and a prediction to a plurality of users in accordance with exemplary embodiments of the present invention.

In embodiments, once the price prediction and/or volume prediction is calculated, the computing device 2702 may generate a price prediction message (e.g. price prediction 4202) and/or a volume prediction message (e.g. volume prediction 4204). Referring to FIG. 42, the price prediction 4202, in embodiments, may state "We believe the price of Stock A will increase to $200.00 per share within the next quarter." In embodiments, the price prediction 4202 may include one or more of the following: the price of an asset or assets within the market, the amount of users that sent the first market response 4002, the amount of users that sent the second market response 4102, the amount of reliable users, the amount of reliable users that gave information that was used in the price prediction 4202, and/or a recommendation based on the price prediction 4202. In embodiments, the volume prediction 4204, may state "We believe 1,000 shares of Stock A will be purchased within the next quarter." In embodiments, the volume prediction 4204 may include one or more of the following: the volume of an asset or assets within the market, the amount of users that sent the first market response 4002, the amount of users that sent the second market response 4102, the amount of reliable users, the amount of reliable users that gave information that was used in the volume prediction 4204, and/or a recommendation based on the volume prediction 4204.

Referring back to FIG. 26, at step S2624, the computing device (e.g. computing device 2702) transmits at least one of the price prediction (e.g. price prediction 4202) and the volume prediction (e.g. volume prediction 4204) to the plurality of users (e.g. plurality of users 3006). Referring to FIG. 42, in embodiments, the generated price prediction 4202 and/or volume prediction 4204 may be transmitted, via network 1910, to one or more of: the plurality of user 3006, the first group of user devices 2708, the second group of user devices, and/or a group of users devices associated with users who provided information that was used in either the price prediction 4202 and/or volume prediction 4204. In embodiments, the price prediction 4202 and/or volume prediction 4204 may not be sent to unreliable users. In those embodiments, a notification message may be generated and transmitted by the computing device 2702 to user devices associated with the unreliable users. The notification may state why the stock market prediction was not sent to the unreliable user (e.g. because your information was not reliable).

In embodiments, users may be incentivized to respond to messages sent from the computing device 2702 (e.g. event stimulus message 2704, news stimulus message 2706, first market query 3102, second market query 3104, first stock market query 3402, second stock market query 3404, third stock market query 3702, first market response 3904, and/or second market response 3906, to name a few). For example, a user may receive a point for every responsive message sent to the computing device 2702 (responsive messages may include first response 2802, first response 2902, first market response 3202, second market response 3302, first stock market response 3502, second stock market response 3602, third stock market response 3802, first market response 4002, and/or second market response 4102, to name a few). These points, in embodiments, may be compared to other user point totals. For example, point totals may be compared within groups (e.g. the users associated with the first group of user devices 2708) or compared globally (e.g. the users associated with the plurality of devices 3006). The top point earners may receive a title for being the top point earner of a certain period of time (e.g. all time, a year, a month, a week, a day, etc., to name a few). If a user has a title, or has earned a title, the computing device 2702 may generate and send a message to a user device associated with the relevant user stating, for example, "Congrats Mr. Responsive, you have responded to the most stimulus messages this week." As another incentive, if a user loses a title, the computing device 2702 may generate and send a message to a user device associated with the relevant user, stating, for example, "John just took your Mr. Responsive title, why not respond to a new stimulus message and reclaim your title?"

As another example, users may receive points based on their respective reliability rating. As with the above example, the points, may be compared to other user point totals. For example, point totals may be compared within groups (e.g. the users associated with the first group of user devices 2708) or compared globally (e.g. the users associated with the plurality of devices 3006). The top point earners may receive a title for being the top point earner of a certain period of time (e.g. all time, a year, a month, a week, a day, etc., to name a few). If a user has a title, or has earned a title, the computing device 2702 may generate and send a message to a user device associated with the relevant user stating, for example, "Congrats Mr. Reliable, you have responded to the most stimulus messages this week." As another incentive, if a user loses a title, the computing device 2702 may generate and send a message to a user device associated with the relevant user, stating, for example, "Jason just took your Mr. Reliable title, get your reliability rating up and take it back!"

In embodiments, other incentives which may be offered, may include financial incentives, which may include, money, coupons, discounts, free memberships, and/or free items in a giveaway (e.g. a t-shirt, hat, cufflinks etc., to name a few). Other exemplary factors that may be used to give incentives may include, for example, how fast a user responds, how often a user responds, how complete each user response is, how many images are sent with responses, how many audio files are sent with responses, how many videos are sent with responses, how often a user is within a predetermined radius for responses, and/or how many references the user receives in prepared news stories, timelines, and/or predictions, to name a few.

The steps of the process described in connection with FIG. 26, in embodiments, may be rearranged or omitted.

In embodiments, the present invention generally relates to a unique and non-routine method for identifying an unreliable user(s) of a network and/or using a user response(s) in the network to provide an accurate timeline of an event. As further described below, at least one embodiment of the present invention includes unconventional and non-routine method steps that specify how to collect responses from a plurality of users, analyze those responses to determine a reliability rating based on the response information and create an accurate timeline of an event based on the responses while accounting for unreliable responses.

In embodiments, a computing device connected to the network may be configured to assign reliability ratings (e.g., reliable, unreliable or graded reliability ratings) to users based on the accuracy of the information provided in their responses, wherein a user providing accurate information in a response is reliable and a user providing inaccurate information in a response is unreliable. Based on these reliability ratings, in embodiments, a decision is made as to whether a respective user is unreliable. In embodiments, responses provided by reliable users are weighted more heavily in creating a timeline than response from unreliable users, such that the net result is a more reliable and accurate timeline. These unique and non-routine steps offer a technical solution to the technical problem posed by deceitful users in network applications that rely on user responses.

Various embodiments of the invention provide generally for a real-time event transcription system and related methods. Some embodiments provide further for utilizing cheating detection and compensation methods while providing synchronized user engagement. Additional embodiments provide further ability to send, target or tailor advertisements, marketing, or other promotional material to a plurality of users based on an analysis of the users (individually or in any grouping) affinity to particular teams, actors, celebrities, or other entities and a further analysis that predicts the reaction of those users to events as they transpire.

For example, the present invention relates to a method of generating an accurate news report based on information provided by one or more users of a plurality of users of an electronic computer network, the method including steps of: (a) receiving, by a computing device, identification information associated with each user of the plurality of users of the electronic computer network; (b) storing, by the computing device in one or more databases, the identification information; (c) generating, by the computing device, a first stimulus message related to an event; (d) transmitting, by the computing device, the first stimulus message to a first group of user devices associated with a first group of users of the plurality of users; (e) receiving, by the computing device from one or more user devices of the first group of user devices, a first response, wherein the first response includes: (i) user information specific to the respective user associated with the respective user device that transmits the first response; (ii) responsive information related to the event; (iii) location information associated with a location of the respective user device associated with the respective user; and (iv) a timestamp; (f) storing, by the computing device, the first response in the one or more databases; (g) determining, by the computing device, authenticity of the first response based on one or more of the responsive information, the location information and the timestamp; (h) assigning, by the computing device, a reliability rating to the respective user based the first response by performing steps of: (i) assigning, by the computing device, the reliability rating to be a reliable rating when the location information is consistent with a location of the event and the timestamp indicates acceptable delay; and (ii) assigning, by the computing device, the reliability rating to be an unreliable rating when the location information is inconsistent with the location of the event or the timestamp indicates an unacceptable delay; (i) storing, by the computing device in the one or more databases, the reliability rating; (j) identifying, by the computing device, one or more reliable users based on the reliability rating; (k) selecting, by the computing device, the responsive information associated with the one or more reliable users; and (l) generating, by the computer system, a news report based on the selected responsive information.

In embodiments, the first stimulus message includes machine readable instructions to present an inquiry message relating to a past event element of the event on the one or more user devices of the first group of user devices.

In embodiments, the first stimulus message includes machine readable instructions to present an inquiry message relating to a future event element of the event on the one or more user devices of the first group of user devices.

In embodiments, the user information in the first response from each user device of the one or more user devices of the first group of user devices includes proximity information regarding each user device, in embodiments, the method further includes the step (g) of determining the authenticity of the first response is based on the proximity of the respective user device to other user devices.

In embodiments, the method further includes a step of determining, by the computing device, a time lag between occurrence of a particular event element of the event and receipt of the respective first response from each respective user device of the one or more user devices from the first group of user devices including information relating to the particular event element. In embodiments, the user information associated with the respective user includes information regarding a connection of the user device associated with the respective user to the electronic computer network and in embodiments, the method further includes the step (g) of determining the authenticity of the first response further includes a step of comparing, by the computing device, the determined time lag to an expected time lag for the connection of the user device associated with the respective user to the electronic computer network. In embodiments, the step (h) of assigning the reliability rating to the respective user further includes a step of assigning, by the computing device, the reliability rating to the respective user to be an unreliable rating when the determined time lag of the first response from the user device associated with the respective user is outside upper and lower thresholds of the expected time lag.

In embodiments, the first stimulus message includes machine readable instructions to present an inquiry message on each user device of the first group of user devices regarding a past event element of the event that was modified or did not take place. In embodiments, the step (h) of assigning the reliability rating further includes a step of assigning, by the computing device, the reliability rating to the respective user to be an unreliable rating when the first response from the user device associated with the respective user includes first response information confirming occurrence of the past event element that was modified or did not take place.

In embodiments, the method further includes a step of creating, by the computing device, a timeline of the event based on the first response from the one or more user devices of the first group of user devices. In embodiments, the step of creating the timeline further includes a step of weighing, by the computing device, first response information from the first response received from the one or more user devices of the first group of user devices based on the reliability rating of the respective user associated with the user device providing the first response, the first response information from the first response from the respective user devices associated with the users with the reliable rating is weighted more heavily than the first response information from the first response from the respective user devices associated with the users with the unreliable rating.

In embodiments, the method further includes steps of: (m) transmitting, from the computing device, after a first predetermined period of time, a second stimulus message related to the event to the first group of user devices, the second stimulus message including information related to the event and machine readable instructions to present a second message to each user of the first group of users on each user device of the first group of user devices that prompts a second response from each user; (n) receiving, by the computing device via the electronic computer network, the second response from one or more user devices of the first group of user devices, the second response including second response information related to the second message and the user information specific to the user associated with the respective user device; (o) storing, by the computing device, the second response in memory accessible by the computing device; (p) determining, by the computing device, authenticity of the second response from each of the one or more user devices of the first group of user devices, by performing at least the following steps: (i) determining, by the computing device, whether the second response includes the second response information that corresponds to activity in the event; and (ii) determining, by the computing device, whether the second response includes the second response information relating to event elements available to the respective user when the second message was displayed on the user device associated with the respective user; and (q) updating, by the computing device, the reliability rating for each user of the one or more user devices based on the authenticity of the second response received from the user device associated with the respective user. In embodiments, the step (q) of updating the reliability rating includes steps of: (i) assigning, by the computing device, a reliable rating to the respective user when the second response from the user device associated with the respective user includes the second response information that corresponds to activity in the event; (ii) assigning, by the computing device, a reliable rating to the respective user when the second response received from the user device associated with the respective user includes the second response information available to the respective user of the user device associated with the respective user when the second message was displayed;

(iii) assigning, by the computing device, an unreliable rating to the respective user when the second response received from the user device associated with the respective user includes the second response information that does not correspond to activity in the event; and (iv) assigning, by the computing device, an unreliable rating to the respective user when the second response received from the user device associated with the respective user includes the second response information that was not available to the respective user when the second message was displayed. In embodiments, the step (q) of updating the reliability rating further includes steps of: (i) assigning, by the computing device, a reliable rating when the respective user received the reliable rating for the first predetermined period of time followed by a second reliable rating, or the reliable rating for the first predetermined period of time followed by a second unreliable rating; and (ii) assigning, by the computing device, an unreliable rating when the respective user received the unreliable rating for the first predetermined period of time followed by a second unreliable rating, or the unreliable rating for the first predetermined period of time followed by a second reliable rating. In embodiments, the method may further include the following steps: creating, by the computing device, a timeline of the event based on the first response from the one or more user devices of the first group of user devices; and updating, by the computing device, the timeline of the event based on the second response after the first predetermined period of time. In embodiments, the step of updating the timeline further includes a step of weighting, by the computing device, the second response information in the second response received from the one or more user devices based on the reliability rating of the respective user associated with the respective user device providing the second response, the second response information in the second response from the user devices associated with the respective users with the reliable rating is weighted more heavily than the second response information in the second response from the user devices associated with the respective users with the unreliable rating. In embodiments, the step of updating the timeline further includes a step of weighting, by the computing device, the second response information in the second response received from the one or more user devices based on the reliability rating of the respective user associated with the respective user device providing the second response when the second response was initiated from a user device at a location geographically proximal to the event, the second response information in the second response from the user devices associated with the respective users with the reliable rating is weighted more heavily than the second response information in the second response from the user devices associated with the respective users with the unreliable rating. In embodiments, the step of updating the timeline further includes a step of weighting, by the computing device, the second response information in the second response received from the one or more user devices based on the reliability rating of the respective user associated with the respective user device providing the second response when the second response was initiated from a user device located geographically proximal to other user devices with similar reliability ratings, and the second response information in the second response from the user devices associated with the respective users with the reliable ratings is weighted more heavily than the second response information in the second response from the user devices associated with the respective users with the unreliable rating.\

In embodiments, the timestamp includes: (A) a first timestamp indicating when the first response was transmitted; and (B) a second timestamp indicating when the first response was received by the computing device.

The present invention also relates to a method of determining accuracy of a news report based on information provided by one or more users of a plurality of users of an electronic computer network, the method including steps of: (a) receiving, by a computing device, identification information associated with each user of the plurality of users of the electronic computer network; (b) storing, by the computing device in one or more databases, the identification information; (c) generating, by the computing device, a first stimulus message related to the news report; (d) transmitting, by the computing device, the first stimulus message to a first group of user devices associated with a first group of users of the plurality of users; (e) receiving, by the computing device from one or more user devices of the first group of user devices, a first response, wherein the first response includes: (i) user information specific to the respective user associated with the respective user device that transmits the first response; (ii) responsive information related to the news report; (iii) location information associated with a location of the respective user device; and (iv) a timestamp; (f) storing, by the computing device, the first response in the one or more databases; (g) determining, by the computing device, authenticity of the first response based on one or more of the responsive information, the location information and the timestamp; (h) assigning, by the computing device, a reliability rating to the respective user based the first response by performing steps of: (i) assigning, by the computing device, the reliability rating to be a reliable rating when the location information is consistent with a location associated with the news report and the timestamp indicates acceptable delay; (ii) assigning, by the computing device, the reliability rating to be an unreliable rating when the location information is inconsistent with the location associated with the news report or the timestamp indicates an unacceptable delay; (i) storing, by the computing device in the one or more databases the reliability rating; (j) identifying, by the computing device, one or more reliable users based on the reliability rating; (k) selecting, by the computing device, the responsive information associated with the one or more reliable users; (l) determining, by the computing device, a news report reliability rating based on the selected responsive information associated with the one or more reliable users; (m) transmitting, by the computing device, the news report reliability rating to the plurality of users.

In embodiments, the user information in the first response from each user device of the one or more user devices of the first group of user devices includes proximity information regarding each user device and the step (g) of determining the authenticity of the first response is based on the proximity of the respective user device to other user devices.

In embodiments, the method further includes a step of determining, by the computing device, a time lag between occurrence of a particular event element of the news report and receipt of the respective first response from each respective user device of the one or more user devices from the first group of user devices including information relating to the particular event element. In embodiments, the user information associated with the respective user includes information regarding a connection of the user device associated with the respective user to the electronic computer network and the step (g) of determining the authenticity of the first response further includes a step of comparing, by the computing device, the determined time lag to an expected time lag for the connection of the user device associated with the respective user to the electronic computer network. In embodiments, the step (h) of assigning the reliability rating to the respective user further includes a step of assigning, by the computing device, the reliability rating to the respective user to be an unreliable rating when the determined time lag of the first response from the user device associated with the respective user is outside upper and lower thresholds of the expected time lag.

In embodiments, the first stimulus message includes machine readable instructions to present an inquiry message on each user device of the first group of user devices regarding a past event element of the news report that was modified or did not take place. In embodiments, the step (h) of assigning the reliability rating to the respective user further includes a step of assigning, by the computing device, the reliability rating to the respective user to be an unreliable rating when the first response from the user device associated with the respective user includes first response information confirming occurrence of the past event element that was modified or did not take place.

In embodiments, the method further includes a step of creating, by the computing device, a timeline of the event based on the first response from the one or more user devices of the first group of user devices.

In embodiments, the step of creating the timeline further includes a step of weighting, by the computing device, first response information from the first response received from the one or more user devices of the first group of user devices based on the reliability rating of the respective user associated with the user device providing the first response, wherein the first response information from the first response from the respective user devices associated with the users with the reliable rating is weighted more heavily than the first response information from the first response from the respective user devices associated with the users with the unreliable rating.

In embodiments, the method further includes the steps of: (n) transmitting, from the computing device, after a first predetermined period of time, a second stimulus message related to the news report to the first group of user devices, the second stimulus message including information related to the news report and machine readable instructions to present a second message to each user of the first group of users on each user device of the first group of user devices that prompts a second response from each user; (o) receiving, by the computing device via the electronic computer network, the second response from one or more user devices of the first group of user devices, the second response including second response information related to the second message and the user information specific to the user associated with the respective user device; (p) storing, by the computing device, the second response in memory accessible by the computing device; (q) determining, by the computing device, authenticity of the second response from each of the one or more user devices of the first group of user devices, by performing at least the following steps: (i) determining, by the computing device, whether the second response includes the second response information that corresponds to an activity event element in the news report; and (ii) determining, by the computing device, whether the second response includes the second response information relating to news report elements available to the respective user when the second message was displayed on the user device associated with the respective user; and (r) updating, by the computing device, the reliability rating for each user of the one or more user devices based on the authenticity of the second response received from the user device associated with the respective user. In embodiments, the step (r) of updating the reliability rating includes steps of: (i) assigning, by the computing device, a reliable rating to the respective user when the second response from the user device associated with the respective user includes the second response information that corresponds to the activity event element in the news report; (ii) assigning, by the computing device, a reliable rating to the respective user when the second response received from the user device associated with the respective user includes the second response information available to the respective user of the user device associated with the respective user when the second message was displayed; (iii) assigning, by the computing device, an unreliable rating to the respective user when the second response received from the user device associated with the respective user includes the second response information that does not correspond to the activity event element in the news report; and (iv) assigning, by the computing device, an unreliable rating to the respective user when the second response received from the user device associated with the respective user includes the second response information that was not available to the respective user when the second message was displayed. In embodiments, the step (r) of updating the reliability rating further includes steps of: (i) assigning, by the computing device, a reliable rating when the respective user received the reliable rating for the first predetermined period of time followed by a second reliable rating, or the reliable rating for the first predetermined period of time followed by a second unreliable rating; and (ii) assigning, by the computing device, an unreliable rating when the respective user received the unreliable rating for the first predetermined period of time followed by a second unreliable rating, or the unreliable rating for the first predetermined period of time followed by a second reliable rating. In embodiments, the method further includes the steps of: creating, by the computing device, a timeline of the news report based on the first response from the one or more user devices of the first group of user devices; and updating, by the computing device, the timeline of the news report based on the second response after the first predetermined period of time. In embodiments, the step of updating the timeline further includes a step of weighting, by the computing device, the second response information in the second response received from the one or more user devices based on the reliability rating of the respective user associated with the respective user device providing the second response, the second response information in the second response from the user devices associated with the respective users with the reliable rating is weighted more heavily than the second response information in the second response from the user devices associated with the respective users with the unreliable rating. In embodiments, the step of updating the timeline further includes a step of weighting, by the computing device, the second response information in the second response received from the one or more user devices based on the reliability rating of the respective user associated with the respective user device providing the second response when the second response was initiated from a user device at a location geographically proximal to an event element of the news report, and the second response information in the second response from the user devices associated with the respective users with the reliable rating is weighted more heavily than the second response information in the second response from the user devices associated with the respective users with the unreliable rating. In embodiments, the step of updating the timeline further includes a step of weighting, by the computing device, the second response information in the second response received from the one or more user devices based on the reliability rating of the respective user associated with the respective user device providing the second response when the second response was initiated from a user device located geographically proximal to other user devices with similar reliability ratings, and the second response information in the second response from the user devices associated with the respective users with the reliable ratings is weighted more heavily than the second response information in the second response from the user devices associated with the respective users with the unreliable rating.

In embodiments, the timestamp includes: (A) a first timestamp indicating when the first response was transmitted; and (B) a second timestamp indicating when the first response was received by the computing device.

The present invention also relates to a method of predicting financial market conditions based on information provided by one or more users of a plurality of users of an electronic computer network, the method including steps of: (a) receiving, by a computing device, identification information associated with each user of a plurality of users of the electronic computer network; (b) storing, by the computing device in one or more databases, the identification information; (c) generating, by the computing device, a first market query related to past financial market conditions; (d) transmitting, by the computing device to at least a first group of user devices associated with a first group of users of the plurality of users of the electronic computer network, the first market query; (e) receiving, by the computing device from at least a plurality of user devices of the first group of user devices, a first market response, the first market response including: (i) user information unique to the respective user associated with the respective user device providing the first market response; (ii) past market information related to prior market conditions; and (iii) a timestamp; (f) storing, by the computing device in the one or more databases, the first market response of each user device of the plurality of user devices of the first group of user devices from which the first market response was received; (g) generating, by the computing device, a second market query related to future market conditions; (h) transmitting, by the computing device, the second market query to the first group of user devices; (i) receiving, by the computing device from at least a plurality of user devices of the first group of user devices, a second market response, the second market response including: (i) user information unique to the respective user associated with the respective user device providing the second market response; (ii) a prediction for the future market conditions; and (iii) a second timestamp; (j) storing, by the computing device in the one or more databases, the second market response of each user device of the plurality of user devices from which the second market response was received; (k) accessing, by the computing device, at least the first market response and the second market response provided by each user device of the first group of user devices; (1) calculating, by the computing device, a market prediction related to the future market conditions based on at least the first market response and the second market rely provided by the first group of user devices.

In embodiments, the past financial market conditions include past price information or past volume information.

In embodiments, the calculating step (1) includes calculating, by the computing device, the market prediction related to the future market conditions based on the first market response and the second market response provided by the first group of user devices, additional historical data and additional information from external data sources.

In embodiments, the step (1) of calculating the market prediction is performed by using a machine learning technique based on the at least the first market response and the second market response provided by the first group of user devices as an input.

In embodiments, the step (1) of calculating the market prediction is performed by using a neural network technique based on the at least the first market response and the second market response provided by the first group of user devices as an input.

In embodiments, the neural network technique includes a deep learning neural network technique.

In embodiments, the first market query includes machine readable instructions to present an inquiry message relating to the past financial market conditions on the one or more user devices of the first group of user devices.

In embodiments, the second market query includes machine readable instructions to present an inquiry message relating to the future market conditions on the one or more user devices of the first group of user devices.

In embodiments, the method further includes a step of determining, by the computing device, a time lag between occurrence of a particular market event element of the past financial market conditions and receipt of the respective first market response from each respective user device of the one or more user devices from the first group of user devices including information relating to the particular event element. In embodiments, the method further includes, determining authenticity of the first market response by performing a step of comparing, by the computing device, the determined time lag to an expected time lag for a connection of the user device associated with the respective user to the electronic computer network. In embodiments, the method further includes, assigning, by the computing device, an unreliable rating to the respective user when the determined time lag of the first response from the user device associated with the respective user is outside upper and lower thresholds of the expected time lag.

In embodiments, the first market query includes machine readable instructions to present an inquiry message on each user device of the first group of user devices regarding a past market event element of the past financial market conditions that was modified or did not take place. In embodiments, the method further includes, assigning, by the computing device, an unreliable rating to the respective user when the first market response from the user device associated with the respective user includes first market response information confirming occurrence of the past market event element that was modified or did not take place.

In embodiments, the first timestamp includes: (A) a third timestamp indicating when the first market response was transmitted; and (B) a fourth timestamp indicating when the first market response was received by the computing device.

In embodiments, the second timestamp includes: (A) a fifth timestamp indicating when the second market response was transmitted; and (B) a sixth timestamp indicating when the second market response was received by the computing device.

The present invention also relates a method of predicting stock market conditions based on information provided by one or more users of a plurality of users of an electronic computer network, the method including steps of: (a) receiving, by a computing device, identification information associated with each user of a plurality of users of the electronic computer network; (b) storing, by the computing device in one or more databases, the identification information; (c) generating, by the computing device, a first stock market query related to prior stock market conditions; (d) transmitting, by the computing device to a first group of user devices associated with a first group of users of the plurality of users of the electronic computer network, the first stock market query; (e) receiving, by the computing device from a plurality of user devices of the first group of user devices, a first stock market response, the first stock market response including: (i) user information unique to the respective user associated with the respective user device providing the first stock market response; (ii) past stock market information related to the prior stock market conditions; and (iii) a timestamp; (f) storing, by the computing device in the one or more databases, the first stock market response of each user device of the plurality of user devices of the first group of user devices from which the first stock market response was received; (g) generating, by the computing device, a second stock market query related to future stock market conditions; (h) transmitting, by the computing device, the second stock market query to the first group of user devices; (i) receiving, by the computing device, a second stock market response from at least a plurality of user devices of the first group of user devices, the second stock market response including: (i) user information unique to the respective user associated with the respective user device providing the second stock market response; (ii) a prediction for the future stock market conditions; and (iii) a second timestamp; (h) storing, by the computing device in the one or more databases, the second stock market response; (i) accessing, by the computing device, at least the first stock market response and the second stock market response provided by each user device of the first group of user devices; (j) calculating, by the computing device, a stock market prediction related to the future stock market conditions based on at least the first stock market response and second stock market response provided by the first group of user devices.

In embodiments, the first stock market query includes a query relating to past price information for a particular stock, past volume information for a particular stock, or past price/volume information for a sector.

In embodiments, the step (j) of calculating the stock market prediction is performed by using a machine learning technique based on the at least the first stock market response and second stock market response provided by the first group of user devices as an input.

In embodiments, the step (j) of calculating the stock market prediction is performed by using a neural network technique based on the at least the first stock market response and second stock market response provided by the first group of user devices as an input.

In embodiments, the neural network technique includes a deep learning neural network technique.

In embodiments, the method of predicting stock market conditions further includes (k) detecting, by the computing device, a trading pattern by performing steps of: (i) generating, by the computing device, a third stock market query related to past transactions; (ii) transmitting, by the computing device, the third stock market query to the first group of user devices; (iii) receiving, by the computing device, a third stock market response from at least a plurality of user devices of the first group of user devices, the third stock market response including: (A) user information unique to the respective user associated with the respective user device providing the third stock market response; (B) stock ID information for a particular stock; (C) stock price information for the particular stock; (D) buy/sell data information for the particular stock; and (E) quantity information for the particular stock; (iv) storing, by the computing device in the one or more databases, the third stock market response; (v) accessing, by the computing device, at least the first stock market response, the second stock market response and the third stock market response provided by each user device of the first group of user devices; (vi) determining, by the computing device, the trading pattern based on at least the first stock market response, the second stock market response and the third stock market response provided by the first group of user devices. In embodiments, the step (k)(vi) of determining the trading pattern is performed by using a machine learning technique based on the at least the first stock market response, the second stock market response and the third stock market response provided by the first group of user devices as an input. In embodiments, the step (k)(vi) of determining the trading pattern is performed by using a neural network technique based on the at least the first stock market response, the second stock market response and the third stock market response provided by the first group of user devices as an input. In embodiments, the neural network technique includes a deep learning neural network technique.

In embodiments, the method of predicting stock market conditions further includes steps of (l) comparing, by the computing device, the determined trading pattern to other users; and (m) generating, by the computing device, trading suggestions for the other users based on the result of the comparing step.

In embodiments, the first stock market query includes machine readable instructions to present an inquiry message relating to the prior stock market conditions on the one or more user devices of the first group of user devices.

In embodiments, the second stock market query includes machine readable instructions to present an inquiry message relating to the future stock market conditions on the one or more user devices of the first group of user devices.

In embodiments, the method further includes the step of determining, by the computing device, a time lag between occurrence of a particular stock market event element of the prior stock market conditions and receipt of the respective first stock market response from each respective user device of the one or more user devices from the first group of user devices including information relating to the particular stock market event element. In embodiments, the method further includes the step of determining authenticity of the first stock market response by performing a step of comparing, by the computing device, the determined time lag to an expected time lag for a connection of the user device associated with the respective user to the electronic computer network. In embodiments, the method further includes the step of assigning, by the computing device, an unreliable rating to the respective user when the determined time lag of the first stock market response from the user device associated with the respective user is outside upper and lower thresholds of the expected time lag.

In embodiments, the first stock market query includes machine readable instructions to present an inquiry message on each user device of the first group of user devices regarding a past stock market event element of the prior stock market conditions that was modified or did not take place. In embodiments, the method further includes the step of assigning, by the computing device, an unreliable rating to the respective user when the first stock market response from the user device associated with the respective user includes first stock market response information confirming occurrence of the past stock market event element that was modified or did not take place.

In embodiments, the first timestamp includes: (A) a third timestamp indicating when the first stock market response was transmitted; and (B) a fourth timestamp indicating when the first stock market response was received by the computing device.

In embodiments, second timestamp includes: (A) a fifth timestamp indicating when the second stock market response was transmitted; and (B) a sixth timestamp indicating when the second stock market response was received by the computing device.

The present invention also relates to a method of gathering opinion information provided by one or more users of a plurality of users of an electronic computer network, the method including steps of: (a) receiving, by a computing device, identification information associated with each user of a plurality of users of the electronic computer network; (b) storing, by the computing device in one or more databases, the identification information; (c) transmitting, by the computing device to at least a first group of user devices associated with a first group of users of the plurality of users of the electronic computer network, market data, the market data including: (i) past price information; (ii) past volume information; and (iii) a first timestamp; (d) generating, by the computing device, a first market query related to the market data; (e) transmitting, by the computing device, the first market query to one or more user devices of the first group of user devices; (f) receiving, by the computing device, a first market response from at least one user device of the first group of user devices, the first market response including: (i) user identification information unique to the respective user device and associated with the respective user associated with the respective user device; (ii) impression sentiment information related to the respective user's impression of the market data; and (iii) a second timestamp; (g) generating, by the computing device, a second market query related to future market parameters; (h) transmitting, by the computing device, the second market query to one or more user devices of the first group of user devices; (i) receiving, by the computing device, a second market response from at least one respective user device of the first group of user devices, the second market response including: (i) user identification information unique to the respective user associated with the respective user device; (ii) prediction information related to at least one of future price information and future volume information; and (iii) a third timestamp; (j) storing, by the computing device in the one or more databases, the second market response; (k) calculating, by the computing device, at least one of a price prediction and a volume prediction based on at least the first market response and the second market response; and (l) transmitting, by the computing device, at least one of the price prediction and the volume prediction to the plurality of users.

In embodiments, the calculating step (k) includes calculating, by the computing device, at least one of the price prediction and the volume prediction based on the first market response, the second market response, and additional information from external data sources. In embodiments, the method further includes a step of determining authenticity of the first market response by performing a step of comparing, by the computing device, the determined time lag to an expected time lag for a connection of the user device associated with the respective user to the electronic computer network. In embodiments, the method further includes a step of assigning, by the computing device, an unreliable rating to the respective user when the determined time lag of the first market response from the user device associated with the respective user is outside upper and lower thresholds of the expected time lag.

In embodiments, the step (k) of calculating the at least one of the price prediction and the volume prediction is performed by using a machine learning technique based on the at least the first market response and the second market response as an input.

In embodiments, the step (k) of calculating the at least one of the price prediction and the volume prediction is performed by using a neural network technique based on the at least the first market response and the second market response as an input. In embodiments, the neural network technique includes a deep learning neural network technique.

In embodiments, the first market query includes machine readable instructions to present an inquiry message relating to the market data on the one or more user devices of the first group of user devices.

In embodiments, the second market query includes machine readable instructions to present an inquiry message relating to the future market parameters on the one or more user devices of the first group of user devices.

In embodiments, the method further includes a step of determining, by the computing device, a time lag between occurrence of a particular market event element of the market data and receipt of the respective first market response from each respective user device of the one or more user devices from the first group of user devices including information relating to the particular market event element.

In embodiments, the first market query includes machine readable instructions to present an inquiry message on each user device of the first group of user devices regarding a past market event element of the market data that was modified or did not take place. In embodiments, the method further includes a step of assigning, by the computing device, an unreliable rating to the respective user when the first market response from the user device associated with the respective user includes first market response information confirming occurrence of the past market event element that was modified or did not take place.

In embodiments, the second timestamp includes: (A) a fourth timestamp indicating when the first market response was transmitted; and (B) a fifth timestamp indicating when the first market response was received by the computing device.

In embodiments, the third timestamp includes: (A) a sixth timestamp indicating when the second market response was transmitted; and (B) a seventh timestamp indicating when the second market response was received by the computing device.

Some embodiments provide for a system comprising at least one computer processor and associated machine instructions, the system configured to allow a plurality of entities (humans and/or electronic and/or mechanical), who (or which) may be referred to as "users" herein, who (or which) are observing or interacting with some event or task (live or otherwise) to interact with a stream of stimuli generated over the course of the event, said interactions happening with, by and between multiple entities including other users, organizations, event affiliates, and to allow the entities or users to interact with the streamed stimuli in a fair and accurate manner whereby each users' interactions are precisely recorded and accurately timestamped, accounting for various delays that may cause different users to encounter the stimuli at different times.

One or more embodiments of the invention provide for various methods to prevent users from cheating (for example, by users using the delays to their advantage) and for various methods for detecting and synchronizing the stimuli. Embodiments provide for additional methods to determine and synchronize stimuli and reaction timing across a plurality of geographical locations, transmission methods and media.

Embodiments of the present invention provide further for a system and methods that can accurately and quickly predict the past, provide valuable insights into future events, and determine the likelihood of cheating by an individual user in an online game or other application. By crowdsourcing user inputs and integrating additional signals from a plurality of additional sources, data can be gathered for each occurrence throughout the course of an event, and the data further processed to enable reconstruction of past occurrences and gathering of insights regarding these occurrences. These insights, in turn, can be used for various applications in multiple embodiments, some of which are described herein.

Various embodiments of the invention provide for generating a transcript of any event that is concurrently observed by a plurality of entities in a manner whereby each such entity can react to a plurality of stimuli and thereby interact with the system contemplated herein such that an accurate transcript will be produced by the system. Various embodiments can provide further benefit by being able to detect any of attempted fraud or cheating by any such entity. Additionally, embodiments can provide benefit by being able to accomplish the foregoing steps without the requirement for a physical presence at the location of the event and/or without the requirement to have an accurate time reference.

One or more embodiments of the invention provide for methods of detecting cheating in online game activities, and/or detecting cheating and/or inaccurate reporting in activities related to news gathering, reporting, current events, disaster relief, stock market trading, forex/equity trading, real estate transactions, financial transactions, and other such activities, without limitation, the activities associated with one or more events, which methods can comprise one or more combinations of analyzing latency in individual and cohort responses, machine-trained analysis of user cohort behavior, and analysis of crowdsourcing information derived from the same or other cohorts.

Some embodiments of the invention provide generally for analyzing crowdsourcing information to analyze events that are the subject of the user responses, for utilizing recursive queries to prompt secondary crowdsource responses, and additionally or alternatively using probabilistic analysis of multiple data sources to form synchronization across delivery paths, locales and modes.

One or more embodiments provide for synchronizing input from a large number of devices to ascertain content, time, and time differences from varying external stimuli. In one embodiment a viewer can see an event at time, t(e) (or t.sub.event), a viewer can respond to an event at a time t(r) (or t.sub.response), and the system and/or method can process the viewers' responses at time t(p) (or t.sub.process). In embodiments, a plurality of data sources can be used in relation to real-time event transcription, cheating detection and compensation, and/or synchronizing user engagement (such as, for example, without limitation: wireless signal, GPS, device accelerometer, absolute time, microphone input, logical location, delivery system base delay, event time, calculated event time, user event-based choice, and user choice time), any or all of which may be made part of the data processing and information transformation steps. In one or more embodiments, a delay estimation can be made by: (i) user-stated mode, (ii) geo-location, (iii) device metadata including type of device, connection method, carrier/connectivity provider, etc. and/or (iv) comparing response time and accuracy to other media/modes. The system and methods can determine, calculate and/or generate latency analysis based on t(r), on t(e), or on a difference between t(r) and t(e), which can be performed in reference to a standard and precise clock time. Various embodiments can further provide for advanced latency accounting for typical stimuli eliciting responses and/or weighting the probability of a particular stimuli to elicit a response. An embodiment can provide, too, for identifying control groups that exhibit less or more appropriate latency.

One or more embodiments provide for identifying fraud, cheating, or other inaccurate input among many users reacting to stimuli via a plurality of media and methods. An embodiment, for example, can provide and utilize in the processing method(s), without limitation, at least one or more of the following sub methods and/or information sources: randomized questions; "honeypot" testing for other transmission modes, control cohorts (such as, for example, without limitation, known non-cheaters and/or known cheaters); aggregate and calculate average response times, providing normal min-max ranges for response boundary to identify cheating; calculating average correct response percentage norms; using geo-location to define cohort for comparative norm; checking response time and accuracy correlation with other transmission modes; and/or utilizing accuracy measure(s) based on probabilities and successes, e.g., $A(i)=average[p(t)*Si(k, t)]$. One or more embodiments can utilize one or more sources of data, such as, without limitation, data from the group of data sources comprising global positioning system (GPS) data, device accelerometer data, microphone input data, logical location data, content channel data, delivery system base delay data, event time data, calculated event display time data, user event-based choice data, and user choice time data. An embodiment can further identify control groups with better latency and/or accuracy.

One or more embodiments provide for detecting and synchronizing input timing with neighboring devices by a variety of methods, including, without limitation, WiFi, WiMax, Bluetooth®, NFC, and/or similar methods. An embodiment can have each device emit specific sound (within and/or outside the audio band) detected by other devices' available sensors. Another or the same embodiment can use input timing or audio content recognition to determine which method and media is being used to broadcast the event to the viewers, and to further aid in the detection of cheating attempts. An embodiment can use input timing to identify control groups with better latency.

One or more embodiments can be used to differentiate sensor readings between different entities, for example if a temperature sensor in the room records the body temperature of a human, data from other sensors can be used to associate and validate this reading with a particular person. It should be noted that the same principle can apply to other living creatures as well as to other machines and other objects.

One or more embodiments can be used to ascertain that sensor readings are not corrupted by inadvertent readings from multiple objects, for example if there are two people in a room and a human body temperature sensor erroneously takes readings from both of those people. It should be well understood that the same principles can apply to blood pressure sensors, heart rate sensors, and so on.

One or more embodiments can include using machine learning, heuristics, pattern-matching, game-theory, and more in the processing method(s).

An embodiment can further provide for determining absolute time (and nature) of stimuli without physical presence at location(s) of stimuli. This can further comprise, without limitation, one or more of: displaying different stimuli to different groups, then correlating responses to predict what happened where and when; recursively using of one set of responses to generate additional query/stimuli; processing being automated within the system; and using heuristics, comb filters, auto-correlation, statistical algorithms, machine learning algorithms, and/or multi-agent systems, inter alia, without limitation, in order to improve the precision of the derived data. The processing in at least one embodiment can one or more of: feed other stimuli of similar events as additional signals (past or present); dynamically change decision tree (represents options for events that have taken and/or are taking place, and for potential future events), wherein crowd-sourcing responses can be used to prune decision-tree branches; compare individual replies to group to detect cheating/fraud; produce one or more transcripts of one or more events; and/or identify one or more control groups with better accuracy and/or latency.

In embodiments, a reliability rating (e.g. the reliability ratings discussed above in connection with FIG. 22) may be used to determine whether one or more IoT devices (e.g., connected consumer devices, connected enterprise devices, and/or connected industrial devices) is defective and/or partially defective, and/or if an emergency is taking place. In embodiment, an individual sensor device itself may be considered an IoT device. In embodiments, the reliability of an IoT device may be determined based, at least in part, on the reliability of one or more sensor devices that may be associated with the IoT device. In embodiments, reliability may be determined for an individual sensor which may itself be considered an IoT device. In embodiments, each sensor device of a plurality of sensor devices may be associated with sensor information. In embodiments, for example, a computing device (e.g. computing device 2702) may be in communication with the plurality of sensors, either directly or indirectly. In embodiments, the computing device may obtain and store sensor information from each sensor device of the plurality of sensor devices operatively connected to the computing device. In embodiments, the sensor information may include information that may assist the computing device in determining whether the IOT device or individual sensor device is at least partially defective. In embodiments, the sensor information may include one or more of the following: sensor identification information (e.g. data unique to each sensor device); sensor type (e.g. light sensor, temperature sensor, acetometer, etc.), location information (e.g. data which may indicate a respective sensor device's location); and/or data range information (e.g., data which may indicate an acceptable range of values for a respective sensor device to output), to name a few.

The sensor information, in embodiments, may be used to separate the plurality of sensor devices into one or more groups. In embodiments, the computing device may determine whether a sensor device and/or an IoT device is defective, or partially defective based at least in part on the group it is in. For example, the computing device, in embodiments, may select one or more sensor devices and group said sensor devices into a first group of sensor devices. In embodiments, the computing device may select the first group of sensor devices based on the sensor information. For example, in embodiments, the computing device may group sensor devices in a similar location in the same group. In embodiments, the computing device may group sensors of the same type in the same group. In embodiments, the computing device may group sensors with similar data range information in the same group, to name a few.

In embodiments, the sensor information may be used to correlate sensor data from a plurality of IoT devices (and other data sources) in order to identify individual persons (or other creatures, or other objects) according to each's individual "signature" of sensor readings, with said signature being computed from the patterns of each individual sensor readings and the combination of a plurality of patterns (and relationships thereof) between patterns In embodiments, to determine whether a sensor device and/or IoT device is defective, or partially defective, the computing device may receive sensor feedback information. In embodiments, the plurality of IoT devices and/or sensor devices may obtain, generate, and/or transmit sensor feedback information (e.g. data provided by the sensor, or associated IoT device and received by the computing device). The sensor feedback information may include one or more of the following: identification information (e.g. data that identifies the source of the sensor feedback information), feedback data (e.g. data provided by the sensor device to the computing device in response to stimuli), and/or a timestamp (e.g. data indicating the time at which the feedback data was obtained by the sensor device), to name a few.

For example, in embodiments, an IoT device (e.g. First IoT Device 4304-1) may include one or more of the following: one or more microcontrollers (e.g. microcontroller(s) 4304-1A), one or more sensor devices (e.g. sensor(s) 4304-1B), an analog to digital converter ("ADC") (e.g. optional ADC 4304-1C), a network connection interface (e.g. network connection interface 4304-1D), and/or a power source (e.g. power source 4304-1E). In embodiments, the IoT device may include a thermometer as a sensor device, which may be monitoring the ambient temperature of the IoT device. Data representing temperature sensed by the thermometer, in embodiments, may be transmitted to the ADC where the data is converted from an analog stream to a digital stream. Once converted, in embodiments, the digital data representing the temperature may be transmitted to the one or more microcontrollers where the digital data may be processed by the one or more microcontrollers into sensor feedback information. The processing, in embodiments, may include adding a timestamp, which may indicate the time and/or date at which the temperature was sensed. Once the data representing the ambient temperature of the IoT device is processed, in embodiments, the IoT device may transmit the sensor feedback information to the computing device. In embodiments, an individual sensor may be the IoT device and may provide the feedback information directly to the computing device. In embodiments, the sensor device may include the ADC converter and the network interface to allow for directed communication. In embodiments, the sensor device may include the microcontroller as well to process the raw output of the sensor device and provide the feedback information. In embodiments, the raw output of the sensor device may be send to the computing device and processed at the computing device to provide the feedback information.

In embodiments, when sensor feedback information is received at the computing device, the computing device may generate a second timestamp indicating a time and/or date at which the sensor feedback information was received by the computing device. The sensor feedback information, in embodiments, may be processed by the computing device. The processed sensor feedback information may result in the generation and storing of sensor variance information and/or sensor deviation information. This process may be completed for each IoT device and/or sensor device of the first group of devices simultaneously, as sensor feedback information is received, and/or at predetermined intervals, to name a few.

In embodiments, the computing device may also obtain and store weather information associated with the respective location of the IoT device and/or sensor devices based on the location information associated therewith. The weather information, which may be obtained from a third party (e.g. third party database 4310), may be obtained at regular intervals and/or as the sensor feedback information is received, to name a few. The weather information, in embodiments, may include, for example, one or more of the following: temperature, atmospheric pressure, wind, humidity, precipitation and/or cloudiness, to name a few. In embodiment, one or more sensors may provide information regarding temperature, atmospheric pressure, wind, humidity, precipitation and/or cloudiness, to name a few.

The respective sensor variance information, respective sensor deviation information, respective weather information, respective sensor information, and/or respective previous reliability rating associated with each respective sensor device may, in embodiments, be used wholly or in part to determine a current reliability rating of each sensor device. In embodiments, the current reliability rating may be assigned and stored by the computing device.

A respective current reliability rating, respective sensor variance information, respective sensor deviation information, respective weather information, respective sensor information, and/or respective previous reliability rating associated with each respective sensor device may, in embodiments, be used to determine whether the respective IoT device and/or sensor device is defective or partially defective.

In embodiments, for example, where the IoT device is defective or partially defective, the computing device may cure the defect and/or report the defect. In embodiments, the computing device may flag the IoT device as defective, indicating that the computing device should "ignore" the bad sensor data (feedback information) provided from the defective IoT device. The computing device, in embodiments, may also generate and/or transmit one or more purchase orders to one or more vendors to purchase one or more parts necessary to cure the defect in the defective IoT device and/or replace the defective IoT device of sensor device. A more detailed explanation of an exemplary process for determining whether an IoT device is defective or at least partially defective is provided below in connection with the description of FIGS. 44A-44G, the description of which applying herein.

In embodiments, a process for determining whether an IoT device is defective or partially defective is described in connection with FIG. 44A, which may begin at step S4402. At step S4402, in embodiments, a plurality of sensor devices may be provided. In embodiments, the plurality of sensor devices may be included in a plurality of IoT devices (e.g. plurality of IoT devices 4302). The plurality of sensor devices, in embodiments, may be operatively connected via a network to a computing device.

Figure 43A:
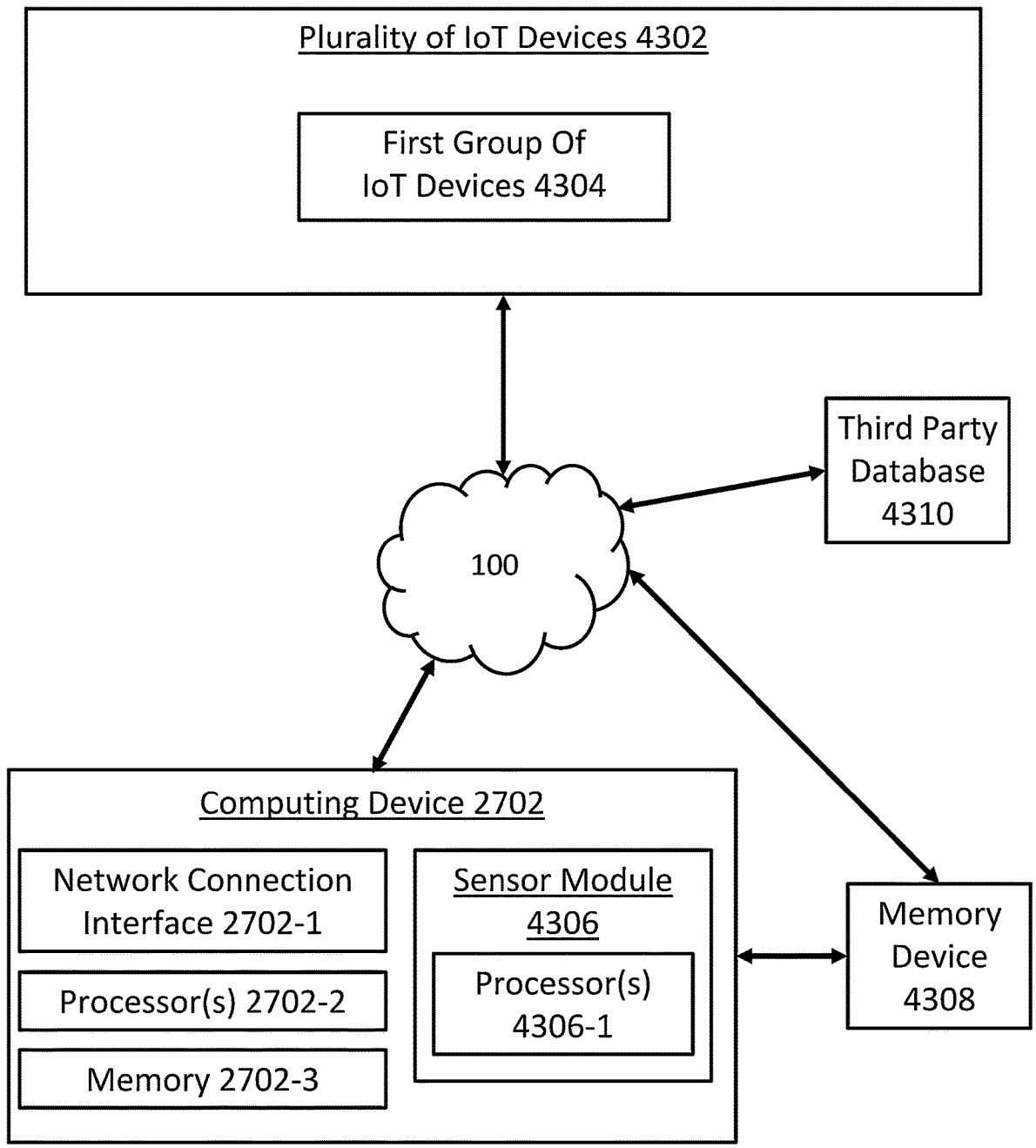
FIG. 43A is an exemplary block diagram illustrating a computing device communicating with a plurality of IoT devices, a third party database and a memory device, in accordance with embodiments of the present invention.

Referring to FIG. 43A, the plurality of sensor devices (e.g., the plurality of IoT devices 4302) may be operatively connected to the computing device 2702 via network 100. In embodiments, each of the plurality of IoT devices 4302 may be associated with respective sensor information. In embodiments, the computing device 2702 may be operatively connected to one or more electronic devices respectively associated with one or more users. In embodiments, each sensor device may be considered an IoT device and may be associated with respective sensor information. For each IoT device, in embodiments, the sensor information may include data representing one or more of the following: (1) sensor identification information; (2) location information; (3) data range information; (4) sensor specification information; (5) sensor running time information; (6) sensor proximity information; (7) historical reliability rating information; (8) historical sensor variance information; (9) historical sensor deviation information; (10) hierarchical information; and/or (11) historical defective report information, to name a few. In embodiments, the sensor identification information may be information unique to the respective IoT Device or a respective sensor device that may identify the IoT device or the respective sensor device. For example, the sensor identification information may include one or more of the following: a Universally Unique Identifier (UUID), a Globally Unique Identifier (GUID), a Persistent Unique Identifier (PUID), a series of letters, numbers, and/or symbols, a unique name, electronic identification (may be similar to electronic identification described above in connection with FIG. 22, the description of which applying herein), connection information (may be similar to connection information described above in connection with FIG. 22, the description of which applying herein), and/or a sensor type, to name a few. For example, thermometer 4344 may be associated with the following sensor information:

| Thermometer 4344 Sensor Identification Information |
| --- |
| Unique Name - First Floor Thermometer<br>Sensor Type - Thermometer |

In embodiments, location information may be information indicating the location of the respective IoT device or sensor device. For example, the location information may include one or more of the following: latitude, longitude, altitude, address, city, state, and/or zip code, to name a few. In embodiments, the location information described herein may be similar to location information 2802C, the description of which applying herein.

In embodiments, data range information may be information indicating an acceptable and/or expected range of feedback data the computing device 2702 is to receive from the IoT device. For example, the data range information may include one or more of the following: a maximum sensor value indicating an upper threshold of sensor feedback data associated with the IoT device or sensor device; a minimum sensor value indicating a lower threshold of sensor feedback data associated with the IoT device or sensor device, a data range over a period of time, a sensor variance range, a sensor deviation range, and/or an emergency threshold indicating that data received that passes the emergency threshold indicates an emergency, to name a few. For example, referring to FIG. 43D, an IoT device or specific sensor may have a data range represented by acceptable range 4358.

Referring to FIG. 43A, in embodiments, sensor specification information may be information indicating one or more of the following: the sensor type, the measurement the sensor detects, the resolution of the aforementioned measurement the sensor detects, a data range of values the sensor is capable of measuring, an accuracy rating of the sensor, a useful life of the sensor device, and/or one or more parts associated with the sensor device, to name a few. In embodiments, the one or more parts associated with the sensor device may include part numbers, vendor information, and/or a useful life of each part, to name a few. For example, Accelerometer 4312 may have the following exemplary sensor specification information

| Accelerometer 4312 Sensor Specification Information |
| --- |
| Sensor Type - Accelerometer |
| Measurement - Meters per Second Squared |
| Data Range - 0-1,000 |
| Accuracy - +/-2% |
| Sensor Spec. - Useful Life 3.2 Years |

Figure 43B:
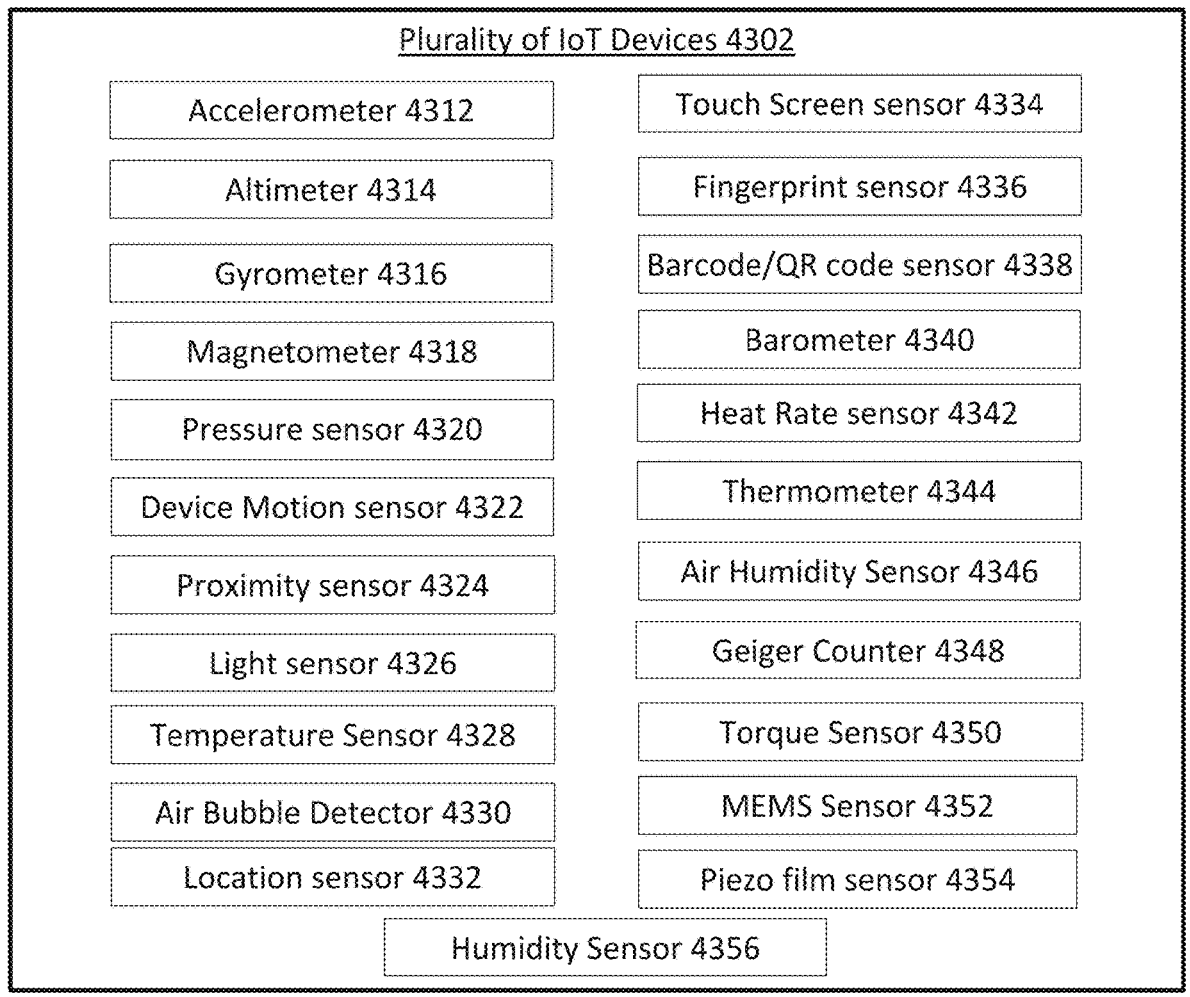
FIG. 43B is an exemplary block diagram illustrating exemplary IoT devices in accordance with embodiments of the present invention.
Figure 43C:
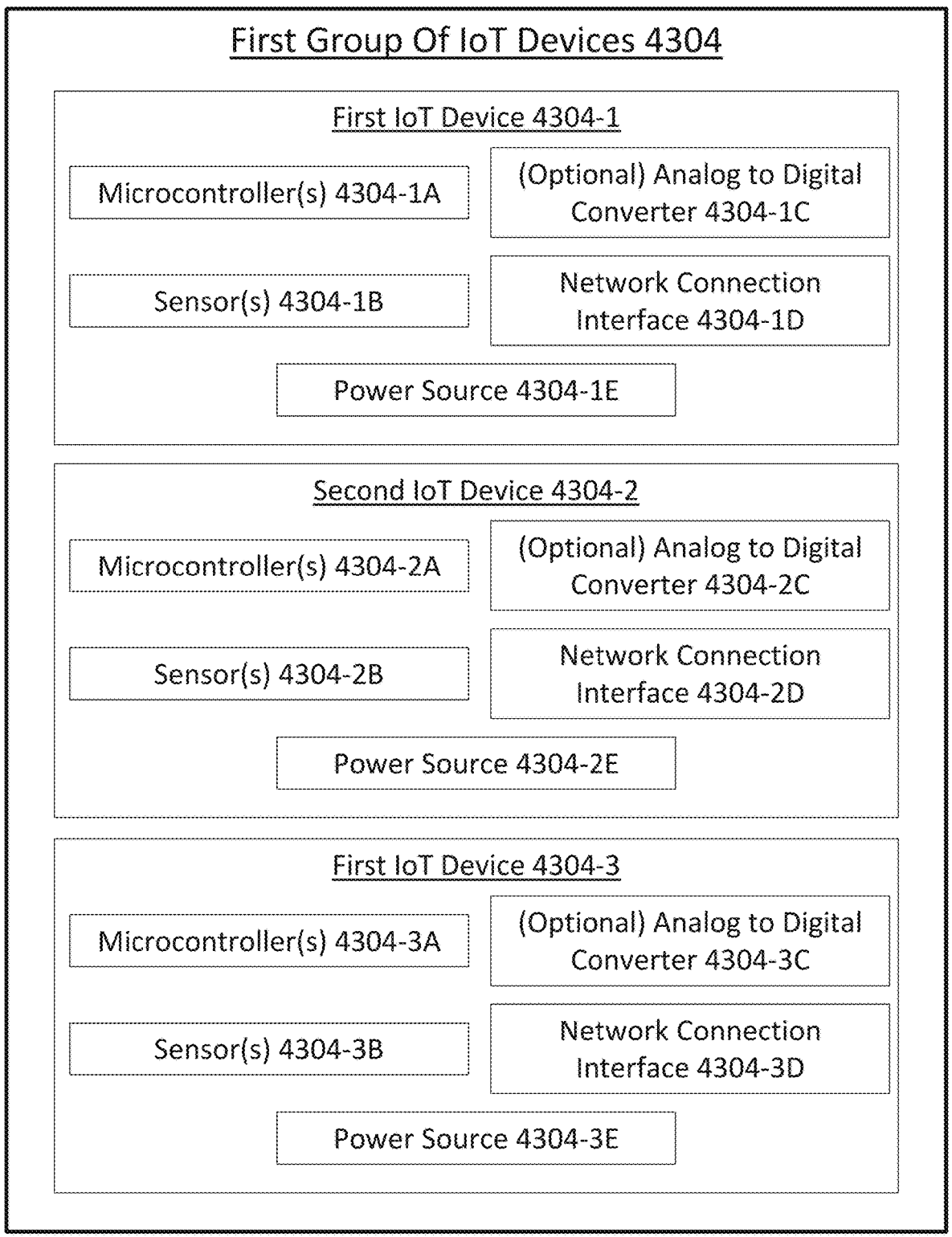
FIG. 43C is an exemplary block diagram illustrating a first group of exemplary IoT devices in accordance with embodiments of the present invention.
Figures 43D, 43E:
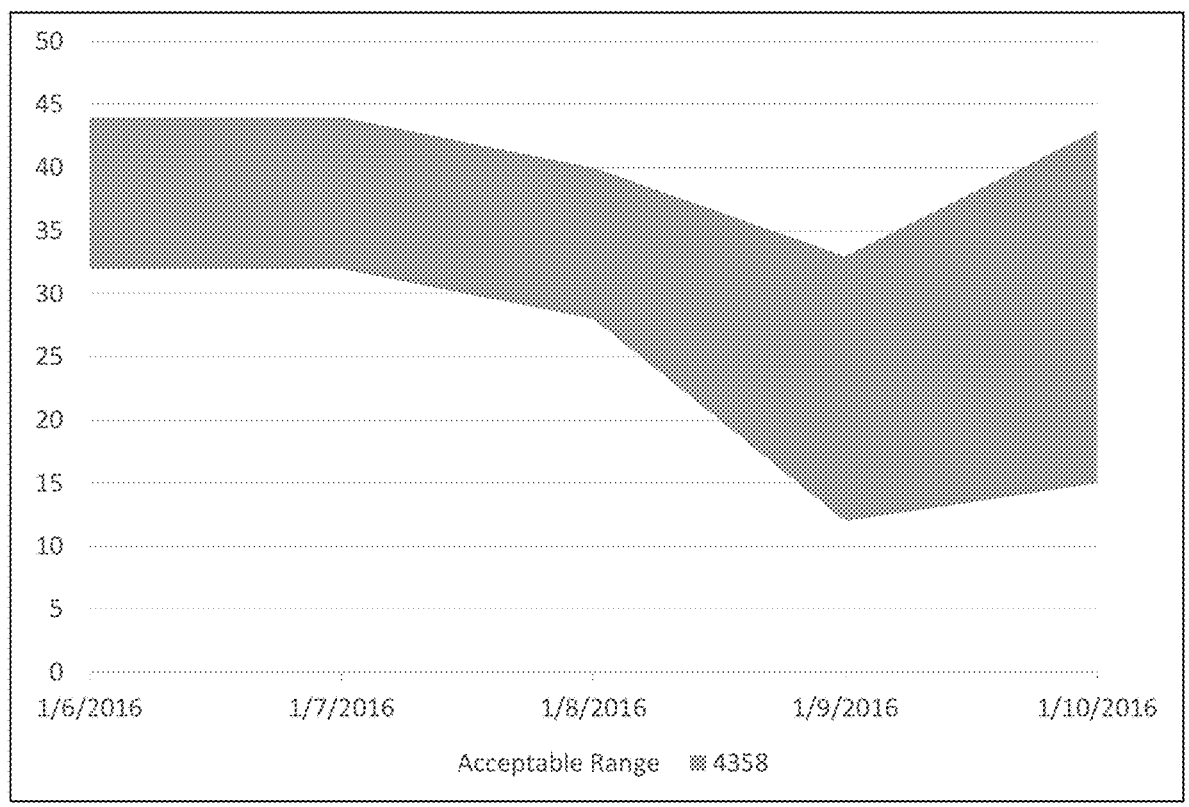
FIG. 43D is an exemplary graph illustrating an exemplary data range of sensor values in accordance with embodiments of the present invention.
FIG. 43E is an exemplary table illustrating exemplary specification information associated with an exemplary sensor device in accordance with embodiments of the present invention.

Exemplary specification information for an exemplary sensor device is shown in connection with FIG. 43E. Referring to FIG. 43E, Sensor Device A may be associated with Sensor Device A Specification Information 4360. In embodiments, Specification Information 4360 may include one or more of the following: a listing of parts by part number, a useful life of each part, one or more vendors associated with each part, a contact for the vendor (e.g. a person, company, etc.), an e-mail address associated with the vendor and/or contact, a phone number associated with the vendor and/or contact, a fax number with the vendor and/or contact, information indicating whether a purchase order is available for the part, a purchase order for the part, price information associated with the part, and/or information indicating whether the part is in stock, to name a few. For example, Sensor Device A may include three parts—Part number 124A; Part number 672C; and Part number 249E. Continuing the example, Part number 124A, as shown in FIG. 43E, has a useful life of 3.4 years and is sold by Vendor 1. Vendor 1's contact is Alice and her e-mail address is Alice@A.com. Additionally, Part number 124A has a purchase order on file—PO1. Continuing the example, Part number 672C, as shown in FIG. 43E, has a useful life of 1.2 years and is sold by Vendor 2. Vendor 2's contact is Bob and his e-mail address is Bob@B.com. Additionally, Part number 672C has a purchase order on file—PO2. Continuing the example, Part number 249E, as shown in FIG. 43E, has a useful life of 5.1 years and is sold by Vendor 1. Additionally, Part number 249E has a purchase order on file—PO1. In embodiments, the purchase orders on file may be stored by memory device 4308 which may be operatively connected to the computing device 2702. In embodiments, each part may have multiple vendors, multiple contacts, no vendors, no contacts, multiple purchase order forms, and/or no purchase order forms, to name a few.

In embodiments, sensor running time information may be information indicating how long the IoT device, sensor device, and/or one or more part(s) thereof have been powered on and running. For example, the sensor running time information may include one or more of the following: the purchase date, the time the device and/or part was put on-line, interruptions within the running time, and/or the useful life of the device and/or part(s), to name a few.

In embodiments, sensor proximity information may be information indicating one or more IoT devices and/or sensor devices within a distance of the IoT device and/or sensor device. For example, IoT device 1 may have sensor proximity information indicating that IoT device 3 and IoT device 8 are within 10 meters of IoT device 1. Sensor proximity information may be similar to the proximity information described above in connection with FIG. 22, the description of which applying herein.

In embodiments, historical reliability rating information may be information indicating one or more reliability ratings that were previously assigned to the IoT device or sensor device. For example, the historical reliability rating information may include one or more of the following: one or more reliability ratings associated with the IoT device or sensor device and/or the most recent reliability rating associated with the IoT device or sensor device, to name a few. The reliability ratings discussed herein may be similar to the reliability ratings described in connection with FIG. 22, the description of which applying herein.

In embodiments, historical sensor variance information may be information indicating a variance of the data received from the IoT device or sensor device. For example, the historical sensor variance information may include one or more of the following: one or more sensor variance values associated with the IoT device or sensor device and/or the most sensor variance value associated with the IoT device, to name a few.

In embodiments, historical sensor deviation information may be information indicating a deviation of the data received from the IoT device or sensor device. For example, the historical sensor deviation information may include one or more of the following: one or more sensor deviation values associated with the IoT device and/or the most sensor deviation value associated with the IoT device, to name a few.

In embodiments, hierarchical information may be information used to group a plurality of sensor devices and/or IoT devices. For example, a plurality of IoT Devices may be monitoring an apartment building with five floors. Continuing the example, the apartment building may receive power at a main circuit breaker, which may be monitored by a first IoT Device. The main circuit breaker may be operatively connected to a circuit breaker for each floor—a first floor circuit breaker, a second floor circuit breaker, a third floor circuit breaker, a fourth floor circuit breaker, and a fifth floor circuit breaker. Each circuit breaker may be monitored by a respective IoT Device (a second IoT Device, a third IoT Device, a fourth floor IoT Device, a fifth IoT Device and a sixth IoT Device). Continuing the example, each floor may also be monitored by an IoT Device (a seventh IoT Device, an eighth IoT Device, a ninth floor IoT Device, a tenth IoT Device and an eleventh IoT Device). The electricity, in this example, may flow through the main circuit breaker to each floor. In this example, the hierarchical information may indicate the following information:

TABLE 26

| IoT Device | Hierarchical Information |
| --- | --- |
| First IoT Device | Main Circuit Breaker |
| Second IoT Device | First Floor Circuit Breaker |
| Third IoT Device | Second Floor Circuit Breaker |
| Fourth IoT Device | Third Floor Circuit Breaker |
| Fifth IoT Device | Fourth Floor Circuit Breaker |
| Sixth IoT Device | Fifth Floor Circuit Breaker |
| Seventh IoT Device | First Floor Apartment |
| Eighth IoT Device | Second Floor Apartment |
| Ninth IoT Device | Third Floor Apartment |
| Tenth IoT Device | Fourth Floor Apartment |
| Eleventh IoT Device | Fifth Floor Apartment |

In embodiments, historical defective report information may be information indicating one or more previous malfunctions of the IoT device or sensor device and/or one or more previous malfunctions of the IoT devices or sensor devices in proximity of the IoT device or sensor. For example, the historical defective report information may include one or more of the following: one or more reports of malfunctions of the IoT device, one or more malfunctions of IoT devices within a proximity of the IoT device, and/or whether the IoT device is currently at least partially defective, to name a few.

In embodiments, respective sensor information may be received from each respective IoT device or sensor device of the plurality of IoT devices 4302. In embodiments, respective sensor information may be manually inputted by an administrator. In embodiments, respective sensor information may be received from a third party.

Referring to FIG. 43B, as stated above, the plurality of IoT Devices 4302, in embodiments, may be a plurality of sensor devices. The plurality of IoT Devices 4302 may be and/or may include one or more of the following sensors from the following non-exhaustive list of sensors: (1) location sensor 4332, (2) accelerometer 4312, (3) altimeter 4314, (4) gyrometer 4316, (5) magnetometer 4318, (6) device motion sensor 4322, (7) proximity sensor 4324, (8) light sensor 4326, (9) pressure sensor 4320, (10) temperature sensor 4328, (11) air bubble detector 4330, (12) touch screen sensor 4334, (13) finger print sensor 4336, (14) barcode/QR code sensor 4338, (15) barometer 4340, (16) heart rate sensor 4342, (17) thermometer 4344, (18) air humidity sensor 4346, (19) Geiger counter 4348, (20) torque sensor 4350, (21) MEMS Sensor 4352, (22) Piezo film sensor 4354, (23) humidity sensor 4356; (24) blood pressure sensor(s); (25) microphone(s) (and/or other acoustic sensors); (26) brain wave sensor(s) (e.g. EEG); (27) heart wave monitor(s) (e.g., EKG); (28) radar sensor(s); (28) chemical composition sensors (e.g. PCR and/or any form of chromatography) (29) electrical current sensors; (30) electrical voltage sensors; (31) electrical capacitance or induction sensors; (32) neurological sensors; (33) pH sensors; (34) salinity sensors; (35) biological assay sensors and/or (36) LIDAR sensor(s), to name a few.

Referring to FIG. 44A, step S4402 may further include a step of providing a reliability rating database. The reliability rating database, in embodiments, may be operatively connected to the computing device 2702. The reliability rating database, in embodiments, may store the above described historical reliability rating information and/or current reliability rating information (which may be determined and/or assigned in connection with step 4524, the description of which applying herein), to name a few.

In embodiments, step S4402 may further include a step of providing at least one hierarchical network model. Each of the at least one hierarchical network models may be associated with at least one iterative algorithm. The at least one iterative algorithm, in embodiments, may be used to derive a hierarchical network model, which may be used in whole or in part by the computing device 2702 to select one or more groups of sensor devices (e.g. first group of IoT Devices 4304). For example, the computing device 2702 may apply the at least one iterative algorithm to each sensor device's respective sensor information, the results of which may assist in the, or lead to, a selection of the first group of IoT Devices 4304. The at least one hierarchical network model and/or the associated at least one iterative algorithm may be stored by the computing device 2702.

In embodiments, a process for determining whether an IOT device or sensor device is at least partially defective may continue with step S4404. At step S4404, the provided sensor information may be stored by the computing device 2702. For example, the provided sensor information may be stored in memory 2702-3. Referring to FIG. 43A, the computing device 2702 may be operatively connected to memory device 4308. The sensor information, when provided, may be stored by the computing device 2702 in the memory device 4308. Memory device 4308, in embodiments, may include one or more types of storage mediums such as any volatile or non-volatile memory, or any removable or non-removable memory implemented in any suitable manner to store data for the computing device 2702. For example, the sensor information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory device 4308 may be implemented as computer-readable storage media ("CRSM"), which may be any available physical media accessible by the computing device 2702 to execute one or more instructions stored within memory device 4308. In embodiments, memory 2702-3 of the computing device 2702 may be similar to memory device 4308, the description of which applying herein.

Referring to FIG. 44A, in embodiments, the process for determining whether an IOT device or sensor device is at least partially defective may continue with step S4406. At step S4406, the sensor information may be accessed by a sensor module of the computing device 4506. For example, the sensor module may obtain the sensor information stored in memory device 4308 and/or memory 2702-3. For example, the sensor module may receive the sensor information stored in memory device 4308 and/or memory 2702-3. Referring to FIG. 43A, the computing device 2702 may include, in embodiments, a sensor module 4306. The sensor module 4306, in embodiments, may include one or more of the following:

processor(s) 4306-1, memory, and/or network connection circuitry, to name a few. The sensor module 4606 may be implemented as combinations of software, hardware, and/or firmware. For example, the sensor module 4606 software may include instructions in one or more suitable languages and may be stored on one or more computer readable storage media which can be accessed and/or executed by one or more processors (e.g., processor 4306-1, processor(s) 2702-2, to name a few). The sensor module 4606 may form particular elements that perform respective functions related to the methods and processes described in further detail below according to embodiments of the present invention. In embodiments, various algorithmic processes may be implemented for the purpose of processing sensor information and/or sensor feedback information.

Referring to FIG. 44A, in embodiments, the process for determining whether an IOT device or sensor device is at least partially defective may continue with step S4408. At step S4408, a first group of sensor devices is selected from the plurality of sensor devices. In embodiments, the first group of sensor devices and/or IoT devices may be selected by one or more of the sensor module 4306 and/or the computing device 2702. For example, the sensor module 4306 may extract respective location information and respective sensor type information from respective sensor information associated with each IoT device or sensor device of the plurality of IoT devices 4302 or sensor devices. The sensor module 4306, in embodiments, may use the respective location information to select a group of IoT devices within a distance of a particular location. For example, the group of IoT devices or sensor devices may be within one or more of the following: a predetermined radius of a particular location, a radius of a particular location, a distance from a particular location, an area, a building, a city, a town, a state, and/or a country to name a few. The sensor module 4306 may then determine the first group of IoT devices 4304 by selecting a second group of IoT devices based on the respective type of each sensor device. Thus, in this example, the first group of IoT devices 4304 or sensor devices may be IoT devices or sensor devices of the plurality of IoT devices 4302 that are of the same type of sensor and are within a distance of a particular location. In embodiments, the first group of IoT devices 4304 or sensor devices may be selected based on one or more of the following: respective location information, respective sensor information, respective sensor identification information, respective sensor type, sensor specification information, respective hierarchical information, hierarchical information, and/or current weather conditions, to name a few.

Referring to FIG. 43C, in embodiments the first group of IoT devices 4304 or sensor devices may include: first IoT device 4304-1, second IoT device 4304-2, and third IoT device 4304-3. In embodiments, first IoT device 4304-1 may include one or more of the following: microcontroller(s) 4304-1A, sensor(s) 4304-1B, (optional) analog to digital converter 4304-1C, network connection interface 4304-1D, and/or power source 4304-1E, to name a few. In embodiments, second IoT device 4304-2 may include one or more of the following: microcontroller(s) 4304-2A, sensor(s) 4304-2B, (optional) analog to digital converter 4304-2C, network connection interface 4304-2D, and/or power source 4304-2E, to name a few. In embodiments, third IoT device 4304-3 may include one or more of the following: microcontroller(s) 4304-3A, sensor(s) 4304-3B, (optional) analog to digital converter 4304-3C, network connection interface 4304-3D, and/or power source 4304-3E, to name a few.

In embodiments, microcontroller(s) 4304-1A, microcontroller(s) 4304-2A, and/or microcontroller(s) 4304-3A may include one or more of the following: a central processing unit (CPU), random access memory (RAM), input circuitry, and/or output circuitry, to name a few. In embodiments, sensor(s) 4304-1B, sensor(s) 4304-2B, and sensor(s) 4304-3B may be similar to one or more of the plurality of IoT devices 4302 described above in connection with FIG. 43B, the description of which applying herein.

In embodiments, network connection interface 4304-1D, network connection interface 4304-2D, network connection 4304-3D, and network connection interface 2702-1 may include any circuitry allowing or enabling one or more components of the first IoT device 4304-1, second IoT device 4304-2, third IoT device 4304-3, and/or the computing device 2702 respectively to communicate with one another, with computing device 2702, and/or with one or more additional devices, servers, and/or systems. As an illustrative example, data retrieved from the one or more IoT devices may be transmitted over a network 100, such as the Internet, to computing device 2702 using any number of communications protocols. For example, network(s) 100 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between first IoT device 4304-1, second IoT device 4304-2, and third IoT device 4304-3, and/or the computing device 2702. In some embodiments, first IoT device 4304-1, second IoT device 4304-2, third IoT device 4304-3, and/or the computing device 2702 may communicate with one another via a web browser using HTTP. Various additional communication protocols may be used to facilitate communications between first IoT device 4304-1, second IoT device 4304-2, and third IoT device 4304-3, and/or the computing device 2702, include the following non-exhaustive list, Wi-Fi (e.g., 802.11 protocol), LiFi, Bluetooth®, radio frequency systems (e.g., 900 MHz, 1.4 GHz, and 5.6 GHz communication systems), optical communications, cellular networks (e.g., GSM, AMPS, GPRS, CDMA, EV-DO, EDGE, 3GSM, DECT, IS-136/TDMA, iDen, LTE, 4G, 5G, 6G or any other suitable cellular network protocol), infrared, BitTorrent, FTP, RTP, RTSP, SSH, and/or VOIP.

In embodiments, network connection interface 4304-1D, network connection interface 4304-2D, network connection 4304-3D, and network connection interface 2702-1 may use any communications protocol, such as any of the previously mentioned exemplary communications protocols. In some embodiments first IoT device 4304-1, second IoT device 4304-2, third IoT device 4304-3, and/or the computing device 2702 may include one or more antennas to facilitate wireless communications with a network using various wireless technologies (e.g., Wi-Fi, Bluetooth®, radiofrequency, etc.). In yet another embodiment, first IoT device 4304-1, second IoT device 4304-2, third IoT device 4304-3, and/or the computing device 2702 may include one or more universal serial bus ("USB") ports, one or more Ethernet or broadband ports, and/or any other type of hardwire access port so that network connection interface 4304-1D, network connection interface 4304-2D, network connection 4304-3D, and network connection interface 2702-1 allows first IoT device 4304-1, second IoT device 4304-2, third IoT device 4304-3, and/or the computing device 2702 respectively to communicate with one another or with one or more communications networks.

In embodiments, power source 4304-1E, power source 4304-2E, and power source 4304-3E may be a device capable of providing power to first IoT device 4304-1, second IoT device 4304-2, and third IoT device 4304-3 respectively.

Referring to FIG. 44A, in embodiments, the process for determining whether an IOT device is at least partially defective may continue with step S4410. At step S4410, the sensor module 4306 and/or the computing device 2702 may obtain sensor feedback information from one or more sensor devices of the first group of sensor devices (e.g. the first group of IoT devices 4304). For example, the first group of IoT devices 4304 may be three torque sensors within a turbine—e.g. a first torque sensor, a second torque sensor, a third torque sensor. Once the three torque sensors are powered on and operatively connected to the computing device 2702 via network 100, each torque sensor of the first group of IoT devices 4304 may begin sensing torque. Continuing the example, data representing the sensed torque may be processed, resulting in sensor feedback information representing, at least in part, the sensed torque.

The sensor feedback information, in embodiments, may be transmitted by the first group of IoT devices 4304 to the sensor module 4306 via the computing device 2702 over network 100. In embodiments, the sensor feedback information may be transmitted as the sensed torque data is processed into the sensor feedback information and/or transmitted at regular intervals, to name a few. In embodiments, the sensor feedback information may be stored locally by the first group of IoT devices 4304, transmitting the sensor feedback information only upon request (e.g. by the computing device 2702).

In embodiments, the sensor feedback information, for each IoT device, may include one or more of the following: (1) identification information, (2) feedback data, (3) a timestamp, (4) connection information, (5) a current reliability rating, and/or (6) device information, to name a few.

In embodiments, identification information may refer to information associated with the IoT device providing the sensor feedback information. The identification information, in embodiments, may enable the computing device 2702 to identify to IoT device which provided the sensor feedback information. In embodiments, the identification information may include one or more of the following: respective sensor identification information, a Universally Unique Identifier (UUID), a Globally Unique Identifier (GUID), a Persistent Unique Identifier (PUID), a series of letters, numbers, and/or symbols, a unique name, electronic identification (may be similar to electronic identification described above in connection with FIG. 22, the description of which applying herein), connection information (may be similar to connection information described above in connection with FIG. 22, the description of which applying herein), and/or a sensor type, to name a few.

In embodiments, feedback data may refer to the data which was sensed by the IoT device or sensor device. For example, torque sensor 4350 may provide torque feedback data. In embodiments, the feedback data may include data over a range of time and/or current data, to name a few.

In embodiments, the timestamp may refer to the time at which the feedback data was sensed by the IoT device or sensor device. The timestamp may be specific to one or more data entries of the feedback data. For example, the feedback data may include data sensed over a period of time. Continuing the example, if an IoT device or sensor device senses stimuli, generating data points between the times of 6:39 AM and 7:32 AM, the timestamp included with the sensor feedback information from the IoT device may indicate the time each data point was gathered by the IoT device or sensor device. If, for example, the IoT device gathers data at 6:39 AM, 6:52 AM, and 7:32 AM, the timestamp may indicate each of those times. In embodiments, the time stamp may refer to the time in which the sensor feedback information was sent to the computing device 2702.

In embodiments, connection information may be similar to connection information described above in connection with FIG. 22, the description of which applying herein. In embodiments the connection information may be used to give context to the sensor feedback information. For example, a time lag may be detected and associated with a timestamp if the sensor feedback information and the timestamp are not in line with sensor feedback information received from other IoT devices within the same group of IoT devices.

In embodiments, a current reliability rating may refer to a reliability rating that was previously assigned to the IoT device or sensor device providing the sensor feedback information. In embodiments, when a reliability rating is determined and assigned, the computing device 2702 may send a respective reliability rating to one or more of the IoT devices of sensor device of the plurality of IoT devices 4302 or sensor devices. Once received, in embodiments, the respective IoT device may store the respective reliability rating—transmitting the reliability rating with the sensor feedback information.

In embodiments, device information may refer to information regarding the IoT device or sensor device that processed the sensor feedback information. For example, the device information may include one or more of the following: a diagnostic report of the IoT device and/or a battery level of the IoT device, to name a few.

In embodiments, the process for determining whether an IOT device is at least partially defective may continue with step S4412. At step S4412, the sensor module 4306 and/or the computing device 2702 may generate a second timestamp. The second timestamp, in embodiments, may indicate a time at which the sensor feedback information was obtained.

In embodiments, the process for determining whether an IOT device is at least partially defective may continue with step S4414. At step S4414, the sensor feedback information and second timestamp are stored by the computing device 2702 and/or the sensor module 4306. In embodiments, the sensor feedback information and/or the second time stamp may be stored, separately and/or together, in one or more of the following: memory 2702-3, memory of the sensor module 4306, and/or the memory device 4308, to name a few.

Referring to FIG. 43A, in embodiments, the computing device 2702 may also obtain additional information from one or more third party database(s) 4310. In embodiments, the additional information may include one or more of the following: weather information, vendor information (e.g. who the vendors are, whether the vendors are open, what parts are in stock, etc.), calendar information (the date, weekend, holidays, etc.), and/or IoT Device administrator information (e.g. who the administrator is, what their calendar states, etc.), to name a few. For example, the computing device 2702 may take current weather conditions into account when determining whether at least one IoT device or sensor device is at least partially defective. Continuing the example, the computing device 2702 may request the third party database 4310 for weather information at the time of the timestamp received with the sensor feedback information, at the location associated with the location data.

The request may be generated by the computing device 2702 and transmitted to the third party database 4310 via network 100, which, in embodiments, may result in the third party database 4310 transmitting the current weather conditions to the third party database 4310. In embodiments, the computing device 2702 may obtain additional information in substantially real time. For example, the computing device 2702 may utilize a streaming HTTP protocol to receive data through and establish a streaming application programming interface (SAPI) with the third party database 4310. Once the connection is established, the additional information may be streamed, in substantially real time, from the third party database 4310 to the computing device 2702 via network 100 and the SAPI.

Referring to FIG. 44A, in embodiments, the process for determining whether an IOT device is at least partially defective may continue with step S4416. At step S4416, the sensor module 4306 and/or the computing device 2702 may generate sensor variance information for each sensor device of the first group of sensor devices. In embodiments, the sensor variance information may be used to determine one or more of: a stability of the noise associated with the sensor feedback information, a systematic bias, a difference between noise forms, the reliability of the feedback data received, and/or an authenticity of the feedback data received, to name a few. To generate sensor variance information for each sensor device and/or IoT device of the first group of IoT devices 4304, the sensor module 4306 and/or the computing device 2702 may apply at least one of the following algorithms to the obtained feedback data: the two-sample variance equation, the Allan deviation, the modified Allan variance, the total variance equation, the Hadamard variance equation, and/or the time variance equation, to name a few. For example, the Allan variance may be represented in the following equation:

$$AVAR^2(\tau) = \frac{1}{2 \cdot (n-1)} \sum_i (y(\tau)_{i+1} - y(\tau)_i)^2$$

The above exemplary equation is the Allan Variance (AVAR) as a function of averaging time. In embodiments, one or more algorithms (and/or including AVAR) may be utilized to generate sensor feedback information, in whole or in part. For example, one or more Euclidean Distances calculations may be utilized with the AVAR to generate sensor feedback information. In embodiments, the sensor variance information may be based on at least one of the following: the sensor feedback information, the sensor information, the aforementioned additional information (e.g. weather information), the first timestamp (e.g. associated with gathering and/or transmitting of the sensor feedback information), and/or the second timestamp (e.g. associated with the receipt of the sensor feedback information, to name a few. In embodiments, one or more Euclidean Distances calculations may be utilized without the AVAR to generate sensor feedback information. In embodiments, the sensor variance information may be based on at least one of the following: the sensor feedback information, the sensor information, the aforementioned additional information (e.g. weather information), the first timestamp (e.g. associated with gathering and/or transmitting of the sensor feedback information), and/or the second timestamp (e.g. associated with the receipt of the sensor feedback information, to name a few.

In embodiments, the following is exemplary code for determining sensor variance in accordance with exemplary embodiments of the present invention:

Exemplary Pseudocode

```
import numpy as np
import pandas as pd
from pandas import Series
from pandas import DataFrame
from sklearn.metrics.pairwise import
274uclidean_distances
from sklearn.metrics.pairwise import
paired_distances
from scipy.spatial.distance import cdist
d = {'col1': [0, 1, 2, 3, 4, 5, 6, 7, 8, 9, 10, 11, 12,
13, 14, 15, 16, 17, 18, 19, 20, 21, 22],
'col2': [0, 1, 1, 1, 2, 1, 1, 2, 3, 2, 1, 1, 1, 1, 1, 2, 1, 1,
3, 4, 1, 2, 3]}
df = pd.DataFrame(data=d)
d2 = {'col1': [0, 1, 2], 'col2': [1, 2, 3]}
patch = pd.DataFrame(data=d2)
def orig(df, patch):
    df['corr'] = np.nan
    for i in range(df.shape[0]):
        #select the df window with the same size of
patch
        window = df[i : i+patch.shape[0]]
        #If window and patch have different shapes →
```

Exemplary Pseudocode

```
Break
    if window. shape[0] != patch.shape[0] :
        break
    else:
        patch.reset_index(inplace=True, drop=True)
        window.reset_index(inplace=True,
drop=True)
        'f['c'rr'] = cdist(d'[['c'l2]],
patc'[['c'12'']],'euclid'an')
    return df
orig(df, patch)
```

As shown in the above, in embodiments, the sensor readings (d[col1]) and corresponding timestamps (d[col2]) are analyzed for any patterns of variance.

In embodiments, the process for determining whether an IOT device is at least partially defective may continue with step S4418. At step S4418, the sensor module 4306 and/or the computing device 2702 may generate sensor deviation information for each sensor device of the first group of sensor devices. In embodiments, the sensor deviation information may be used to determine one or more of: noise within a signal over time, a systematic bias, a difference between noise forms, the reliability of the feedback data received, and/or an authenticity of the feedback data received, to name a few. To generate sensor deviation information for each sensor device and/or IoT device of the first group of IoT devices 4304, the sensor module 4306 and/or the computing device 2702 may take the square root of the sensor variance information. In embodiments, the sensor deviation information may be based on at least one of the following: the sensor feedback information, the sensor information, the aforementioned additional information (e.g. weather information), the first timestamp (e.g. associated with gathering and/or transmitting of the sensor feedback information), and/or the second timestamp (e.g. associated with the receipt of the sensor feedback information), to name a few.

In embodiments, the process for determining whether an IOT device is at least partially defective may continue with step S4420. At step S4420, the sensor variance information and the sensor deviation information for each sensor device are both stored by the computing device 2702 and/or the sensor module 4306. In embodiments, the sensor variance information and/or the sensor deviation information for each sensor device may be stored separately and/or together, in one or more of the following: memory 2702-3, memory of the sensor module 4306, and/or the memory device 4308, to name a few.

In embodiments, the process for determining whether an IOT device is at least partially defective may continue with step S4422. At step S4422, the computing device 2702 and/or sensor module 4306 may determine and/or assign a reliability rating to each sensor device of the first group of sensor devices. In embodiments, the computing device 2702 may determine a reliability rating of an IoT device of a group of IoT devices based one on or more of the following: respective sensor variance information, respective sensor deviation information, respective sensor information, the second timestamp, the aforementioned additional information (e.g. weather information), respective historical reliability ratings, sensor information associated with additional IoT devices of the group of IoT devices, and/or historical reliability ratings associated with the additional IoT devices of the group of IoT devices, to name a few.

For example, the computing device 2702 may obtain sensor feedback information from the first group of IoT devices 4304. The first group of IoT devices, for the purposes of the example, includes a First Device, a Second Device, and a Third Device. Continuing the example, once the computing device 2702 has generated sensor variation information and sensor deviation information for the First Device, Second Device, and Third Device, the computing device 2702 may determine that the Second Device's sensor variance information and feedback data are outside an expected range. The computing device 2702 may also determine that the First Device and the Third Device are associated with feedback data, sensor variation information, and sensor deviation information that are each respectively within an expected respective range. Continuing the example, because weather may affect the sensor variance information, the computing device 2702 may obtain weather information for the area in which the first group of IoT devices 4304 are located. In this example, the computing device may determine that the weather information indicates that weather is not the cause of the sensor variance information that is outside an expected range. The computing device 2702, in embodiments, once it is determined that there are values out of range that are not explained by the First IoT Device, the Third IoT Device, or the weather, may obtain historical reliability ratings for each of the First IoT Device, the Second IoT Device, and the Third IoT Device. Continuing the example, each of the First, Second, and Third IoT Devices may historically have reliable reliability ratings. Concluding the example, given the disclosure in this example, the computing device 2702 may determine that the Second IoT Device is unreliable and the First and Third IoT Devices are reliable—assigning each their respective reliability rating.

The reliability rating, in embodiments, may be a binary rating (e.g. reliable or unreliable) and/or a graded scale (e.g. on a scale of 1-10 where 1 is the most unreliable and 10 is the most reliable), to name a few. In embodiments, the determined reliability ratings may be stored separately and/or together, in one or more of the following: memory 2702-3, memory of the sensor module 4306, a reliability ratings database, and/or the memory device 4308, to name a few. In embodiments, a reliability rating that indicates an IoT device is unreliable does not necessarily mean that the IoT device is at least partially defective, and vice versa.

In embodiments, after determining and assigning a reliability rating for each of the IoT devices of the first group of IoT devices 4304, the computing device 2702 may generate a plurality of machine-readable instructions, each of the plurality being for each IoT device of the first group of IoT Devices 4304. The machine-readable instructions, in embodiments, may be to store the respective, determined, and assigned reliability rating locally on the respective IoT device. Once generated, in embodiments, the plurality of machine-readable instructions may be transmitted by the computing device 2702 to each IoT device of the first group of IoT devices 4304 via network 100. In embodiments, upon receipt of respective machine-readable instructions, the respective IoT device may store the respective reliability rating.

In embodiments, the computing device 2702 may generate a reliability report. The reliability report may include one or more of the following: (1) current reliability ratings associated with the first group of IoT devices 4304, (2) current reliability ratings associated with the plurality of IoT devices 4302, (3) historical reliability ratings associated with the first group of IoT devices 4304, (4) historical reliability ratings associated with the plurality of IoT devices 4302, (5) the sensor feedback information associated with the first group of IoT devices 4304, and/or (6) the sensor feedback information associated with the plurality of IoT devices 4302, to name a few. The reliability report, in embodiments, may be transmitted by the computing device 2702 to a device associated with at least one administrator of the computing device 2702 via network 100.

In embodiments, the process for determining whether an IOT device is at least partially defective may continue with step S4424. At step S4424, the computing device 2702 and/or sensor module 4306 may determine whether at least one sensor device of the first group of sensor devices is at least partially defective. In embodiments, the computing device 2702 may determine whether at least one sensor device of the first group of sensor devices is at least partially defective based one on or more of the following: respective reliability rating, respective sensor variance information, respective sensor deviation information, respective sensor information, the second timestamp, the aforementioned additional information (e.g. weather information), respective historical reliability ratings, the first timestamp, sensor information associated with additional IoT devices of the group of IoT devices, and/or historical reliability ratings associated with the additional IoT devices of the group of IoT devices, to name a few.

Continuing the example described in connection with step S4422, the computing device 2702 may determine that the Second Device's sensor variance information and feedback data are outside an expected range. The computing device 2702 may also determine that the First Device and the Third Device are associated with feedback data, sensor variation information, and sensor deviation information that are each respectively within an expected respective range. The computing device 2702, in embodiments, once it is determined that there are values out of range that are not explained by the First IoT Device, the Third IoT Device, and/or the weather, may obtain historical reliability ratings for each of the First IoT Device, the Second IoT Device, and the Third IoT Device. Continuing the example, each of the First, Second, and Third IoT Devices may historically have reliable reliability ratings. Concluding the example, given the disclosure in this example, the computing device 2702 may determine that the Second IoT Device is at least partially defective.

In embodiments, a wide fluctuation in noise, indicated by sensor variation information, may indicate the battery (e.g. power source 4304-1E) of the IoT device (e.g. first IoT device 4304-1) is low and/or the voltage from the battery is fluctuating. As another example, if the respective feedback data is a plurality of data points over a period of time, and the slope of the curve connecting the data points is similar to that of the curve of data points associated with obtained feedback data from additional IoT devices of the same group of IoT devices, the computing device 2702 may determine that the IoT device is not calibrated correctly. A more detailed explanation is described in connection with FIG. 44C.

Referring to FIG. 44C, in embodiments, the process for determining whether at least one sensor device of the first group of sensor devices is at least partially defective may begin at step S4430. At step S4430, the computing device 2702 and/or sensor module 4306 may compare the first respective sensor feedback information associated with the at least one sensor device with first respective sensor information associated with the at least one sensor device. For the purposes of the following example, the first group of IoT devices 4304 may include thermometer 4344, Thermometer A, and Thermometer B. Thermometer 4344, Thermometer A, and Thermometer B, for the purposes of this example, may be located in an elevator machine room. Thermometer 4344, for example, may be located six feet off the floor of the elevator machine room. Thermometer A, for example, may be located on the floor of the elevator machine room. Thermometer B, for example, may be located on the ceiling of the elevator machine room.

Continuing the example, the computing device 2702 may extract data from the stored sensor information of thermometer 4344 and data from the obtained sensor feedback data of thermometer 4344. As mentioned above, in embodiments, the sensor information for thermometer 4344 may include data representing one or more of the following: (1) sensor identification information; (2) location information; (3) data range information; (4) sensor specification information; (5) sensor running time information; (6) sensor proximity information; (7) historical reliability rating information; (8) historical sensor variance information; (9) historical sensor deviation information; and/or (10) historical defective report information, to name a few. Moreover, as mentioned above, in embodiments, the sensor information for thermometer 4344 may include one or more of the following: (1) identification information, (2) feedback data, (3) a timestamp, (4) connection information, (5) a current reliability rating, and/or (6) device information, to name a few. Continuing the example, the computing device 2702 may extract data range information from the sensor information of thermometer 4344 and feedback data from the sensor feedback information of thermometer 4344. For the purposes of this example, the exemplary information extracted by the computing device 2702 is listed in the below table:

TABLE 27

| Data Range Information | | Feedback Data | |
|---|---|---|---|
| Expected Range | Time | Temperature | Time |
| 15.56° C.-32.22° C. | 1:00 PM | 134° F. | 1:00 PM |
| 15.56° C.-32.22° C. | 2:00 PM | 76° F. | 2:00 PM |
| 15.56° C.-32.22° C. | 3:00 PM | 121° F. | 3:00 PM |
| 15.56° C.-32.22° C. | 4:00 PM | 143° F. | 4:00 PM |

As shown in the above exemplary table, the data range information includes an expected and/or acceptable temperature range over the course of time. Because an elevator may be in service during an afternoon (e.g. between the hours of 1 PM and 4 PM), the expected range may be constant. However, in embodiments, the expected range may fluctuate based on one or more conditions (e.g. planned service, high volume of usage during a period of time, low volume of usage, to name a few). In embodiments, the computing device 2702 may initially view the feedback data above as an indication of either a defective sensor or an emergency situation (e.g. a fire). In response, the computing device 2702 may process the data, looking for issues with either the feedback data or the expected range (e.g. different unit of measurement, different time, missing data points, to name a few). For example, the computing device 2702 may determine that the expected range is in a different unit of measurement than the feedback data. Before determining thermometer 4344 is at least partially defective, the computing device 2702 may convert the units of measurement such that the expected range and the feedback data are represented in the same unit of measurement.

Continuing the example, the computing device 2702 may, in embodiments, convert the expected range to Fahrenheit and/or convert the feedback data to Celsius. For the purposes of this example, the computing device may convert the expected range of 15.56° C.-32.22° C. to 60° F.-90° F. Once the expected range and the feedback data are represented in the same unit of measurement, the computing device 2702 may determine that 3 of the 4 data points between 1 PM and 4 PM are outside of the expected range. In embodiments, the computing device 2702 may compare the data points outside the expected range to predetermined thresholds. For example, in embodiments, a room that is on fire may have a temperature of 100° F. at the floor level, 600° F. at eye level, and 1,500° F. at ceiling level—depending on the size and shape of the room. Because thermometer 4344 is located six feet off the floor of the elevator machine room, the computing device 2702 may determine whether the temperature is hot enough to indicate a fire—e.g. determine if the temperature is 600° F. In embodiments, the predetermined threshold for an emergency situation (e.g. a fire) may be 400° F., allowing for a faster response to an emergency. For the purposes of this example, because the data points do not reach 400° F., the computing device 2702 may determine that there is no emergency situation, and flag the thermometer 4344 for monitoring (see e.g. steps S4440-S4448, the description of which applying herein).

If, for example, the temperature is hot enough to indicate a fire, the computing device 2702 may generate and send a notification message (e.g. see steps S4426-S4428, the description of which applying herein) to one or more of the following: an administrator of the computing device 2702, the fire department, the police department, an administrator of the building that houses the elevator machine room, and/or an ambulance corps, to name a few.

In embodiments, computing device 2702 may also verify sensor feedback data by correlating two seemingly unconnected sensor data in order to generate and send notification messages. A process for verifying sensor feedback data, in embodiments, is illustrated in connection with FIGS. 45A and 45B. For example, referring to FIG. 45A, First IoT Device 4304-1 and Second IoT Device 4304-2 may transmit sensor feedback data to Computing Device 2702 via network 100. Continuing the example, referring to FIG. 45B, the computing device 2702 may at step S4502 verify the sensor feedback data received from the First IoT Device 4304-1 and Second IoT Device 4304-2 individually (e.g., steps S4502-1 verify feedback data from the First Computing Device and S4502-1 verify feedback data from the Second Computing Device 4502-2) and/or together. The sensor feedback data, for example, may include data that indicates an error, such as, an error message, data with an excessive amount of noise, a lack of data, and/or a combination thereof, to name a few. In embodiments, one or more processor(s) (e.g., processors of the computing device 2702, processor(s) of computer 1802, to name a few) may be operable to verify sensor feedback data.

Following this paragraph are three examples of unverified sensor feedback data (e.g., data which is at least partially defective). The first example (Table 28), illustrates an embodiment where the sensor feedback data values are zero, (e.g., indicating a defective sensor). Where the sensor feedback data values are zero, in embodiments, the computing device 2702 may determine that an IoT Device is at least partially defective and/or generate and send a message to an administrator notifying of the IoT Device (e.g., to verify the IoT Device's proper operation, to repair the IoT Device, and/or to replace the IoT Device, to name a few). The second example (Table 29), illustrates an embodiment where the sensor feedback data is not received from an IoT Device (e.g., the IoT Device is not communicating data to the computing device 2702). In embodiments, where sensor feedback data is not being received from an IoT Device, the computing device 2702 may generate and send a message to an administrator notifying of the IoT Device (e.g., to verify the IoT Device's proper operation, to repair the IoT Device, and/or to replace the IoT Device, to name a few). The third example (Table 30), illustrates an embodiment where the sensor feedback data is data values are bifurcative and/or oscillating between minimum and maximum and/or within a range (e.g., indicating no valid readout values from the IoT Device). In embodiments, where sensor feedback data is not returning valid readout values, the computing device 2702 may generate and send a message to an administrator notifying of the IoT Device (e.g., to verify the IoT Device's proper operation, to repair the IoT Device, and/or to replace the IoT Device, to name a few).

TABLE 28

| Time (HH:MM) | First IoT Device 4304-1 Sensor Feedback Data Value |
|---|---|
| 00:00 | 0 |
| 00:15 | 0 |
| 00:30 | 0 |
| . | . |
| . | . |
| . | . |
| 23:45 | 0 |

TABLE 29

| Time (HH:MM) | Second IoT Device 4304-2 Sensor Feedback Data Value |
|---|---|
| 00:00 | n/a |
| 00:15 | n/a |
| 00:30 | n/a |
| . | . |
| . | . |
| . | . |
| 23:45 | n/a |

TABLE 30

| Time (HH:MM) | Third IoT Device 4304-3 Sensor Feedback Data Value |
|---|---|
| 00:00 | 0 |
| 00:15 | 255 |
| 00:30 | 0 |
| 00:45 | 255 |
| 01:00 | 0 |
| . | . |
| . | . |
| . | . |
| 23:45 | 0 |

In embodiments, the computing device 2702 may utilize one or more standardized Euclidean Distances calculations (e.g., distance between vectors and/or arrays) to correlate to verify two seemingly unconnected pieces of sensor feedback data. In embodiments, the computing device 2702 may correlate two seemingly unconnected pieces of sensor feedback data utilize one or more standardized Euclidean Distances (SED) calculations by: (1) identifying two or more seemingly unconnected pieces of sensor feedback data utilizing the results of the SED calculations; (2) generating a similarity metric for each piece of sensor feedback data utilizing the results of the SED calculations; (3) generating a message including information regarding the correlated sensor feedback data; and/or (4) a combination thereof, to name a few. In embodiments, alternatively to and/or in combination with the SED calculations, the computing device 2702 may utilize one or more of the following: supervised learning algorithms (e.g. classification supervised learning, regression supervised learning), unsupervised learning algorithms (e.g. association unsupervised learning, clustering unsupervised learning, dimensionality reduction unsupervised learning), reinforcement learning algorithms (e.g. through trial and error), semi-supervised algorithms, Naïve Bayes Classifier Algorithm(s), K Means Clustering Algorithm(s), Support Vector Machine Algorithm(s), Apriori Algorithm(s), Linear Regression, Logistic Regression, Artificial Neural Networks, Random Forests, Decision Trees, Histogram of Oriented Gradients Algorithm(s), and/or Nearest Neighbors, to name a few. The following table (Table 31) is an illustrative example where a portion of the sensor feedback data is determined to be a mistake and is discarded.

TABLE 31

| Time (HH:MM) | Fourth IoT Device 4304-4 Sensor Feedback Data Value |
|---|---|
| 00:00 | 68 |
| 00:15 | 68 |
| 00:30 | 68 |
| 00:45 | 68 |
| 01:00 | 68 |
| . | |
| . | |
| . | |
| 11:30 | 70 |
| 11:45 | 2,320 |
| 12:00 | 71 |
| 12:15 | 71 |
| . | |
| . | |
| . | |
| 23:45 | 68 |

Referring to the above illustrative example, the sensor feedback data value received by the computing device 2702 from the fourth IoT Device 4304-4 at 11:45 may be determined to be a mistake (e.g., the Fourth IoT Device 4304-4 is not capable of reading a temperature of 2,320 degrees Fahrenheit—exceeding a predetermined threshold; the temperature of a room cannot feasibly fluctuate between 70 and 2,320 degrees Fahrenheit within 15 minutes, to name a few). In embodiments, the mistaken reading may result in the computing device 2702 lowering the reliability rating of the Fourth IoT Device 4304-4. In embodiments, the value at 11:45 may be discarded by the Fourth IoT Device 4304-4 and/or redirected to a folder for readings from IoT Devices which were determined to be mistaken. In embodiments, at step S4505, the computing device 2702 may generate and send a message to an administrator notifying of the IoT Device (e.g., to verify the IoT Device's proper operation, to repair the IoT Device, and/or to replace the IoT Device, to name a few).

In embodiments, the following exemplary code is run for each sensor to assist in verifying by determining a correlation between two or more seemingly unconnected pieces of sensor feedback data in accordance with the present invention:

Exemplary Pseudocode

```
# Define a function that fits model to training set (or prior known good data, evaluate
performance with test set, and forecast with whole dataset
def proph_it(train, test, whole, interval=0.95, forecast_periods 1,
forecast_periods2):
'''Uses Facebook Prophet to fit model to train set, evaluate
performance with test set, and forecast with whole dataset. The
model has a 95% confidence interval by default.
Remember: datasets need to have two columns, 'ds' and 'y'.
Dependencies: fbprophet, matplotlib.pyplot as plt
Parameters:
train: training data
test: testing/validation data
whole: all available data for forecasting
interval: confidence interval (percent)
forecast_periods1: number of months for forecast on
training data
forecast_periods2: number of months for forecast on whole
dataset'''
# Fit model to training data and forecast
model = proph(interval_width=interval)
model.fit(train)
future = model. make_future_dataframe(periods=forecast_periods1, freq='MS')
forecast = model, predict(future)
# Plot the model and forecast
model. plot(forecast, uncertainty=True)
plt.title('Training data with forecast')
plt.legend( );
# Make predictions and compare to test data
y_pred = model.predict(test)
# Plot the model, forecast, and actual (test) data
model.plot(y_pred, uncertainty=True)
plt.plot(test['ds'], test['y'], color='r', label='actual')
plt.title('Validation data v. forecast')
plt.legend( );
# Fit a new model to the whole dataset and forecast
model2 = proph(interval_width=0.95)
model2.fit( whole)
future2 = model2.make_future_dataframe(periods=forecast_periods2,
freq='MS')
forecast2 = model2.predict(future2)
# Plot the model and forecast
model2.plot(forecast2, uncertainty=True)
plt.title('{(-month forecast'.format(forecast_periods2))
plt.legend( );
# Plot the model components
model2.plot_components(forecast);
return y_pred, forecast2
```

The above exemplary code was based on computer code for correlation between pieces of data available at: https://towardsdatascience.com/time-series-modeling-with-facebook-prophet-57f146a11d0d.

Figure 45A:
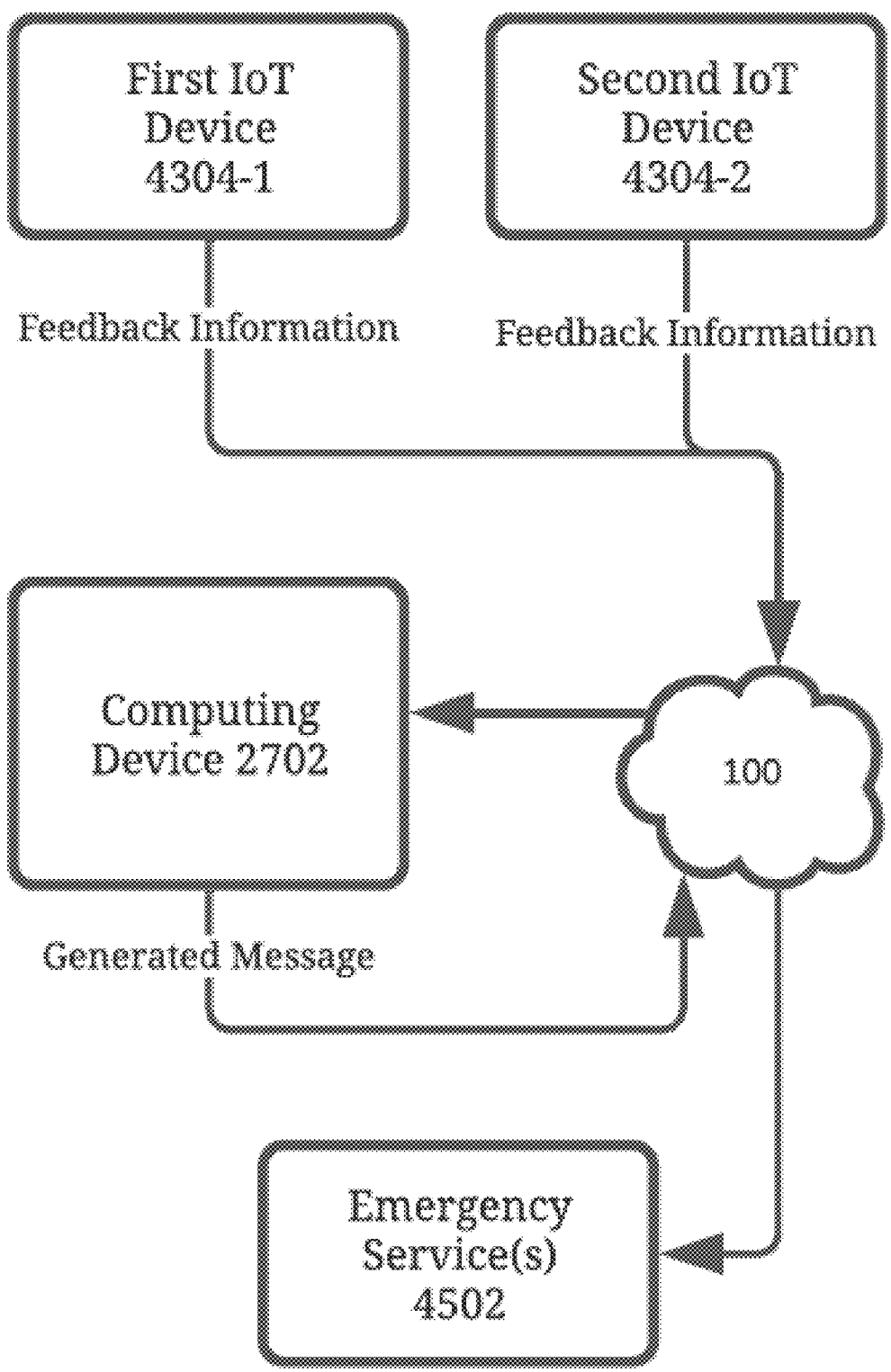
FIGS. 45A-45B are an exemplary block diagram and corresponding flow chart of a process for verifying and analyzing sensor data in accordance with exemplary embodiments of the present invention.

To validate and/or verify sensor feedback data, in embodiments, the computing device 2702 may executed the above pseudocode for each IoT device of the plurality of IoT devices 4302. For example, the computing device may at step S4504, determine the validity of sensor feedback data from the First IoT Device 4304-1 and/or the Second IoT Device 4304-2 (as illustrated in FIG. 45A) by executing the above pseudocode If, referring to FIG. 45B, for example, the sensor feedback data at S4504-1 and S4504-2 is determined to be not valid or not verified, the sensor feedback data may be discarded. In embodiments, the data received and discarded may be corrupted and/or unreadable sensor feedback data.

If, in embodiments, the sensor feedback data is valid and/or verified, in embodiments, at step S4506, the valid and/or verified sensor feedback data is analyzed by the computing device 2702. In embodiments, the computing device may utilize results of the execution of the pseudocode associated with step S4504 in one or more SED calculations, e.g., utilizing the following exemplary pseudocode:

Exemplary Pseudocode

```
Define period=3600 #for example, 60 minutes = 3600 seconds
Define Alarm_Indicator=0
Define Sensor_Check_Array[ ]=0
Foreach(sensor[ ], period) {
If (Calc_ED(sensor[i].period.readings[ ], sensor[i].period.forecast[ ])    >0.05)
Then
    Alarm_Indicator += 1
Sensor_Check_Array[i++]=sensor[i].name
End
```

| Exemplary Pseudocode |
|---|
| If Alarm indicator > 3 # or any other desired threshold showing unexpected<br>    Then<br>        Send_message(receipient, "Multiple sensors (%s) are<br>readings concurrently. Please check.", Sensor_Check_Array) |

Figure 45B:
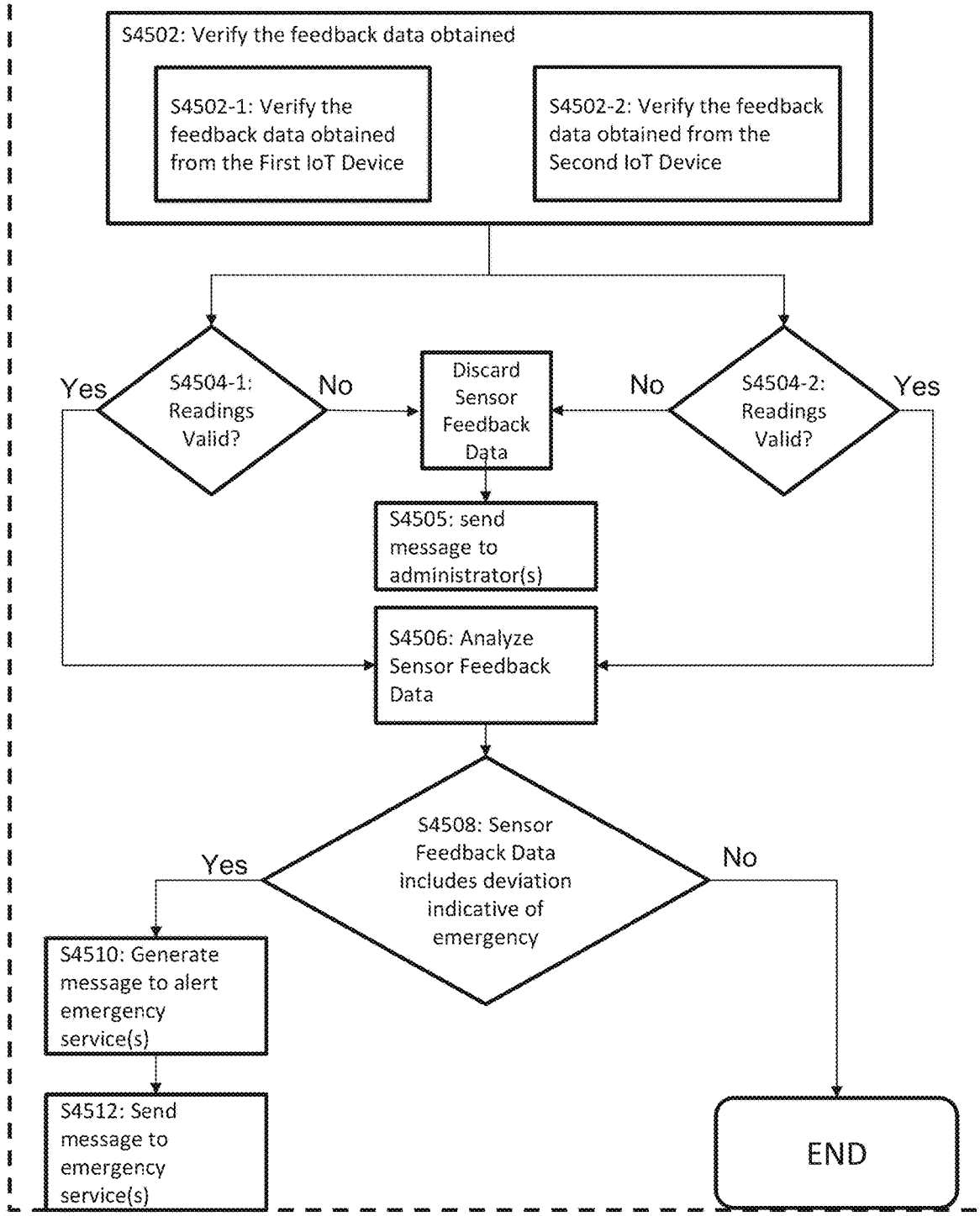

In embodiments, referring to FIG. 45B, at step S4508, the computing device 2702 may determine that the sensor feedback data does not indicate an emergency situation. For example, the computing device S4508 may analyze the sensor feedback data in the context of one or more predetermined thresholds (e.g., above a threshold, below a threshold), one or more predetermined ranges (e.g., inside a predetermined range, outside a predetermined range), and/or a combination thereof (e.g., above a threshold and within a range indicating a type of emergency is occurring), to a name a few. For example, the computing device 2702 may determine the sensor feedback data (e.g., data from a temperature sensor) of an IoT Device monitoring a refrigerator is below a specified threshold (e.g., based on the contents of the refrigerator). As another example, the computing device 2702 may determine sensor feedback data (e.g., data from a temperature sensor) of an IoT Device monitoring the ambient temperature of a room is within a predetermined range (e.g., a specified range around room temperature).

In embodiments, the computing device 2702 at step S4508 may determine the sensor feedback data indicates an emergency. If, continuing the example of a refrigerator, the IoT Device reads the temperature as above the specified threshold, the computing device 2702 may determine an emergency is occurring. In embodiments, the computing device 2702 may further analyze the sensor feedback data to determine the type of emergency (e.g., the refrigerator is on fire) and/or the urgency of the emergency (e.g., if a maintenance man gets to the refrigerator within 2 hours, the contents of the refrigerator may be saved). If, continuing the example of a room, the IoT Device reads the temperature as outside the predetermined range, the computing device may determine the room is on fire if the verified sensor data indicates an ambient temperature above a predetermined threshold.

Figure 46A:
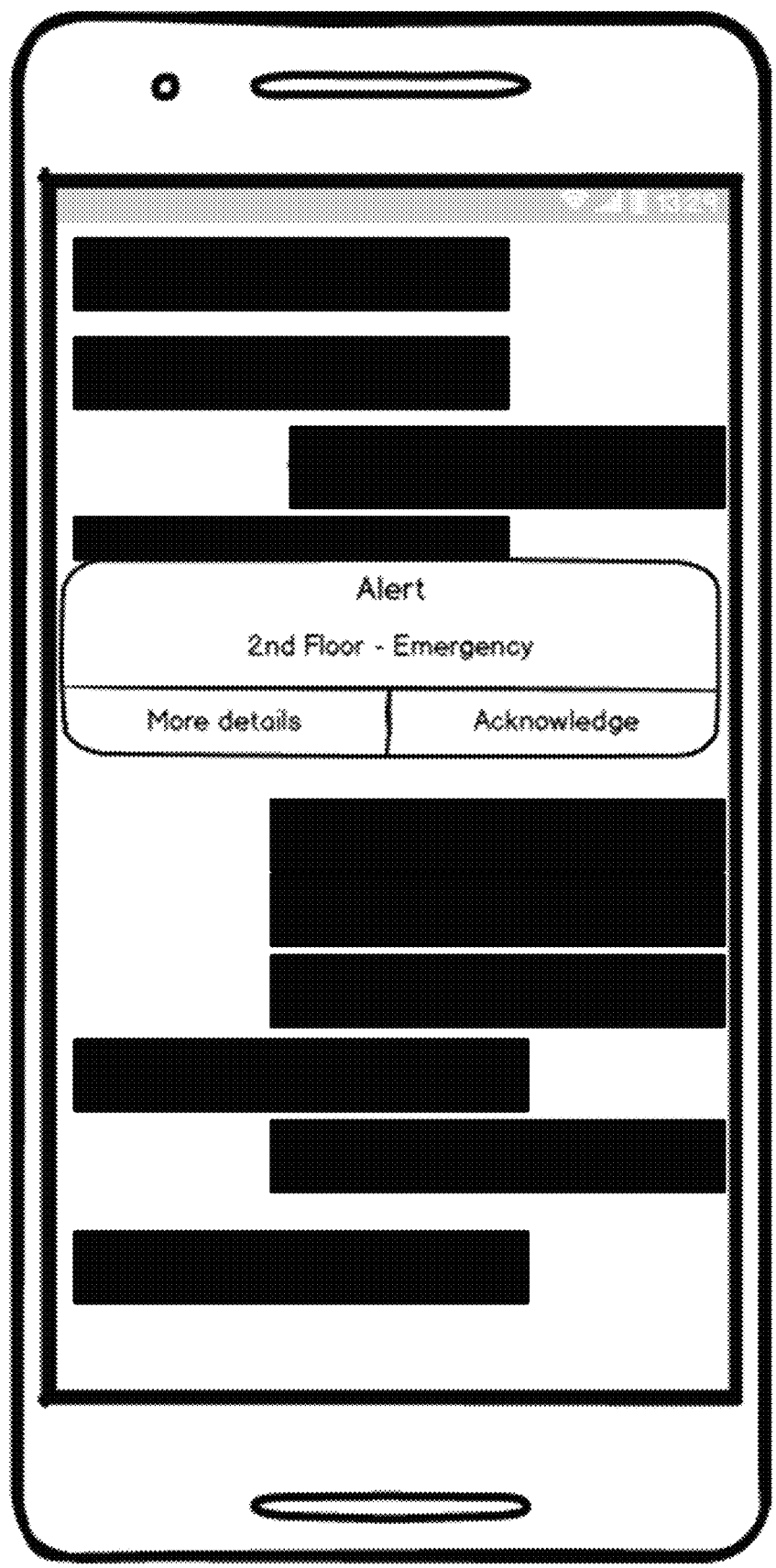
FIGS. 46A-46B are exemplary graphical user interfaces in accordance with exemplary embodiments of the present invention.
Figure 46B:

In a possible emergency situation, in embodiments, at step S4510, the computing device 2702 may generate a message alerting one or more of an administrator of the IoT Devices, emergency services, third parties, and/or a combination thereof, to name a few. This message, which may be similar to the exemplary graphical user interfaces illustrated in FIGS. 46A and 46B, at step S4512, may be sent to, for example, emergency services to alert said services of the possible emergency situation (e.g., as shown in FIG. 45A where the generated message is sent from the computing device 2702 to the emergency service(s) 4502). In embodiments, the message and/or notification recipient may have predetermined response options—e.g., acknowledge, dismiss, request more details, monitor (e.g., request frequent updates and/or live streaming of the data from the IoT Device), and/or a combination thereof, to name a few.

In embodiments, computing device 2702 may associate and/or correlate data received from two or more IoT Devices of the plurality of IoT Devices 4302. The computing device 2702 may, for example, utilize a plurality of IoT Devices 4302 to determine a particular person (particular animal, and/or particular object) is in a room. Continuing the example, a temperature sensor 4328 that reads within a 2 m radius of its location detects an increase in temperature. The temperature sensor 4328, continuing the example, is co-located with a Bluetooth® receiver and a computer vision camera. The computing device 2702, finishing the example, may determine that a particular person is present if one or more of the following are true at or around (e.g., within a range) the same time: (1) the Bluetooth® receiver indicates a cell phone associated with the particular person is within 2 meters and/or (2) the particular person is identified by the computer vision camera (e.g., utilizing facial recognition software). The detection of that particular person may validate the increased temperature readings from the temperature sensor 4328. In embodiments, the computing device 2702 may erroneously read that a person (and/or more than one person) is present. In embodiments, the mistaken reading may be utilized to determine the IoT device(s) associated with the mistaken feedback data are at least partially defective.

In embodiments, the computing device 2702 may use the feedback data from the plurality of IoT Devices 4302 to recognize an object and/or a particular identifier (e.g., barcode, NFC, RFID, MAC address, and/or a combination thereof, to name a few) associated with an object to determine the validity of sensor feedback data. In embodiments, one or more of the plurality of IoT Devices 4302 may be able to move about one or more axis, focus on one or more points, and/or utilize a mask (e.g., an image mask) such that only a portion of the area covered by the particular IoT device is covered. In such embodiments, for example, the computing device 2702 may correlate sensor feedback data from two or more IoT devices and/or generate masking instructions to send to one or more IoT devices to validate sensor feedback data.

As another example, a current sensor may indicate a brief high current event on floor 5 of a building, and a thermometer may record a slight increase in temperature on floor 6 twenty minutes later. Each of these events, analyzed individually, may not be significant, however in combination they may indicate that a short circuit on floor 5 sparked a fire on floor 5 which is what is causing floor 6 to start warming up. Continuing the example, computing device 2702 may send a notification to one or more of the following: an administrator of the computing device 2702, the fire department, the police department, an administrator of the building that houses the sensor, room, and/or an ambulance corps, to name a few.

The process for determining whether at least one sensor device of the first group of sensor devices is at least partially defective may continue with step S4432. At step S4432, the computing device 2702 and/or sensor module 4306 may compare the first respective sensor feedback information with second respective sensor feedback information associated with one or more other sensor devices of the first group of sensor devices. Continuing the example, the sensor module 4306 and/or computing device 2702 may extract stored sensor information of Thermometer A and/or Thermometer B and data from the obtained sensor feedback data of Thermometer A and/or Thermometer B. For the purposes of this example, the exemplary information extracted by the computing device 2702 is listed in the below table:

TABLE 32

| Feedback Data of Thermometer 4344 | | Feedback Data of Thermometer A | | Feedback Data of Thermometer B | |
|---|---|---|---|---|---|
| Temperature | Time | Temperature | Time | Temperature | Time |
| 134° F. | 1:00 PM | 68° F. | 1:00 PM | 81.2° F. | 1:00 PM |
| 76° F. | 2:00 PM | 67.4° F. | 2:00 PM | 80.4° F. | 2:00 PM |
| 121° F. | 3:00 PM | 72.6° F. | 3:00 PM | 81.3° F. | 3:00 PM |
| 143° F. | 4:00 PM | 71.1° F. | 4:00 PM | 80.8° F. | 4:00 PM |

In embodiments, the computing device 2702 (and/or sensor module 4301) may determine that the feedback data of Thermometer A and Thermometer B are within the 60° F. through 90° F. expected range. This determination, in embodiments, may allow computing device 2702 to determine there is no emergency and that Thermometer 4344 is at least partially defective.

In embodiments, the feedback data may indicate that thermometer 4344 is producing data within an expected range. However, the computing device 2702 may determine the thermometer 4344 is at least partially defective based on one or more of the following: (1) a timestamp, (2) connection information, (3) a current reliability rating, (4) useful life information, (5) sensor variance information, (6) sensor deviation information, (7) historical reliability rating and/or (8) device information, to name a few. In embodiments, IoT devices may experience one or more of the following defects: hardware defects (e.g. battery life, wiring, connectivity issues, broken parts, wear and tear, etc.), software defects, and/or malicious defects (e.g. a hacker or other bad actor, etc.) to name a few.

In embodiments, as mentioned above, the process for determining whether at least one sensor device is at least partially defective may continue with obtaining respective historical reliability ratings for each sensor device of the first group of sensor devices. Continuing the example, the computing device 2702 and/or the sensor module 4306, may extract historical reliability from the stored sensor information associated with thermometer 4344, Thermometer A, and Thermometer B. In embodiments, the historical reliability ratings may indicate that the first group of IoT devices 4304 were all assigned a reliable reliability rating In embodiments, the respective historical reliability ratings may be compared to the determined and assigned reliability ratings. Continuing the example, the historical reliability ratings of reliable, in combination with the previous analysis, may indicate that the thermometer 4344 is at least partially defective. In embodiments, a previous reliable reliability rating may indicate that the sensor is detecting an emergency—which may result in the same actions noted above.

In embodiments, the computing device 2702, utilize hierarchical information associated with the plurality of IoT devices 4302 to predict if a defect and/or emergency will spread from the at least one IoT Device to one or more of the remaining IoT devices of the plurality of IoT Devices 4302. Continuing the example above with the eleven IoT Devices monitoring a five story apartment building, the respective sensor types may be as follows:

TABLE 33

| IoT Device | Sensor Type |
|---|---|
| First IoT Device | Electrical Current Sensor |
| Second IoT Device | Electrical Current Sensor |
| Third IoT Device | Electrical Current Sensor |
| Fourth IoT Device | Electrical Current Sensor |
| Fifth IoT Device | Electrical Current Sensor |
| Sixth IoT Device | Electrical Current Sensor |
| Seventh IoT Device | Temperature Sensor |
| Eighth IoT Device | Temperature Sensor |
| Ninth IoT Device | Temperature Sensor |
| Tenth IoT Device | Temperature Sensor |
| Eleventh IoT Device | Temperature Sensor |

Continuing the example, the $2^{nd}$ IoT Device may transmit sensor feedback data that indicates a loss of power. A loss of power to an entire floor of an apartment building, in embodiments, may cause inconsistent feedback data associated with the remaining IoT Devices ($1^{st}$, $3^{rd}$-$11^{th}$). For example, the second floor of the apartment building may lose power in the middle of a hot summer day. Without power, in embodiments, the second floor may also lose air conditioning, which may cause the $8^{th}$ IoT device to gather and transmit feedback data that indicates an increase in temperature over a period of time. Additionally, in embodiments, an increase of heat during a hot summer day may also cause the $3^{rd}$, $4^{th}$, and $5^{th}$ floors to increase in temperature and/or electrical output. For example, as the higher floors increase in temperature, tenants of the apartments may turn up their respective air conditioners, resulting in an increased amount of electrical current. In embodiments, because the power outage affected the $2^{nd}$ floor, the $1^{st}$ floor may not experience an increase in temperature and/or an increase in electrical output. The computing device 2702, in embodiments, may analyze the change in temperature and electrical output over time to determine whether the $2^{nd}$ IoT Device and/or $8^{th}$ IoT device are defective or whether the $2^{nd}$ IoT Device and/or $8^{th}$ IoT device are indicating an emergency situation. For example, if the temperature increases below a threshold rate (e.g. a gradual rate), the temperature increase may indicate that the $2^{nd}$ IoT Device and/or the $8^{th}$ IoT device is defective. Alternatively, for example, if the temperature increases above a threshold rate (e.g. a fast rate), the temperature increase may indicate an emergency situation on the $2^{nd}$ floor of the apartment building. The computing device 2702, in embodiments, may also predict the effects a defective IoT device on the $2^{nd}$ floor will have on the remaining IoT Devices. In embodiments, the predicted effects may be stored and accessed when feedback data is received from the plurality of IoT devices.

Figure 44B:
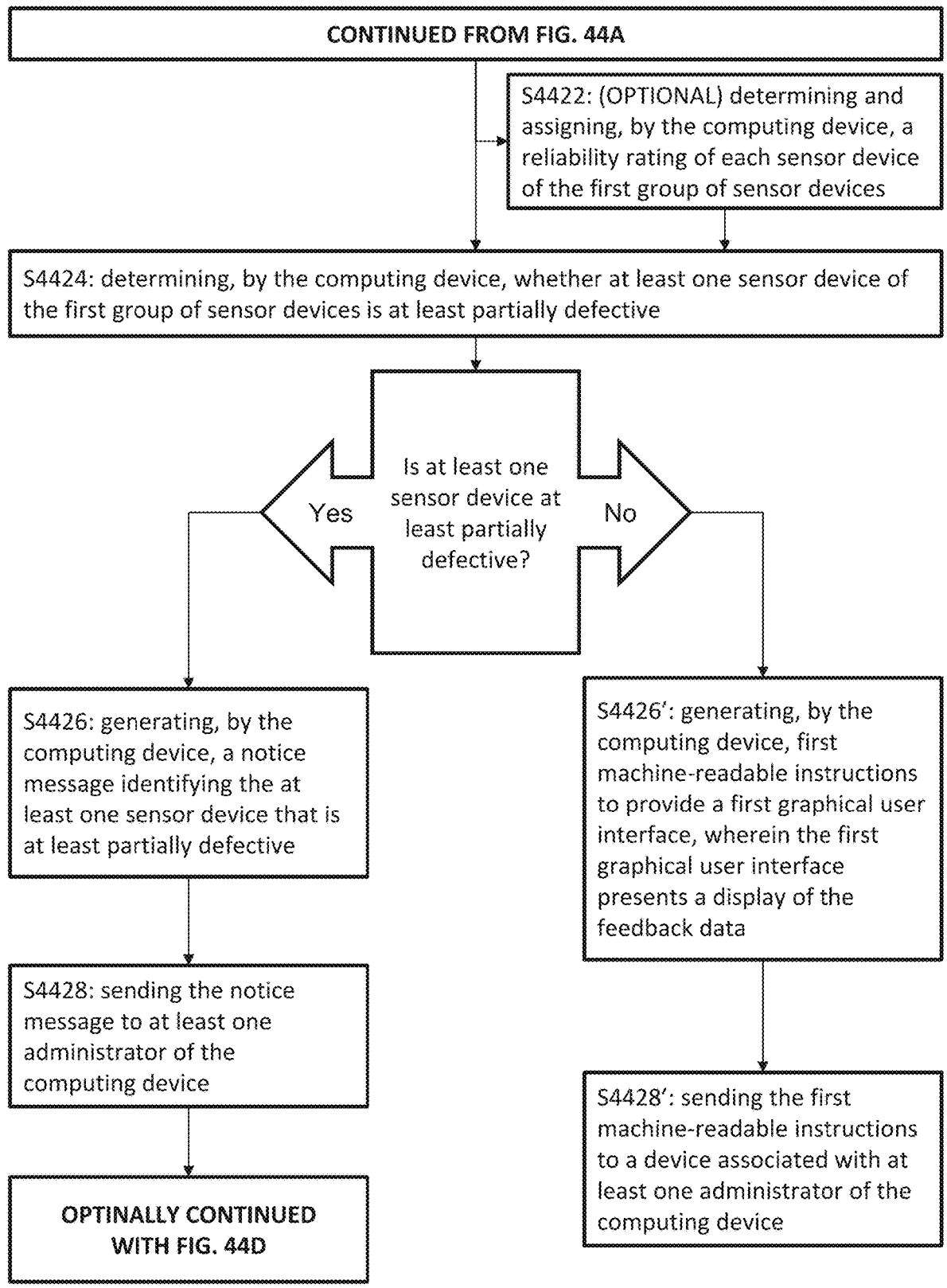

Referring to FIG. 44B, in embodiments the process for determining whether at least one sensor device is at least partially defective may continue with step S4426. At step S4426, the computing device 2702 may generate a notice message. The notice message, in embodiments, may identify the at least one sensor device that is at least partially defective. In embodiments, the computing device 2702 may also generate a report regarding the at least one partially defective IoT device. The report, in embodiments, may include one or more of the following: (1) sensor information associated with the at least one partially defective IoT device, (2) a repair message indicating the at least one partially defective IoT device, and/or (3) the sensor feedback information associated with the at least one partially defective IoT device, to name a few. The repair message may indicate one or more of the following: (1) the issue associated with the IoT device, (2) whether a purchase order has been sent for necessary parts and/or replacement (see steps S4464-S4468, the descriptions of which applying herein), and/or (3) an acceptable timeframe to repair the at least one partially defective IoT device, to name a few.

In embodiments the process for determining whether at least one sensor device is at least partially defective may continue with step S4426. At step S4426, the computing device 2702 transmits the notice message to a device associated with at least one administrator of the computing device 2702 via network 100. In embodiments, the computing device 2702 may transmit the aforementioned generated report to the device associated with at least one administrator of the computing device 2702 via network 100.

Alternatively, in embodiments, the computing device may determine that no IoT device is at least partially defective. In embodiments, the process may continue from step S4424 with step S4426'. At step S4426', the computing device 2702 may generate first machine-readable instructions to provide a first graphical user interface. The first graphical user interface, in embodiments, may include a display of one or more of the following: (1) the sensor feedback information associated with the first group of IoT devices 4304, (2) the sensor feedback information associated with the plurality of IoT devices 4302, (3) the sensor information associated with the first group of IoT devices 4304, and/or (4) the sensor information associated with the plurality of IoT devices 4302, to name a few. The first machine-readable instructions, in embodiments, may include instructions that the cause the first graphical user interface to be displayed upon receipt by an electronic device with a display screen.

In embodiments, the process may continue from with step S4428'. At step S4428', the computing device 2702 may transmit the first machine-readable instructions to a device associated with at least one administrator of the computing device 2702. Upon receipt, the device may display the first graphical user interface.

Figure 44D:
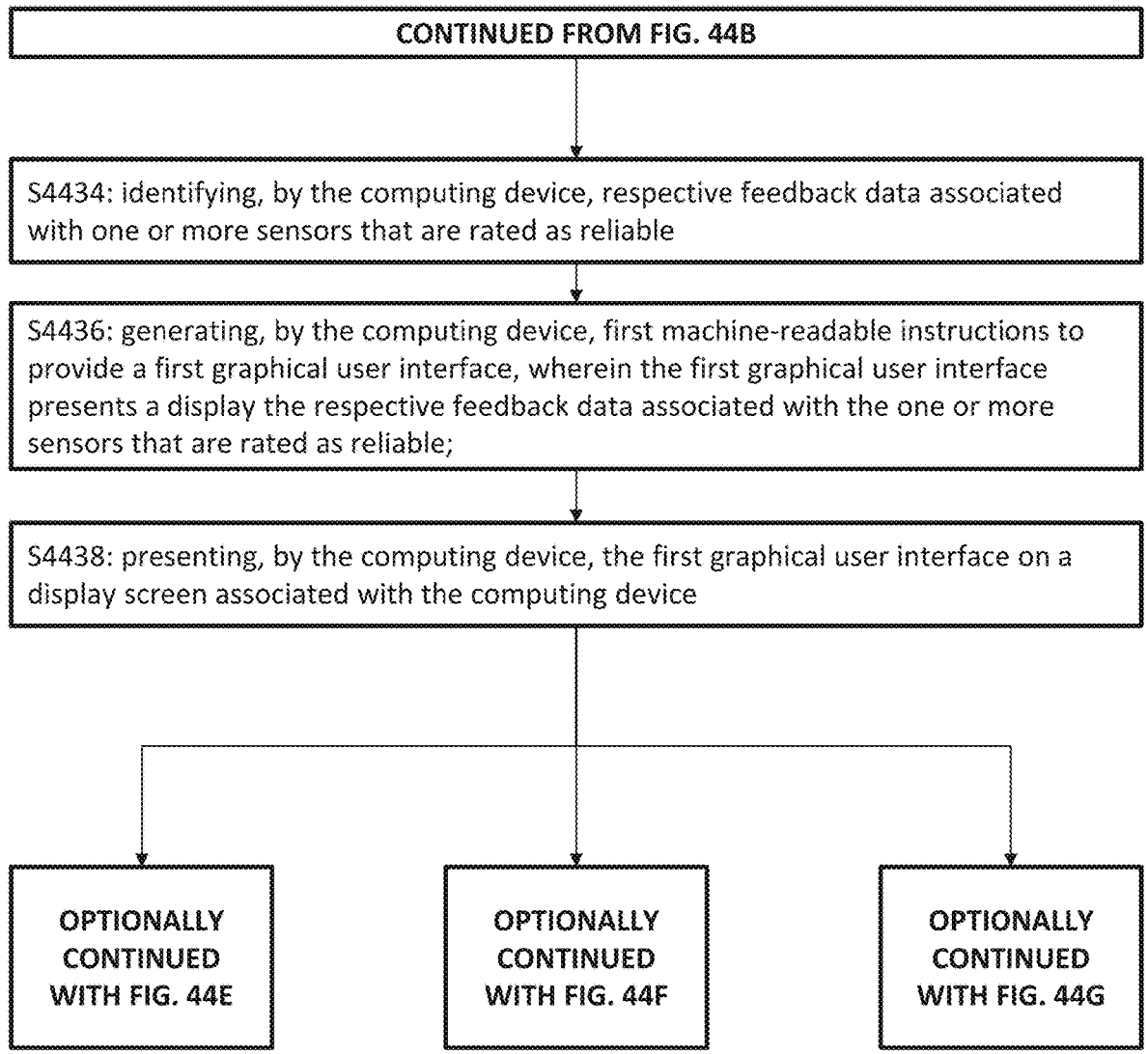

In embodiments, the process for determining whether at least one sensor device is at least partially defective may optionally continue with step S4434 of FIG. 44D. Referring to FIG. 44D, step S4434, the computing device 2702 may identify respective feedback data associated with one or more sensors that are rated as reliable. Continuing the example with three thermometers, the computing device 2702 may identify Thermometer A and Thermometer B as reliable IoT devices of the first group of IoT devices 4304.

The process may continue with step S4436. In embodiments, at step S4436, the computing device 2702 may generate first machine-readable instructions to provide a first graphical user interface. The first graphical user interface, in embodiments, may include a display of one or more of the following: (1) the sensor feedback information associated with the reliable IoT devices (e.g. Thermometer A and Thermometer B), (2) the feedback data associated with the reliable IoT devices (e.g. Thermometer A and Thermometer B), and/or (3) the sensor information associated with the reliable IoT devices (e.g. Thermometer A and Thermometer B), to name a few. The first machine-readable instructions, in embodiments, may include instructions that the cause the first graphical user interface to be displayed upon receipt by an electronic device with a display screen. In embodiments, the first graphical user interface may also include feedback data from IoT devices that are marked as unreliable. In embodiments, where unreliable feedback data is displayed, the computing device 2702 may highlight the unreliable and/or reliable feedback data and/or the computing device 2702 may weigh the reliable feedback data more in its presentation of the feedback data.

In embodiments, the process may continue from with step S4438. At step S4438, the computing device 2702 may execute the first machine-readable instructions to present the first graphical user interface on a display screen associated with the computing device. The display screen described herein may be similar to the monitor 1823 described above in connection with FIG. 18, the description of which applying herein.

In embodiments, the computing device may transmit the first machine-readable instructions to one or more of the following: a device associated with at least one administrator of the computing device 2702, a device associated with the owner of the IoT devices, and/or a device associated with a third party, to name a few. Upon receipt, the device may display the first graphical user interface.

In embodiments, the process for determining whether at least one sensor device is at least partially defective may optionally continue with one or more of the processes described in connection with FIGS. 45E, 45F, and 45G. Each process may be executed contemporaneously and/or separately. In embodiments, each process may be optionally executed after step S4425.

Figure 44E:
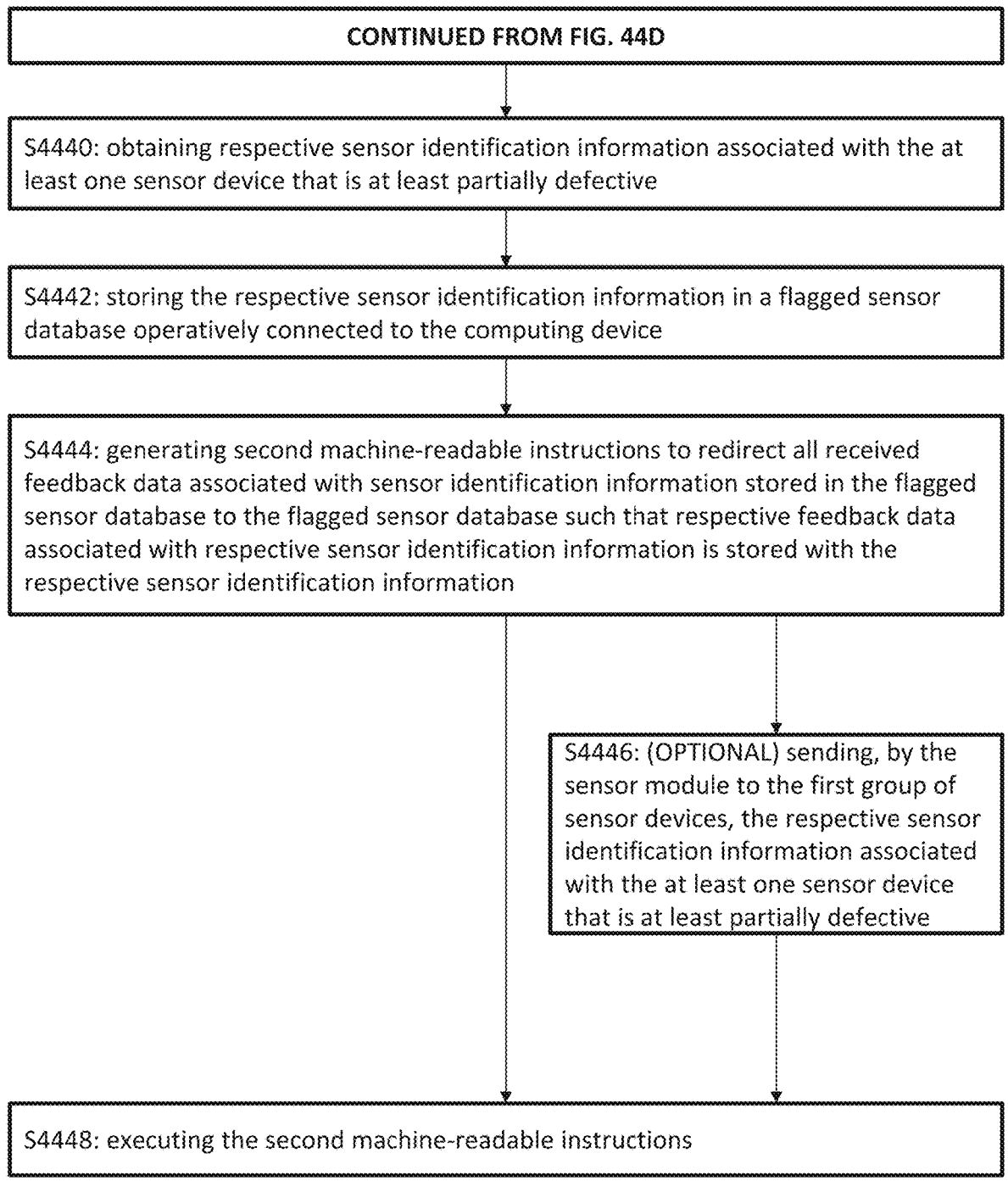

In embodiments, the computing device 2702 and/or the sensor module 4306 may flag one or more IoT devices that are at least partially defective and/or unreliable. Referring to FIG. 44E, in embodiments the process for flagging at least one sensor device that is at least partially defective and/or unreliable may optionally begin with step S4440. At step S4440, in embodiments, the sensor module 4306 and/or the computing device 2702 may obtain respective sensor identification information associated with the at least one sensor device that is at least partially defective. Continuing the example, the computing device 2702 may obtain the sensor information associated with the thermometer 4344. Once obtained, the computing device 2702 may extract the sensor identification information associated with thermometer 4344. As shown above and reproduced below, for example, the thermometer 4344 may have the following sensor identification information:

| Thermometer 4344 Sensor Identification Information |
| --- |
| Unique Name - First Floor Thermometer<br>Sensor Type - Thermometer |

In embodiments, the computing device 2702 may also create a second group of IoT devices. The second group of IoT devices may be each IoT device of the first group of IoT devices 4304 that is not at least partially defective. Continuing the example, the second group of IoT devices may be Thermometer A and Thermometer B.

In embodiments the process for flagging at least one sensor device that is at least partially defective and/or unreliable may optionally continue with step S4442. At step S4442, in embodiments, the sensor module 4306 and/or the computing device 2702 may store the extracted sensor identification information in a flagged sensor database operatively connected to the computing device 2702. In embodiments, the sensor identification information may be stored with other IoT devices that have been or will be flagged as at least partially defective and/or unreliable, in one or more of the following: a flagged sensor database, memory 2702-3, memory of the sensor module 4306, and/or the memory device 4308, to name a few.

In embodiments the process for flagging at least one sensor device that is at least partially defective and/or unreliable may optionally continue with step S4444. At step S4444, in embodiments, the sensor module 4306 and/or the computing device 2702 may generate second machine-readable instructions. In embodiments, the second machine readable instructions may be instructions to redirect all received sensor feedback information that is associated with the at least one sensor device that is at least partially defective and/or unreliable. The instructions to redirect the sensor feedback information, in embodiments, may cause all received sensor feedback information that is associated with the at least one sensor device that is at least partially defective and/or unreliable to be stored with the respective sensor identification information (e.g. in the flagged sensor database). Continuing the example, until the thermometer 4344 is repaired and/or replaced, the redirect instructions may cause all sensor feedback information received from thermometer 4344 by the computing device 2702 to be transmitted to the flagged sensor database (e.g. skipping steps S4414-S4428 in the next iteration of the currently described process(es)).

In embodiments, the following is exemplary code for redirecting flagged sensor feedback information in accordance with exemplary embodiments of the present invention:

may include the extracted sensor identification information associated with the at least one IoT device that is at least partially defective and/or unreliable.

Once generated, in embodiments at optional step S4446, the plurality of machine-readable instructions may be transmitted by the computing device 2702 to each IoT device of the second group of IoT devices 4304 via network 100. In embodiments, upon receipt of respective machine-readable instructions, the respective IoT device may execute the instructions and store the extracted sensor identification information associated with the at least one IoT device that is at least partially defective and/or unreliable rating to ignore all transmissions from said extracted sensor identification information and cease transmitting to the at least one IoT device.

In embodiments the process for flagging at least one sensor device that is at least partially defective and/or unreliable may optionally continue with step S4448. At step S4448, in embodiments, the sensor module 4306 and/or the computing device 2702 may execute the second-machine readable instructions, flagging the at least one IoT device and redirecting the respective sensor feedback information.

In embodiments, the computing device 2702 may determine that the at least one IoT device that is at least partially Exemplary Pseudocode

```
import numpy as np
import pandas as pd
from pandas import Series
from pandas import DataFrame
from sklearn.metrics, pairwise import euclidean_distances
from sklearn.metrics.pairwise import paired_distances
from scipy.spatial.distance import cdist
d = {'col1': [0, 1, 2, 3, 4, 5, 6, 7, 8, 9, 10, 11, 12, 13, 14, 15, 16, 17, 18, 19, 20, 21, 22],
'col2': [0, 1, 1, 1, 2, 1, 1, 2, 3, 2, 1, 1, 1, 1, 1, 2, 1, 1, 3, 4, 1, 2, 3]}
df = pd.DataFrame(data=d)
d2 = {'col1': [0, 1, 2], 'col2': [1, 2, 3]}
patch = pd.DataFrame(data = d2)
def orig(df, patch):
    df['corr'] = np.nan
    for i in range(df.shape[0]):
        #select the df window with the same size of patch
        window = df[i : i+patch.shape[0]]
        #If window and patch have different shapes --> Break
        if window. shape[0] != patch. shape[0] :
            break
        else:
            patch.reset_index(inplace=True, drop=True)
            window.reset_index(inplace=True, drop=True)
            df['corr'] = cdist(df[['col2']], patch[['col2']],'euclidean')
        if df['corr'] < THRESHOLD :
            move(df, bad_readings_folder)
```

The above exemplary code was based on computer code for pattern finding within a time series graph available at: https://stackoverflow.com/questions/55057635/find-pattern-in-time-series-graph-with-pandas.

Figure 44F:
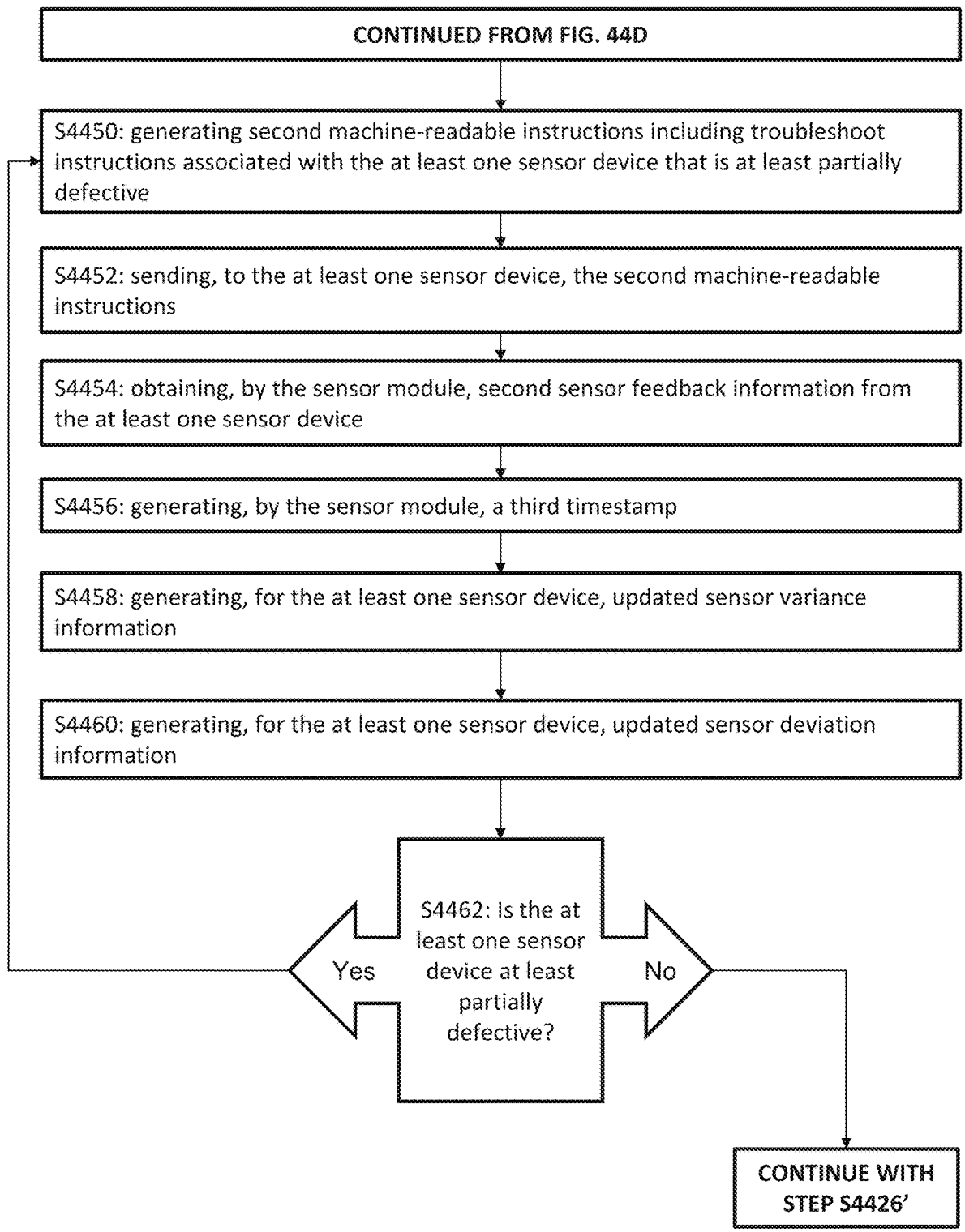

In embodiments, the computing device 2702 may generate a plurality of machine-readable instructions, each of the plurality being for each IoT device of the second group of IoT devices and/or plurality of IoT devices 4302 less the at least one partially defective and/or unreliable IoT device. The machine-readable instructions, in embodiments, may include instructions to ignore all transmissions from the at least one IoT device that is at least partially defective and/or unreliable. In embodiments, the instructions may include a direction to cease transmitting data to the at least one IoT device that is at least partially defective and/or unreliable. In embodiments, the plurality of machine-readable instructions defective and/or unreliable can be fixed using troubleshoot instructions. In embodiments, the troubleshoot instructions may be stored with the respective sensor information. Referring to FIG. 44F, in embodiments the process for troubleshooting an IoT device may optionally begin with step S4450. At step S4450, in embodiments, the sensor module 4306 and/or the computing device 2702 may generate second machine-readable instructions. In embodiments, the second machine readable instructions may include troubleshoot instructions associated with the at least one sensor device that is at least partially defective. The troubleshoot instructions, in embodiments, may be extracted from sensor information associated with the at least one IoT device. In embodiments, the troubleshoot instructions may be obtained via a third party (e.g. third party database 4310).

In embodiments the process for troubleshooting an IoT device may optionally continue with step S4452. At step S4452, in embodiments, the sensor module 4306 and/or the computing device 2702 may transmit the second machine-readable instructions to the at least one IoT device that is at least partially defective and/or unreliable via network 100. Upon receipt of the second machine-readable instructions, in embodiments, the at least one IoT device may execute the second machine-readable instructions, causing the at least one IoT device to troubleshoot its software.

In embodiments, at step S4454, the computing device 2702 may obtain second sensor feedback information from the at least one IoT device that is at least partially defective and/or unreliable. Step S4454, in embodiments, may be similar to step S4410 described above in connection with FIG. 44A, the description of which applying herein. In embodiments, the second sensor feedback information may be similar to the sensor feedback information described above in connection with FIGS. 44A-44D, the description of which applying herein.

In embodiments, the process for troubleshooting an IoT device may continue with step S4456. At step S4456, the sensor module 4306 and/or the computing device 2702 may generate a third timestamp. The third timestamp, in embodiments, may indicate a time at which the second sensor feedback information was obtained. In embodiments the sensor feedback information and third timestamp are stored by the computing device 2702 and/or the sensor module 4306. In embodiments, the second sensor feedback information and/or the third timestamp may be stored, separately and/or together, in one or more of the following: the flagged sensor database, memory 2702-3, memory of the sensor module 4306, and/or the memory device 4308, to name a few. In embodiments, the computing device 2702 may also obtain second additional information from one or more third party database(s) 4310. The second additional information and manner of obtaining said information may be similar to the description of additional information (e.g. weather information) described above in connection with FIGS. 44A-44D, the description of which applying herein.

In embodiments, the process for troubleshooting an IoT device continue with step S4458. At step S4458, the sensor module 4306 and/or the computing device 2702 may generate second sensor variance information for the at least one IoT device. The second sensor variance information may be based on at least one of the following: the second sensor feedback information, the third timestamp, the second additional information, the sensor feedback information, the sensor information, the aforementioned additional information (e.g. weather information), the first timestamp (e.g. associated with gathering and/or transmitting of the sensor feedback information), and/or the second timestamp (e.g. associated with the receipt of the sensor feedback information, to name a few. The generation of the second sensor variance information for the at least one IoT device may be similar to the generation of the sensor variance information described above in connection with step S4416 of FIG. 44A, the description of which applying herein.

In embodiments, the process for troubleshooting an IoT device continue with step S4460. At step S4460, the sensor module 4306 and/or the computing device 2702 may generate second sensor deviation information for the at least one IoT device. In embodiments, the second sensor deviation information may be based on at least one of the following: the second sensor feedback information, the second sensor variance information, the third timestamp, the sensor feedback information, the sensor information, the aforementioned additional information (e.g. weather information), the first timestamp (e.g. associated with gathering and/or transmitting of the sensor feedback information), and/or the second timestamp (e.g. associated with the receipt of the sensor feedback information, to name a few. The generation of the second sensor deviation information for the at least one IoT device may be similar to the generation of the sensor deviation information described above in connection with step S4418 of FIG. 44A, the description of which applying herein.

In embodiments, the process for troubleshooting an IoT device continue with step S4462. At step S4462, the sensor module 4306 and/or the computing device 2702 may determine whether the at least one IoT device remains at least partially defective. Determining whether the at least one IoT device remains partially defective may be similar to step S4424 described above in connection with FIGS. 44B and 44C, the description of which applying herein.

In embodiments, the sensor module 4306 and/or the computing device 2702 may determine a current reliability rating of the at least one IoT device. In embodiments, the determination of the current reliability rating for the at least one IoT device may be similar to step S4422 described above in connection with FIGS. 44A-44D, the description of which applying herein.

In embodiments, once the at least one IoT device has received the troubleshoot instructions and the computing device 2702 and/or the sensor module 4306 have determined whether the at least one IoT device is defective, the computing device 2702 may generate and send an updated notice. The updated notice, in embodiments, may identify whether the at least one sensor device is still at least partially defective. In embodiments, the computing device 2702 may also generate and send an updated report regarding the at least one partially defective IoT device. The report, in embodiments, may include one or more of the following: (1) sensor information associated with the at least one partially defective IoT device, (2) a repair message indicating the at least one partially defective IoT device, (3) second sensor feedback information, and/or (4) the sensor feedback information associated with the at least one partially defective IoT device, to name a few. The repair message may indicate one or more of the following: (1) the issue associated with the IoT device, (2) whether a purchase order has been sent for necessary parts and/or replacement (see steps S4464-S4468, the descriptions of which applying herein), and/or (3) an acceptable timeframe to repair the at least one partially defective IoT device, to name a few. In embodiments, the updated notice and/or updated report may be transmitted from the computing device 2702 to the device associated with the at least one administrator.

In embodiments, if the at least one IoT device remains at least partially defective and/or unreliable, the computing device 2702 may repeat this process with second troubleshoot instructions. In embodiments, if the at least one IoT device is no longer at least partially defective and/or unreliable, the process may continue with step S4426' of FIG. 45B.

Figure 44G:
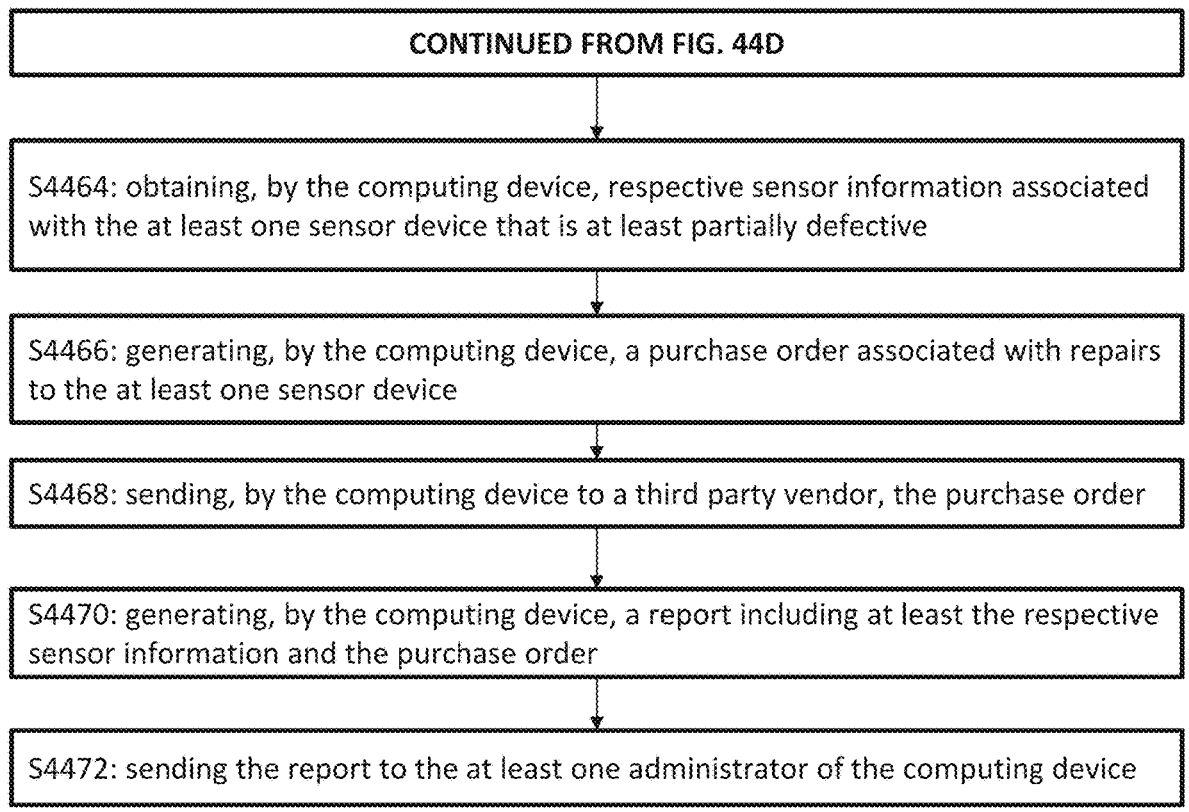

In embodiments, the computing device 2702 and/or sensor module 4306 may determine one or more parts and/or a replacement IoT device are required for repairs to the at least one IoT device. Referring to FIG. 44G, in embodiments the process for purchasing parts and/or a replacement IoT device may optionally begin with step S4464. At step S4464, in embodiments, the sensor module 4306 and/or the computing device 2702 may obtain respective sensor information associated with the at least one sensor device that is at least partially defective and/or unreliable. Once obtained, the computing device 2702 and/or sensor module 4306 may extract a purchase order associated with the part and/or IoT device.

Continuing with step S4466, the computing device 2702 may generate a purchase order associated with repairs to the at least one sensor device. For example, the computing device 2702 may use information from the respective sensor information to populate the purchase order. In embodiments, the information may include the information illustrated in connection with FIG. 43E. In embodiments, the computing device may have access to payment methods for purchase orders (e.g. a credit card number, bank account, etc.) and use said payment methods with the purchase order. In embodiments, the computing device 2702 may have a stored value, of which the purchase order may not exceed. The stored value, in embodiments, may prevent the computing device 2702 from spending too much capital to repair and/or replace the at least one IoT device. Continuing with step S4468, the computing device 2702 may send the generated purchase order to a third party vendor via network 100. In embodiments, the computing device 2702 may extract the contact information from the information illustrated in FIG. 43E.

Continuing with step S4470, the computing device 2702 may generate a report. In embodiments, the report may include one or more of the following: a copy of the purchase order, the respective sensor information, and/or the repair message, to name a few. At step S4472, the computing device 2702 may send the report to the device associated with the at least one administrator and/or a device associated with the person or persons who will be responsible for repairing and/or replacing the IoT device.

In embodiments, the steps of the processes described above in connection with FIGS. 44A-44G may be rearranged and/or omitted.

In embodiments, a process for detecting at least a partially defective sensor device may include: (a) providing a plurality of sensor devices operatively connected via a network to a computing device; (b) providing a reliability rating database operatively connected to the computing device, wherein the reliability rating database comprises a respective historical reliability rating for each sensor device of the plurality of sensor devices; (c) storing, by the computing device, in at least one memory element operatively connected to the computer device, sensor information associated with each sensor device of the plurality of sensor devices, wherein the sensor information includes, for each sensor device of the plurality of sensor devices: (1) sensor identification information unique to each sensor device; (2) location information indicating sensor location; (3) data range information indicating a range of sensor values, the data range information including: (i) a maximum sensor value; and (ii) a minimum sensor value; (d) accessing, by a sensor module of the computing device, the sensor information; (e) selecting, by the sensor module, at least a first group of sensor devices of the plurality of sensor devices based on at least the sensor information, (f) obtaining, by the sensor module, first sensor feedback information from one or more sensor devices of the first group of sensor devices, wherein the sensor feedback information includes: (1) identification information associated with a respective sensor device providing the first sensor feedback information; (2) first feedback data provided by the respective sensor device in response to stimuli; and (3) a first timestamp indicating a first time at which the first feedback data was generated by the respective sensor device; (g) generating, by the sensor module, a second timestamp indicating a time at which the first sensor feedback data was obtained by the sensor module; (h) storing, by the sensor module, the first sensor feedback information, including the second timestamp in the at least one memory element; (i) generating, by the sensor module, for each sensor device of the first group of sensor devices, sensor variance information based on at least the first sensor feedback information; (j) generating, by the sensor module for each sensor device of the first group of sensor devices, sensor deviation information based on at least the first sensor feedback information and the generated sensor variance information; (k) storing, by the sensor module in the at least one memory element, respective sensor variance information and respective sensor deviation information associated with each sensor device of the first group of sensor devices; (l) determining, by the computing device, a determined reliability rating of each sensor device of the first group of sensor devices based on at least the following: (1) respective sensor variance information; (2) respective sensor deviation information; and (3) respective first sensor feedback information; (m) determining, by the computing device, whether at least one sensor device of the first group of sensor devices is at least partially defective based on at least the following: (1) comparing, by the computing device, first respective sensor feedback information associated with the at least one sensor device with first respective data range information associated with the at least one other sensor device; (2) comparing, by the computing device, the first respective sensor feedback information with second respective sensor feedback information associated with one or more other sensor devices of the first group of sensor devices; and (3) analyzing respective determined reliability rating, wherein the computing device determines that the at least one sensor device is at least partially defective when at least one of the following occurs: (A) the computing device determines that the first respective sensor feedback data varies by more than a first predetermined threshold from the first respective data range information; (B) the computing device determines that the first respective sensor feedback data is inconsistent with the second respective sensor feedback data; and (C) the computing device determines that the first respective reliability rating indicates the at least one sensor device is unreliable; (n) generating, by the computing device, a notice message identifying the at least one sensor device that is at least partially defective, where the notice message includes cause information indicating the at least one sensor device is at least partially defective; and (o) sending the notice message to a device associated with at least one user of the computing device.

In embodiments, the computing device weighs respective sensor feedback information associated with one or more sensor devices of the plurality of sensor devices that are associated with a first respective reliability rating indicating that one or more sensor devices are reliable more than respective sensor feedback information associated with one or more sensor devices of the plurality of sensor devices that are associated with a second respective reliability rating indicating that one or more sensor devices are unreliable.

In embodiments, determining whether the at least one sensor device is partially defective may further comprise: (4) obtaining, by the computing device from the reliability rating database, respective historical reliability ratings for each sensor device of the first group of sensor devices. In embodiments, in the event that both the obtained reliability rating and the determined reliability rating indicate the respective sensor device is unreliable, the respective sensor device is at least partially defective. In embodiments, in the event that both the obtained reliability rating indicates the respective sensor device is reliable and the determined reliability rating indicates the respective sensor device is unreliable, the respective sensor device is not at least partially defective. In embodiments, in the event that both the obtained reliability rating indicates the respective sensor device is unreliable and the determined reliability rating indicates the respective sensor device is reliable, the respective sensor device is not at least partially defective.

In embodiments, the method further comprises: (p) identifying, by the computing device, respective feedback data associated with one or more sensors that are rated as reliable; (q) generating, by the computing device, first machine-readable instructions to provide a first graphical user interface, wherein the first graphical user interface presents a display the respective feedback data associated with the one or more sensors that are rated as reliable; and (r) presenting, by the computing device based on the first machine-readable instructions, the first graphical user interface on a display screen associated with the computing device.

In embodiments, the method further comprises: (p) generating, by the computing device, second machine-readable instructions including troubleshoot instructions, wherein the troubleshoot instructions are associated with the at least one sensor device; (q) sending, by the sensor module to the at least one sensor device via the network, the second machine-readable instructions, wherein, upon receipt of the second machine-readable instructions, the at least one sensor device performs a troubleshoot operation by executing the second machine-readable instructions; (r) obtaining, by the sensor module from the at least one sensor device, second sensor feedback information; (s) generating, by the sensor module, a third timestamp indicating a time at which the second sensor feedback information was obtained by the sensor module; (t) generating, by the sensor module, for the at least one sensor device, updated sensor variance information based on at least the second sensor feedback information and the sensor feedback information; (u) generating, by the sensor module for the at least one sensor device, updated sensor deviation information based on at least the sensor feedback information, the generated sensor variance information, the second sensor feedback information, the updated sensor variance information and the sensor deviation information; (v) determining, by the computing device, whether at least one sensor device of the first group of sensor devices is at least partially defective based on at least the following: (1) comparing, by the computing device, first respective second sensor feedback information associated with the at least one sensor device with the first respective data range information associated with the at least one other sensor device; (2) comparing, by the computing device, the first respective second sensor feedback information with second respective second sensor feedback information associated with one or more other sensor devices of the first group of sensor devices; and (3) analyzing at least the updated sensor variance information and the updated sensor deviation information, wherein the computing device determines that the at least one sensor device is at least partially defective when at least one of the following occurs: (A) the computing device determines that the first respective second sensor feedback information varies by more than the first predetermined threshold from the first respective data range information; (B) the computing device determines that first respective second sensor feedback information is inconsistent with the second respective second sensor second feedback information; and (C) the computing device determines that the sensor variance information and the updated sensor deviation information indicate the at least one sensor device is unreliable; (w) generating, by the computing device, an updated notice message identifying whether the at least one sensor device is at least partially defective; and (x) sending the updated notice message to at least one administrator of the computing device.

In embodiments, the method further comprises: (p) obtaining, by the computing device, respective sensor information associated with the at least one sensor device that is at least partially defective; (q) generating, by the computing device, a report comprising at least the following: (1) the respective sensor information; and (2) a repair message indicating at least that the at least one sensor device is at least partially defective; and (r) sending, by the computing device to the device associated with the at least one user, the report. In embodiments, the method further comprises: (s) sending, by the computing device to an electronic device operatively connected to the computing device, the report.

In embodiments, the method further comprises: (p) obtaining, by the computing device, respective sensor information associated with the at least one sensor device that is at least partially defective; (q) determining, by the computing device based on the sensor information, at least one item to purchase, wherein the one item is associated with the at least one sensor device; (r) generating, by the computing device, a purchase order comprising at least the following: (1) the respective sensor information associated with the at least one sensor device that is at least partially defective; and (2) the at least one item; and (s) sending, by the computing device, the purchase order to a third party vendor. In embodiments, the method further comprises: (t) generating, by the computing device, a report comprising at least the following: (1) the respective sensor information; (2) information identifying the at least one item; and (3) a repair message indicating at least the following: (i) that the at least one sensor device is at least partially defective; (ii) the at least one item; (u) sending, by the computing device to the device associated with the at least one user, the report. In embodiments, the method further comprises: (v) sending, by the computing device to an electronic device operatively connected to the computing device, the repair message.

In embodiments, the method further comprises: (p) obtaining, by the computing device, respective sensor identification information associated with the at least one sensor device that is at least partially defective; (q) storing, in a flagged sensor database of the computing device, the respective sensor identification information; (r) generating, by the computing device, second machine-readable instructions to: (1) flag, by the flagged sensor database, obtained respective sensor feedback data associated with the sensor identification information stored in the flagged sensor database; and (2) store, in the flagged sensor database, the flagged respective sensor feedback data; and (s) executing, by the computing device, the second machine-readable instructions. In embodiments, the flagged respective sensor feedback data is stored with the respective sensor identification information. In embodiments, the method further comprises: (t) generating, by the computing device, third machine-readable instructions to: (1) ignore data received from the at least one sensor device that is at least partially defective; and (2) cease transmitting data to the at least one sensor device that is at least partially defective; and (u) sending, by the computing device to each sensor device of a second group of sensor devices, the third machine-readable instructions, wherein the second group of sensor devices is the first group of sensor devices less the at least one sensor device, and wherein, upon receipt of the third machine-readable instructions, each of the second group of sensor devices executes the third machine-readable instructions.

In embodiments, the method further comprises: (p) generating, by the computing device, a reliability report comprising, for each sensor device of the first group of sensor devices, at least: (1) a respective reliability rating; and (2) respective feedback data; and (q) transmitting, by the computing device to the device associated with the at least one user, the reliability report.

In embodiments, the method further comprises: (p) obtaining, by the computing device for each sensor device of the first group of sensor devices, first weather information associated with at least a first respective temperature at the first time within a predetermined radius of respective location information, wherein the sensor variance information is further based on the first weather information, and wherein the sensor deviation information is further based on the first weather information.

In embodiments, the first group of sensor devices is selected based on location information.

In embodiments, the first group of sensor devices is selected based on the sensor identification information.

In embodiments, the location information, for each sensor device of the plurality of sensor devices, includes respective hierarchical information associated with a respective sensor device. In embodiments, the first group of sensor devices is selected based at least in part on respective hierarchical information.

In embodiments, the first group of sensor devices selected by the sensor module by performing the following steps: (1) determining, by the sensor module for each sensor device of the plurality of sensor devices, respective location information; (2) selecting, by the sensor module, a group of sensor devices of the plurality of sensor devices based on the respective location information, wherein each sensor device of the group of sensor devices are within a predetermined radius; and (3) determining, by the sensor module for each sensor device of the group of sensor devices, a respective sensor type based on respective sensor identification information, wherein the first group of sensor devices is each sensor device of the group of sensor devices that are of a first type of sensor device.

In embodiments, the senor identification information comprises, for each sensor device, at least the following: (A) a sensor type; (B) sensor specification information; and (C) sensor running time information indicating a respective amount of time a respective sensor has been operating.

In embodiments, the sensor information further includes: (4) sensor proximity information, indicating one or more sensor devices within a predefined distance of a respective sensor device.

In embodiments, determining whether the at least one sensor device is at least partially defective is further based at least partially on respective sensor variance information, respective first timestamp, and respective second timestamp.

In embodiments, the plurality of sensor devices includes at least one of: (1) a temperature sensor; (2) a pressure sensor; (3) a torque sensor; (4) a MEMS sensor; (5) a humidity sensor; (6) an air moisture sensor; (7) an air flow sensor; (8) a dielectric soil moisture sensor; (9) an optical sensor; (10) an electro-chemical sensor; (11) an accelerometer; (12) a gyrometer; (13) a magnetometer; (14) a proximity sensor; (15) an air bubble detector (16) a piezo film sensor; (17) an angle or position sensor; (18) a voltage sensor; (19) a current sensor; (20) a magnetic or electrical field sensor; (21) an audio sensor; (22) a pH sensor; (23) a time sensor; (24) a biological sensor; (25) a biometric sensor and (26) a radiation sensor.

In embodiments, the method further comprises: (p) determining, by the computing device, whether a first sensor device of the first group of sensor devices is detecting an emergency, based on at least the following: (1) comparing, by the computing device, first sensor feedback information associated with the first sensor device with first data range information associated with the first sensor device, wherein the computing device determines that the first sensor feedback information varies by more than a second predetermined threshold from the first data range information; (2) comparing, by the computing device, the first sensor feedback information with at least second sensor feedback information associated with a second sensor device of the first group of sensor devices, wherein the computing device determines that the first sensor feedback data is consistent with at least the second sensor feedback data; and (3) analyzing, by the computing device a first determined reliability rating associated with the first sensor device, wherein the first determined reliability rating indicates that the first sensor device is reliable; and (q) generating, by the computing device, an emergency notification indicating that the first sensor device is detecting an emergency event; and (r) sending the emergency notification to the at least one administrator of the computing device.

In embodiments, the method further comprises: (p) sending, by the computing device to an electronic device operatively connected to the computing device, the notice message.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly. Those of ordinary skill in the art will recognize that the method and apparatus of the present invention described herein, and others implied have many applications; therefore, the present invention which is the subject of this application is not limited by or to the representative examples and/or methods disclosed herein, nor limited by or to the embodiments described herein. Moreover, various other embodiments and modifications to these exemplary embodiments may be made by those skilled in the relevant art without departing from the scope or spirit of these inventions. Accordingly, the inventions are not to be limited by the foregoing specification, except as by the appended claims.

What is claimed is:

1. A computer system comprising: 1) at least one processor; and 2) memory operably connected to the at least one processor, the memory including processor executable instructions that when executed by the at least one processor execute the steps of: (a) obtaining, by a sensor module associated with the at least one processor, first sensor feedback information from each sensor device of a first group of sensor devices of a plurality of sensor devices operatively connected via a network to the computer system, wherein the first sensor feedback information includes: (1) identification information associated with each respective sensor device providing first sensor feedback information; (2) respective first readout information provided by each respective sensor device; (3) respective first metadata information associated with and provided by each respective sensor device; and (4) respective first timestamp information indicating a respective first time at which the respective first readout information was generated by the respective sensor device; (b) generating, by the sensor module, respective second timestamp information indicating a respective second time at which the first sensor feedback information was obtained by the sensor module; (c) storing, in the memory, the first sensor feedback information, including the second timestamp, wherein the memory further includes historical sensor feedback information associated with one or more sensor devices of the plurality of sensor devices, wherein the historical sensor feedback information includes: (1) identification information associated with each respective sensor device of the one or more sensor devices associated with the historical sensor feedback information; (2) respective historical readout information provided by each respective sensor device of the one or more sensor devices associated with the historical sensor feedback information; (3) respective historical metadata information associated with and provided by each respective sensor device of the one or more sensor devices associated with the historical sensor feedback information; and (4) respective historical timestamp information indicating a respective historical time at which the respective historical feedback information was generated by the respective sensor device of the one or more sensor devices associated with the historical sensor feedback information, wherein the memory comprises: (i) a reliability rating database which comprises a respective historical reliability rating for each sensor device of the plurality of sensor devices, and (ii) a sensor information database which includes for each sensor device of the plurality of sensor devices, sensor information including: (a) sensor identification information unique to each sensor device; (b) location information indicating a sensor location associated with each sensor device; and (C) data range information indicating a range of permissible sensor values for the respective sensor device; (d) calculating, by the sensor module, for each sensor device of the first group of sensor devices, respective sensor variance information based on at least one of the following: (1) respective first sensor feedback information; (2) respective historical sensor feedback information; and (3) respective predictive data, wherein the respective predictive data is generated by the computer system by populating a database with respective exemplary readout information associated with a sensor device of the first group of sensor devices; (e) calculating, by the sensor module for each sensor device of the first group of sensor devices, respective sensor deviation information based on at least one of the following: (1) respective sensor variance information; and (2) first sensor feedback information; (f) storing, by the sensor module in the memory, the respective sensor variance information and the respective sensor deviation information associated with each sensor device of the first group of sensor devices; (g) determining, by the computer system, a reliability rating of each sensor device of the first group of sensor devices based on at least the following: (1) the respective sensor variance information; (2) the respective sensor deviation information; and (3) the respective first sensor feedback information; (h) determining, by the computer system, whether at least one sensor device of the first group of sensor devices is out of specification by performing at least the following steps: (1) comparing, by the computer system, first respective sensor feedback information associated with the at least one sensor device with first respective data range information associated with the at least one other sensor device, wherein, the computer system determines that the at least one sensor device is out of specification when the first respective sensor feedback data varies by more than a first predetermined threshold from the first respective data range information; (2) comparing, by the computer system, the first respective sensor feedback information with second respective sensor feedback information associated with one or more other sensor devices of the first group of sensor devices, wherein the computer system determines that the at least one sensor device is out of specification when the first respective sensor feedback data is inconsistent with the second respective sensor feedback data; and (3) determining that the at least one sensor device is out of specification by performing the following steps: (A) obtaining respective reliability ratings for at least the at least one sensor device; (B) in the event the respective reliability ratings indicate the at least one sensor is unreliable, the at least one sensor device is determined to be out of specification; and (C) in the event the respective reliability ratings indicate the at least one sensor is not unreliable, the at least one sensor device is not determined to be out of specification; (i) in the case where at least one sensor device is determined to be out of specification, performing the following steps: (1) generating, by the computer system, a notice message identifying the at least one sensor device that is out of sequence, where the notice message includes cause information indicating the at least one sensor device is out of specification; and (2) sending the notice message to a device associated with at least one user of the computer system; and ( ) updating, by the sensor module, the historical sensor feedback information with the first sensor feedback information.

2. The computer system of claim 1, wherein in step (d), the sensor module calculates, for each sensor device of the first group of sensor devices, respective sensor variance information further based on: (4) calculated results of a Hidden Markov Model (HMM) algorithm utilizing one or more of the following as an input: a. the respective sensor variance information; b. the respective sensor deviation information; c. the respective first sensor feedback information; and d. respective historical sensor feedback information.

3. The computer system of claim 1, wherein in step (d), the sensor module calculates, for each sensor device of the first group of sensor devices, respective sensor deviation information further based on at least one of the following: (3) respective historical sensor feedback information; (4) respective predictive data; and (5) calculated results of a Hidden Markov Model (HMM) algorithm utilizing one or more of the following as an input: a. the respective sensor variance information; b. the respective sensor deviation information; c. the respective first sensor feedback information; and d. respective historical sensor feedback information.

4. The computer system of claim 1, wherein step (h)(2) of comparing the first respective sensor feedback information with second respective sensor feedback information further comprises comparing the first respective sensor feedback information with one or more of the following: (A) historical sensor feedback information associated with the respective sensor device; (B) historical sensor feedback information associated with the one or more other sensor devices of the first group of sensor devices; (C) predictive data associated with the respective sensor device, wherein the respective predictive data is generated by the computer system utilizing respective exemplary readout information associated with the respective sensor; (D) predictive data associated with the one or more other sensor devices of the first group of sensor devices, wherein the respective predictive data is generated by the computer system utilizing respective exemplary readout information associated with the one or more other sensor devices of the first group of sensor devices.

5. The computer system of claim 1, wherein the computer system weights respective sensor feedback information associated with one or more sensor devices of the plurality of sensor devices that are associated with a first respective reliability rating indicating that one or more sensor devices are reliable more than respective sensor feedback information associated with one or more sensor devices of the plurality of sensor devices that are associated with a second respective reliability rating indicating that one or more sensor devices are unreliable.

6. The computer system of claim 1, wherein determining whether the at least one sensor device of the first group of sensor devices is out of sequence further comprises: (4) obtaining, by the computer system from the reliability rating database, a respective historical reliability rating for each sensor device of the first group of sensor devices; and (5) weighting respective sensor feedback information associated with reliable sensor devices of the first group of sensor devices more than sensor feedback information associated with unreliable sensor devices of the first group of sensor devices.

7. The computer system of claim 6, wherein, in the event that both the respective historical reliability rating and the determined reliability rating associated with the at least one sensor device indicate that the at least one sensor device is unreliable, the at least one sensor device is determined to be out of sequence.

8. The computer system of claim 6, wherein, in the event that the respective historical reliability rating indicates that the at least one sensor device is reliable and the determined reliability rating indicates the at least one sensor device is unreliable, the respective sensor device is determined to be out of sequence.

9. The computer system of claim 6, wherein, in the event that the respective historical reliability rating indicates the at least one sensor device is unreliable and the determined reliability rating indicates the at least one sensor device is reliable, the at least one sensor device is determined to be not out of sequence.

10. The computer system of claim 1, wherein the memory includes processor executable instructions that when executed by the at least one processor execute the steps of: (k) identifying, by the computer system, respective first readout information associated with one or more sensors that are determined to be reliable based on the determined reliability rating; (l) generating, by the computer system, first machine-readable instructions to provide a first graphical user interface, wherein the first graphical user interface presents a display of the respective first readout information associated with the one or more sensors that are determined to be reliable; and (m) transmitting, by the computer system to an administrator device associated with an administrator of the computer system, the first machine-readable instructions, wherein, upon receipt, the administrator device executes the first machine-readable instructions such that the first graphical user interface is displayed on a display screen associated with the administrator device.

11. The computer system of claim 1, wherein the memory includes processor executable instructions that when executed by the at least one processor execute the steps of: (k) obtaining, by the computer system, respective sensor information associated with the at least one sensor device that is out of sequence; (l) generating, by the computer system, a report comprising at least the following: (1) the respective sensor information; and (2) a repair message indicating that the at least one sensor device is out of sequence; and (m) sending, by the computer system to the device associated with the at least one user, the report.

12. The computer system of claim 1, wherein the memory includes processor executable instructions that when executed by the at least one processor execute the steps of: (k) obtaining, by the computer system, respective sensor information associated with the at least one sensor device that is out of sequence; (l) determining, by the computer system based on the respective sensor information, at least one item associated to purchase, wherein the at least one item is associated with the at least one sensor device; (m) generating, by the computer system, a purchase order comprising at least the following: (1) the respective sensor information associated with the at least one sensor device that is out of sequence; and (2) the at least one item; and (n) sending, by the computer system, the purchase order to a third party vendor.

13. The computer system of claim 12, wherein the memory includes processor executable instructions that when executed by the at least one processor execute the steps of: (o) generating, by the computer system, a report comprising at least the following: (1) the respective sensor information; (2) information identifying the at least one item; and (3) a repair message indicating at least the following: (i) that the at least one sensor device is out of sequence; and (ii) the at least one item; and (p) sending, by the computer system to the device associated with the at least one user, the report.

14. The computer system of claim 13, wherein the memory includes processor executable instructions that when executed by the at least one processor execute the steps of: (q) sending, by the computer system to an electronic device operatively connected to the computer system, the repair message.

15. The computer system of claim 1, wherein the memory includes processor executable instructions that when executed by the at least one processor execute the steps of: (k) obtaining, by the computer system, respective sensor identification information associated with the at least one sensor device that is out of sequence; (l) storing, in a flagged sensor database of the computer system, the respective sensor identification information; (m) generating, by the computer system, second machine-readable instructions to: (1) flag, by the flagged sensor database, obtained respective sensor feedback data associated with the sensor identification information stored in the flagged sensor database; and (2) store, in the flagged sensor database, the flagged respective sensor feedback data; and (n) executing, by the computer system, the second machine-readable instructions.

16. The computer system of claim 15, wherein the memory includes processor executable instructions that when executed by the at least one processor execute the steps of: (o) generating, by the computer system, third machine-readable instructions to: (1) ignore data received from the at least one sensor device that is out of sequence; and (2) cease transmitting data to the at least one sensor device that is out of sequence; and (p) sending, by the computer system to each sensor device of a second group of sensor devices, the third machine-readable instructions, wherein the second group of sensor devices is the first group of sensor devices less the at least one sensor device, and wherein, upon receipt of the third machine-readable instructions, each of the second group of sensor devices executes the third machine-readable instructions.

17. The computer system of claim 1, wherein the memory includes processor executable instructions that when executed by the at least one processor execute the steps of: (k) obtaining, by the computer system for each sensor device of the first group of sensor devices, first weather information associated with at least a first respective temperature at the first time within a predetermined radius of respective location information, wherein the sensor variance information is further based on the first weather information, and wherein the sensor deviation information is further based on the first weather information.

18. The computer system of claim 1, wherein the first group of sensor devices selected by the sensor module by performing the following steps: (1) determining, by the sensor module for each sensor device of the plurality of sensor devices, respective location information; (2) selecting, by the sensor module, a group of sensor devices of the plurality of sensor devices based on the respective location information, wherein each sensor device of the group of sensor devices are within a predetermined radius; and (3) determining, by the sensor module for each sensor device of the group of sensor devices, a respective sensor type based on respective sensor identification information, wherein the first group of sensor devices is each sensor device of the group of sensor devices that are of a first type of sensor device.

19. The computer system of claim 1, wherein the memory includes processor executable instructions that when executed by the at least one processor execute the steps of: (k) determining, by the computer system, whether a first sensor device of the first group of sensor devices is detecting an emergency, based on at least the following: (1) comparing, by the computer system, first sensor feedback information associated with the first sensor device with first data range information associated with the first sensor device, wherein the computer system determines that the first sensor feedback information varies by more than a second predetermined threshold from the first data range information; (2) comparing, by the computer system, the first sensor feedback information with at least second sensor feedback information associated with a second sensor device of the first group of sensor devices, wherein the computer system determines that the first sensor feedback data is consistent with at least the second sensor feedback data; and (3) analyzing, by the computer system a first determined reliability rating associated with the first sensor device, wherein the first determined reliability rating indicates that the first sensor device is reliable; and (1) generating, by the computer system, an emergency notification indicating that the first sensor device is detecting an emergency event; and (m) sending the emergency notification to the at least one administrator of the computer system.

20. The computer system of claim 19, wherein the memory includes processor executable instructions that when executed by the at least one processor execute the steps of: (n) sending, by the computer system to an electronic device operatively connected to emergency services, the emergency notification.

* * * * *